(12) United States Patent
Nychis et al.

(10) Patent No.: US 10,754,493 B2
(45) Date of Patent: *Aug. 25, 2020

(54) SOFTWARE ROBOTS FOR PROGRAMMATICALLY CONTROLLING COMPUTER PROGRAMS TO PERFORM TASKS

(71) Applicant: Soroco Private Limited, London (GB)

(72) Inventors: George Peter Nychis, Somerville, MA (US); Rohan Narayan Murty, Bangalore (IN)

(73) Assignee: Soroco Private Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,031

(22) Filed: May 31, 2019

(65) Prior Publication Data
US 2019/0302968 A1    Oct. 3, 2019

Related U.S. Application Data

(63) Continuation of application No. 15/942,930, filed on Apr. 2, 2018, now Pat. No. 10,310,701, which is a
(Continued)

(51) Int. Cl.
*G06F 3/0481* (2013.01)
*G06F 3/048* (2013.01)
(Continued)

(52) U.S. Cl.
CPC .......... *G06F 3/0481* (2013.01); *G06F 3/048* (2013.01); *G06F 3/0482* (2013.01); *G06F 3/0484* (2013.01); *G06F 3/04842* (2013.01); *G06F 8/38* (2013.01); *G06F 9/44* (2013.01); *G06F 9/4488* (2018.02); *G06F 9/451* (2018.02); *G06F 9/455* (2013.01); *G06F 9/45508* (2013.01); *G06F 9/45512* (2013.01); *G06F 9/45533* (2013.01);
(Continued)

(58) Field of Classification Search
None
See application file for complete search history.

(56) References Cited

U.S. PATENT DOCUMENTS 6,226,783 B1   5/2001   Limondin et al.
7,434,167 B2   10/2008  Sinclair et al.
(Continued)

FOREIGN PATENT DOCUMENTS

EP   2657837 A1   10/2013

OTHER PUBLICATIONS

Extended European Search Report for European Application No. 16759461.3 dated Oct. 2, 2018.
(Continued)

*Primary Examiner* — Wynuel S Aquino
*Assistant Examiner* — Mark A Gooray
(74) *Attorney, Agent, or Firm* — Wolf, Greenfield & Sacks, P.C.

(57) ABSTRACT

A system comprising at least one computer hardware processor configured to perform: generating an object hierarchy comprising a plurality of objects corresponding to active graphical user interface (GUI) elements of at least one application program; controlling the at least one application program to perform a task comprising a sequence of actions at least in part by using the object hierarchy to invoke actions in the sequence of actions.

20 Claims, 53 Drawing Sheets

Related U.S. Application Data continuation of application No. 15/059,816, filed on Mar. 3, 2016, now Pat. No. 9,965,139.

(60) Provisional application No. 62/155,227, filed on Apr. 30, 2015, provisional application No. 62/127,795, filed on Mar. 3, 2015.

(51) Int. Cl.

| | | |
|---|---|---|
| *G06F 9/44* | (2018.01) | |
| *G06F 9/455* | (2018.01) | |
| *G06F 9/448* | (2018.01) | |
| *G06F 8/38* | (2018.01) | |
| *G06F 3/0484* | (2013.01) | |
| *G06F 11/36* | (2006.01) | |
| *G06F 9/451* | (2018.01) | |
| *G06F 16/9535* | (2019.01) | |
| *G06F 11/07* | (2006.01) | |
| *G06F 11/32* | (2006.01) | |
| *G06F 3/0482* | (2013.01) | |
| *G06F 11/34* | (2006.01) | |

(52) U.S. Cl.
CPC ...... *G06F 9/45558* (2013.01); *G06F 11/0706* (2013.01); *G06F 11/0766* (2013.01); *G06F 11/32* (2013.01); *G06F 11/36* (2013.01); *G06F 11/3612* (2013.01); *G06F 11/3688* (2013.01); *G06F 16/9535* (2019.01); *G06F 11/3409* (2013.01); *G06F 11/3438* (2013.01); *G06F 11/3466* (2013.01); *G06F 11/3476* (2013.01); *G06F 2009/4557* (2013.01)

(56) References Cited

U.S. PATENT DOCUMENTS

| | | | |
|---|---|---|---|
| 7,644,367 | B2 | 1/2010 | McKeon et al. |
| 7,653,896 | B2 | 1/2010 | Herdeg, III |
| 7,840,970 | B2 | 11/2010 | Liang |
| 8,020,108 | B1 | 9/2011 | Roytman et al. |
| 8,166,165 | B1 | 4/2012 | Meketa et al. |
| 8,171,460 | B2 | 5/2012 | Pizzoli et al. |
| 8,504,803 | B2 | 8/2013 | Shukla |
| 8,984,446 | B1 | 3/2015 | Meketa et al. |
| 9,965,139 | B2 | 5/2018 | Nychis et al. |
| 10,156,958 | B2 | 12/2018 | Nychis et al. |
| 10,268,333 | B2 | 4/2019 | Nychis et al. |
| 10,310,701 | B2 | 6/2019 | Nychis et al. |
| 2004/0036698 | A1 | 2/2004 | Thurner et al. |
| 2004/0046787 | A1 | 3/2004 | Henry et al. |
| 2004/0194065 | A1 | 9/2004 | McGrath et al. |
| 2004/0239701 | A1 | 12/2004 | Crichton |
| 2005/0102636 | A1 | 5/2005 | McKeon et al. |
| 2005/0108655 | A1 | 5/2005 | Andrea et al. |
| 2006/0101392 | A1 | 5/2006 | Isaza |
| 2006/0195817 | A1 | 8/2006 | Moon |
| 2008/0098296 | A1 | 4/2008 | Brichford et al. |
| 2009/0070687 | A1 | 3/2009 | Mazzaferri |
| 2009/0150868 | A1 | 6/2009 | Chakra et al. |
| 2009/0157627 | A1 | 6/2009 | Arthursson |
| 2009/0204945 | A1 | 8/2009 | Jain et al. |
| 2009/0254843 | A1 | 10/2009 | Van Wie et al. |
| 2010/0082733 | A1 | 4/2010 | Bernstein et al. |
| 2010/0174732 | A1 | 7/2010 | Levy et al. |
| 2011/0119603 | A1 | 5/2011 | Peltz et al. |
| 2012/0089931 | A1 | 4/2012 | Steinhauer |
| 2012/0324365 | A1 | 12/2012 | Momchilov et al. |
| 2013/0024778 | A1 | 1/2013 | Reeves et al. |
| 2013/0055244 | A1 | 2/2013 | Cannon et al. |
| 2013/0104051 | A1 | 4/2013 | Reeves et al. |
| 2013/0268257 | A1 | 10/2013 | Hu et al. |
| 2013/0290856 | A1 | 10/2013 | Beveridge et al. |
| 2014/0026057 | A1 | 1/2014 | Kimpton et al. |
| 2014/0109063 | A1 | 4/2014 | Schissel et al. |
| 2014/0380192 | A1 | 12/2014 | Shukla |
| 2015/0012919 | A1 | 1/2015 | Moss et al. |
| 2015/0161088 | A1 | 6/2015 | Kamada |
| 2015/0339002 | A1 | 11/2015 | Arnold et al. |
| 2016/0072873 | A1 | 3/2016 | Hu et al. |
| 2016/0085583 | A1 | 3/2016 | Goodson |
| 2016/0103923 | A1 | 4/2016 | Thomas et al. |
| 2016/0259651 | A1 | 9/2016 | Nychis et al. |
| 2016/0259652 | A1 | 9/2016 | Nychis et al. |
| 2016/0259653 | A1 | 9/2016 | Nychis et al. |
| 2016/0259654 | A1 | 9/2016 | Nychis et al. |
| 2016/0259655 | A1 | 9/2016 | Nychis et al. |
| 2016/0259717 | A1 | 9/2016 | Nychis et al. |
| 2017/0277312 | A1 | 9/2017 | Adelman et al. |
| 2017/0295243 | A1 | 10/2017 | Kim |
| 2018/0113780 | A1 | 4/2018 | Kim et al. |
| 2018/0225010 | A1 | 8/2018 | Nychis et al. |
| 2019/0034041 | A1 | 1/2019 | Nychis et al. |
| 2019/0196665 | A1 | 6/2019 | Nychis et al. |

OTHER PUBLICATIONS

Invitation to Pay Additional Fees for Application No. PCT/US2016/020588 dated Apr. 19, 2016.
International Search Report and Written Opinion for Application No. PCT/US2016/020588, dated Jul. 18, 2016.
Chang et al., Associating the Visual Representation of User Interfaces with their Internal Structures and Metadata. Paper Session: Development. Proceedings of the 24th Annual ACM Symposium on User Interface Software and Technology. 2011;245-55.
Dube, Pass any information between VBA applications using clipboard. Makeusof.com Feb. 17, 2012. pp. 1-7.
Yeh et al., Sikuli: Using GUI Screenshots for Search and Automation. Proceedings of the 22nd Annual ACM Symposium on User Interface Software and Technology: 2009;183-92.
U.S. Appl. No. 15/059,638, filed Mar. 3, 2016, Nychis et al.
U.S. Appl. No. 16/582,244, filed Sep. 25, 2019, Nychis et al.
U.S. Appl. No. 15/059,701, filed Mar. 3, 2016, Nychis et al.
U.S. Appl. No. 16/291,840, filed Mar. 4, 2019, Nychis et al.
U.S. Appl. No. 15/059,770, filed Mar. 3, 2016, Nychis et al.
U.S. Appl. No. 15/059,816, filed Mar. 3, 2016, Nychis et al.
U.S. Appl. No. 15/942,930, filed Apr. 2, 2018, Nychis.
U.S. Appl. No. 15/059,883, filed Mar. 3, 2016, Nychis et al.
U.S. Appl. No. 15/059,907, filed Mar. 3, 2016, Nychis et al.
U.S. Appl. No. 16/150,743, filed Oct. 3, 2018, Nychis et al.
EP 16759461.3, Oct. 2, 2018, Extended European Search Report.
PCT/US2016/020588, Apr. 19, 2016, Invitation to Pay Additional Fees.
PCT/US2016/020588, Jul. 18, 2016, International Search Report and Written Opinion.

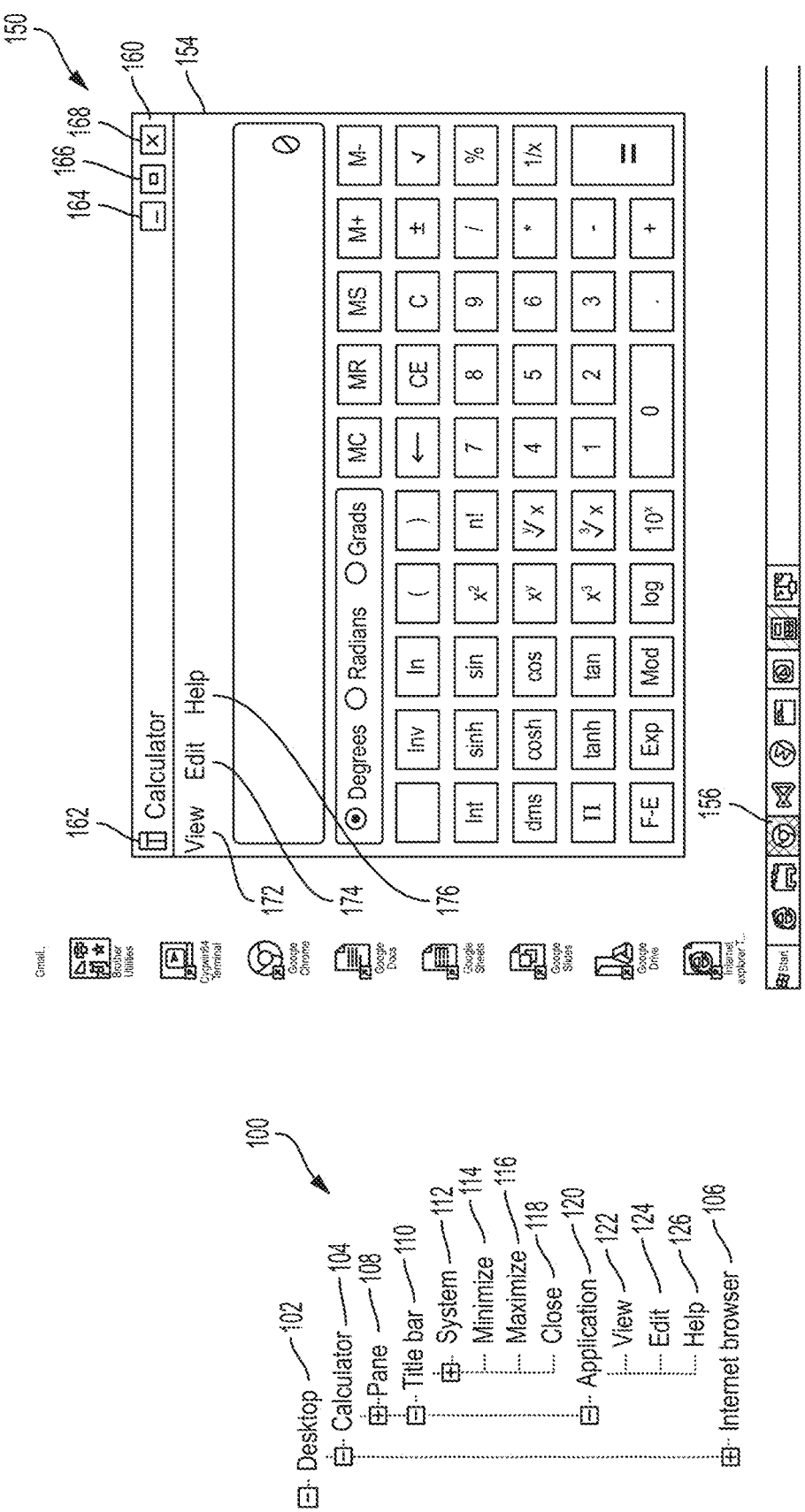

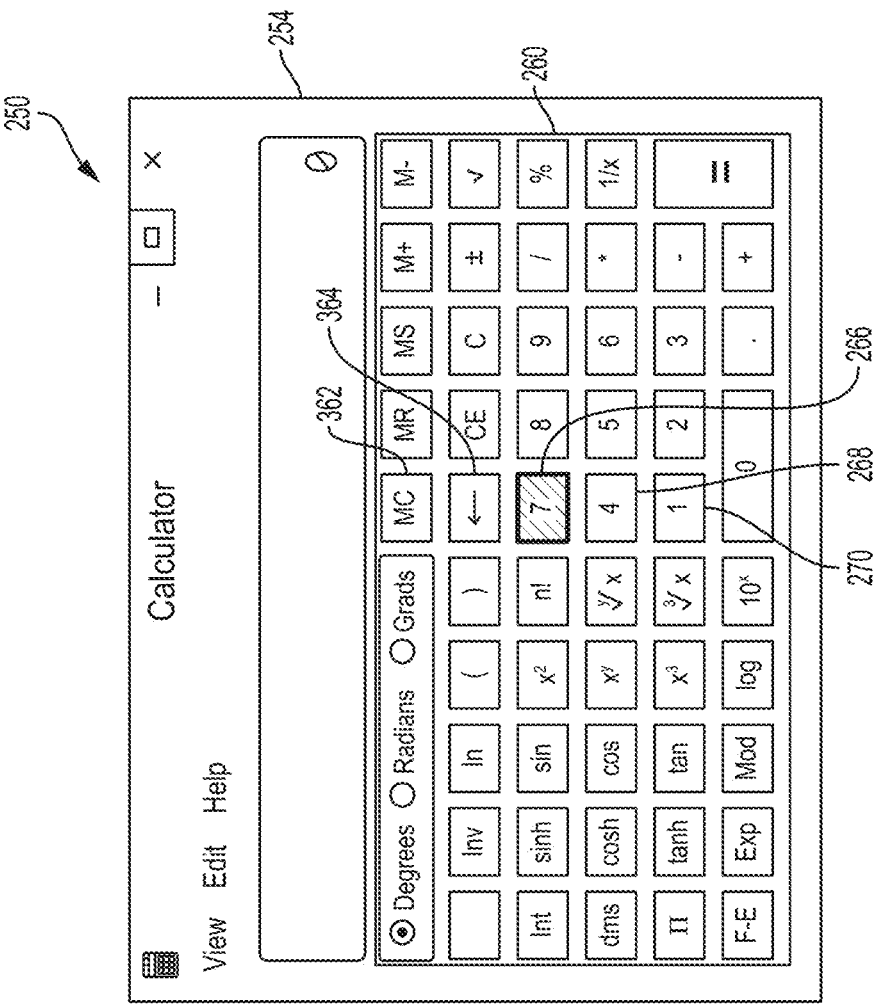

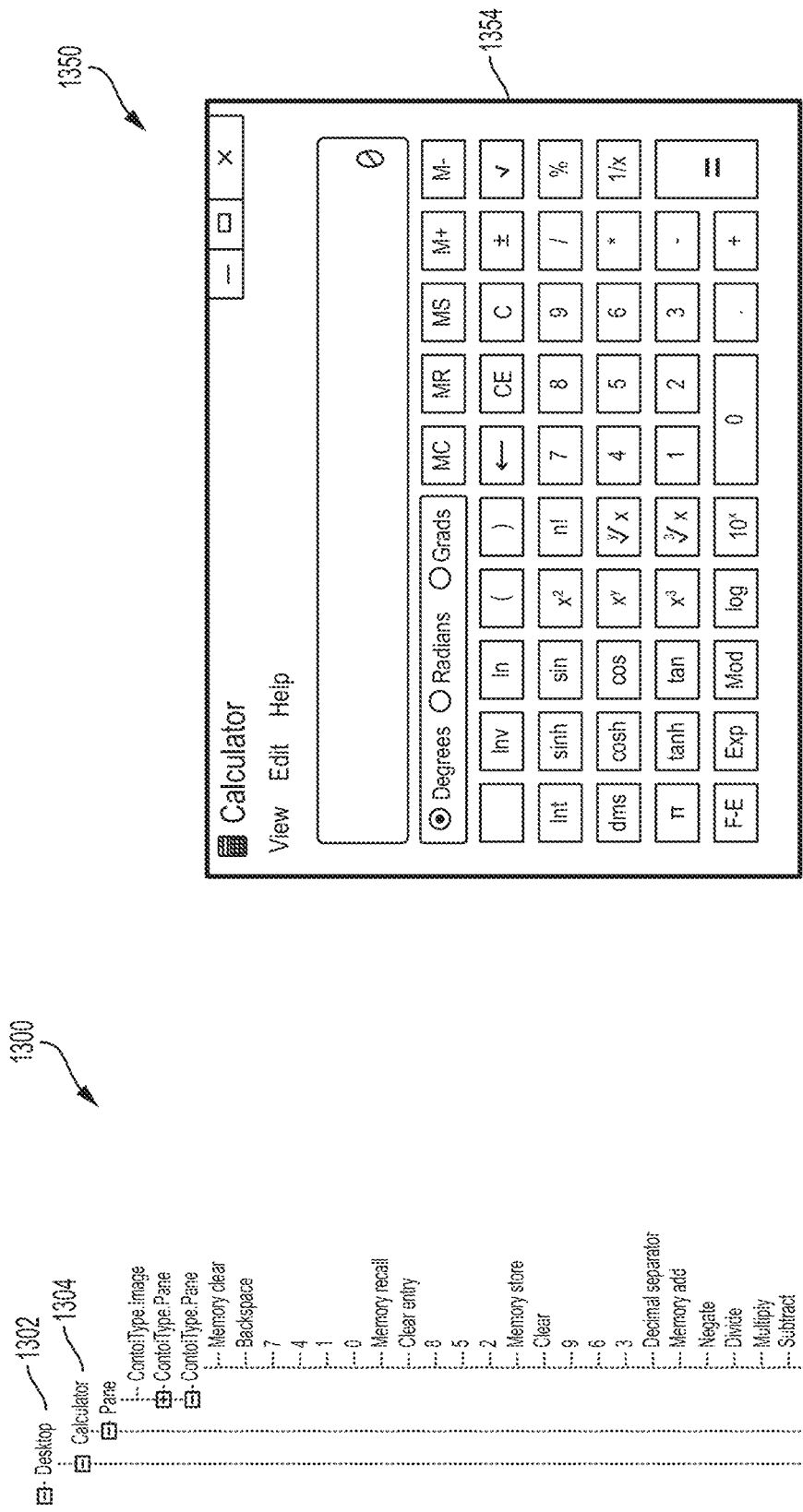

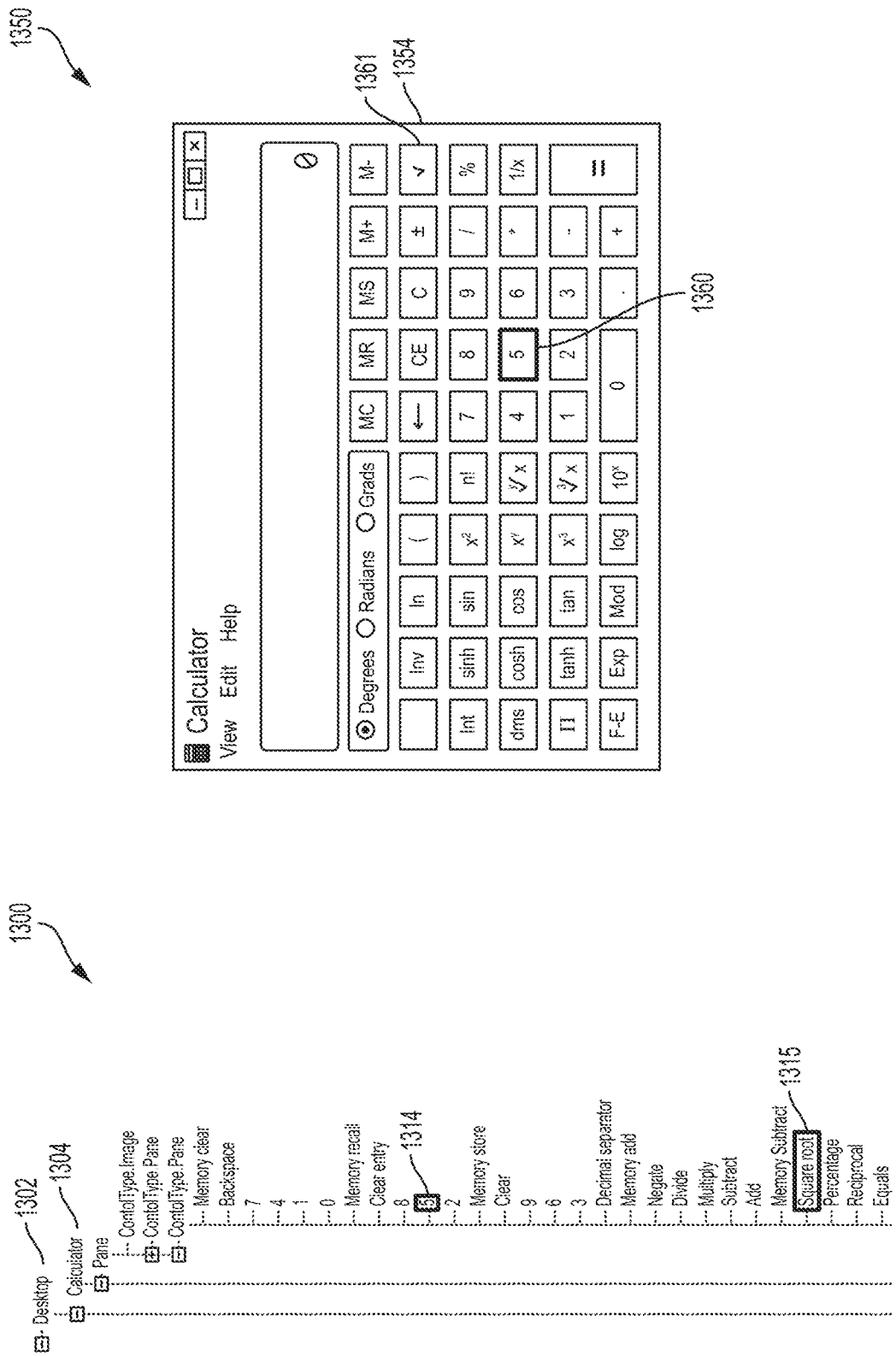

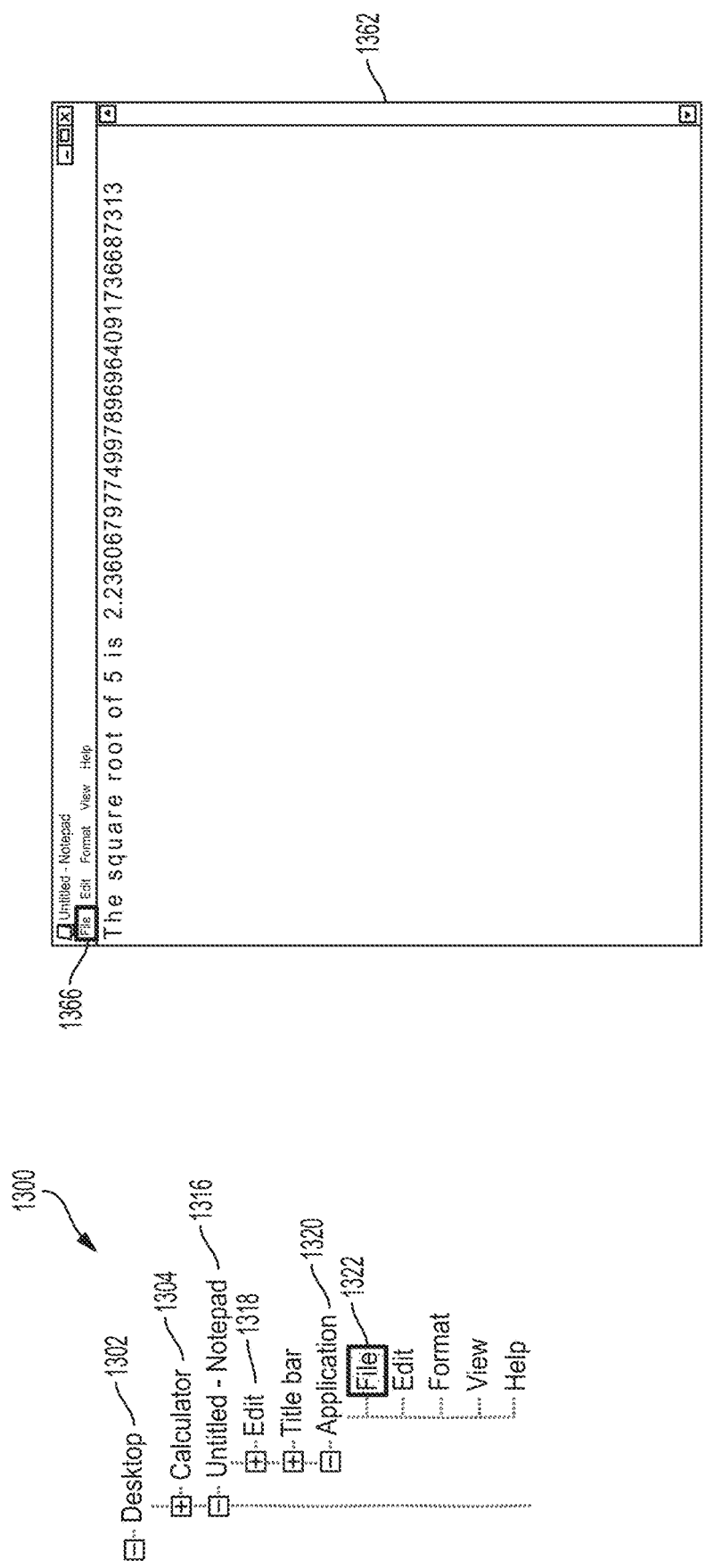

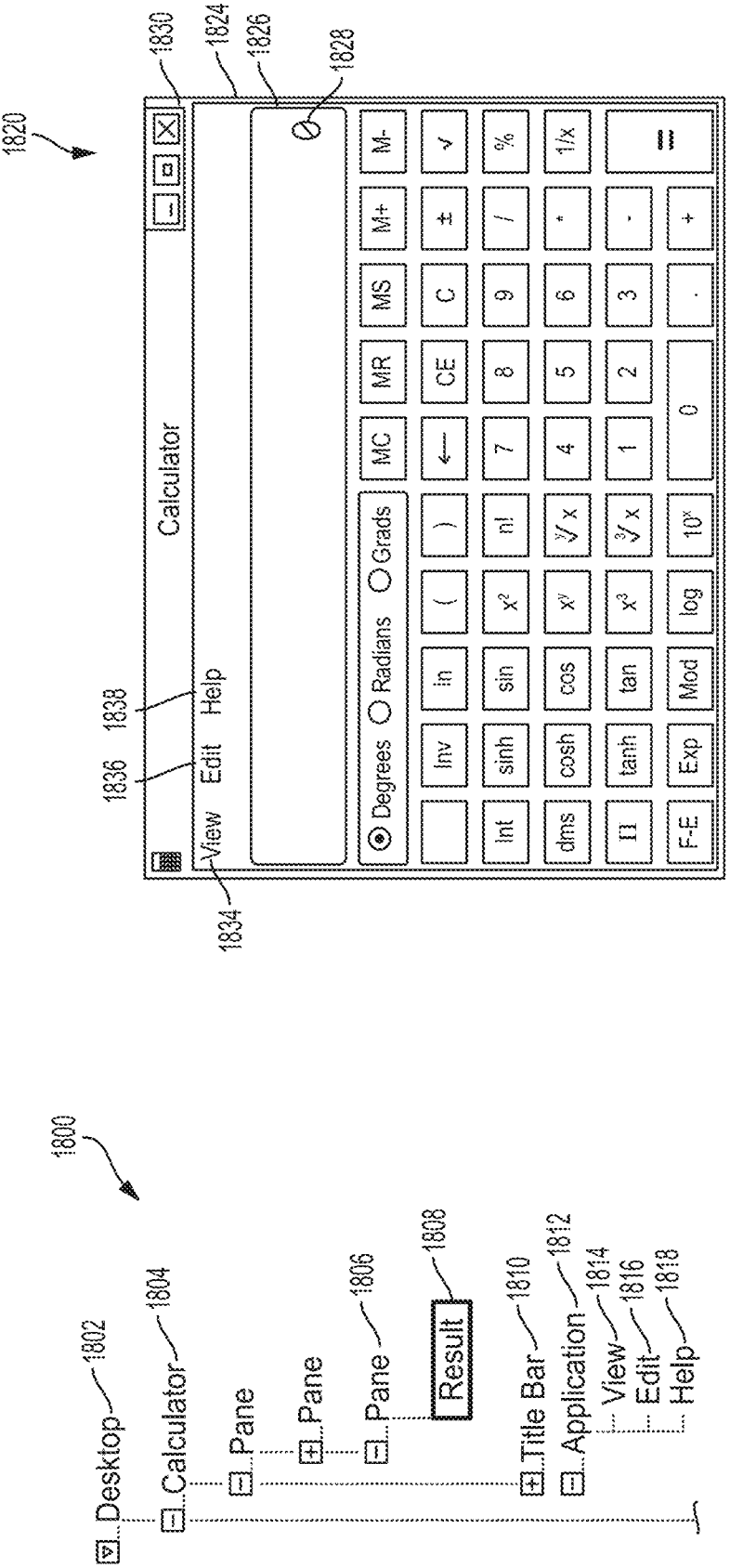

| APPLICATION | ACTION | HITS | AVG. TIME |
|---|---|---|---|
| APPLICATION A | ACTION $a_1$ | 24 | 2.05 ms |
| APPLICATION A | ACTION $a_2$ | 49 | 15 ms |
| ⋮ | ⋮ | ⋮ | ⋮ |
| APPLICATION A | ACTION $a_k$ | 35 | 14 ms |
| APPLICATION B | ACTION $b_1$ | 21 | 0.6 ms |
| ⋮ | ⋮ | ⋮ | ⋮ |
| APPLICATION B | ACTION $b_k$ | 15 | 4 ms |
| APPLICATION C | ACTION $c_1$ | 10 | 5.6 ms |
| ⋮ | ⋮ | ⋮ | ⋮ |
| APPLICATION C | ACTION $c_k$ | 64 | 21 ms |
| SOFTWARE ROBOT | ACTION $s_1$ | 85 | 30 ms |
| ⋮ | ⋮ | ⋮ | ⋮ |
| SOFTWARE ROBOT | ACTION $s_k$ | 27 | 2 ms |
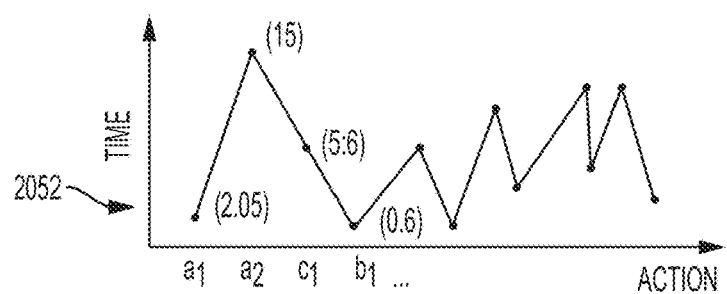
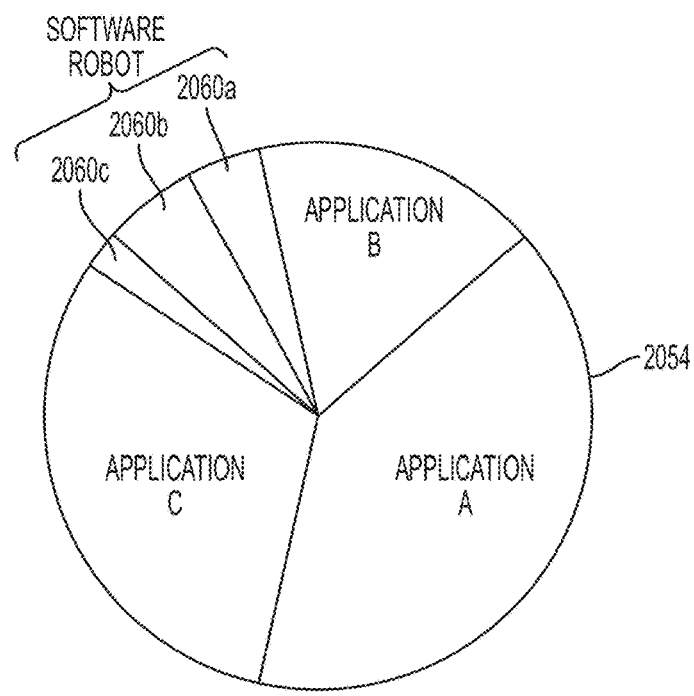
FIG. 20C

SOFTWARE ROBOTS FOR PROGRAMMATICALLY CONTROLLING COMPUTER PROGRAMS TO PERFORM TASKS

CROSS-REFERENCE TO RELATED APPLICATIONS

This Application is a continuation of and claims priority under 35 U.S.C. § 120 to U.S. patent application Ser. No. 15/942,930, filed Apr. 2, 2018, entitled "SOFTWARE ROBOTS FOR PROGRAMMATICALLY CONTROLLING COMPUTER PROGRAMS TO PERFORM TASKS", which is a continuation of U.S. patent application Ser. No. 15/059,816, filed Mar. 3, 2016, now U.S. Pat. No. 9,965,139, entitled "SOFTWARE ROBOTS FOR PROGRAMMATICALLY CONTROLLING COMPUTER PROGRAMS TO PERFORM TASKS", which claims the benefit under 35 U.S.C. 119(e) of U.S. Provisional Application Ser. No. 62/155,227, filed Apr. 30, 2015, entitled "SYSTEMS AND METHODS FOR AUTOMATING TASKS" and of U.S. Provisional Application Ser. No. 62/127,795, filed Mar. 3, 2015, entitled "SYSTEMS AND METHODS FOR AUTOMATING TASKS". The entire contents of these applications are incorporated by reference in their entirety.

FIELD

Aspects of the technology described herein relate to monitoring software robots that programmatically control one or more computer program(s) to perform a task via an object hierarchy that provides a representation of graphical user interface (GUI) elements of the computer program(s) being controlled. Some aspects relate to techniques for resolving errors occurring during execution of a software robot.

BACKGROUND

A user can control an application program by interacting with the application program via its graphical user interface (GUI). An application program may provide for the recording of a macroinstruction (sometimes termed a "macro"), which is a recording of the steps taken by the user in controlling the application through its GUI. The macro may be replayed at a later time to control the application program in the same way as the user had done at the time the recording was made. When an application program provides an application programming interface (API), the application program may be also controlled by another computer program via the API.

SUMMARY

Some embodiments provide for a system for remotely controlling multiple application programs executing on multiple respective virtual machines. The system comprises: a computing device, comprising a first processor, and configured to execute: a first virtual machine configured to execute a first application program; and a second virtual machine configured to execute a second application program; and a controller communicatively coupled to the computing device and comprising a second processor, the controller configured to perform: generating, based on first information obtained from the first virtual machine and second information obtained from the second virtual machine device, a global object hierarchy comprising a plurality of objects corresponding to active graphical user interface (GUI) elements of the first application program and the second application program; controlling the first application program to perform the first sub-task at least in part by using the global object hierarchy; and controlling the second application program to perform the second sub-task at least in part by using the global object hierarchy.

Some embodiments provide for a system for remotely controlling one or more application programs executing on a respective one or more virtual machines. The system comprises a controller, comprising a processor, configured to perform: accessing a software robot computer program for controlling at least one application program to perform a task including a first sub-task to be performed by a first application program executing on a first virtual machine; identifying, using the software robot computer program, a first action to perform in furtherance of the first sub-task; and providing an indication to the computing device to control the first application program to at least partially perform the first action; and a computing device, communicatively coupled to the controller, comprising a processor configured to execute the first virtual machine and to perform: generating a first object hierarchy comprising a first plurality of objects corresponding to active graphical user interface (GUI) elements of the first application program; and in response to receiving the indication from the controller device to at least partially perform the first action, using the first object hierarchy to cause the first application program to at least partially perform the first action.

Some embodiments provide for a system for remotely controlling multiple application programs executing on multiple respective physical computing devices. The system comprises: a first computing device, comprising a first processor, and configured to execute a first application program; a second computing device, comprising a second processor, and configured to execute a second application program; and a controller communicatively coupled to the first and second computing devices and comprising a third processor, the controller configured to perform: generating, based on first information obtained from the first computing device and second information obtained from the second computing device, a global object hierarchy comprising a plurality of objects corresponding to active graphical user interface (GUI) elements of the first application program and the second application program; controlling the first application program to perform the first sub-task at least in part by using the global object hierarchy; and controlling the second application program to perform the second sub-task at least in part by using the global object hierarchy.

Some embodiments provide for a system for remotely controlling one or more application programs executing on a respective one or more physical computing devices. The system comprises: a controller comprising a processor and configured to perform: accessing a software robot computer program for controlling at least one application program to perform a task including a first sub-task to be performed by a first application program executing on a first computing device external to the controller; identifying, using the software robot computer program, a first action to perform in furtherance of the first sub-task; and providing an indication to the first computing device to control the first application program to at least partially perform the first action; and the first computing device, communicatively coupled to the controller and comprising a processor, configured to execute the first application program and to perform: generating a first object hierarchy comprising a first plurality of objects corresponding to active graphical user interface (GUI) elements of the first application program; and in response to receiving the indication from the controller to at least partially perform the first action, using the first object hierarchy to cause the first application program to at least partially perform the first action.

Some embodiments provide for a system, comprising: at least one computer hardware processor; and at least one non-transitory computer-readable storage medium storing: a software robot computer program for controlling multiple application programs to perform a task comprising a first sub-task to be performed by a first application program and a second sub-task to be performed by a second application program; and processor-executable instructions that, when executed by the at least one computer hardware processor, cause the at least one computer hardware processor to perform: accessing the software robot computer program; generating an object hierarchy comprising a plurality of objects corresponding to active graphical user interface (GUI) elements of at least one of the multiple application programs; controlling the first application program, via the software robot computer program, to perform the first sub-task at least in part by: automatically accessing, in the object hierarchy, a first object corresponding to a first active GUI element of the first application program, the accessing comprising refreshing the object hierarchy; and automatically using the first object to cause the first application program to at least partially perform a first action in furtherance of the first sub-task; and controlling the second application program, via the software robot computer program, to perform the second sub-task at least in part by: automatically accessing, in the object hierarchy, a second object corresponding to a second active GUI element of the second application program, the accessing comprising refreshing the object hierarchy; and automatically using the second object to cause the second application program to at least partially perform a second action in furtherance of the second sub-task.

Some embodiments provide for a system comprising: at least one hardware processor; and at least one non-transitory computer-readable storage medium storing: a software robot computer program for controlling at least one application program to perform a task comprising a first sub-task to be performed by a first application program; and processor-executable instructions that, when executed by the at least one hardware processor, cause the at least one hardware processor to perform: accessing the software robot computer program; generating an object hierarchy comprising a plurality of objects corresponding to active graphical user interface (GUI) elements of the first application program; and controlling the first application program to perform the first sub-task at least in part by: identifying, using the software robot computer program, a first action to perform in furtherance of the first sub-task; automatically accessing, in the object hierarchy, a first object corresponding to a first active GUI element of the first application program, the accessing comprising refreshing the object hierarchy; and automatically using the first object to cause the first application program to at least partially perform the first action.

Some embodiments provide for a method comprising using at least one computer hardware processor to perform: accessing a software robot computer program for controlling at least one application program to perform a task including a first sub-task to be performed by a first application program; generating an object hierarchy comprising a plurality of objects corresponding to active graphical user interface (GUI) elements of the first application program; and controlling the first application program to perform the first sub-task at least in part by: identifying, using the software robot computer program, a first action to perform in furtherance of the first sub-task; automatically accessing, in the object hierarchy, a first object corresponding to a first active GUI element of the first application program, the accessing comprising refreshing the object hierarchy; and automatically using the first object to cause the first application program to at least partially perform the first action.

Some embodiments provide for a system, comprising: at least one computer hardware processor; and at least one non-transitory computer-readable storage medium storing: a software robot computer program for controlling multiple application programs to perform a task comprising a first sub-task to be performed by a first application program and a second sub-task to be performed by a second application program; and processor-executable instructions that, when executed by the at least one computer hardware processor, cause the at least one computer hardware processor to perform: accessing the software robot computer program; generating an object hierarchy comprising a plurality of objects corresponding to active graphical user interface (GUI) elements of at least one of the multiple application programs; controlling the first application program, via the software robot computer program, to perform the first sub-task at least in part by: automatically accessing, in the object hierarchy, a first object corresponding to a first active GUI element of the first application program, the accessing comprising searching for the first object in the object hierarchy using a first search string formatted in accordance with a search grammar; and automatically using the first object to cause the first application program to at least partially perform a first action in furtherance of the first sub-task; and controlling the second application program, via the software robot computer program, to perform the second sub-task at least in part by: automatically accessing, in the object hierarchy, a second object corresponding to a second active GUI element of the second application program, the accessing comprising searching for the second object in the object hierarchy using a second search string formatted in accordance with the search grammar; and automatically using the second object to cause the second application program to at least partially perform a second action in furtherance of the second sub-task.

Some embodiments provide for a system, comprising: at least one computer hardware processor; and at least one non-transitory computer-readable storage medium storing: a software robot computer program for controlling at least one application program to perform a task comprising a first sub-task to be performed by a first application program; and processor-executable instructions that, when executed by the at least one computer hardware processor, cause the at least one computer hardware processor to perform: accessing the software robot computer program; generating an object hierarchy comprising a plurality of objects corresponding to active graphical user interface (GUI) elements of the at least one application program to be controlled by the software robot computer program; controlling the first application program to perform the first sub-task at least in part by: identifying, using the software robot computer program, a first action to perform in furtherance of the first sub-task; automatically accessing, in the object hierarchy, a first object corresponding to an active GUI element of the first application program, the accessing comprising searching for the first object in the object hierarchy, the searching comprising modifying the object hierarchy; and automatically using the first object to cause the first application program to at least partially perform the first action.

Some embodiments provide for a system, comprising: at least one computer hardware processor; and at least one non-transitory computer-readable storage medium storing processor-executable instructions that, when executed by the at least one computer hardware processor, cause the at least one computer hardware processor to perform: generating an object hierarchy comprising a plurality of objects corresponding to active graphical user interface (GUI) elements of a first application program; controlling the first application program to perform a first sub-task of a task at least in part by: automatically accessing, in the object hierarchy, a first object corresponding to an active GUI element of the first application program, the accessing comprising searching for the first object in the object hierarchy, the searching comprising modifying the object hierarchy; and automatically using the first object to cause the first application program to at least partially perform a first action in furtherance of the first sub-task.

Some embodiments provide for a method, comprising: using at least one computer hardware processor to perform: accessing a software robot computer program for controlling at least one application program to perform a task comprising a first sub-task to be performed by a first application program and a second sub-task to be performed by a second application program; and generating an object hierarchy comprising a plurality of objects corresponding to active graphical user interface (GUI) elements of at least one of the multiple application programs; and controlling the first application program, via the software robot computer program, to perform the first sub-task at least in part by: automatically accessing, in the object hierarchy, a first object corresponding to a first active GUI element of the first application program, the accessing comprising searching for the first object in the object hierarchy using a first search string formatted in accordance with a search grammar; and automatically using the first object to cause the first application program to at least partially perform a first action in furtherance of the first sub-task; and controlling the second application program, via the software robot computer program, to perform the second sub-task at least in part by: automatically accessing, in the object hierarchy, a second object corresponding to a second active GUI element of the second application program, the accessing comprising searching for the second object in the object hierarchy using a second search string formatted in accordance with the search grammar; and automatically using the second object to cause the second application program to at least partially perform a second action in furtherance of the second sub-task.

Some embodiments provide for a system, comprising: at least one computer hardware processor; and at least one computer-readable storage medium storing: a software robot computer program for controlling multiple application programs to perform a task comprising a first sub-task to be performed by a first application program and a second sub-task to be performed by a second application program; and processor-executable instructions that, when executed by the at least one computer hardware processor, cause the at least one computer hardware processor to perform: accessing the software robot; generating an object hierarchy comprising a plurality of objects corresponding to active graphical user interface (GUI) elements of at least one of the multiple application programs; controlling the first application program to perform the first sub-task at least in part by using the software robot computer program and the object hierarchy; and controlling the second application program to perform the second sub-task at least in part by using software robot computer program and the object hierarchy, wherein the first and second application programs are configured to execute at least in part by using different GUI application libraries.

Some embodiments provide for a system, comprising: at least one computer hardware processor; and at least one computer-readable storage medium storing processor-executable instructions that, when executed by the at least one computer hardware processor, cause the at least one computer hardware processor to perform: generating an object hierarchy comprising a plurality of objects corresponding to active graphical user interface (GUI) elements of at least one of a first application program and a second application program; controlling the first application program to perform a first sub-task of a task at least in part by using the object hierarchy; and controlling the second application program to perform a second sub-task of the task at least in part by using the object hierarchy, wherein the first and second application programs are configured to execute at least in part by using different GUI application libraries.

Some embodiments provide for a method comprising: using at least one computer hardware processor to perform: generating an object hierarchy comprising a plurality of objects corresponding to active graphical user interface (GUI) elements of at least one of a first application program and a second application program; controlling the first application program to perform a first sub-task of a task at least in part by using the object hierarchy; and controlling the second application program to perform a second sub-task of the task at least in part by using the object hierarchy, wherein the first and second application programs are configured to execute at least in part by using different GUI application libraries.

Some embodiments provide for a system, comprising: at least one computer hardware processor; and at least one non-transitory computer-readable storage medium storing processor-executable instructions that, when executed by the at least one computer hardware processor, cause the at least one computer hardware processor to perform: generating an object hierarchy comprising a plurality of objects corresponding to active graphical user interface (GUI) elements of at least one application program; controlling the at least one application program to perform a task comprising a sequence of actions at least in part by using the object hierarchy to invoke actions in the sequence of actions; and during performance of the sequence of actions, generating a visual record of how a GUI of the at least one application program would appear on a display during the performance of the sequence of actions and a log of already-performed actions in the sequence of actions, the log containing at least some information not in the visual record and the visual record containing at least some information not in the log; storing the visual record and the log; determining than an error in performance of the sequence of actions has occurred, the error preventing completing automated performance of the sequence of actions without human intervention; and when it is determined that the error in performance of the sequence of actions has occurred, providing to a user the visual record and the log.

Some embodiments provide for a system, comprising: at least one computer hardware processor; and at least one non-transitory computer-readable storage medium storing processor-executable instructions that, when executed by the at least one computer hardware processor, cause the at least one computer hardware processor to perform: generating an object hierarchy comprising a plurality of objects corresponding to active graphical user interface (GUI) elements of at least one application program; controlling the at least one application program to perform a task comprising a sequence of actions at least in part by using the object hierarchy to invoke actions in the sequence of actions; during performance of the sequence of actions, generating a log of already-performed actions in the sequence of actions; generating contextual information associated with the already performed actions, the contextual information containing at least some information not in the log and the log containing at least some information not in the contextual information; and providing to a user the log and the contextual information.

Some embodiments provide for a method, comprising: using at least one computer hardware processor to perform: generating an object hierarchy comprising a plurality of objects corresponding to active graphical user interface (GUI) elements of at least one application program; controlling the at least one application program to perform a task comprising a sequence of actions at least in part by using the object hierarchy to invoke actions in the sequence of actions; and during performance of the sequence of actions, generating a visual record of how a GUI of the at least one application program would appear on a display during the performance of the sequence of actions and a log of already-performed actions in the sequence of actions, the log containing at least some information not in the visual record and the visual record containing at least some information not in the log; storing the visual record and the log on the at least one storage device; determining than an error in performance of the sequence of actions has occurred, the error preventing completing automated performance of the sequence of actions without human intervention; and when it is determined that the error in performance of the sequence of actions has occurred, providing to a user the visual record and the log.

Some embodiments provide for a method, comprising: generating an object hierarchy comprising a plurality of objects corresponding to active graphical user interface (GUI) elements of at least one application program; controlling the at least one application program to perform a task comprising a sequence of actions at least in part by using the object hierarchy to invoke actions in the sequence of actions; during performance of the sequence of actions, generating a log of already-performed actions in the sequence of actions; generating contextual information associated with the already performed actions, the contextual information containing at least some information not in the log and the log containing at least some information not in the contextual information; and providing to a user the log and the contextual information.

Some embodiments provide for a system, comprising: at least one hardware processor; at least one non-transitory computer-readable storage medium storing: a software robot computer program for controlling multiple application programs to perform a task comprising a first sub-task to be performed by a first application program and a second sub-task to be performed by a second application program; and processor-executable instructions that, when executed by the at least one hardware processor, cause the at least one hardware processor to perform: accessing the software robot computer program; generating an object hierarchy comprising a plurality of objects corresponding to active graphical user interface (GUI) elements of the first and second application programs, the generating comprising: generating, based on a first hierarchical representation of active GUI elements of the first application, a first portion of the object hierarchy corresponding to active GUI elements of the first application program; generating, based on a second hierarchical representation of active GUI elements of the second application, a second portion of the object hierarchy corresponding to the active GUI elements of the second application program, and combining the first portion and the second portion; and controlling, using software robot computer program and the generated object hierarchy, the first application program to perform the first sub-task and the second application program to perform the second sub-task.

Some embodiments provide for a system, comprising: at least one hardware processor; at least one non-transitory computer-readable storage medium storing processor-executable instructions that, when executed by the at least one hardware processor, cause the at least one hardware processor to perform: generating an object hierarchy comprising a plurality of objects corresponding to active graphical user interface (GUI) elements of a first application program, the generating comprising: obtaining a hierarchical representation of the active GUI elements of the application program; generating an object for each of at least some of the active GUI elements represented in the hierarchical representation; and organizing the generated objects into the object hierarchy based on relationships among active GUI elements represented in the hierarchical representation; and controlling, using software robot computer program and the generated object hierarchy, the first application to perform the first sub-task.

Some embodiments provide for a system for controlling multiple application programs to perform a task comprising a first sub-task and a second sub-task, the system comprising: at least one hardware processor; at least one non-transitory computer-readable storage medium storing processor-executable instructions that, when executed by the at least one hardware processor, cause the at least one hardware processor to perform: generating an object hierarchy comprising a plurality of objects corresponding to active graphical user interface (GUI) elements of a first application program and a second application program, the generating comprising: generating, based on a first hierarchical representation of active GUI elements of the first application program, a first portion of the object hierarchy corresponding to active GUI elements of the first application program; generating, based on a second hierarchical representation of active GUI elements of the second application program, a second portion of the object hierarchy corresponding to the active GUI elements of the second application program, and combining the first portion and the second portion; and controlling, using the generated object hierarchy, the first and second application program, respectively, to perform the first sub-task and the second sub-task.

Some embodiments provide for a method for controlling multiple application programs to perform a task comprising a first sub-task and a second sub-task, the method comprising: using at least one hardware processor to perform: generating an object hierarchy comprising a plurality of objects corresponding to active graphical user interface (GUI) elements of a first application program and a second application program, the generating comprising: generating, based on a first hierarchical representation of active GUI elements of the first application program, a first portion of the object hierarchy corresponding to active GUI elements of the first application program; generating, based on a second hierarchical representation of active GUI elements of the second application program, a second portion of the object hierarchy corresponding to the active GUI elements of the second application program, combining the first portion and the second portion; and controlling, using the generated object hierarchy, the first and second application programs, respectively, to perform the first and second sub-tasks.

Some embodiments provide for a method comprising using at least one hardware processor to perform: generating an object hierarchy comprising a plurality of objects corresponding to active graphical user interface (GUI) elements of a first application program, the generating comprising: obtaining a hierarchical representation of the active GUI elements of the application program; generating an object for each of at least some of the active GUI elements represented in the hierarchical representation; and organizing the generated objects into the object hierarchy based on relationships among active GUI elements represented in the hierarchical representation; and controlling, using the generated object hierarchy, the first application program to perform the first sub-task.

Some embodiments provide for at least one non-transitory computer-readable storage medium storing processor-executable instructions to perform any one of the foregoing methods.

The foregoing is a non-limiting summary of the invention, which is defined by the attached claims.

BRIEF DESCRIPTION OF DRAWINGS

Various aspects and embodiments of the application will be described with reference to the following figures. Items appearing in multiple figures are indicated by the same or a similar reference number in all the figures in which they appear.

FIG. 1A is a diagram of an illustrative object hierarchy including objects corresponding to GUI elements of the calculator application program shown in FIG. 1B, in accordance with some embodiments of the technology described herein.

FIG. 1B is a diagram of an illustrative user interface showing GUI elements of one or more computer programs, including the GUI elements of the calculator program, corresponding to objects in the object hierarchy of FIG. 1A, in accordance with some embodiments of the technology described herein.

FIG. 4A is a diagram of an illustrative object hierarchy including objects corresponding to GUI elements of the calculator program shown in FIG. 4B, in accordance with some embodiments of the technology described herein.

FIG. 4B is a diagram of a GUI of the calculator program that includes GUI elements corresponding to objects in the object hierarchy of FIG. 4A, in accordance with some embodiments of the technology described herein.

FIGS. 14A-14G provide another illustrative example of using an object hierarchy to control multiple application programs to perform a task by illustrating how the object hierarchy and the display screen are updated during performance of the task, in accordance with some embodiments of the technology described herein.

FIG. 15 illustrates a task that may be performed using a software robot, in accordance with some embodiments of the technology described herein.

FIGS. 18A-18C illustrate a technique for refreshing an object hierarchy at least in part by using one or more visual cues, in accordance with some embodiments of the technology described herein.

FIG. 20C is a diagram of an illustrative interface that may be used to present information about the performance of a software robot, in accordance with some embodiments of the technology described herein.

DETAILED DESCRIPTION

I. Introduction

Figures 2A, 2B:
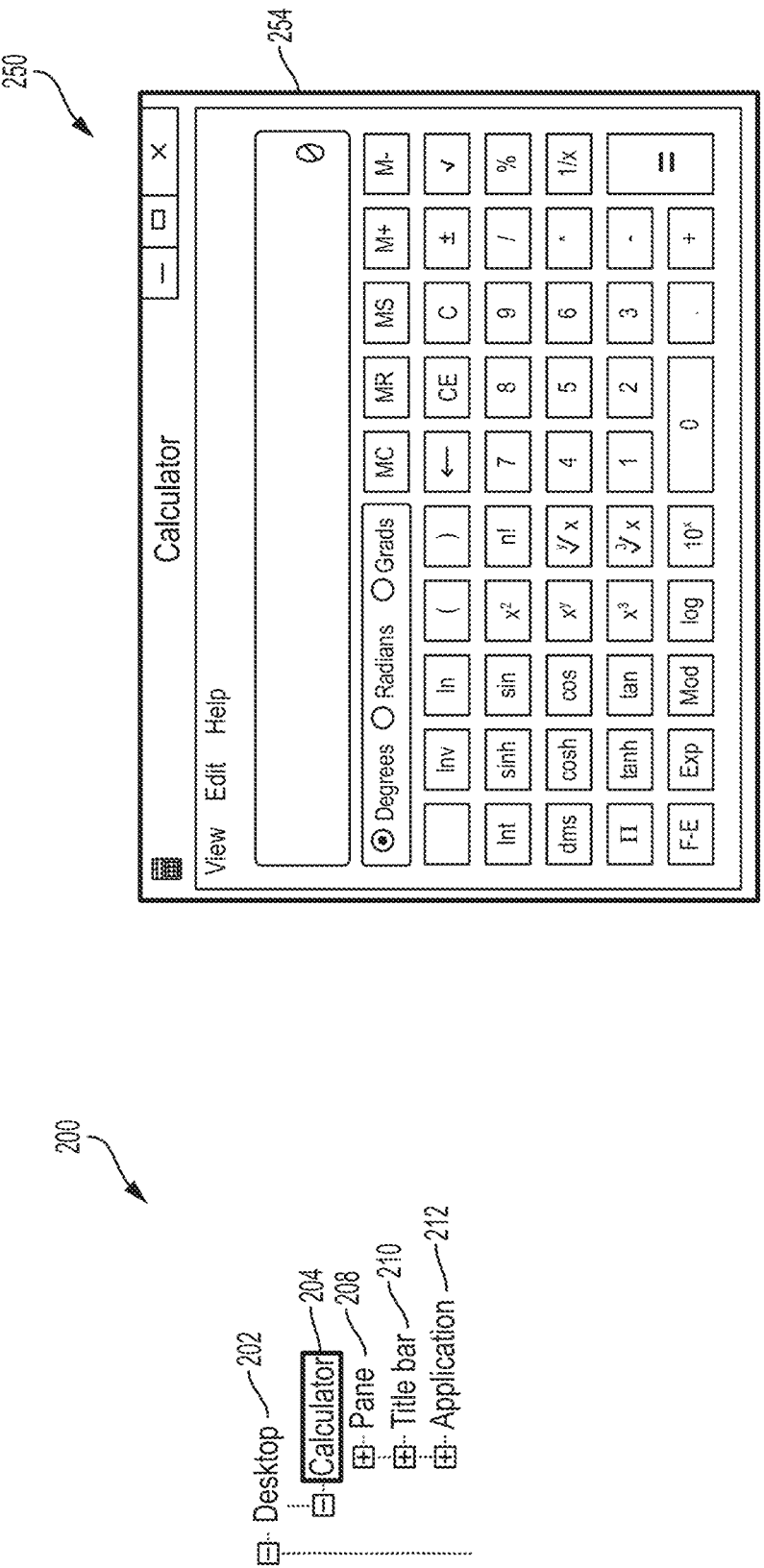
FIG. 2A is a diagram of another illustrative object hierarchy including objects corresponding to active GUI elements of the calculator program shown in FIG. 2B, in accordance with some embodiments of the technology described herein.
FIG. 2B is a diagram of a GUI of the calculator program that includes GUI elements corresponding to objects in the object hierarchy of FIG. 2A, in accordance with some embodiments of the technology described herein.

The inventors have realized and appreciated that conventional technology for programmatically controlling other computer programs to perform tasks may be improved by using software robot computer programs (hereinafter, "software robots" or "workflows") that control other computer programs to perform tasks via an object hierarchy representing the graphical user interfaces of the computer programs being controlled. Such software robots allow for the real-time programmatic control of computer programs implemented using different GUI technologies, executing on one or multiple computing devices, and/or executing on one or multiple virtual machines, which is not possible using conventional technology.

Conventional techniques for programmatically controlling computer programs to perform tasks can each be applied to only a limited set of computer programs. For example, a recorded macro can only be used to control the application program that was used to record it. As another example, the WINDOWS Automation API may be used to control only native WINDOWS applications whose graphical user interfaces are implemented using the WINDOWS GUI application libraries, and cannot be used to control computer programs implemented using a different GUI technology (e.g., a JAVA application or a web-based application). As yet another example, SELENIUM tools may be used to control only Internet browsers, but cannot be used to control computer programs implemented using a different GUI technology (e.g., a JAVA application or a native WINDOWS application other than an Internet browser). Also, none of the conventional techniques for programmatically controlling computer programs allow for the concurrent control of multiple computer programs executing on different virtual machines and/or computing devices—they are designed for controlling a limited set of applications on executing on a single physical computing device.

By contrast, software robots implemented in accordance with the techniques described herein may be used to control computer programs implemented using any of a broad range of GUI technologies, examples of which are provided herein. In some embodiments, for example, a software robot may be configured to control a native WINDOWS application, a JAVA application, and a web-based application. As described in more detail below, a software robot may control such a diverse set of computer programs via a "unified" object hierarchy that includes objects corresponding to elements of the graphical user interfaces of all these computer programs, despite the fact that these graphical user interfaces may be implemented using different GUI technologies. Also, software robots implemented in accordance with the techniques described herein may be used to control multiple computer programs executing on different virtual machines and/or computing devices and, unlike conventional techniques, are not limited to controlling computer programs executing on a single device.

Some conventional techniques for programmatically controlling computer programs do so via the graphical user interfaces of the computer programs being controlled. However, in this particular context of programmatically controlling a computer program via its graphical user interface, arises a unique technical problem in that to programmatically control a computer program through its GUI, the state of the GUI must be ascertained to determine what the computer program's GUI is displaying at any point in time. For example, it may be necessary to know what GUI elements (e.g., buttons, scrollbars, menus, toolbars, windows, panes, etc.) are being displayed by the GUI of the computer program and where in these GUI elements are located so that they may be controlled. Conventional techniques for programmatically controlling computer programs via their GUIs do not provide such information about the state of the GUIs. The technical problem is that obtaining such information about the state of a program's GUI not only is computationally expensive, when performed once, but also must be performed multiple times, as the program is being controlled, in order to capture any changes in the GUI of the program, which further exacerbates the computational cost of ascertaining the state of the GUI. The high computational cost of repeatedly ascertaining the state of a computer program's GUI leads to a high computational cost of controlling the computer program through its GUI to the point of making this approach impractical.

By contrast, although the software robots implemented in accordance with the techniques described herein are also configured to control other computer programs through their graphical user interfaces, the inventors have developed techniques for doing so in a computationally-efficient manner. In some embodiments, a software robot may be configured to control one or more computer programs via an object hierarchy that represents the state of the GUI of the computer program(s) being controlled. The inventors have developed multiple techniques described herein for efficiently, generating, accessing, and refreshing this object hierarchy to provide a real-time snapshot of the state of the GUIs of the computer programs being controlled. The object hierarchy may be accessed thousands of times per second and may be refreshed or updated in real-time to provide a faithful representation of the state of the GUIs of the computer programs being controlled. In this way, the techniques described herein may be used to overcome the above-described technical problem facing conventional techniques for controlling computer programs through their GUIs, and provide for software robots that can effectuate such control efficiently.

Some conventional techniques for programmatically controlling computer programs to perform tasks are also difficult to use because they provide developers with only a low-level API for this purpose. As a result, developing software for controlling other computer programs using conventional techniques requires detailed knowledge of multiple low-level APIs for multiple different GUI technologies. These APIs may be complex, leading to long development times.

By contrast, the inventors have developed a software robot development platform to facilitate the development of software robots. The platform relieves software robot developers from the burden of learning low-level APIs. For example, although the software robots described herein use an object hierarchy to control computer programs, the software robot development platform may shield software robot developers from having to write code to access and/or manipulate the object hierarchy directly. To this end, the platform may provide component libraries for controlling respective computer programs. Although the functions in the component libraries may use the underlying representation of the state of GUIs of the computer programs being controlled (as embodied in an object hierarchy) to control them, a software robot developer may develop a software robot using these component libraries without needing to learn how they are implemented, which may reduce or even eliminate the need for the developer to directly access and/or manipulate the object hierarchy.

Some embodiments of the technology described herein address some of the above-discussed drawbacks of conventional techniques for programmatically controlling computer programs to perform tasks. However, not every embodiment addresses every one of these drawbacks, and some embodiments may not address any of them. As such, it should be appreciated that aspects of the technology described herein are not limited to addressing all or any of the above-discussed drawbacks of conventional techniques for programmatically controlling computer programs to perform tasks.

Accordingly, some embodiments provide for the development, deployment, and use of software robots each of which is configured to control one or multiple computer programs via an object hierarchy comprising objects corresponding to GUI elements of the computer program(s) being controlled. The computer programs may be implemented using one or multiple different GUI technologies and may execute on one computing device, multiple computing devices, and/or one or multiple virtual machines. Examples of computer programs that may be controlled by a software robot are provided herein.

In some embodiments, a software robot may be configured to control multiple computer programs to perform a task including a first sub-task to be performed by a first application and a second sub-task to be performed by a second application. Each of the first and second sub-tasks may include one or multiple actions. Examples of tasks, sub-tasks, and actions are provided herein. The software robot may be any suitable type of computer program including a compiled program or an interpreted program.

The software robot may be configured to control the first and second application programs to perform the first and second sub-tasks, respectively, via an object hierarchy including objects corresponding to active graphical user interface (GUI) elements of the first and second applications. For example, the software robot may be configured to control the first application to perform the first sub-task at least in part by: (1) identifying an action to perform in furtherance of the first sub-task; (2) automatically accessing, in the object hierarchy, one or more objects corresponding to one or more active GUI elements of the first application; (3) and automatically using the accessed object(s) to cause the first application to at least partially (e.g., fully) perform the action. As another example, the software robot may be configured to control the second application to perform the second sub-task at least in part by: (1) identifying an action to perform in furtherance of the second sub-task; (2) automatically accessing, in the object hierarchy, one or more objects corresponding to one or more active GUI elements of the second application; and (3) automatically using the accessed object(s) to cause the second application to at least partially (e.g., fully) perform the second action.

An object hierarchy may contain multiple objects corresponding to active GUI elements of one or more computer programs executing on one or multiple computing devices and/or virtual machines. The hierarchical organization of objects in the object hierarchy may reflect the containment relationships among the GUI elements of the computer program(s). Object hierarchies and active GUI elements of computer programs are described in more detail below.

In some embodiments, accessing an object in the object hierarchy may include refreshing the object hierarchy such that the object hierarchy provides a faithful representation of the current states of the GUIs of any executing computer programs. Additionally or alternatively, accessing an object in the object hierarchy may include searching for the object in the object hierarchy. Techniques for generating an object hierarchy, searching for objects in the object hierarchy, refreshing the object hierarchy, accessing objects in the object hierarchy and other aspects of managing the object hierarchy are described below.

Automatically accessing an object in an object hierarchy is performed by executing one or more program instructions and without receiving user input indicating either what object is to be accessed or whether an object is to be accessed at all. Automatically using an object in an object hierarchy is performed by executing one or more program instructions and without receiving user input indicating whether the object is to be used and/or the manner in which it is to be used.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

II. Object Hierarchy

FIG. 1A shows a non-limiting example of an object hierarchy corresponding to active GUI elements of the computer programs executing on a computing device as shown in FIG. 1B. In particular, FIG. 1A is a diagram of an illustrative object hierarchy 100 that includes objects corresponding to GUI elements shown in the illustrative display screen 150 shown in FIG. 1B. The display screen 150 is a screen showing GUI elements of the WINDOWS operating system (e.g., the WINDOWS desktop), the calculator program running in the foreground, and an Internet browser running in the background. The hierarchy of objects in hierarchy 100 reflects the containment relationships among GUI elements shown in FIG. 1B, as described below.

As shown in FIGS. 1A and 1B, the root of object hierarchy 100 is "desktop" object 102 that corresponds to the desktop interface of the WINDOWS operating system, as shown in display screen 150. Since all other GUI elements shown in display screen 150 visually appear as being contained within the desktop interface, the objects in the object hierarchy 100 that correspond to these GUI elements are descendants of the root object 102. For example, "calculator" object 104 is a child of the root desktop object 102 and corresponds to GUI element 154 of the calculator program, which is contained within the desktop interface. The GUI element 154 represents an outer container of the calculator application user interface so that all other GUI elements of the calculator program are contained within the GUI element 154. As another example, "Internet browser" object 106 is also a child of the root object 102 and corresponds to an outer container of the Internet browser running in the background (e.g., as a hidden minimized window, as indicated by GUI element 156).

The descendants of the calculator object 104, which corresponds to GUI element 154, correspond to GUI elements contained within GUI element 154. For example, the children of the calculator object 104 include "pane" object 108, "title bar" object 110, and "application" object 120. Pane object 108 corresponds to a pane of the calculator user interface that encapsulates all the calculator buttons below the results window, but does not include the results window or any GUI elements appearing above it. Although this pane is not explicitly shown in FIG. 1B, a similar pane is shown as GUI element 260 in FIG. 3B. Title bar object 110 corresponds to the GUI element 160 representing the title bar of the calculator program. Application object 120 corresponds to a GUI element representing the menu toolbar of the calculator program.

As shown in FIG. 1A, title bar object 110 has four child objects corresponding to GUI elements contained within the title bar of the calculator program. The child objects of the title bar object 110, in the object hierarchy 100, include the "system" object 112 that corresponds to GUI element 162 which can be used to access the system menu of the calculator program, the "minimize" object 114 that corresponds to GUI element 164 that represents a button used for minimizing the user interface of the calculator program, "maximize" object 116 that corresponds to GUI element 166 that represents a button used for maximizing the user interface of the calculator program, and "close" object 118 that corresponds to GUI element 168 that represents a button used for closing the calculator program. Application object 120 corresponds to a GUI element representing the menu toolbar of the calculator program.

As shown in FIG. 1A, application object 120 has three child objects corresponding to GUI elements contained within the menu toolbar of the calculator program. The child objects of the application object 120, in the object hierarchy 100, include the "view" object 122 corresponding to the GUI element 172 that represents a button used for accessing the view menu of the calculator program, "edit" object 124 corresponding to the GUI element 174 that represents a button used for accessing the edit menu of the calculator program, and "help" object 126 corresponding to the GUI element 176 that represents a button used for accessing the help menu of the calculator program.

As may be appreciated from the foregoing discussion of FIGS. 1A and 1B, the organization of objects in an object hierarchy relative to one another may reflect the hierarchical relationship among GUI elements of a user interface, as implied by the containment relationships among the GUI elements. Accordingly, in some embodiments, when a first GUI element of a user interface contains a second GUI element, the object in the object hierarchy corresponding to the second GUI element is a descendant of the object in the object hierarchy corresponding to the first GUI element. For example, GUI element 154 of user interface 150 contains GUI element 160, and the object 110, which corresponds to GUI element 160 is a child of object 104, which represents GUI element 154. As another example, GUI element 154 of user interface 150 contains GUI element 176, and the object 126, which corresponds to GUI element 176 is a descendant of object 104, which represents GUI element 154. In this way, the hierarchical structure of objects in an object hierarchy may model the way that a human user perceives the relationships among GUI elements of a user interface. In addition, since containment relationships between GUI elements are transitive (e.g., when GUI element A is contained in GUI element B, and GUI element B is contained in GUI element C, then A is also contained in C), so are the relationships among the corresponding objects in the hierarchy (e.g., when object $O_A$, which corresponds to GUI element A, is a child of object $O_B$ that corresponds to GUI element B, and $O_B$ is a child of $O_C$, which corresponds to GUI element C, then $O_A$ is a descendant of $O_C$).

In some embodiments, an object hierarchy may contain objects that correspond to active GUI elements of an executing computer program. An active GUI element of a computer program is a GUI element that is present in the graphical user interface of the computer program. An active GUI element present in a graphical user interface may be visible or hidden from view, when the graphical user interface is viewed by a person. A GUI element is "visible" in a graphical user interface of a computer program if a person would see the graphical user interface element if a visual presentation of the graphical user interface were provided to the person. For example, GUI elements 162, 164, 166, and 168, shown in FIG. 1B, are examples of visible GUI elements of the calculator program because they are present in the user interface 150 and would be visible to a person viewing the user interface 150. A person may interact with visible GUI elements of a computer program. It should be appreciated that a GUI element is "visible" regardless of whether there is a person actually viewing the user interface that contains the GUI element. All that is required is that the GUI element would be seen by a person if the person were shown a visual presentation (e.g., using a display device) of the user interface that contains the GUI element. For example, any GUI element of a calculator program executing on a computer not connected to a display device (e.g., a rackmount computer) is nonetheless a visible GUI element if the GUI element would be visible to a person if a display device were connected to the computer.

As discussed above, an active GUI element that is present in a user interface of a computer program need not be visible and may be hidden from view. For example, in some instances, an active GUI element may be partially or fully hidden from view because it is partially or fully occluded by another user interface. As one example, one or more GUI elements of one program (e.g., calculator program) may be partially or fully occluded by another program (e.g., Internet browser program) whose user interface has been positioned to partially or fully overlap with the user interface of the one program. As another example, GUI elements of a computer program may not be visible because the computer program may be minimized and may be executing in the background. As another example, a GUI element may be present in a user interface, but may be invisible by design such that it has no visually perceptible characteristics (e.g., the color of the element is selected so that the element is not visible against its background, the transparency of the element may be set so that it is not visible, etc.). For example, the user interface of a computer program may include one or more invisible containers used for grouping other GUI elements. As a non-limiting example, user interface 150 of FIG. 1B includes an invisible container representing a menu toolbar and used for logically grouping the GUI elements 172, 174, and 176, representing the "View," "Edit," and "Help" menus, respectively. Although this container is not visible, the calculator program generates this container during execution and, as such, this invisible container is present in the user interface. The application object 120 in object hierarchy 100 corresponds to this invisible container and may be used to access its properties, for example. A frame element of a webpage is another example of an invisible container used for grouping other GUI elements. As another example, an application may be started in "invisible" mode, but may nevertheless be accessed and controlled even though all of its GUI elements are invisible. Accordingly, an object hierarchy may include one or multiple graphical user interface elements that are present in the user interface of a computer program, but which GUI elements are not visible.

Figure 13B:
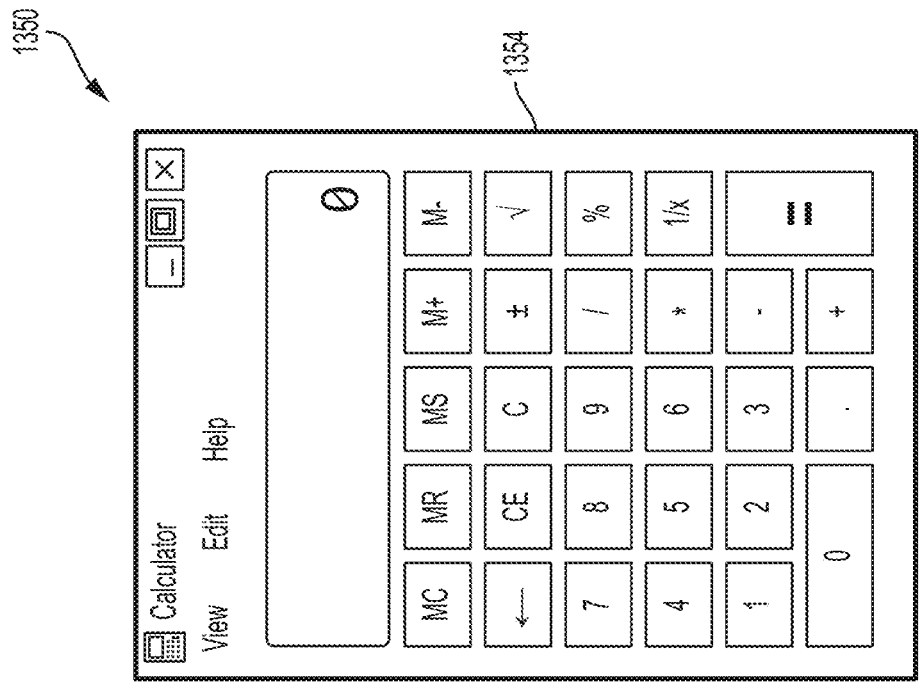
FIGS. 13A-13R provide an illustrative example of using an object hierarchy to control multiple application programs to perform a task by illustrating how the object hierarchy and the display screen are updated during performance of the task, in accordance with some embodiments of the technology described herein.

In some embodiments, an object hierarchy contains objects that correspond to GUI elements of an executing computer program that are active at a particular time (e.g., at a particular point in time or during a particular period of time). In such embodiments, the object hierarchy does not contain a respective object for each GUI element that could be generated by a computer program, which would be computationally expensive from both a processing and a memory management perspective. In this way, an object hierarchy may represent a snapshot of the active GUI elements of one or more computer programs executing at the particular time. As the user interface of a computer may change over time, the object hierarchy may change over time to reflect at least some of the changes to the user interface. For example, when a user interface of a computer program changes and includes a new active GUI element not previously present in the user interface, the object hierarchy may be updated to add a new object to the hierarchy that corresponds to the new active GUI element. As a non-limiting example, when the user interface of a calculator program is updated from "standard" mode (e.g., as shown in FIG. 13B) to "scientific mode" (e.g., as shown in FIG. 1B), the object hierarchy may be updated to add new objects corresponding to GUI elements that appear in the "scientific mode" user interface, but not in the "standard" user interface of the calculator program (e.g., buttons for invoking trigonometric functions, buttons for invoking hyperbolic functions, radio buttons for selecting between degrees and radians, etc.).

As yet another example, when a user interface of a computer program changes such that information associated with an active GUI element is changed, the object in the object hierarchy that corresponds to the active GUI element may be refreshed to reflect the change in the information. As discussed in greater detail below, refreshing an object may be done by updating information associated with the object or by replacing the object with a new object associated with up-to-date information. For example, an object hierarchy may include an object corresponding to a GUI element present in a user interface of an Internet browser, which represents the title bar of the Internet browser that displays the title of the webpage being displayed by the Internet browser. When the Internet browser navigates from a webpage having one title to a different webpage having another title, the object corresponding to the GUI element representing the title bar may be refreshed to reflect the change in the text shown in the title bar of the Internet browser.

As another example, when a user interface of a computer program changes to no longer include one or more GUI elements that were previously present in the user interface, the object hierarchy may be updated to remove the object(s) corresponding to the now inactive GUI element(s). For example, when the user interface of a calculator program is updated from "scientific mode" (e.g., as shown in FIG. 1B) to "standard" mode (e.g., as shown in FIG. 13B), the object hierarchy may be updated to remove objects that appear in the "scientific mode" user interface, but not in the "standard" user interface of the calculator program.

As the preceding example demonstrates, in some instances, an object hierarchy may contain objects that correspond to inactive GUI elements of a computer program (e.g., GUI elements that were active, but have become inactive due to changes in the user interface of the computer program), and may be updated to remove such inactive objects. Accordingly, in some instances, at a particular time, all objects in an object hierarchy correspond to GUI elements active at the particular time (i.e., none of the objects correspond to inactive GUI elements). However, this is not a limitation of aspects of the technology described herein. For example, in some instances, at a particular time, substantially all (e.g., at least 75%, at least 80%, at least 85%, at least 90%, at least 95%, at least 99%, etc.) of the objects in the object hierarchy correspond to GUI elements that are active at the particular time. As another example, in some instances, at a particular time, a preponderance (e.g., at least 50%) of the objects in the object hierarchy correspond to GUI elements that are active at the particular time. It should also be appreciated that while an object hierarchy may, at a particular time, contain a respective object for each GUI element active at the particular time, this is not a limitation of the technology described herein. For example, an object hierarchy may, at a particular time, include objects corresponding to only a subset of the GUI elements that are active at the particular time.

The correspondence between objects in an object hierarchy and active GUI elements of a computer program is illustrated further in FIGS. 2A-2B, 3A-3B, and 4A-4B. FIG. 2A is a diagram of an illustrative object hierarchy 200 that includes objects corresponding to active GUI elements of user interface 250 of a calculator program, which is shown in FIG. 2B. The root object in the object hierarchy 200 is "desktop" object 202 corresponding to the desktop interface of the WINDOWS operating system (not shown in FIG. 2B) and "calculator" object 204 is a child of object 202. Calculator object 204 of FIG. 2A corresponds to GUI element 254 of FIG. 2B, which correspondence is indicated by a simultaneous emphasis of object 204 (with a box) and GUI element 254 (with a boldface border). Calculator object 204 has three child objects including pane object, title bar object 210, and application object 212. Descendants of the pane object 208 correspond to active GUI elements below the results line of the calculator program, as described in more detail below. Descendants of title bar object 210 correspond to active GUI elements in the title bar of the calculator program. Examples of active GUI elements in the title bar were provided above with reference to FIG. 1B. Descendants of application object 212 include active GUI elements in the menu toolbar of the calculator program. Examples of active GUI elements in the menu toolbar were provided above with reference to FIG. 1B.

Figure 3B:
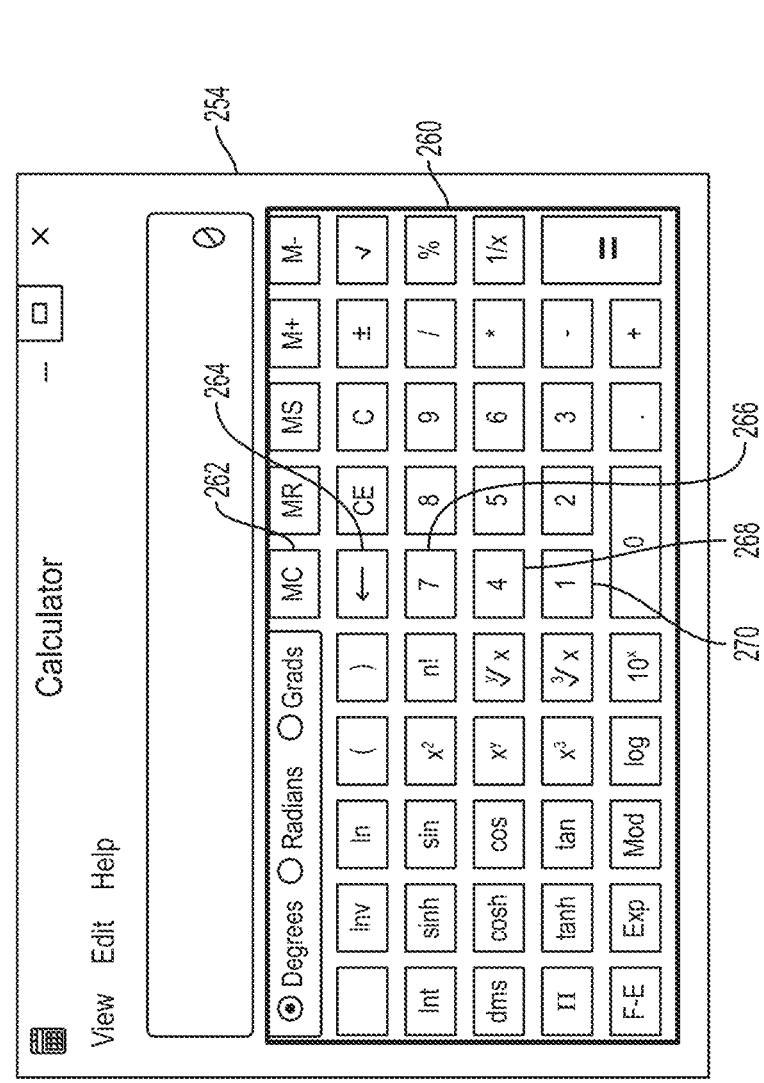
FIG. 3B is a diagram of a GUI of the calculator program that includes GUI elements corresponding to objects in the object hierarchy of FIG. 3A, in accordance with some embodiments of the technology described herein.
Figure 3A:
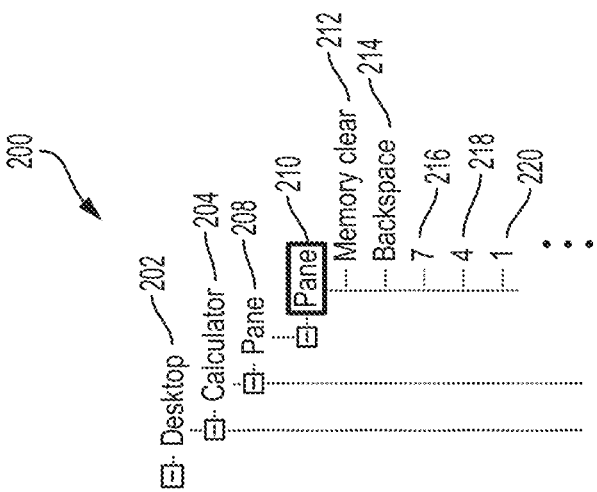
FIG. 3A is a diagram of an illustrative object hierarchy including objects corresponding to active GUI elements of the calculator program shown in FIG. 3B, in accordance with some embodiments of the technology described herein.

FIGS. 3A and 3B further illustrate the correspondence between objects in object hierarchy 200 and active GUI elements of user interface 250. As shown in FIG. 3A, pane object 208 has a child pane object 210. Pane object 210 corresponds to active GUI element 260 that represents a "pad" of the calculator that contains various buttons and radio boxes used to provide input to the calculator program. The correspondence between pane object 210 and GUI element 260 is indicated by a simultaneous emphasis of object 210 (with a box) and GUI element 260 (with a boldface border). Pane object 210 has multiple child objects corresponding to buttons contained within GUI element 260 including "memory clear" object 212, "backspace" object 214, "7" object 216, "4" object 218, and "1" object 220. Memory clear object 212 corresponds to active GUI element 262 that represents the memory clear button of the calculator program. Backspace object 214 corresponds to active GUI element 264 that represents the backspace button of the calculator program. Object 216 corresponds to active GUI element 266 that represents the button used to input the number seven to the calculator program. The correspondence between object 216 and active GUI element 266 is further illustrated in FIGS. 4A and 4B, which indicate this correspondence by a simultaneous emphasis of object 216 (with a box) and GUI element 266 (with a bold-face border). Object 218 corresponds to active GUI element 268 that represents the button used to input the number four to the calculator. Object 220 corresponds to active GUI element 270 that represents the button used to input the number one to the calculator program.

In some embodiments, the correspondence between objects in an object hierarchy and active GUI elements in a computer program may be used to control the computer program. Objects in the object hierarchy may be used to identify, address, and manipulate corresponding user interface elements of the computer program. Thus, objects in the object hierarchy may be used to manipulate the state of a computer program, which in turn may change the state of the user interface of the computer program. An object in an object hierarchy that corresponds to an active GUI element of a computer program may be used to control the computer program (e.g., by providing input to the computer program and/or receiving output from the computer program) analogous to the way in which a person may control the computer program by interacting with the active GUI element. This allows another computer program, such as a software robot, to access the object in the object hierarchy and use it to control the corresponding active GUI element, thereby controlling the computer program whose user interface contains the active GUI element. In this way, a person's interactions with an active GUI element of a computer program, may be automated and performed by a software robot, without input from any human user, by using the object in the object hierarchy that corresponds to the active GUI element.

As one example of using objects in an object hierarchy to control a computer program, an object corresponding to an active GUI element in the user interface of the computer program may be used to provide the same input to the computer program as a person would provide through the active GUI element if the person were interacting with the active GUI element via the computer program's graphical user interface. For example, an object corresponding to a button in the user interface of a computer program may be used to provide the same input to the computer program that a person would provide to the computer program by clicking the button (e.g., using a mouse, a touchpad, etc.). As one non-limiting example, object 216 in object hierarchy 200 corresponds to active GUI element 266 of FIB. 3B, which represents the "7" button in the calculator application, and may be used to "click" the active GUI element 266 by performing one or more programmatic actions to control the calculator program in the same way that a person would by clicking the active GUI element. Thus, a software robot configured to perform a task (e.g., to perform a calculation such as 7+2) using the calculator program may perform that task at least in part by automatically accessing the object 216 in object hierarchy 200 and using the accessed object 216 to click the GUI element 266 that represents the "7" button. The software robot may also use objects in the object hierarchy 200 corresponding to active GUI elements representing the "+", "7" and "=" buttons to click those buttons in furtherance of performing the example calculation of adding seven to two.

As another example of using objects in an object hierarchy to control a computer program, an object corresponding to an active GUI element in the user interface of the computer program may be used to obtain information from the computer program in the same way that a person would obtain that information by looking at the active GUI element. For example, an object corresponding to a GUI element displaying information in the user interface of a computer program may be used to perform one or more programmatic actions to access the displayed information. For example, an object in the object hierarchy 200 that corresponds to the results field of the calculator program may be used to obtain the number being displayed in the results field. Thus, the software robot of the above-described example, which is configured to perform the task of adding seven and two, may cause the buttons corresponding to "7", "+", "2", and "=" to be clicked and then access information in the results field of the calculator application to obtain the resultant value of the operation (i.e., the number 9).

As yet another example of using objects in an object hierarchy to control a computer program, an object corresponding to an active GUI element in the user interface of the computer program may be used to obtain information about the active GUI element. Information about an active GUI element includes, but is not limited to, the size of the active GUI element, the location of the active GUI element on a display (e.g., coordinates indicating the location of the active GUI element such as, for example, x-y coordinates), an identifier and/or name of the active GUI element, information indicating whether the active GUI element is minimized, information indicating whether the active GUI element is maximized, information displayed by the active GUI element, a type of the GUI element (e.g., button, scrollbar, pane, etc.), and one or more pointers to memory storing information associated with the active GUI element (e.g., one or more pointers to memory storing information being displayed by the active GUI element). The object corresponding to the active GUI element may be used to perform one or more programmatic actions that provide access to the information about the GUI element. For example, a software robot may use object 204 in object hierarchy 200 to determine the location of active GUI element 254, which would provide the software robot with information about the location of the calculator program on the screen.

As described above, an object in an object hierarchy that corresponds to an active GUI element of a computer program may be used to perform one or more programmatic actions to control the program. For example, the object may be used to perform one or more programmatic actions to provide input to and/or obtain output from the computer program. Output from the computer program may include output displayed by the active GUI element to which the object corresponds and/or information about the active GUI element itself. In some embodiments, performing one or more programmatic actions to control the computer program may include using an application programming interface (API) of the computer program. An object in an object hierarchy may be configured to perform one or more programmatic actions to control the computer program at least in part by invoking one or more functions in the API. For example, an object in an object hierarchy may be configured to "click" on the active GUI element to which the object corresponds by invoking a function in the API (e.g., a "click" function for the particular active GUI element) that causes the computer program to behave in the same way as it would in response to a person clicking the active GUI element (e.g., using a mouse, touch pad, etc.). As another example, an object in an object hierarchy may be configured to obtain information being displayed by an active GUI element by calling a suitable function in the API that provides access to the information being displayed. As yet another example, an object in an object hierarchy may be configured to obtain information about the active GUI element to which the object corresponds by invoking a suitable function in the API that provides access to information about the active GUI element. Additionally or alternatively, an object in an object hierarchy may be configured to obtain information about the active GUI element by calling a suitable function of the operating system managing execution of the computer program whose user interface includes the active GUI element.

In some embodiments, performing one or more programmatic actions to control the computer program may include using functionality provided by an operating system (or another application program) to emulate, programmatically, what a person would do to control the computer program using one or more input devices (e.g., a keyboard, a mouse, a touchpad, a microphone, a stylus, a joystick, etc.). For example, an object in an object hierarchy may be configured to "click" on the active GUI element to which the object corresponds by invoking one or more functions of the operating system (e.g., an operating system managing execution of the computer program whose user interface includes the active GUI element to which the object corresponds) to cause the operating system to position a cursor over the GUI element (e.g., thereby emulating the positioning of the cursor through movement of a mouse on a surface, the movement of a person's finger on a touchpad, etc.) and generate a command to click the active GUI element over which the cursor is positioned (e.g., thereby emulating a mouse click, a tap on a touchpad, etc.). For example, an object in an object hierarchy may correspond to an active GUI element of an application program implemented using the WINDOWS graphical user interface API. The object may be configured to "click" on the active GUI element by invoking one or more functions in the WINDOWS Automation API. As another example, an object in an object hierarchy may be configured to copy information being displayed on an active GUI element by using the operating system to select the displayed information and copy it (e.g., as a user may operate a mouse and/or keyboard to select displayed information such as text, for example).

An object hierarchy is not limited to including objects corresponding to only one computer program, as an object hierarchy may include objects corresponding to any suitable number of computer programs. An object hierarchy that includes objects corresponding to active GUI elements of multiple computer programs may be used (e.g., by a software robot) to automatically perform tasks that involve multiple computer programs. One example such object hierarchy is shown in FIG. 5A, which is a diagram of an illustrative object hierarchy 500 comprising objects corresponding to active GUI elements of multiple application programs.

Figure 5A:
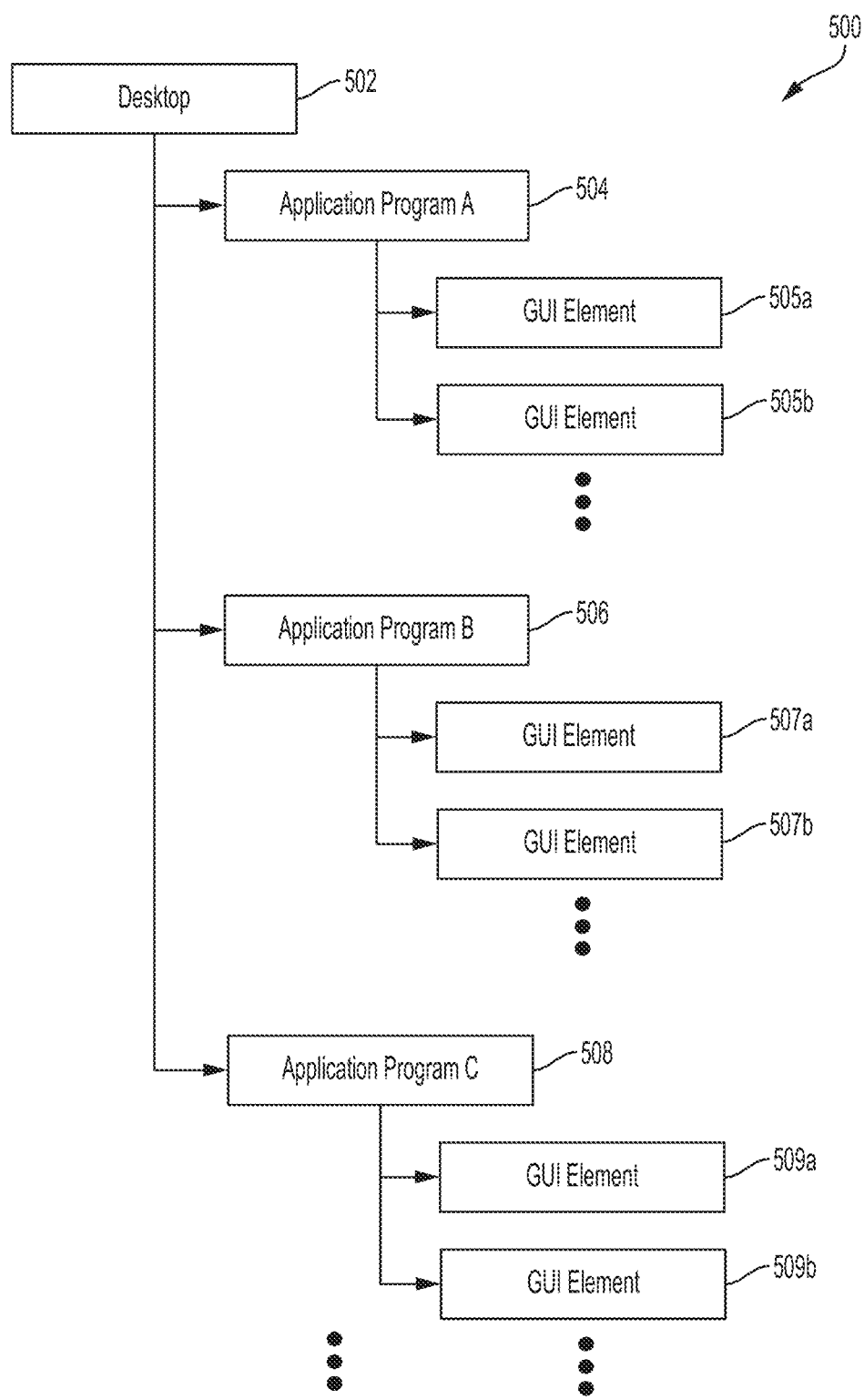
FIG. 5A is a diagram of an illustrative object hierarchy comprising objects corresponding to active GUI elements of multiple application programs, in accordance with some embodiments of the technology described herein.

As shown in FIG. 5A, the root of object hierarchy 500 is object 502 that corresponds to a desktop interface of an operating system, which may be any suitable operating system examples of which are provided herein. Object 502 has multiple child objects each of which corresponds to a GUI element of a respective application program. In particular, the child objects of root object 502 include object 504 corresponding to an active GUI element of application program "A," object 506 corresponding to an active GUI element of application program "B," and object 508 corresponding to an active GUI element of application program "C." Object 504 has multiple child objects including objects 505*a* and 505*b* that correspond to respective active GUI elements of application program A. Object 506 has multiple child objects including objects 507*a* and 507*b* that correspond to respective active GUI elements of application program B. Object 508 has multiple child objects including objects 509*a* and 509*b* that correspond to respective active GUI elements of application program C. Although, object hierarchy 500 is shown as having objects corresponding to four different computer programs (i.e., an operating system and three application programs), this is only for illustration because an object hierarchy may include objects corresponding to any suitable number of computer programs (e.g., one, two, three, at least five, between 1 and 20, at least ten, etc.). In addition, although object hierarchy 500 includes three objects corresponding to each of application programs A, B, and C, this is only for illustration and not by way of limitation, as an object hierarchy may include any suitable number of objects corresponding to active GUI elements of a particular application program. Moreover, since one application program may include a different number of active GUI elements from another application program, an object hierarchy may include different numbers of objects associated with active GUI elements of different application programs.

An object hierarchy, such as object hierarchy 500, may include objects corresponding to graphical user elements of any suitable computer program, which may be any suitable type of operating system or application program. Although some specific computer programs, such as the calculator program, are used herein for clarity of exposition, the technology described herein is not limited to being used only with respect to these illustrative computer programs. Examples of computer programs include, but are not limited to, the examples of operating systems and application programs described below. Non-limiting examples of operating systems include the ANDROID operating system, the BSD operating system, the CHROME operating system, the IPhone operating system (IOS), the LINUX operating system, the Mac OS X operating system, the SOLARIS operating system, IBM AIX, and MICROSOFT WINDOWS.

Non-limiting examples of application programs include any WINDOWS application, any LINUX GTK application, any application having component object model (COM) access, any JAVA application, any FLASH application, any SILVERLIGHT application, any SAP application, any ANDROID application program, any ORACLE application, any web-based application, any HTML application, any Javascript application, any AJAX application, any WINDOWS MOBILE application program, any IOS application, any SOLARIS application, any IBM AIX application, and/or any other suitable application.

Figure 5B:
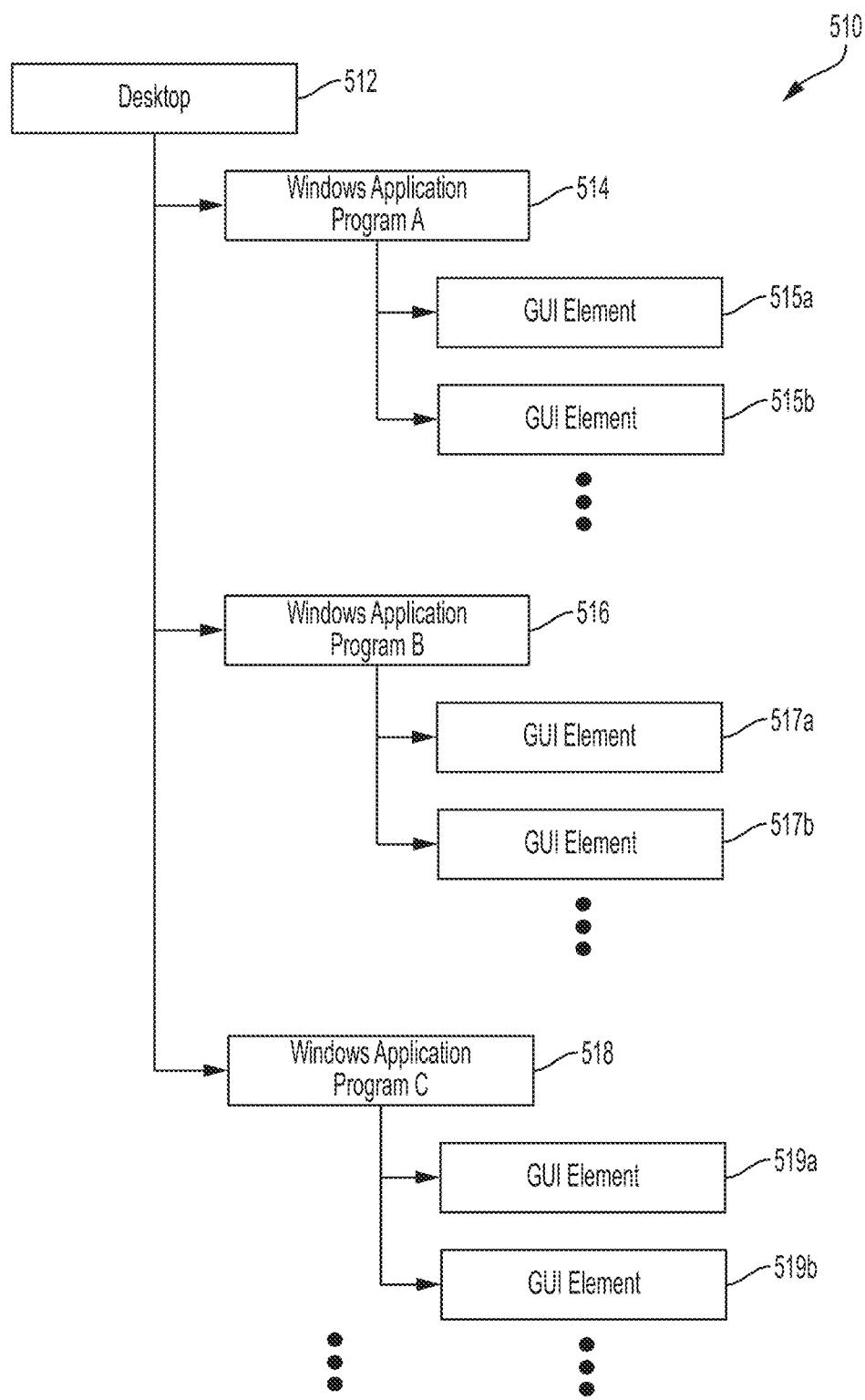
FIG. 5B is a diagram of an illustrative example of the object hierarchy of FIG. 5A, in accordance with some embodiments of the technology described herein.

Accordingly, the application programs A, B, and C shown in FIG. 5A may be any of the above-listed types of application programs and/or any other suitable type of application program. For example, FIG. 5B shows object hierarchy 510—an illustrative example of the object hierarchy shown in FIG. 5A—in which the application programs A, B, and C are WINDOWS applications. As shown in FIG. 5B, the root of hierarchy 510 is object 512 whose children include: object 514 that corresponds to an active GUI element of WINDOWS application A, object 516 that corresponds to an active GUI element of WINDOWS application B, and object 518 that corresponds to an active GUI element of WINDOWS application C. Object 514 has multiple child objects including objects 515a and 515b that correspond to respective active GUI elements of application A. Object 516 has multiple child objects including objects 517a and 517b that correspond to respective active GUI elements of application B. Object 518's children include objects 519a and 519b that correspond to active GUI elements of application C.

An object in an object hierarchy may correspond to any of numerous types of graphical user interface elements, as aspects of the technology described herein are not limited in this respect. Examples of a GUI element include, but are not limited to, a container element (e.g., a window, a frame, a text terminal window, a pane, pop-up window, a message window, a dialog box, a text box, a canvas, etc.), an interaction element (e.g., a cursor, a pointer, a caret, a selection, a handle operating as an indicator of a starting point for a drag and drop operation, etc.), a control element (e.g., a button, a radio button, a check box, a slider, a list box, a spinner, a drop-down list, a menu, a menu bar, a toolbar, an icon, etc.), a navigation element (e.g., a link, a scrollbar, a tab, etc.), a bar (e.g., a status bar, a progress bar), and/or any other suitable GUI element.

Figure 5C:
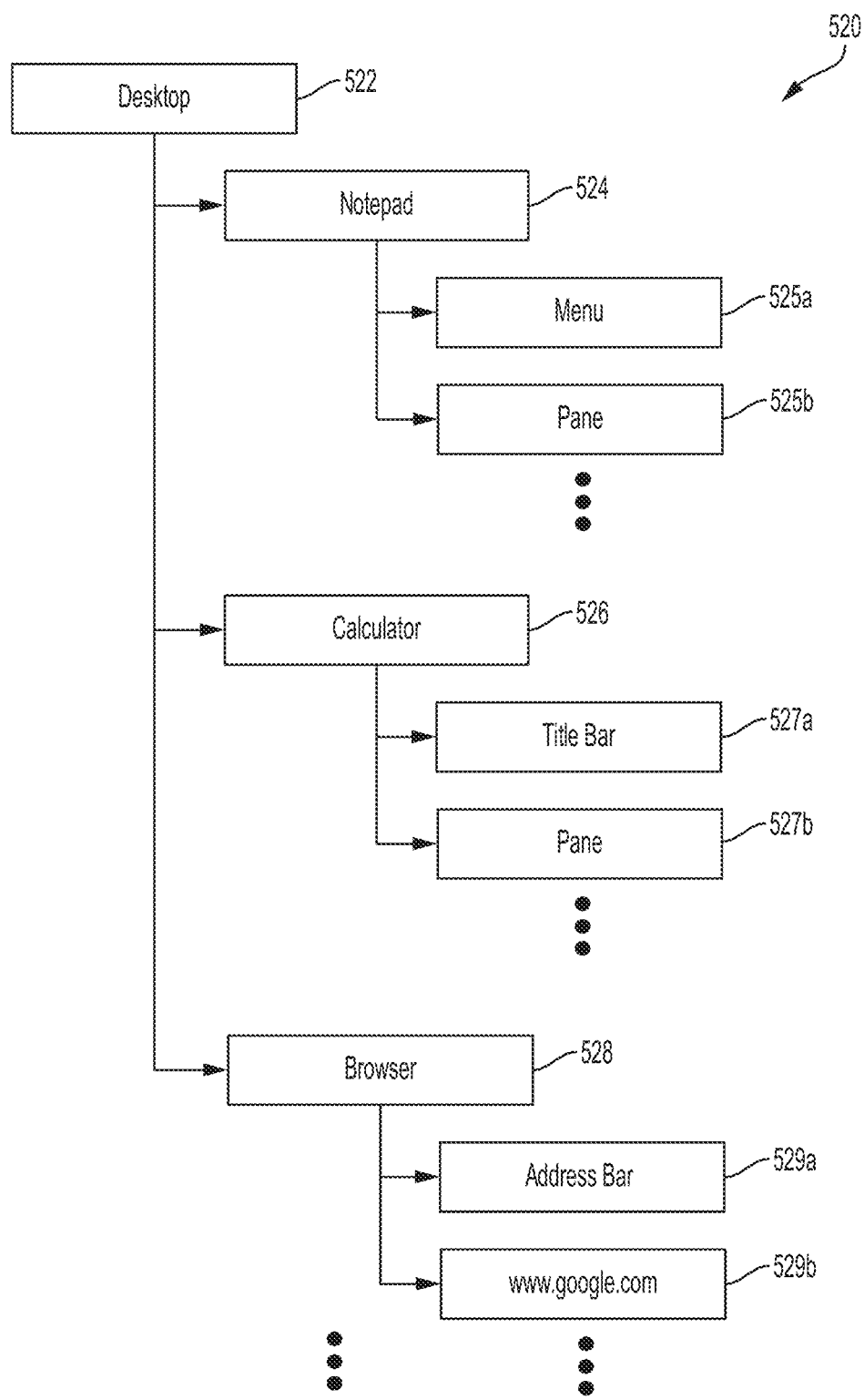
FIG. 5C is a diagram of an illustrative example of the object hierarchy of FIG. 5B, in accordance with some embodiments of the technology described herein.

Accordingly, the GUI elements of object hierarchies 500 and 510 may correspond to any of the above-listed types of GUI elements and/or any other types of GUI elements. For example, FIG. 5C shows object hierarchy 520—an illustrative example of the object hierarchy shown in FIG. 5A—in which various objects correspond to various illustrative active GUI elements of WINDOWS application programs. As shown in FIG. 5C, the root of hierarchy 520 is object 522 whose children include object 524 that corresponds to an active GUI element of the Notepad program, object 526 that corresponds to an active GUI element of the calculator program, and object 528 that corresponds to an active GUI element of an Internet browser. Object 524 has multiple child objects including object 525a that corresponds to an active GUI element that represents a menu bar, and object 525b that corresponds to an active GUI element that represents a pane. Object 526 has multiple child objects including object 575a that corresponds to an active GUI element that represents a title bar (e.g., title bar 160 shown in FIG. 1B), and object 575b that corresponds to an active GUI element that represents a pane. Object 528 has multiple child objects including object 529a that corresponds to an active GUI element that represents an address bar of the browser, and object 529b that corresponds to an active GUI element that represents a pane.

Figure 5D:
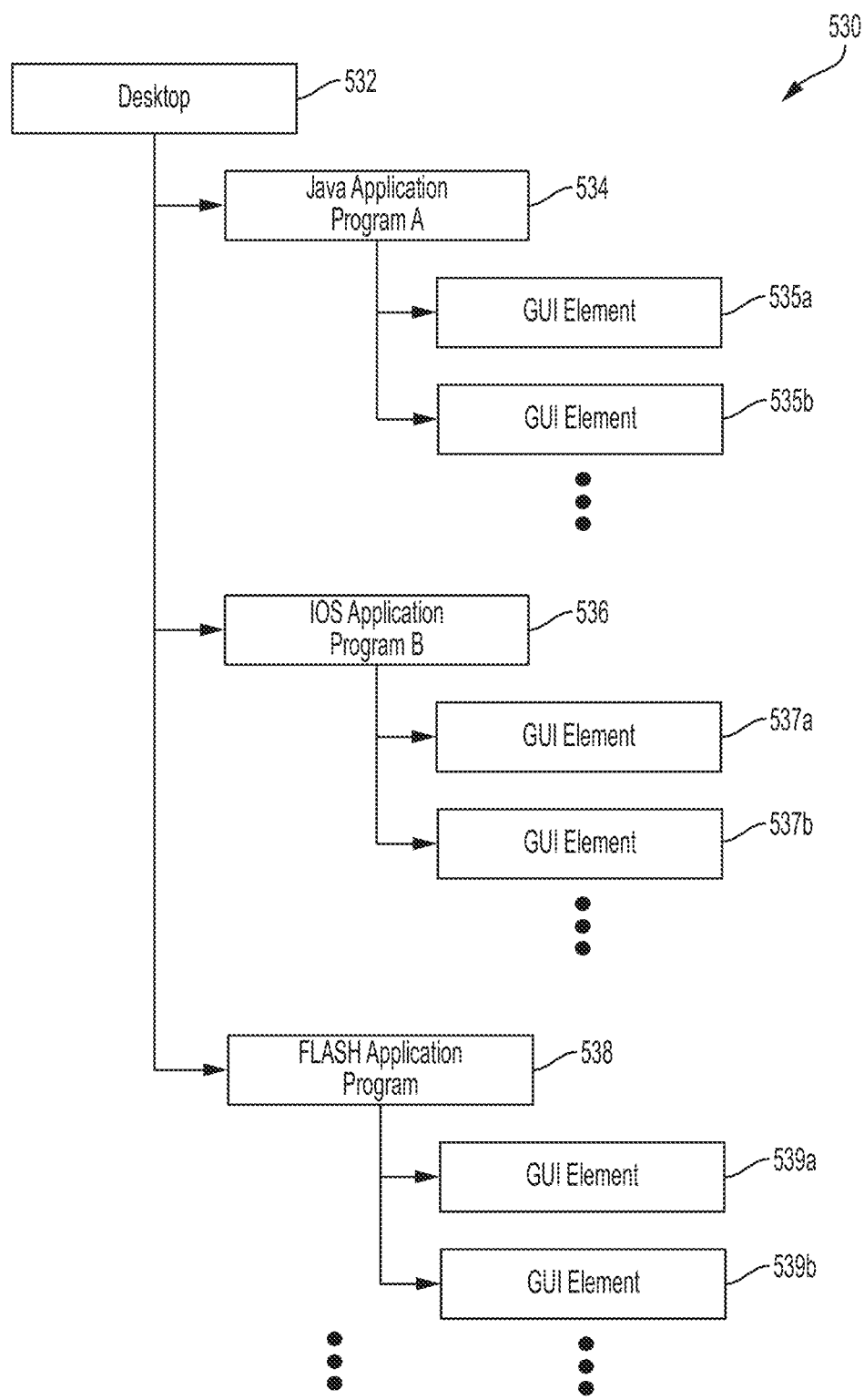
FIG. 5D is a diagram of another illustrative example of the object hierarchy of FIG. 5A that includes objects corresponding to active GUI elements of multiple application programs that are configured to execute at least in part by using different GUI application libraries, in accordance with some embodiments of the technology described herein.

In some embodiments, an object hierarchy may include objects corresponding to active GUI elements of multiple computer programs that are configured to execute at least in part by using different GUI application libraries. For example, FIG. 5D shows an illustrative hierarchy 530 that includes multiple objects corresponding to GUI elements of application programs that are implemented using different GUI application libraries. As shown in FIG. 5D, the root of hierarchy 530 is object 532 whose children include object 534 that corresponds to an active GUI element of an application program A implemented in the JAVA programming language and whose user interface is implemented using a JAVA GUI application library, object 536 that corresponds to an active GUI element of an IOS application program whose GUI is implemented using an IOS GUI application library, and object 538 that corresponds to an active GUI element of an Adobe FLASH application whose GUI is implemented using a FLASH GUI application library. Object 534 has multiple child objects including objects 535a and 535b that correspond to respective active GUI elements of the JAVA application program A. Object 536 has multiple child objects including objects 537a and 537b that correspond to respective active GUI elements of the IOS application program B. Object 538 has multiple child objects including objects 539a and 539b that correspond to respective active GUI elements of the FLASH application program C.

Figure 6:
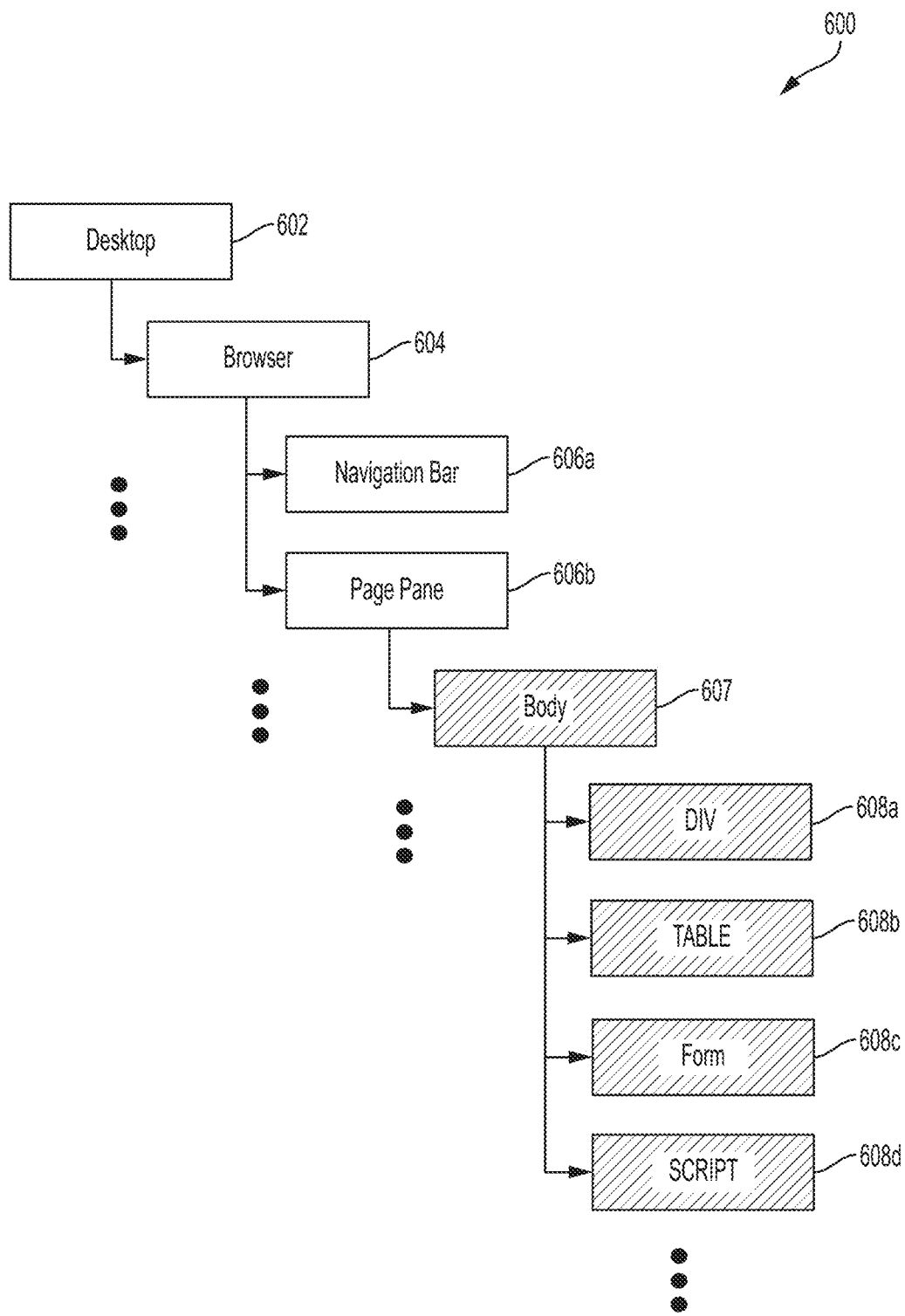
FIG. 6 is a diagram of an illustrative object hierarchy comprising objects corresponding to active GUI elements implemented using different GUI technologies, in accordance with some embodiments of the technology described herein.

Another example of an object hierarchy containing objects corresponding to active GUI elements implemented using different GUI technologies is shown in FIG. 6, which shows an illustrative object hierarchy 600 containing objects corresponding to active GUI elements of an Internet browser (i.e., objects 604, 606a, and 606b) and objects corresponding to active GUI elements of the webpage displayed by the Internet browser (i.e., objects 607 and 608a-d). The hierarchy of objects corresponding to active GUI elements of the webpage are rooted at object 606b corresponding to the active GUI element representing the browser's page pane, which displays the webpage. The active GUI elements of the Internet browser are implemented using a first GUI application library (e.g., a WINDOWS GUI application library when the browser is a WINDOWS application, a JAVA GUI application library when the browser is a JAVA application, etc.). The active GUI elements of the webpage are implemented in accordance with a web-based GUI technology such as HTML, which specifies the types of GUI elements that may appear on the webpage, their appearance, and their properties.

Figure 7:
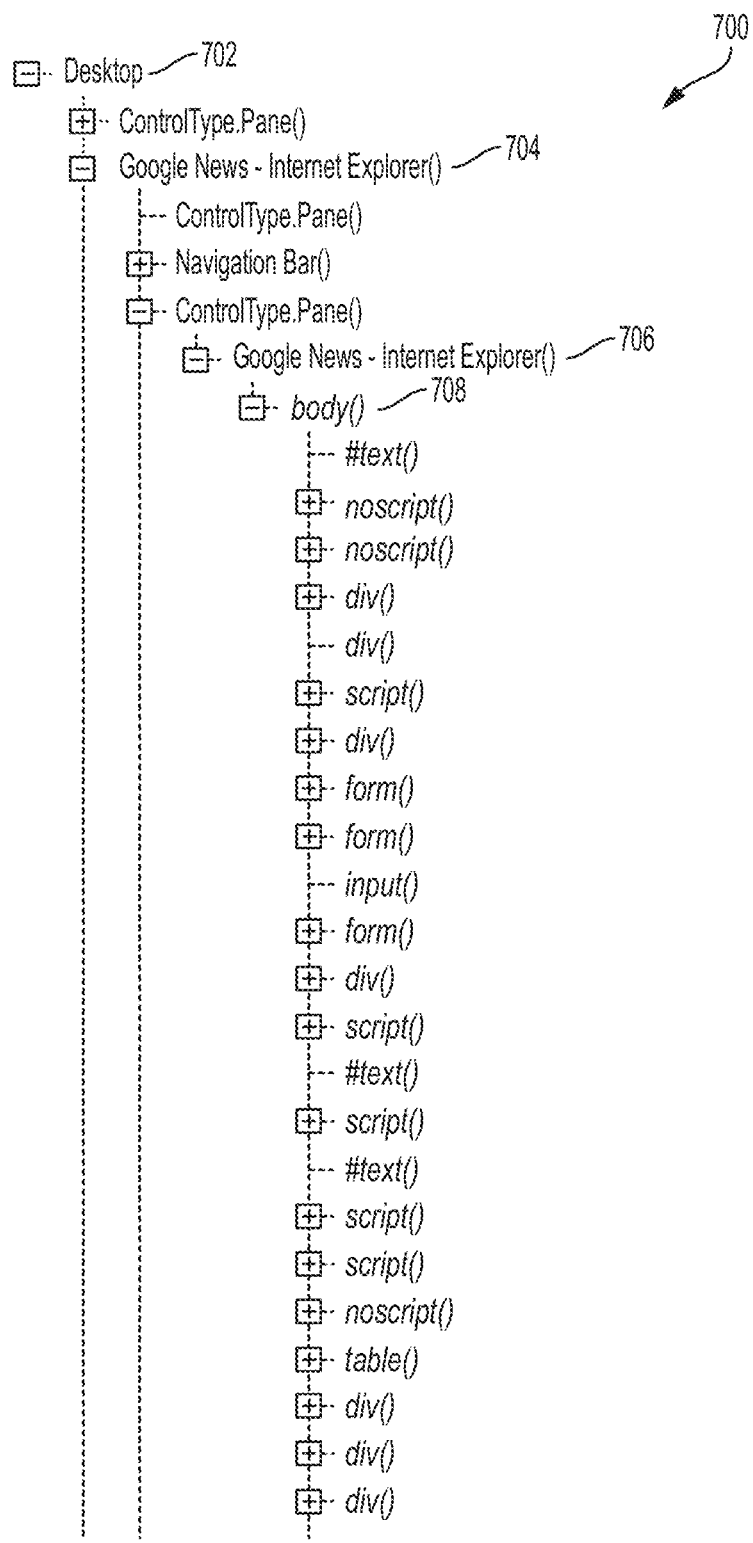
FIG. 7 is a diagram of another illustrative object hierarchy comprising objects corresponding to active GUI elements implemented different GUI application libraries, in accordance with some embodiments of the technology described herein.

FIG. 7 is a diagram of an illustrative object hierarchy 700 including objects corresponding to GUI elements implemented using different GUI technologies (e.g., GUI application libraries). Object hierarchy 700 is a non-limiting example of object hierarchy 600 of FIG. 6. The root of object hierarchy 700 is object 702 that corresponds to the desktop of the WINDOWS operating system. Hierarchy 700 includes objects corresponding to active GUI elements of a Windows Internet browser (i.e., objects 704, and 706) and objects corresponding to active GUI elements of the webpage displayed by the browser (i.e., object 708 and its descendants). The hierarchy of objects corresponding to active GUI elements of the webpage are rooted at object 706 corresponding to the active GUI element representing a pane in the browser that displays the webpage.

In some embodiments, an object hierarchy only contains objects that correspond to GUI elements of computer programs executing on a single physical computing device, examples of which are provided below. In some embodiments, an object hierarchy may include objects that correspond to GUI elements of computer programs executing on multiple different computing devices. Additionally, in some embodiments, the technology described herein may be used in virtualized environments. Accordingly, in some embodiments, an object hierarchy may include objects corresponding to GUI elements corresponding to multiple computer programs executing on one or multiple virtual machines. The virtual machines may be configured to execute on a same physical device or on multiple physical devices.

In some embodiments, an object hierarchy may be represented using one or more data structures embodying a graph comprising vertices or nodes that represent objects and edges that represent relationships between the objects. In some embodiments, the graph may be a tree. Any suitable data structure(s) may be used to represent the object hierarchy (e.g., one or more arrays, one or more linked lists, one or more heaps, one or more trees, one or more hash tables, etc.), as aspects of the disclosure described herein are not limited in this respect. The data structure(s) embodying an object hierarchy may be stored in at least one non-transitory computer-readable storage medium. For example, the data structure(s) embodying the object hierarchy may be stored in memory of a computing device executing a software robot that uses the object hierarchy to control one or more other computer programs to perform a task.

In some embodiments, an object in an object hierarchy that corresponds to an active GUI element (e.g., any of the objects described herein including unified objects described below) may be represented by one or more data structures. These data structure(s) may be the same as or different from the data structure(s) representing the object hierarchy. The data structure(s) representing the object may contain information identifying the object (e.g., an identifier of the object) and information about the active GUI element to which the object corresponds. As described above, information about the active GUI element may include, but is not limited to, an identifier of the active GUI element, a pointer (and/or any other suitable handle) to the active GUI element, information indicating the relationship between the active GUI element and one or more other GUI elements, information indicating whether the active GUI element is minimized or maximized, information indicating the location of the active GUI element on a screen, size of the active GUI element, and information displayed by the active GUI element.

In some embodiments, the data structure(s) representing an object corresponding to an active GUI element of a computer program may include information that may allow the object to perform one or more programmatic actions on the active GUI element. The programmatic action(s) may be used to obtain information from the computer program, provide information to the computer program, and/or cause the computer program to perform an action. For example, the data structure(s) representing an object may include code (or a pointer to code) used for performing the programmatic action(s) on the active GUI element. As one example, the data structure(s) representing an object that corresponds to an active GUI element that is clickable (e.g., a button) may include code (or a pointer to code) for clicking on the active GUI element. As another example, the data structure(s) representing an object that corresponds to an active GUI element may include code (or a pointer to code) for obtaining a value of active GUI element (e.g., text displayed by a textbox, text shown on a button, a value indicating whether a checkbox is checked, etc.). As yet another example, the data structure(s) representing an object that corresponds to an active GUI element may include code (or a pointer to code) for setting the value of the active GUI element.

In some embodiments, the software used for generating and maintaining an object hierarchy may be implemented in an object-oriented programming language. In such embodiments, an object in the object hierarchy may correspond to instance of an object class, and may include one or more fields and one or more methods. Any object-oriented language may be used, including, but not limited to, C++, JAVA, C #, Python, Objective-C, Smalltalk, Swift, Perl, and Ruby. In other embodiments a non-object oriented programming languages may be used to implement software used for generating and maintaining an object hierarchy.

III. Unified Object Hierarchy

As described above, in some embodiments, an object hierarchy may include objects corresponding to active GUI elements implemented using different GUI technologies. For example, an object hierarchy may include objects corresponding to active GUI elements of computer programs implemented using different GUI application libraries, examples of which are provided herein. As a non-limiting example, an object hierarchy may include objects corresponding to active GUI elements of an application program implemented using the WINDOWS GUI application library, objects corresponding to active GUI elements of an application program implemented using the JAVA GUI application library, and objects corresponding to active GUI elements of a webpage implemented in accordance to a web-based GUI technology, such as HTML.

The inventors have recognized that an object hierarchy containing objects corresponding to GUI elements implemented using diverse GUI technologies may be challenging for programmers to use (e.g., for creating software robots), unless the objects in the hierarchy provide a common interface to similar types of active GUI elements across multiple different GUI technologies. Although different GUI technologies provide for similar types of GUI elements, these GUI elements are often implemented differently despite their similarities. As a result, programmatic access to and/or control of these GUI elements needs to be implemented differently for different GUI technologies, which increases the complexity of creating and maintaining software robots to control programs implemented using different GUI technologies. Although a user may interact with similar types of GUI elements without regard to the type of GUI technology used to realize these elements (e.g., by clicking on a button without regard to the type of GUI technology used to implement that button), programmatic emulation of the user's interaction with the GUI elements (e.g., by a software robot) depends on the type of GUI technology used.

For example, similar types of GUI elements implemented using different GUI technologies may have analogous properties, but these properties may have different names and, as a result, programmatically accessing these properties may require using different code for different GUI technologies. As a specific example, the location of a button implemented using the WINDOWS GUI application library may be obtained from the WINDOWS operating system (e.g., via its accessibility interface) by accessing a field having one name, but the location of a button implemented using the JAVA GUI application library may be obtained from a JAVA Virtual Machine by accessing a field having a different name. Thus, a programmer needs to write different code for accessing the same information about a button in a WINDOWS application and a button in a JAVA application.

As another example, similar types of GUI elements implemented using different GUI technologies may expose analogous functionality using functions having different signatures (e.g., different names, different requirements for input, different format for output, etc.). As a specific example, buttons (or other clickable GUI elements) implemented using the WINDOWS and JAVA GUI application libraries may each provide for being clicked programmatically, but the manner in which such a click may be invoked programmatically differs between the two technologies. Consequently, as shown in Table 1A, even though different GUI technologies provide for clickable objects, a programmer would have to write multiple portions of GUI technology-specific code to invoke, programmatically, the clicking functionality.

TABLE 1A

Illustration of Code for Handling
Differences Among GUI
Application Libraries

```
Click( ) {
  if (object is of type WINDOWSGUIObject) {
    // Code for automating clicks for WINDOWS GUI objects
  }
  else if (object is of type JAVAGUIObject) {
    // Code for automating clicks for JAVA GUI Objects
  }
  else if (object is of type HTMLGUIObject) {
    // Code for automating clicks for HTML GUI Objects
  }
}
```

As may be appreciated from the foregoing examples, a programmer who wishes to develop a software robot to control computer programs implemented using different GUI technologies may need to write multiple different pieces of code to perform the same function in order to deal with underlying differences among the different GUI technologies. For example, a programmer may need to write multiple different pieces of code to click on a clickable GUI element (e.g., click on a button), get a value from a GUI element (e.g., get a text string displayed in a text box), and/or perform any other function common to GUI elements across different GUI technologies. The burden, therefore, falls on the programmer to write GUI technology-specific code, resulting in longer development times, larger pieces of code that likely contain more errors and take more time to maintain, which in turn greatly (and, in some instances, prohibitively) increases the cost and time needed to develop and maintain software robots. The problem is exacerbated further when developing a software robot to perform a task by controlling computer programs implemented using more than two (e.g., three, four, five, six, etc.) different GUI technologies, examples of which are described herein.

Accordingly, the inventors have developed a common interface for accessing and/or controlling similar types of GUI elements across different GUI technologies. This common interface may be realized through the use of so-called "unified" objects that may be used to access and/or control similar types of GUI elements implemented using different GUI technologies. The common interface may include a unified object for each class of GUI elements (e.g., buttons, labels, text boxes, etc.). An object hierarchy containing one or more unified objects may be called a "unified" object hierarchy. A programmer may develop a software robot by controlling GUI elements implemented using different GUI technologies via one or more unified objects in a unified object hierarchy, without writing GUI-technology specific code.

In some embodiments, a unified object may provide a common interface for a particular class of GUI elements that may be implemented across multiple different GUI technologies. The interface provided by the unified object may provide a programmatic interface (e.g., by exposing properties and functions or methods) that may be used to manipulate the unified object and, through that manipulation, control any active GUI element to which the unified object corresponds.

For example, some embodiments provide for a "unified button" object, which provides a common interface to buttons implemented using different GUI technologies. The unified button object may provide a single programmatic interface that may be used to control a button in a GUI of a computer program, regardless of the GUI technology used to implement the button. As a result, the developer of a software robot may program the software robot to click an active GUI element representing a button by writing code that accesses a unified button object in the object hierarchy corresponding to the active GUI element and invokes the click method provided by the programmatic interface of the accessed unified button object. The developer need not write any GUI technology-specific code because the manner in which the invocation of the "click" method is subsequently processed is hidden from the developer of the software robot. This greatly reduces the amount of code the developer has to write.

Figure 8:
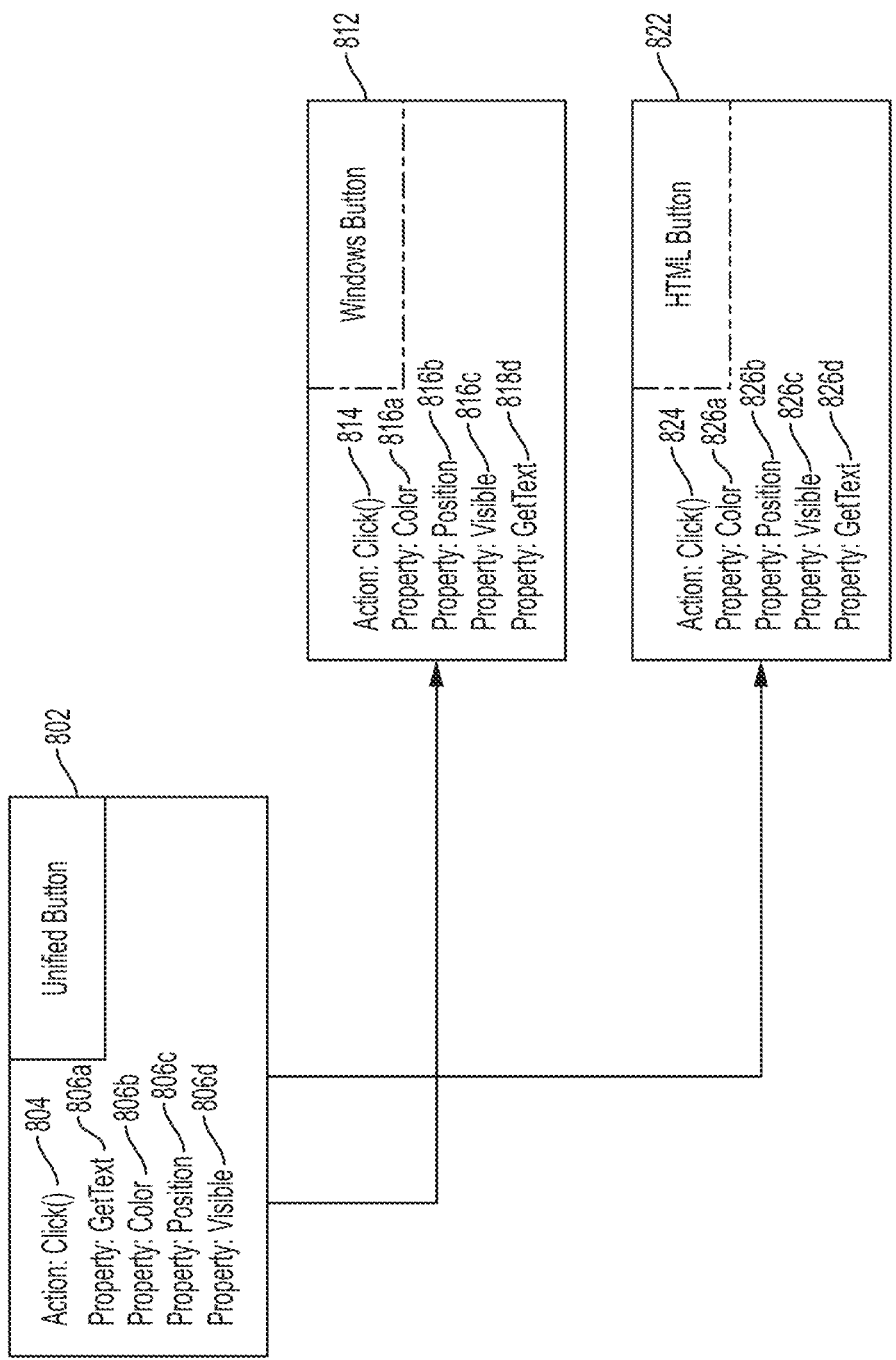
FIG. 8 is a diagram illustrating a unified "Button" object, in accordance with some embodiments of the technology described herein.

FIG. 8 provides an example of an illustrative unified button object 802, which may be used to control an active GUI element representing a button implemented using WINDOWS, HTML, and/or any other GUI technologies. Unified button object 802 exposes a method 804 for performing a click and multiple properties including property 806a indicating the text displayed by the button, property 806b indicating a color of the button, property 806c indicating a position of the button, and property 806d indicating whether the button is visible or invisible.

A unified object may be associated with one or more GUI technology-specific implementing objects that conform to the interface specified by the unified object. For example, as shown in FIG. 8, unified button object 802 is associated with Windows button object 812 and HTML button object 822, each of which conforms to the interface specified by object 802. WINDOWS button object 812 and HTML button object 822 each includes the properties and methods specified by unified button object 802 and, optionally, one or more other properties and/or methods (not shown in FIG. 8). For example, object 812 includes method 814 for clicking a WINDOWS button and properties 816a, 816b, 816c, and 816d indicating, respectively, the button's color, the button's position, whether the button is visible, and the text displayed by the button. Similarly, object 822 includes method 824 for clicking an HTML button and properties 826a, 826b, 826c, and 826d indicating, respectively, the button's color, the button's position, whether the button is visible, and the text displayed by the button. A unified object may be associated with any suitable number of GUI technology-specific implementing objects (for any suitable number of GUI technologies), as aspects of the technology described herein are not limited in this respect, with only two such objects being shown in FIG. 8 for clarity of exposition and not by way of limitation.

A GUI technology-specific implementing object (e.g., object 812 or 822) may be implemented in any suitable way. For example, in embodiments where objects in an object hierarchy are implemented using an object-oriented programming language, the GUI technology-specific objects may inherit (in the sense of inheritance among objects in an object-oriented programming language) the properties and/or methods of a unified object (e.g., unified button 802). The GUI technology-specific implementing objects may further include code (or pointers to code) that will execute the functions associated with a particular inherited method. For example, object 812 may include code to execute a click on a WINDOWS button (e.g., via a call to the WINDOWS Automation API). As another example, object 822 may include code to execute a click on an HTML button (e.g., via a call to the Internet browser displaying a webpage having the button).

In some embodiments, when an object corresponding to a particular active GUI element is generated and added to an object hierarchy, the generated object may be an instance of a unified object corresponding to the class of GUI elements including the particular active GUI element. The instance of the unified object may be an instance of one of the GUI technology-specific implementing objects associated with the unified object. For example, when an object corresponding to a WINDOWS button is generated and added to an object hierarchy, the object may be an instance of WINDOWS button object 812, which inherits properties (e.g., implements the interface of) of the unified button object 802, as described above. As another example, when an object corresponding to an HTML button is generated and added to an object hierarchy, the object may be an instance of HTML button object 812, which also inherits properties of the unified button object 802, as described above. The type of GUI technology-specific implementing object to instantiate may be determined automatically or may be specified by the code for generating the object corresponding to the particular active GUI element and adding it to the object hierarchy.

In this way, although an object hierarchy may contain multiple objects corresponding to active GUI elements representing buttons implemented using different GUI technologies, all these objects have a common interface, inherited from the unified button object 802. This allows a developer of a software robot to write one piece of code that programmatically controls a button without regard to the particular GUI technology used to implement the button. That is, the developer of a software robot need not write any GUI technology-specific code to click on a button, because the unified objects developed by the inventors provide an interface layer (sometimes termed an "abstraction layer" in the field of software engineering), shielding the developer from GUI-technology-specific implementation details. This greatly reduces the amount of code the developer has to write and maintain. For example, the developer need not bear the additional burden of writing code filled with conditions based on the type of the underlying object being accessed (e.g., as shown in Table 1A). By contrast, absent the interface layer provided by the unified objects, a developer would have to manage multiple different GUI technology-specific objects that would not share a common interface and would need to be accessed differently from one another, thereby increasing the complexity of software robot code, as described above.

In this way, a developer of a software robot is shielded from management of GUI technology-specific details relating to control of similar types of GUI elements because this management is performed by the unification layer provided by the software robot platform developed by the inventors. This is analogous to how a developer of a JAVA computer program may be shielded from managing memory used by the computer program because this management is performed by the memory management functionality provided by the JAVA virtual machine. Consequently, a software robot may be developed in a manner agnostic to certain differences among GUI technologies.

Figure 9:
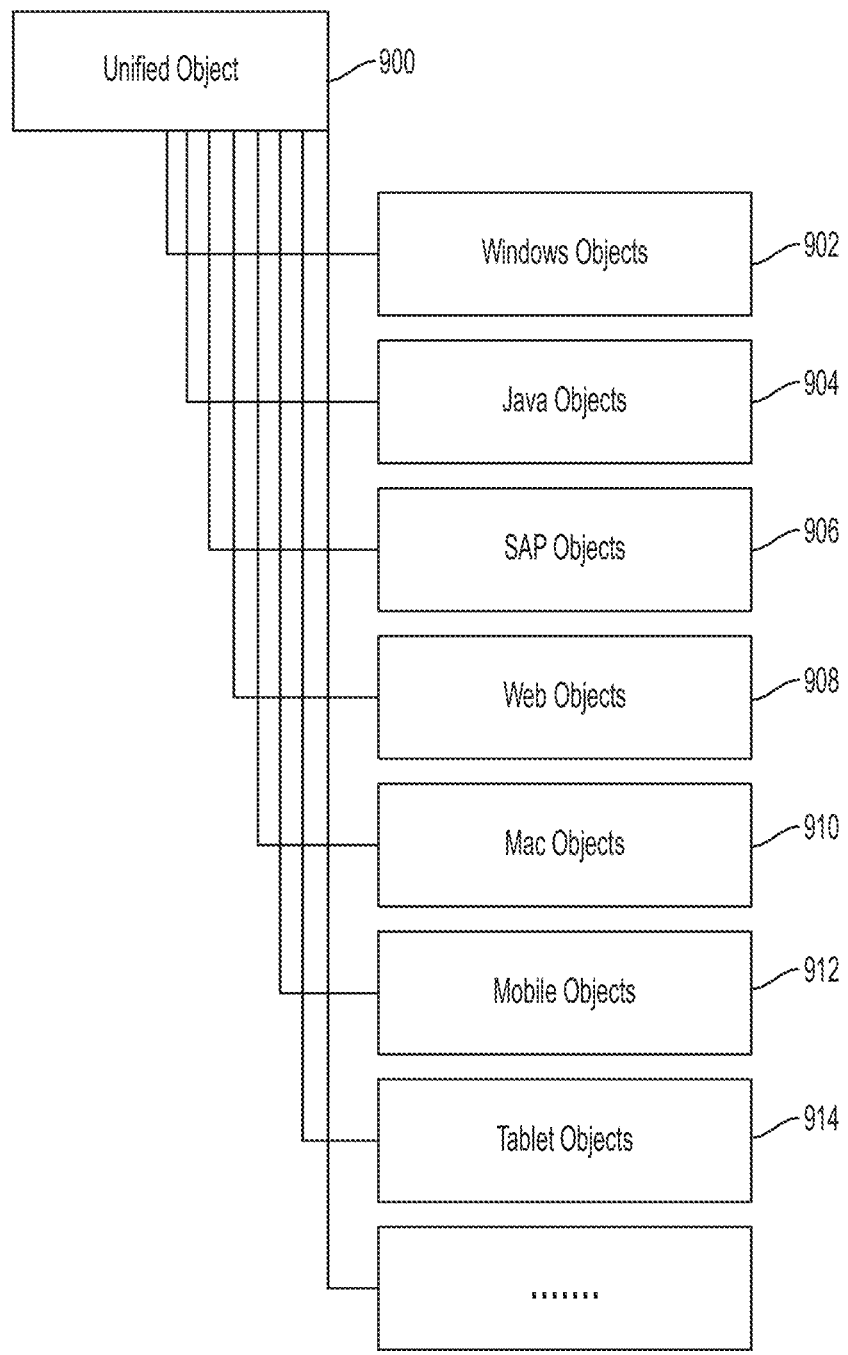
FIG. 9 is a diagram illustrating aspects of a unified object in an object hierarchy, in accordance with some embodiments of the technology described herein.

As discussed above, the unification layer may include a unified object for each class of GUI elements (e.g., buttons, labels, text boxes, etc.). Each of these unified objects may be associated with any suitable number of GUI technology-specific implementing objects conforming to the interface specified by the unified object. FIG. 9 illustrates GUI technology-specific objects conforming to unified object 900. These GUI technology-specific objects include WINDOWS objects 902 for controlling GUI elements implemented using WINDOWS GUI application libraries, JAVA objects 904 for controlling GUI elements implemented using JAVA GUI application libraries, SAP objects 906 for controlling GUI elements implemented using SAP GUI application libraries, web objects 908 for controlling GUI elements implemented using web-based GUI technologies such as HTML, Mac objects 910 for controlling GUI elements implemented using a MACINTOSH GUI application library, mobile objects 912 for controlling GUI elements implemented using a GUI application library for a mobile device (e.g., a library part of an operating system, such as IOS or ANDROID, for a mobile device), tablet objects 914 implemented using a GUI application library for a tablet device (e.g., a library part of an operating system for a tablet device).

Table 1B shows an illustrative specification of an illustrative unified object 900. The specification requires that objects conforming to it include three properties and two methods. Tables 1C and 1D show illustrative specifications of GUI technology-specific implementations of the unified object specified in Table 1B. Table 1C shows an illustrative example of a WINDOWS-specific implementation object associated with the unified object specified in Table 1B. Table 1D shows an illustrative example of an HTML-specific implementation object associated with the unified object specified in Table 1B. Each of these objects includes the properties of the unified object of Table 1B and one or more other properties/methods.

TABLE 1B

Illustrative Specification of Definition
of Illustrative Unified Object

```
class UOHObject {
    string Name { get { return
    string.Empty; ; } }      // return name of object
    string ClassName { get { return
    string.Empty; ; } }      // return Class name
    string ControlType { get { return
    string Empty; ; } }// return Type of GUI element
    Click( );        // click on corresponding GUI element
    GetValue( ); // Get value of corresponding
    GUI element
}
```

TABLE 1C

Illustrative example of a WINDOWS-specific
implementation object associated with the unified
object specified in Table 1B.

```
class WINDOWSGUIObject {
    // Properties
    string Name;           // Inherited from unified object of Table 1B
    string ClassName;      // Inherited from unified object of Table 1B
    string ControlType;    // Inherited from unified object of Table 1B
    int? X; int? Y;        // Properties indicating location in X,Y
                           coordinates
    int? Height; int? Width; // Properties indicating height/width
    bool isMinimized;      // Property indicating whether element
                           minimized
    bool isMaximized;      // Property indicating whether element
                           maximized
    // Functions
    bool Maximize( );      // Method for maximizing a window
    bool Minimize( );      // Method for maximizing a window
    bool Click( );         // Inherited from unified object of Table 1B
    string GetValue( );    // Inherited from unified object of Table 1B
}
```

TABLE 2D

Illustrative example of HTML-specific
implementation object associated
with the unified object
specified in Table 1B.

```
class HTMLGUIObject {
    string Name;           // Inherited from unified object of Table 1B
    string ClassName;      // Inherited from unified object of Table 1B
    string ControlType;    // Inherited from unified object of Table 1B
    int? X; int? Y;        // Properties indicating location in X,Y
                           coordinates
    int? Height; int? Width; // Properties indicating height/width
    bool Click( );         // Inherited from unified object of Table 1B
    string GetValue( );    // Inherited from unified object of Table 1B
}
```

IV. Performing a Task Using an Object Hierarchy

As described above, an object hierarchy may be used to control one or more computer programs to perform one or multiple tasks. For example, a software robot may be configured to control an operating system and/or one or more applications to automatically perform a task by using an object hierarchy to cause the operating system and/or the application(s) to perform one or more actions in furtherance of the task. The software robot may be configured to control the operating system and/or one or more application(s) to perform any suitable task, examples of which are provided herein.

In some embodiments, for example, a software robot may use an object hierarchy to automatically perform a task including multiple sub-tasks. Each of the sub-tasks may consist of one or more actions performed by respective application programs. The software robot may control a first application to perform a first of the multiple sub-tasks by accessing objects in an object hierarchy corresponding to active GUI elements of the first application and using the accessed objects to cause the first application to perform one or more actions in furtherance of the first sub-task. Next, the software robot may control a second application to perform a second of the multiple sub-tasks by accessing objects in the object hierarchy corresponding to active GUI elements of the second application and using the accessed objects to cause the second application to perform one or more actions in furtherance of the second sub-task. The software robot may continue controlling other application (s) until each of the multiple sub-tasks is performed and the task is completed.

As one non-limiting example, a software robot may use an object hierarchy to perform the task of performing a calculation using the calculator program (the first sub-task) and placing the result of the calculation into a text file using the Notepad program (the second sub-task). The software robot may access objects in an object hierarchy corresponding to active GUI elements of the calculator program to perform a sequence of one or more actions in furtherance of the first sub-task of performing a calculation. For example, this sequence of actions may include placing the calculator program into a desired mode (e.g., "scientific" mode) by using one or more objects in the object hierarchy that correspond to active GUI elements representing various toolbar elements, providing input to the calculator program using objects corresponding to active GUI elements representing buttons of the calculator program, and accessing the result of the calculation by using an object in the object hierarchy that corresponds to the active GUI element representing the results pane of the calculator program. The software robot may then access objects in the object hierarchy corresponding to active GUI elements of the Notepad program to perform a sequence of one or more actions in furtherance of performing the second sub-task of placing the result of the calculation into a text file. By way of example, this sequence of actions may include placing the result of the calculation into a worksheet opened by the Notepad program by using an object in the object hierarchy corresponding to an active GUI element representing the worksheet of the Notepad program and saving the worksheet as a file by using objects in the object hierarchy corresponding to active GUI elements representing various toolbar elements (e.g., "File," "Save As," etc.) of the Notepad program. This example is further described below with reference to FIGS. 13A-13R.

As another non-limiting example, a software robot may use an object hierarchy to perform the task of obtaining prices from multiple e-commerce websites for products in a list of products. This task includes multiple sub-tasks such as opening an application program in which to store prices, and obtaining, for each of multiple products, prices from multiple different websites. The software robot may first access one or more objects in an object hierarchy corresponding to one or more active GUI elements of an operating system to perform one or more actions in furtherance of the sub-task of launching the EXCEL application program and an Internet browser. Then, for each product in the list of products, the software robot may cause the Internet browser to navigate to a webpage containing the price of the product by using one or more objects in the object hierarchy corresponding to active GUI elements of the Internet browser, obtain the price for the product from the webpage by using one or more objects in the object hierarchy corresponding to active GUI elements of the webpage, and enter the obtained price into an EXCEL spreadsheet by using one or more objects in the object hierarchy corresponding to active GUI elements of the EXCEL application. This example is described in more detail below with reference to FIGS. 14A-14G.

It should be appreciated that a software robot may be configured to control the operating system and/or one or more application programs to perform any suitable task including, but not limited to, automatically generating a presentation (e.g., in MICROSOFT POWERPOINT) and/or a report (e.g., in MICROSOFT EXCEL) with information gathered from multiple sources (e.g., a user's computer and one or more websites), performing one or more tasks related to finance and accounting services (e.g., generating, submitting, and/or processing purchase orders, updating a retailer's systems to reflect purchases, auditing one or more financial transactions, etc.), performing one or more tasks related to information technology infrastructure management (e.g., resetting a user's login and/or password, resolving network connectivity issues, providing someone with access to data, restoring a hard disk, re-installing an application program on a computing device, etc.), merging information stored in different databases, and performing one or more tasks related to gathering prices about products for sale at multiple sources. A software robot may be configured to control any suitable number of application programs to perform a particular task.

Although a software robot may use an object hierarchy to control one or more other computer programs, the software robot is not limited to controlling the other computer program(s) solely by using the object hierarchy. Accordingly, in some embodiments, a software robot may control one or more other computer program(s) (e.g., an operating system and/or one or more applications) at least in part by using an object hierarchy, in accordance with embodiments described herein, and at least in part by using another technique. For example, when an API is available for a particular computer program, a software robot may control the particular computer program via an object hierarchy and via one or more calls to the API of the particular computer program. As another example, a software robot may control multiple computer programs to perform a task. The software robot may control one of the multiple computer programs using an object hierarchy and another one of the multiple computer programs via one or more API calls. Thus, in some embodiments, a software robot may control one or more other computer program(s) via an object hierarchy only and, in other embodiments, via an object hierarchy and/or another way.

It should also be appreciated that a software robot may be used to control any suitable type of computer program having a user interface. For example, a software robot may be used to control one or more operating systems having a user interface. Examples of operating systems that may be controlled by a software robot include, but are not limited to, the ANDROID operating system, the BSD operating system, the CHROME operating system, the IPhone operating system (IOS), the LINUX operating system, the Mac OS X operating system, the SOLARIS operating system, IBM AIX, and MICROSOFT WINDOWS. As another example, a software robot may be used to control one or more application programs having a user interface, which includes any of the application programs mentioned herein by way of example. Specific non-limiting examples of application programs that may be controlled by a software robot include, but are not limited to, Internet browsers (e.g., Internet Explorer, GOOGLE CHROME, OPERA, SAFARI, Firefox, Netscape Navigator, etc.), application programs for editing text (e.g., MICROSOFT WORD, NOTEPAD, EMACS, etc.), e-mail applications (e.g., MICROSOFT OUTLOOK, Mozilla Thunderbird, etc.), database applications (e.g., MICROSOFT ACCESS, MICROSOFT SQL Server Studio, ORACLE application(s), MongoDB application(s), etc.), and application(s) for generating presentations.

As described above, when a software robot uses an object hierarchy to control one or more other computer programs to perform a task by controlling the active GUI elements of the computer program(s), the object hierarchy needs to be refreshed to reflect any changes in the active GUI elements that may occur during performance of the task. Various techniques for updating the object hierarchy during automated performance of a task are described herein, including below with reference to FIGS. 10A-C.

Figure 10A:
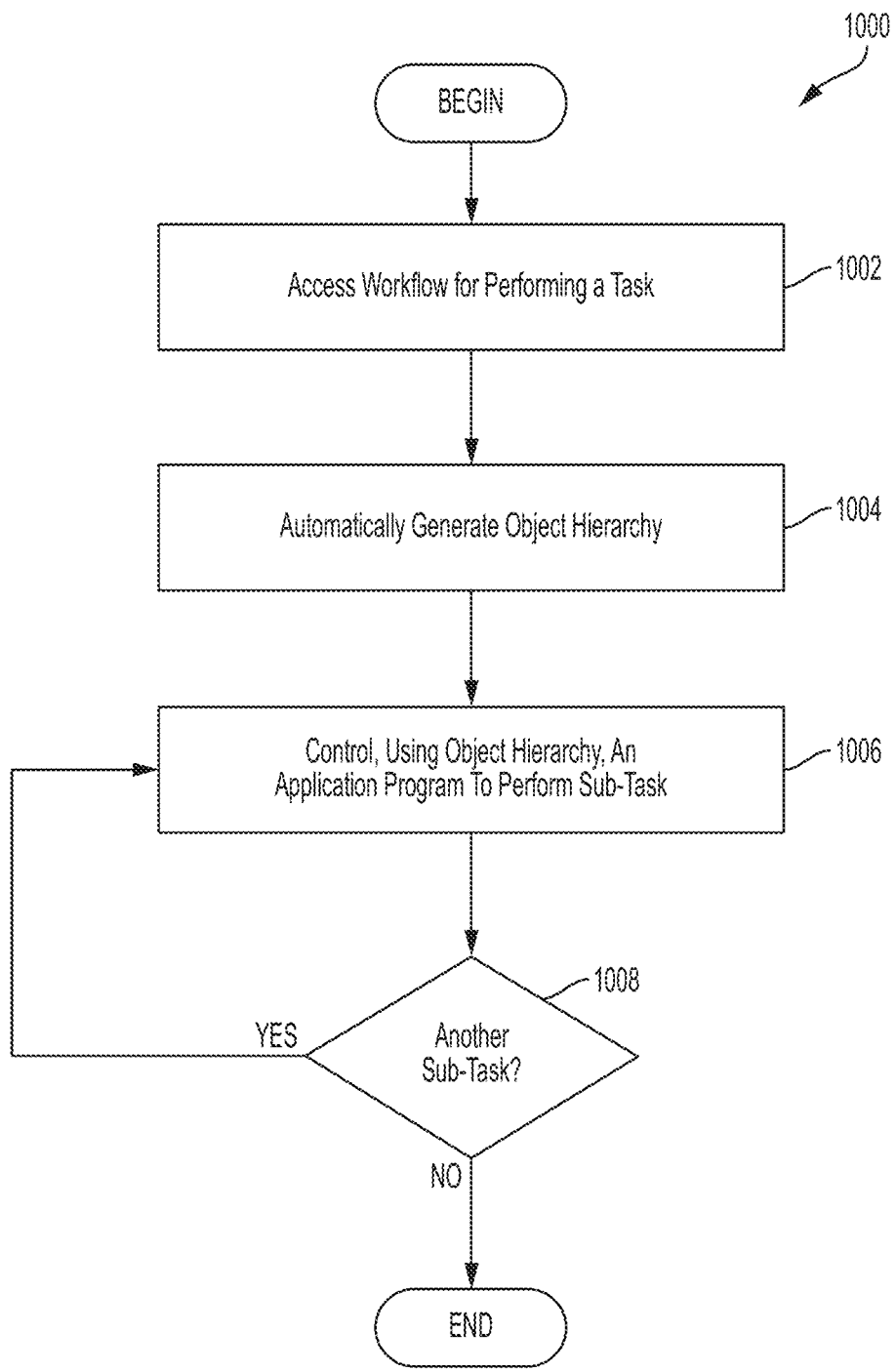
FIG. 10A is a flowchart of an illustrative process for using an object hierarchy to control one or multiple computer programs to perform a task, in accordance with some embodiments of the technology described herein.
Figure 10B:
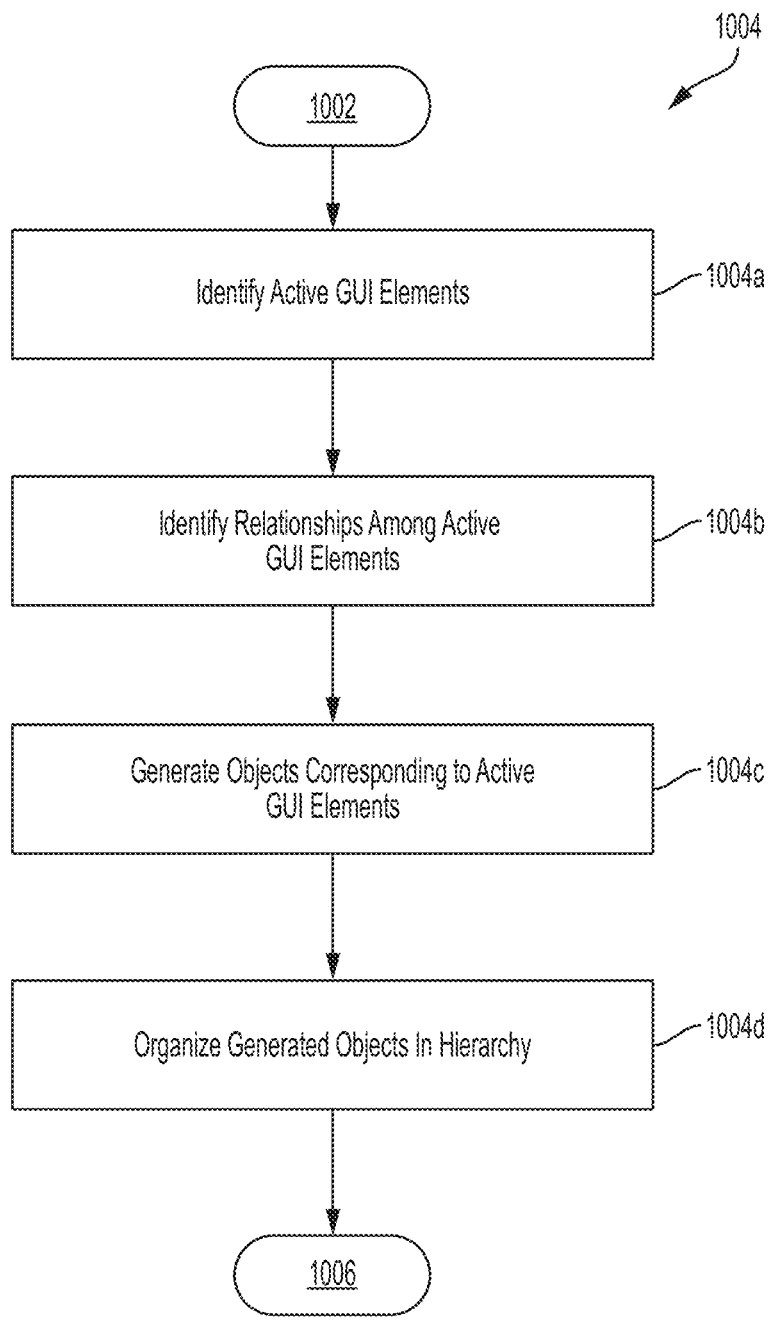
FIG. 10B is a flowchart of an illustrative process for generating an object hierarchy, in accordance with some embodiments of the technology described herein.
Figure 10C:
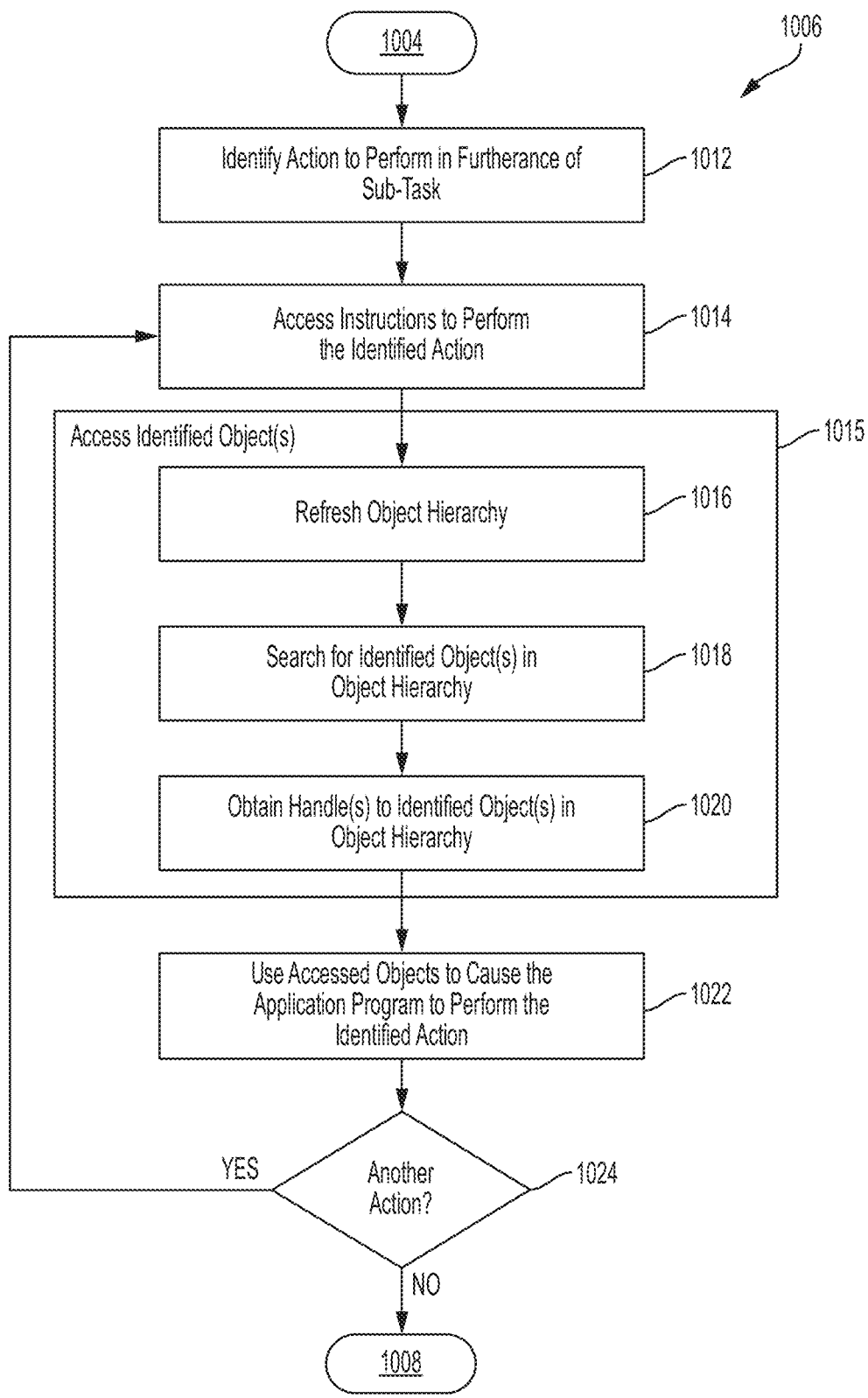
FIG. 10C is a flowchart of an illustrative process for using an object hierarchy to control a computer program to perform one or more sub-tasks of a task, in accordance with some embodiments of the technology described herein.

FIGS. 10A-C show a flowchart of an illustrative process 1000 for performing a task using an object hierarchy, in accordance with some embodiments of the technology described herein. Process 1000 may be performed by any suitable computing device(s) and, for example, may be performed by one or more of computing devices 2210, described with reference to FIG. 22. In some instances, process 1000 may be performed by a single computing device, while in other instances, performance of process 1000 may be distributed across multiple computing devices. In some embodiments, process 1000 may be performed by one or more virtual machines executing on one or more computing devices (e.g., by virtual machines executing on one or more of the computing devices 2210).

Process 1000 begins at act 1002, where a software robot for performing a task is accessed. The software robot may include instructions that, when executed by the computing device(s) performing process 1000, cause the computing device(s) to control one or more computer programs to perform the task using a hierarchy of objects corresponding to active GUI elements of the computer program(s). For example, the software robot may include program instructions, that when executed, control an operating system and/or one or more applications to perform the task at least in part by using an object hierarchy.

In some embodiments, a task may include multiple sub-tasks performed by respective computer programs. A particular sub-task may be performed by a computer program (e.g., an operating system or an application program) and may include one or multiple actions to be taken by the computer program. For example, a task may include a first sub-task to be performed by a first application program (e.g., performing a calculation using the calculator program) and a second sub-task (e.g., saving the result of the calculation in a file) to be performed by a second application program. Accordingly, the software robot program may include instructions that, when executed, control the first application program to perform one or more actions in furtherance of the first sub-task of a task (e.g., control a calculator program to perform a calculation) and control the second application program to perform one or more actions in furtherance of the second sub-task of the task (e.g., control a Notepad program to paste the result of the calculation into a worksheet and save the worksheet as a file). It should be appreciated that a task is not limited to including exactly two sub-tasks, as in the above-described examples, and may include any suitable number of sub-tasks. Some tasks may be performed entirely by a single computer program.

In some embodiments, a software robot may be stored on the computing device executing process 1000 (e.g., computing device 2210 described with reference to FIG. 22) and may be accessed from the location(s) where it is stored during act 1002. In other embodiments, the software robot may be provided from a remote computing device that is not executing process 1000 (e.g., computing device 2208 described with reference to FIG. 22) that is configured to provide the software robot to the computing device(s) executing process 1000. For example, the remote computing device may send the software robot to the computing device(s) executing process 1000 and/or allow the computing device(s) executing process 1000 to access the location(s) where the software robot is stored. The software robot computer program may be accessed in any other suitable way, as aspects of the technology described herein are not limited in this respect.

A software robot may be written in any suitable programming language. In some embodiments, the software robot may be a compiled computer program and may include code that has been or is to be compiled. In some embodiments, the software robot may be an interpreted computer program (e.g., a script). The software robot may be formatted in any suitable way, as the format of the software robot is not a limitation of aspects of the technology described herein.

A non-limiting example of a software robot is shown in Table 2A. This software robot is configured to perform the following actions: open an Internet browser, cause the Internet browser to navigate to a search website ("www-.google.com" in this example), access the search box on the search website, enter a search query into the search box ("Where is the nearest laundromat?" in this example), and click the search button the search website to cause the search query to be submitted.

TABLE 2A

Illustrative software robot computer program b = Browser( )
b.OpenSite("www.google.com")
searchBox = b.GetItem("Search Box")
searchBox.Text = "Where is the nearest laundromat?"
searchButton = b.GetItem("Search Button")
searchButton.Click( )

The illustrative software robot shown in Table 2A performs each of the above-described actions by using an object hierarchy in accordance with embodiments described herein. For example, the software robot may use one or more objects in an object hierarchy corresponding to active GUI elements of the Internet browser to cause the Internet browser to navigate to a specified website. As another example, the software robot may use objects in the object hierarchy corresponding to active GUI elements of the search website to access the search box, enter a search query in the search box, and click the search button to cause the search query to be submitted.

Another non-limiting example of a software robot is shown in Table 2B. This software robot program is configured to perform a calculation using the calculator program and place the result of the calculation into a text file using the Notepad program. As shown in Table 2B, the software robot is configured to perform the following actions: open the calculator program, put the calculator program into scientific mode, perform a calculation using the calculator program, open the Notepad program, store the results of the calculation in the Notepad program, and save the contents of the notepad in a file ("answer.txt" in this example).

TABLE 2B

Another illustrative software robot computer program g = new Calculator( );                // Open calculator program
g.EnableScientific( );                // Enable scientific mode
sqrtVal = g.SquareRoot(5);            // Calculate the square root of five
Notepad n = new Notepad( );           // Instantiate notepad
n.SetText("The square root of 5 is " + sqrtVal + "\r\n");
// Place result into notepad
n.SaveAs(@ "answer.txt"); // Save notepad contents
into file named 'answer.txt'

The illustrative software robot shown in Table 2B performs each of the above-described actions by using an object hierarchy in accordance with embodiments described herein. For example, the software robot may use one or more objects in an object hierarchy corresponding to active GUI elements of the calculator program to perform the sub-task of calculating the square root of five. As another example, the software robot may use one or more objects in the object hierarchy corresponding to active GUI elements of the Notepad program to perform the sub-task of placing the result of the calculation into a notepad workspace and saving it as a text file.

The software robots illustrated in Tables 2A and 2B include calls to functions implemented at least in part by using the object hierarchy. For example, the software robot illustrated in Table 2A includes calls to the functions Browser( ) OpenSite( ), GetItem( ), and Click( ), each of which is implemented at least in part by using an object hierarchy. As another example, the software robot illustrated in Table 2B includes calls to the functions new Calculator( ), EnableScientific( ), SquareRoot( ), new Notepad( ), SetText( ), and SaveAs( ), each of which is implemented at least in part by using the object hierarchy. Illustrative implementations of some of these functions, sometimes termed components, are shown in Tables 4-8 below.

After a software robot is accessed at act 1002, process 1000 proceeds to act 1004, where an object hierarchy is automatically generated by the computing device(s) executing process 1000. The generated object hierarchy includes objects corresponding to at least some of the active GUI elements of the operating system and/or application programs used to perform the task.

In some embodiments, generating the object hierarchy at act 1004 includes performing the acts illustrated in FIG. 10B. In the embodiment shown in FIG. 10B, generating an object hierarchy includes: identifying active GUI elements of the computer program(s) executing on the computing device(s) performing process 1000 at act 1004a; identifying relationships among the active GUI elements at act 1004b; generating objects corresponding to the active GUI elements at act 1004c; and organizing the generated objects in a hierarchy whose structure reflects the identified relationships among the GUI elements at act 1004d. It should be appreciated that the above-described acts need not be executed sequentially in the illustrated order. For example, in some embodiments, some of the acts 1004a-d may be performed concurrently such that an object hierarchy containing objects corresponding to active GUI elements may be generated at the same time as the active GUI elements are being identified. In this way, objects corresponding to already identified active GUI elements may be generated before all the active GUI elements have been identified. As another example, some of the generated objects may be organized within the object hierarchy before all the active GUI elements have been identified. Each of these acts is discussed in more detail below.

At act 1004a, in some embodiments, at least some of the active GUI elements of the computer program(s) executing on a computing device performing process 1000 may be identified based on information provided by the operating system executing on the computing device. For example, the operating system may be configured to provide information about at least some active GUI elements of the operating system itself and active GUI elements of any applications whose user interfaces are implemented using the GUI application library of the operating system. Information about an active GUI element may include, but is not limited to, an identifier of the active GUI element, a pointer (and/or any other suitable handle) to the active GUI element, information indicating the relationship between the active GUI element and one or more other GUI elements, information indicating whether the active GUI element is minimized or maximized, information indicating the location of the active GUI element on a display (e.g., coordinates), size of the active GUI element, and information displayed by the active GUI element. Information about active GUI elements of any application programs implemented using a GUI application library different from that of the operating system may be obtained in other ways, as described below.

For example, when the process 1000 is being executed by a computing device running a WINDOWS operating system, information about some active GUI elements of the computer program(s) executing on the computing device may be obtained from the operating system via the WINDOWS Automation API. The WINDOWS Automation API may be used to obtain information about active GUI elements of only those computer programs whose user interfaces are implemented by using the WINDOWS graphical user interface API (e.g., the calculator program, the Notepad program, the MICROSOFT WORD for WINDOWS application program etc.). On the other hand, the WINDOWS Automation API does not provide information about active GUI elements of computer programs whose user interfaces are implemented by using a GUI application library that is different from the WINDOWS GUI application library. For example, the WINDOWS operating system does not provide information, through the WINDOWS Automation API or otherwise, about active GUI elements of a JAVA application program executing on the same computing device as the operating system. As another example, the WINDOWS operating system does not provide information, through the WINDOWS Automation API or otherwise, about active GUI elements of an HTML webpage displayed by an Internet browser executing on the same computing device as the operating system. Information about active GUI elements of computer programs implemented using a library different from the WINDOWS GUI application library may be obtained in other ways, as described below.

As another example, when the process 1000 is being executed by a computing device running a WINDOWS operating system, information about some active GUI elements of the computer program(s) executing on the computing device may be obtained from the operating system via use of one or more component object model (COM) objects. For example, information stored in cells of a MICROSOFT EXCEL application program may be accessed via one or more COM objects.

In some embodiments, active GUI elements of an application executing on a computing device performing process 1000 may be identified based on information provided by the application itself or another application. The application (or the other application) may be used to obtain information about the application's active GUI elements including, but not limited to, any of the above-described types of information about active GUI elements. For example, an Internet browser may provide information about active GUI elements of a displayed webpage by providing access to the document object model (DOM) representation of the webpage. In turn, the DOM representation of the webpage may be used to obtain information about active HTML GUI elements in the webpage displayed by the Internet browser. As another example, a JAVA Virtual Machine (JVM) executing a JAVA application may be used to obtain information about active GUI elements of the JAVA application.

In some embodiments, at least some of the active GUI elements of a computer program executing on a computing device performing process 1000 may be identified by applying image processing techniques to an image generated by taking a screenshot of what is shown on a display connected to the computing device (or of what would have been shown on a display if the display were connected to the computing device). Any suitable image processing technique(s) may be used to identify active GUI elements, as aspects of the technology described herein are not limited in this respect. Though image processing techniques will not generally identify active GUI elements that are not visible, examples of such active GUI elements are provided above.

As discussed above, after active GUI elements of the computer program(s) executing on the computing device(s) performing process 1000 are identified at act 1004a, relationships among the active GUI elements are identified at act 1004b. Relationships among the active GUI elements may reflect containment relationships among the active GUI elements. For example, two active GUI elements may be identified as being related when one of the active GUI elements (e.g., a button) is contained within the other (e.g., a pane). Non-limiting examples of relationships among active GUI elements include a parent-child relationship in which the parent GUI element contains the child GUI element, an ancestor-descendant relationship in which a child element of the ancestor GUI element contains the descendant GUI element, and a sibling relationship in which sibling GUI elements are contained within a common parent GUI element.

Relationships among active GUI elements may be identified in any suitable way. For example, in some embodiments, relationships among active GUI elements may be identified based on information obtained from an operating system executing on the computing device performing process 1000. For example, relationships among the active GUI elements in an application program implemented using the WINDOWS GUI application library may be identified based on information obtained from the WINDOWS operating system via the WINDOWS Automation API. Such information may include a hierarchical representation of the relationships among the active GUI elements. As another example, in some embodiments, relationships among the active GUI elements of an application may be identified based on information obtained from the application itself. For example, relationships among the active GUI elements of a webpage displayed by an Internet browser may be identified based on information obtained from the DOM representation of the displayed webpage, which representation may be provided by an Internet browser and includes a tree-based representation of relationships among active GUI elements on the webpage. As yet another example, in some embodiments, relationships among the active GUI elements of a JAVA application program may be identified based on information obtained from the JVM executing the JAVA application program. Such information may include a hierarchical representation among the active GUI elements of the JAVA application program. As yet another example, in some embodiments, relationships among the active GUI elements may be identified based on information obtained by applying one or more image processing techniques to an image or images (e.g., screenshot(s)) shown on a display connected to the computing device or to images that would have been shown on a display if the display were connected to the computing device). The image processing techniques may be used to identify containment relationships among the active GUI elements, which may then be used to generate a hierarchical representation of the relationships among the active GUI elements. Relationships among the active GUI elements may be identified in any other suitable way.

As may be appreciated from the foregoing, information identifying relationships among the active GUI elements may be obtained from a variety of sources. In some instances, information identifying relationships among all the active GUI elements may be provided from a single source. For example, when all the active GUI elements identified at act 1004a are GUI elements of the WINDOWS operating system and/or one or more application(s) implemented using the WINDOWS GUI application library, the relationships among all these elements may be identified based on information obtained from the WINDOWS operating system via the WINDOWS Automation API. In other instances, information identifying relationships among the active GUI elements may be provided from multiple different sources. For example, when active GUI elements identified at act 1004a include active GUI elements of a webpage displayed by Internet browser, active GUI elements of a JAVA application, and active GUI elements of an application implemented using the WINDOWS GUI application library, information about relationships among the active GUI elements of the webpage may be obtained from a DOM representation of the webpage provided by the Internet browser, information about relationships among the active GUI elements of the JAVA application may be obtained from the JVM executing the JAVA application, and information about relationships among the active GUI elements of the application implemented using the WINDOWS GUI application library may be obtained from the WINDOWS operating system. As discussed in more detail below, in embodiments where information identifying relationships among active GUI elements is provided from multiple sources, additional processing may be performed to generate a single object hierarchy that includes objects corresponding to all the active GUI elements.

After relationships among the active GUI elements are identified at act 1004b, objects corresponding to the GUI elements identified as being active are generated at act 1004c. In some embodiments, generating an object corresponding to an active GUI element comprises allocating memory for one or more data structure(s) representing the object, obtaining information about the active GUI element, and storing the obtained information in the allocated memory. For example, in embodiments where an object oriented programming language is used to implement an object hierarchy, generating an object corresponding to an active GUI element may comprise constructing an instance of an object, obtaining information about the active GUI element, and storing the obtained information in the constructed instance of the object. Examples of information about an active GUI element are described herein.

After objects corresponding to the GUI elements identified as being active are generated at act 1004c, the generated objects may be organized, at act 1004d, in a hierarchy whose structure reflects the relationships among the active GUI elements that were identified at act 1004b. In some embodiments, an object hierarchy may be represented using one or more data structures embodying a graph (e.g., a tree) comprising vertices or nodes that represent objects and edges that represent relationships between the objects. Organizing the generated objects in a hierarchy may comprise generating one more data structure(s) representing an object hierarchy and associating the generated objects with nodes in the object hierarchy. For example, organizing the generated objects in a hierarchy may comprise generating a data structure representing a tree having nodes (e.g., a root node, at least one internal node, and at least one leaf node) and associating the objects generated at act 1004c with the nodes of the tree.

In some embodiments, the objects generated at act 1004c may be organized in a hierarchy based on information identifying relationships among the active GUI elements that was obtained from a single source. For example, a hierarchical representation of the relationships among all the active GUI elements may be provided from a single source and the generated objects may be organized in a hierarchy that corresponds to the provided hierarchical representation. For example, when all the active GUI elements identified at act 1004a are GUI elements of computer program(s) implemented using the WINDOWS GUI application library, a hierarchical representation of the relationships among all these GUI elements may be obtained from the WINDOWS operating system via the WINDOWS Automation API, and the generated objects may be organized in a hierarchy that corresponds to the hierarchical representation. For example, the hierarchical representation of relationships among the active GUI elements A, B, C, D, E, may indicate that elements B and C are children of element A, element D is a child of element C, and element E is a child of element D. Then the generated objects $O_A$, $O_B$, $O_C$, $O_D$, $O_E$, which respectively correspond to elements A, B, C, D, and E, may be organized in a hierarchy in which objects $O_B$ and $O_C$ are children of the object $O_A$, object $O_D$ is a child of object $O_C$, and object $O_E$ is a child of object $O_D$.

In some embodiments, the objects generated at act 1004c may be organized into a hierarchy based on information identifying relationships among the active GUI elements that was obtained from multiple sources. For example, a first hierarchical representation of relationships among one group of active GUI elements may be provided from one source, a second hierarchical representation of relationships among another group of active GUI elements may be provided from another source, and the hierarchical representations may be combined ("stitched") into a single object hierarchy. This manner of organizing objects in a hierarchy is useful when generating an object hierarchy including objects corresponding to active GUI elements of computer programs implemented using different GUI application libraries because information about relationships among active GUI elements implemented using one GUI application library is often obtained from a different source than information about relationships among active GUI elements implemented using another different application library.

For example, the active GUI elements identified at act 1004a may include active GUI elements of an Internet browser (the "first group" of GUI elements including, for example, elements representing menu items and buttons of the Internet browser) and the active GUI elements of a webpage displayed by Internet browser (the "second group" of GUI elements including, for example, elements representing various items in the webpage associated with respective HTML tags). In this example, a hierarchical representation of relationships among active GUI elements of the Internet browser may be obtained from the WINDOWS operating system (e.g., via the WINDOWS Automation API), a hierarchical representation of relationships among active GUI elements in the webpage may be obtained from the Internet browser (via the DOM representation of the webpage), and the hierarchical representations may be combined into a single unified object hierarchy. In this single object hierarchy, the object corresponding to the active GUI element representing the page pane of the Internet browser that displays the webpage serves as a node that "roots" the hierarchy of objects corresponding to the objects corresponding to the active GUI elements in the webpage. Object hierarchy 600 of FIG. 6 is one example of such a unified object hierarchy. The hierarchy of objects corresponding to active GUI elements of the webpage are rooted at object 606b corresponding to the active GUI element representing a pane of the browser that displays the webpage.

After the object hierarchy is generated at act 1004, process 1000 proceeds to act 1006, where the generated object hierarchy is used to control a computer program to perform a sub-task of the task. The sub-task may include one or more actions to be performed by a computer program in furtherance of the task and the object hierarchy may be used to cause the computer program to perform the action(s). For example, the object hierarchy generated at act 1004 may be used to control the calculator program to perform a computation and, for example may control the calculator program by placing it in a desired mode (e.g., "scientific" mode) and performing the calculation by using features available in the desired mode (e.g., the square root operation, which becomes accessible when the calculator program is placed in "scientific" mode). As another example, the object hierarchy generated at act 1004 may be used to launch an application program (e.g., an application for working with spreadsheets, an Internet browser, etc.). As another non-limiting example, the object hierarchy generated at act 1004 may be used to cause an Internet browser to navigate to a particular website and obtain information from the website (e.g., obtain a price of a product from a website selling the product). The generated object hierarchy may be used to control the application program to perform one or more actions in furtherance of the sub-task in a variety of ways, which are described with reference to FIG. 10C.

In some embodiments, controlling another computer program to perform a sub-task includes performing the acts illustrated in FIG. 10C. These acts, which are discussed in more detail below, include: identifying an action to perform in furtherance of the sub-task at act 1012, accessing instructions to perform the identified action at act 1014, accessing one or more objects in the generated object hierarchy that are referenced by the accessed instructions at act 1015, and using the accessed objects to control the computer program to perform the identified action in furtherance of the sub-task at act 1022. After an action is performed by the computer program, a determination may be made, at block 1024, whether another action is to be performed in furtherance of the sub-task or whether the process 1000 can proceed to act 1008.

As shown in FIG. 10C, an action to perform in furtherance of the sub-task is identified at act 1012. As discussed above, controlling a computer program to perform a sub-task may include controlling the computer program to perform one or more actions in furtherance of the sub-task. For example, controlling the calculator program to perform a calculation (which is a sub-task in the illustrative task of performing a calculation and saving the result of the calculation in a file) may include controlling the calculator program to perform the actions of placing the calculator program into a desired mode (e.g., "scientific" mode), providing input to the calculator program to specify the calculation to be performed, causing the calculator to perform the calculation, and accessing the result of the calculation. As another example, controlling the Notepad program to save the result of the calculation in a file may include controlling the Notepad program to perform the actions of placing the result of the calculation into a worksheet of the Notepad program and saving the worksheet as a file.

In some embodiments, an action to perform in furtherance of the sub-task may be identified based on the instructions in the software robot program obtained at act 1002. For example, the action to perform in furtherance of the sub-task may be identified based on instructions in the software robot that have not yet been performed. As a non-limiting example, the software robot illustrated in Table 2B above, includes instructions to perform the actions of opening the calculator program, enabling scientific mode, and calculating the square root of five, and the action to be performed may be identified, at act 1012, by accessing these instructions. For example, if the first instruction "g=new calculator( )" has not been performed, then opening the calculator program may be identified as the action to perform in furtherance of the sub-task. As another example, if the second instruction "g.EnableScientific( )" has not been performed, then enabling scientific mode may be identified as the action to perform in furtherance of the task. Though, it should be appreciated that the action to perform in furtherance of the sub-task may be identified in any other suitable way.

After an action to perform in furtherance of a sub-task has been identified, at act 1012, the process 1000 proceeds to act 1014, where instructions for performing the identified action are accessed. The instructions may be part of the software robot computer program accessed at act 1002, part one or more software libraries to which the computing device performing process 1000 has access, or both.

The instructions for performing the identified action may reference one or more objects that will be used to control the computer program to perform the identified action. The referenced object(s) may correspond to the active GUI elements of the computer program that may be used to control the application program to perform the identified action. For example, as shown in Table 6 below, the instructions for causing the calculator program to perform the action of placing the calculator in scientific mode may reference an object corresponding to the active GUI element representing a button that, when clicked, places the calculator program in scientific mode. As another example, as shown in Table 10 below, the instructions for causing the Notepad program to perform the action of saving a file may reference an object corresponding to the active GUI element representing a button that, when clicked, causes the Notepad program to bring up a "Save as" dialog box.

Accordingly, after the instructions for performing an action are accessed at act 1014, process 1000 proceeds to act 1015, where the object(s) referenced by the instructions are accessed in the object hierarchy generated at act 1004 in order to obtain handle(s) to the object(s). In the illustrated embodiment, accessing a particular object in the object hierarchy may include refreshing the hierarchy at act 1016, searching for the particular object in the refreshed hierarchy at act 1018, and obtaining a handle (e.g., a pointer or a reference) to the particular object in the refreshed hierarchy once it is found, at act 1020. Each of the acts 1016, 1018, and 1020 is described in more detail below. After the objects are accessed, they may be used to control the computer program to perform the action at act 1022.

As may be appreciated from the foregoing, the object hierarchy generated at act 1004 represents a snapshot (e.g., a real-time snapshot) of GUI elements that were active at the time that the object hierarchy was generated. Accordingly, the object hierarchy may be refreshed at act 1016 to ensure that the object hierarchy reflects any changes to the user interface(s) of the computer program(s) executing on the computing device performing process 1000 that took place since the time that the object hierarchy was generated. In this way, the object hierarchy is updated at act 1016 to contain objects corresponding to currently active GUI elements. Refreshing an object hierarchy to update it for any changes to the active GUI element(s) is more efficient than generating the object hierarchy anew each time one or more objects needs to be accessed. As discussed in more detail below, in some embodiments, the entire object hierarchy may be refreshed, but in other embodiments only a portion of the object hierarchy may be refreshed, which may be more efficient than refreshing the entire object hierarchy in a situation where only a subset of the active GUI elements changed (e.g., due to changes in the user interface of one application program, but not another).

In some embodiments, refreshing the object hierarchy may include adding one or more objects to the object hierarchy. For example, the user interface of a computer program may include a new active GUI element not previously present in the user interface, and the object hierarchy may be updated to add a new object corresponding to the new active GUI element. For example, when the user interface of a calculator program is changed from "standard" to "scientific mode," the object hierarchy may be updated to add new objects corresponding to GUI elements that appear in the "scientific mode" user interface, but not in the "standard" user interface of the calculator program. Examples of such GUI elements are provided herein.

In some embodiments, refreshing the object hierarchy may include removing one or more objects from the object hierarchy. For example, when a user interface of a computer program changes to no longer include one or more GUI elements that were previously present in the user interface, the object hierarchy may be updated to remove the object(s) corresponding to the now inactive GUI element(s). For example, when the user interface of a calculator program is updated from "scientific mode" (e.g., as shown in FIG. 1B) to "standard" mode (e.g., as shown in FIG. 13B), the object hierarchy may be updated to remove objects that appear in the "scientific mode" but not in the "standard" user interface of the calculator program.

In some embodiments, refreshing the object hierarchy may include refreshing one or more objects in the hierarchy to reflect any changes in the active GUI elements to which they correspond. For example, when a user interface of a computer program changes such that information (e.g., a value of a parameter or a property) associated with a particular active GUI element is updated, the object in the object hierarchy that corresponds to the particular active GUI element may be refreshed to reflect the change in the information. For example, an object hierarchy may include an object corresponding to a GUI element representing the results pane of the calculator program. When the text shown in the pane changes after the calculator program computes a result, the object that corresponds to the results pane may be refreshed to store the displayed text.

In some embodiments, refreshing the object hierarchy may include refreshing one or more objects to reflect changes in information maintained by any operating system through which the objects in the hierarchy control the active GUI elements to which they correspond. As discussed above, in some embodiments, an object may be used to control an active GUI element of an application program via the operating system on which the application is executing. For example, an object in the object hierarchy may control an active GUI element of an application program via a native interface, provided by the operating system, for controlling GUI elements of applications whose user interfaces are built using the native GUI application library of the operating system. The WINDOWS Automation API, for example, provides an interface for controlling GUI elements of application programs built using the WINDOWS GUI application library, and an object in the object hierarchy may be used to control an active GUI element of a WINDOWS application via the WINDOWS Automation API. For instance, the WINDOWS Automation API may maintain information that can be used to access and control an active GUI element, and an object in the object hierarchy may use information stored in the data structure to access and control the active GUI element. Accordingly, when information maintained by the WINDOWS Automation API changes, and an object in the object hierarchy used this information to control the active GUI element, the object may be updated to reflect the changes in the information maintained by the WINDOWS Automation API.

As a specific non-limiting example, the WINDOWS Automation API may maintain a logical tree of elements, each of the elements corresponding to GUI elements of application programs implemented by using the WINDOWS GUI application libraries. The logical tree of elements may include element "A" corresponding to the address bar of the Internet Explorer application program. An object "O" in the object hierarchy corresponding to the address bar of the Internet Explorer application program may be configured to control the address bar via the element "A" in the logical tree of elements maintained by the WINDOWS Automation API. However, when the text in the address bar changes, the WINDOWS Automation API may update its logical tree by removing element "A" and introducing a new element "B" corresponding to the Internet Explorer address bar with the updated text. However, since object "O" is maintained by the system described herein, rather than by the WINDOWS Automation API, this object would still point to element "A," which no longer exists in the logical tree the object hierarchy, in order to control the Internet Explorer address bar. Accordingly, the object "O" needs to be refreshed so that it points to the element "B" in the logical tree and uses element "B" to control the Internet Explorer address bar.

It should be appreciated, from the above example, that although the object hierarchy described herein is distinct from any logical tree of elements maintained by the WINDOWS Automation API, the object hierarchy may use the logical tree of elements maintained by the WINDOWS Automation API to control active GUI elements of application programs built using the WINDOWS GUI application libraries.

An existing object in the object hierarchy may be refreshed by updating the existing object such that any information associated with the existing object is up to date. Alternatively, an existing object in the object hierarchy corresponding to an active GUI element may be refreshed by deleting the existing object and replacing the deleted object with a new object (by adding the new object to the hierarchy) that corresponds to the same active GUI element and such that any information associated with the new object is up to date.

In some embodiments, the entire object hierarchy may be refreshed. This may be done in any suitable way. For example, each object in the object hierarchy may be examined to determine whether it corresponds to an active GUI element. The objects may be examined in any suitable order (e.g., breadth first order, depth-first order, pre-order, in-order, post-order, and/or in any other suitable order). Illustrative pseudo-code for recursively iterating through the objects rooted at a root node using a depth-first search order is shown below in Table 3. When examining a particular object, if it is determined that the object does not correspond to an active GUI element, the object may be removed from the object hierarchy along with any of its descendants. On the other hand, when it is determined that the object corresponds to an active GUI element, the object may be refreshed so that it contains updated information about the active GUI element. Additionally, one or more new objects may be added to the hierarchy. For example, when it is determined that an object being examined corresponds to a particular active GUI element, and there are any active GUI elements related to the particular active GUI element which do not have corresponding objects in the hierarchy, objects corresponding to these new active GUI elements may be added to the hierarchy.

TABLE 3

Pseudocode for refreshing
objects in an object hierarchy
in a depth-first order refresh(root) {
    for each (child in root) { refresh(child) }
}

The determination of whether an object corresponds to an active GUI element may be performed in any of the ways described above with respect to generating an object hierarchy or in any other suitable way. For example, this determination may be made based on information provided by the operating system executing on the computing device performing process 1000 (e.g., from the WINDOWS operating system via the WINDOWS Automation API), from a particular application program (e.g., an Internet browser may provide information about active GUI elements on a webpage displayed by the browser, a JVM executing a JAVA application may provide information about active GUI elements in the JAVA application), by applying image processing techniques to screenshots, and/or in any other suitable source of information.

The inventors have recognized that refreshing the entire object hierarchy is computationally expensive requiring significant processing and/or memory resources. Accordingly, in some embodiments, only a portion of an object hierarchy is refreshed such that some, but not all objects in the object hierarchy are refreshed. For example, when the object(s) accessed at act 1015 are to be used for controlling a particular application to perform an action, only the portion of the hierarchy containing objects corresponding to GUI elements of the particular application may be refreshed. In this way, the object hierarchy may be refreshed more quickly while utilizing fewer computing resources. As another example, described in more detail below, the acts 1016 and 1018 may be performed together so that the search through the hierarchy for a certain object guides what portions of the object hierarchy are refreshed.

In some embodiments, refreshing a portion of the object hierarchy or the entire object hierarchy may be performed using multiple processors and/or one or more threads so that the object hierarchy may be refreshed more quickly. Accordingly, in some embodiments, the efficiency of refreshing the object hierarchy may be improved through use distributing computing, parallel computing, and/or multi-threading techniques. For example, different portions of an object hierarchy may be refreshed using different processors and/or threads. As one example, an object hierarchy may include a first portion rooted at a particular node in the hierarchy and a second portion (different from the first portion) also rooted at the particular node. The first portion may be refreshed by using a first processor and the second portion may be refreshed by using a second processor. The first portion may be refreshed by using a first thread and the second portion may be refreshed by using a second thread different from the first thread. As another example, different portions of an object hierarchy corresponding to different computer programs may be refreshed using different processors and/or threads. As yet another example, when a portion of the object hierarchy corresponding to one computer program includes more objects than another portion of the object hierarchy corresponding to a different computer program, more resources (e.g., threads and/or processors) may be devoted to refreshing the larger portion of object hierarchy. As yet another example, a thread may be spawned for refreshing each portion of a hierarchy that includes a threshold number of objects. For instance, a thread may be spawned for refreshing an object and its descendants when the descendants include at least a threshold number of objects. Additional techniques for increasing the efficiency of the refresh operation are discussed below in Section VII.

After the object hierarchy has been refreshed at act 1016, process 1000 proceeds to act 1018, where a search is performed to find, in the refreshed object hierarchy, the object(s) referenced in the instructions to perform the action. This may be done in any suitable way. In some embodiments, the instructions to perform the action may include one or more search strings that may be used to search for the object(s) to use for performing the action, and the search string(s) may be used to find the objects in the object hierarchy by comparing contents of the search string(s) with information associated with objects in the object hierarchy. The search strings may be constructed in accordance with a search grammar, as described further below in Section VII.

Non-limiting examples of search strings are shown below in Tables 5, 6, 7, 8, and 10. For example, as shown in Table 5, the search strings "@Clear::'ControlType.Button'" and "@Equals::'ControlType.Button'" may be used to search for objects in the object hierarchy corresponding, respectively, to the active GUI element representing the "clear" button of the calculator program and the "equals" button of the calculator program. As another example, the string "'@File::'ControlType.MenuItem'+!>@'SaveAs'::'ControlType.MenuItem'"" may be used to search for an object in the object hierarchy corresponding to the "Save As" button in the File menu of the calculator program. Additional examples are provided below. The syntax for search strings, such as the search strings discussed in this paragraph, is described further in Section VII.

After the search for the referenced objects in the refreshed hierarchy is performed, at act 1018, handles to the objects found through the search are obtained at act 1020. A handle to an object may be a reference, a pointer, and/or any other suitable type of handle allowing the object to be programmatically accessed.

After the object(s) referenced by the instructions to perform the identified action are accessed at act 1015, with the handle(s) to the object(s) being obtained at act 1020, the process of FIG. 10C proceeds to act 1022, where the accessed object(s) are used to control the application program, via the active GUI element(s) to which they correspond, to perform the identified action. As discussed above, an accessed object that corresponds to an active GUI element of the application program may be used to control the application in the same way that a person may control the application by interacting with the active GUI element. For example, an object corresponding to an active GUI element of an application may be used to provide input to the application via the active GUI element. As another example, an object corresponding to an active GUI element of an application may be used obtain output from the application via the active GUI element. Examples of using an object to control an application program via an active GUI element to which the object corresponds are described herein.

An object accessed at act 1015 that corresponds to an active GUI element of an application may be used to control the application using an operating system managing execution of the application, via the application program itself, via another application, and/or in any other suitable way.

In some embodiments, the object accessed at act 1015 may be used to control the application program by controlling the active GUI element via the operating system managing execution of the application. For example the object may control the active GUI element via an API provided by the operating system. The API may provide functionality for emulating actions that a user may perform when interacting with the active GUI element. For example, the operating system may provide an API for emulating a user selecting (e.g., clicking) a selectable GUI element, providing textual input into a field, dragging a GUI element, etc. One example of such an API is the WINDOWS Automation API, which, as described above, maintains a logical tree of elements through which active GUI elements of application programs implemented using the WINDOWS GUI application library may be controlled. Thus, in some instances, an object may control an active GUI element of an application implemented using the WINDOWS GUI application library via an element, maintained by the WINDOWS Automation API, corresponding to the active GUI element. As another example, the IOS operating system may provide an API for emulating actions that a user may perform on GUI elements of applications implemented using an IOS GUI application library.

In some embodiments, the object accessed at act 1015 may be used to control the application program by controlling the active GUI element via an API provided by the application itself. In some embodiments, the object accessed at act 1015 may be used to control the application by controlling the active GUI element via an API provided by another application. For example, an object may control a corresponding active GUI element of a JAVA application by using an API provided by the JVM managing execution of the application. As another example, an object may control a corresponding a corresponding active GUI element of a web-page by using an API provided by an Internet browser displaying the webpage.

Next, the process 1000 proceeds to decision block 1024, where it is determined whether another action is to be performed in furtherance of the sub-task. This determination may be made in any suitable way and, for example, may be made based on the instructions in the software robot accessed at act 1002. For example, if there are instructions in the software robot for performing actions of the sub-task which have not yet been executed, it may be determined that another action is to be performed.

When it is determined, at decision block 1024, that another action is to be performed, processing returns to block 1014. On the other hand, when it is determined that no other action is to be performed, processing continues to block 1008, where it is determined whether there is another sub-task to perform in furtherance of the task. This determination may be made in any suitable way. For example, when the task includes multiple sub-tasks and at least one of the multiple sub-tasks has not been performed, it may be determined that there is another sub-task to perform. On the other hand, when each of the multiple sub-tasks has been performed, it may be determined that there are no other sub-tasks to perform. When it is determined, at decision block 1008, that there is another sub-tasks to perform, process 1000 returns, via the "YES" branch, to act 1006. On the other hand, when it is determined, at decision block 1008, that there are no additional sub-tasks to perform, process 1000 completes.

It should be appreciated that the process 1000 is illustrative and that there are variations of this process. For example, although the illustrated process 1000 includes the act 1016 of refreshing an object hierarchy in order to access one or more identified objects at act 1015, in some embodiments, one or more objects in the object hierarchy may be accessed without the object hierarchy being refreshed. For instance, one or more objects in the hierarchy may be accessed without refreshing the hierarchy, when the active GUI elements to which the object(s) correspond have not changed since the last time these object(s) were added to the hierarchy or refreshed. As another example, in the illustrative embodiment of FIG. 10C, accessing a particular object in the object hierarchy involves first refreshing the object hierarchy and then searching for the particular object in the refreshed object hierarchy. In other embodiments, the hierarchy may be refreshed at the same time as the search for the object is being performed, which may result in a more efficient implementation of refreshing, as discussed next.

In some embodiments, for example, the search for a particular object may guide which portion(s) of the object hierarchy are to be refreshed. For example, one or more objects in the object hierarchy may be examined to determine, based on the search string used to search for a particular object, whether one of the examined object is the particular object being searched for. The objects may be examined in an order determined by the search strategy, which may be an order implied by a breadth-first search, a depth-first search, or any other suitable order. As described above, for each object being examined during the search, it may be determined whether the object corresponds to an active GUI element. If the object corresponds to an active GUI element, the object may be refreshed to update information stored in it about its corresponding GUI element. One or more descendant objects may be added to the object if the active GUI element to which it corresponds contains one or more active GUI elements having no corresponding object(s) in the hierarchy. When the object does not correspond to an active GUI element, the object and its descendants may be removed from the object hierarchy.

In embodiments where a search for a particular object guides which portions of the object hierarchy are refreshed, the refreshing of the hierarchy may stop after the object being searched for is located. In this way, search-guided refreshing of the object hierarchy may be more efficient than search-agnostic refreshing because (e.g., substantial) portions of the object hierarchy may not need to be refreshed in the search-guided approach, especially in instances when the object being searched for occurs early on in the order of objects examined during the search.

V. Component Library

In some embodiments, a software robot may control a computer program to perform a sequence of acts by using multiple objects in the object hierarchy. The set of program instructions used by the software robot to control the computer program to perform the sequence of acts may therefore include multiple "low-level" instructions for accessing and using various objects in an object hierarchy that correspond to GUI elements of the computer program being controlled by the software robot. The software robot may control the computer program to perform this sequence of acts multiple times, in which case the software robot includes multiple repetitions of the set of program instructions for this sequence of acts. One or more other software robots also may control the computer program to perform the same sequence of acts and, to this end, may include one or more repetitions of the set of program instructions. Repeatedly placing the same set of program instructions multiple times across different software robots leads to a large amount of code being generated, introduces errors, increases cost of development, and does not take advantage of software development work already performed.

To address these issues, in some embodiments, the program instructions used by a software robot to control a computer program to perform a sequence of one or more acts may be grouped to form a function, also termed a component herein, which may be called by the software robot and/or one or more other software robots.

For example, the set of program instructions used by a software robot to control an application program (e.g., MICROSOFT WORD) to print a file may include: (1) one or more instructions for accessing and using one or more objects in the object hierarchy to open a print dialog; (2) one or more instructions for accessing and using one or more objects in the object hierarchy to set various printing options via the print dialog; and (3) one or more instructions for accessing and using one or more objects in the object hierarchy to click the print button in the print dialog. These instructions may be organized into a "print" function, which may be called repeatedly in the software robot and/or one or more other software robots without unnecessarily replicating blocks of low-level program instructions. As another example, the program instructions for controlling an Internet browser to launch and navigate to a desired webpage may be organized into a "navigate" function for the Internet browser. As yet another example, the program instructions for controlling a database program to access a file, read data from the file, transform the data read from the file, and write the transformed data to another file may be organized into a function for the database that may be called by the software robot and/or by one or more other software robots.

As may be appreciated from the foregoing, various groups of program instructions may be organized into respective functions or components thereby forming a library of functions termed a "component library." In some embodiments, groups of program instructions for controlling a computer program may be organized into a component library for that computer program. In this way, when a developer of a software robot seeks to control a computer program to perform a task, the developer may first look at the component library to determine whether the library contains one or more functions that the developer may include in the code of the software robot for controlling the computer program to perform one or more actions in furtherance of the task, and in this way may avoid doing extra work by re-using already available code.

Figure 11:
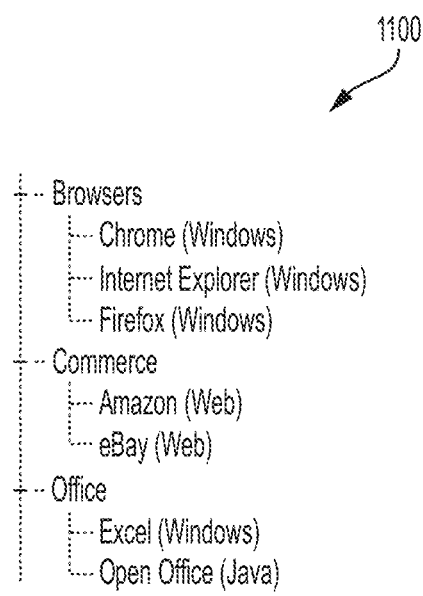
FIG. 11 illustrates component libraries, in accordance with some embodiments of the technology described herein.

FIG. 11 illustrates component libraries 1100 that, in some embodiments, may be available for developing software robots for controlling various computer programs. For example, component libraries 1100 include component libraries for various Internet browsers (e.g., CHROME, INTERNET EXPLORER, and FIREFOX), component libraries for interacting with e-commerce websites (e.g., AMAZON and EBAY), and component libraries for office application programs (e.g., EXCEL and OPEN OFFICE). It should be appreciated that component libraries 1100 may include a library for any operating system and/or application, implemented using any suitable GUI technology, as aspects of the technology described herein are not limited in this respect.

Additional examples of components and component libraries are shown below in Tables 4-10. Table 4 shows an illustrative example of a component library for the calculator program. As shown, this component library includes functions for computing a square root of a number, getting a result from the results pane of the calculator program, adding two numbers, subtracting two numbers, multiplying two numbers, dividing one number by another, and placing the calculator in scientific mode. Table 5 shows an illustrative implementation of function for using the object hierarchy to launch the calculator program. Table 6 shows an illustrative implementation of a function for placing the calculator into scientific mode. Tables 7 and 8 show illustrative implementations of functions for calculating a square root with the calculator program and a getting a value from the results pane of the calculator program.

TABLE 4

Illustrative functions provided
by a component library for
the calculator program double SquareRoot(double number);
double GetResult( );
double Add(double number1, double number2);
double Subtract(double number1, double number2);
double Multiply(double number1, double number2);
double Divide(double number1, double number2);
void   EnableScientific( );

TABLE 5

Illustration of using object hierarchy to launch calculator program and
obtain handles to objects corresponding to commonly used GUI
elements of the calculator program Method Calculator( ) {
  _calc = _uHierarchy.Launch(CALCULATOR);

TABLE 5-continued

Illustration of using object hierarchy to launch calculator program and obtain handles to objects corresponding to commonly used GUI elements of the calculator program

```
_clear = _calc.Select(" @Clear::'ControlType.Button'");
_equals = _calc.Select(" @Equals::'ControlType.Button'");
_menuBar = _calc.Select(" @Application");
_result = _calc.Select("::'ControlType.Pane' >
   @Result::'ControlType.Text'");
}
```

TABLE 6

Illustrative implementation of component for placing calculator in scientific mode

```
Method EnableScientific( ) {
   scientificMenuItem = _calc.Select(" @Application >
   @View::'ControlType.MenuItem'+ !>
   @Scientific::'ControlType.MenuItem'");
   return scientificMenuItem.Click(MouseButtons.Left);
}
```

TABLE 7

Illustrative implementation of SquareRoot component for the calculator program

```
Method SquareRoot(int number) {
  _clear = _calc.Select(" @Clear::'ControlType.Button'");
  _clear.Click(MouseButtons.Left);
  _TypeNumber(number);
  sqrRootObj = _calc.Select(" @Square root'::'ControlType.Button'");
  sqrRootObj.Click(MouseButtons.Left);
  return GetResult( );
}
```

TABLE 8

Illustrative implementation of GetResult component for the calculator program

```
Method GetResult( ) {
   _pane = _calc.Select("::'ControlType.Pane'");
   _result = _pane.Select(" @Result::'ControlType.Text'");
   return _result.GetValue( );
}
```

Tables 9 and 10 provide examples of components for the Notepad program. Table 9 shows an illustrative implementation of the setText component for the Notepad program, which allows for text to be pasted into the Notepad window. Table 10 shows an illustrative implementation of the SaveAs component for the Notepad program that provides for saving the contents of the Notepad window into a file.

TABLE 9

Illustrative implementation of SetText component for the Notepad program

Method SetText(string s) { return _editBox.SetValue(s);}

TABLE 10

Illustrative implementation of SaveAs component for the Notepad program

```
Method SaveAs(string filename, bool overwrite) {
      return __save(filename, true, overwrite);
}
Method __save(string filename, bool saveAs, bool overwrite) {
   result = false;
   save = null;
   if (saveAs)
      save = _notepad.Select("@File::'ControlType.MenuItem'+ !>
      @'Save As'::'ControlType.MenuItem'");
   else
      save = _notepad.Select("@File::'ControlType.MenuItem'+ !>
      @Save::'ControlType.MenuItem'");
   if (save != null) {
      save.Click(MouseButtons.Left);
      SaveDialog saveDialog = new SaveDialog(_notepad);
      result = saveDialog.Save(filename, saveAs, overwrite);
   }
   return result;
}
```

Another innovative aspect of the technology described herein relates to legacy application programs. A legacy application is a relative concept. For a particular enterprise software environment implemented using a current set of programming languages, platforms, and/or technologies, a legacy application is one that is implemented using an earlier set languages, platforms, and/or technologies predating the current set. Most enterprises face the challenge of maintaining and providing for compatibility with various legacy applications. Most legacy applications do not provide APIs, significantly complicating the task of making these applications interoperable with other parts of the enterprise's information technology systems.

The inventors have appreciated that the techniques described herein may be used to generate an API for a legacy application, which API would not only allow the legacy application to be controlled by a software robot, but also would allow the API to be accessed by other information technology systems of an enterprise. The techniques described herein provide for the generation of APIs for legacy applications by allowing for the creation of component libraries for these applications by using the object hierarchy techniques described herein to control the legacy application programs to perform various functions. Providing information systems of an enterprise with access to a component library for a legacy application would therefore provide these systems with an API for the legacy application, which was not otherwise available.

VI. Software Robot Examples

In this section, a number of non-limiting and illustrative examples of software robot computer programs are discussed.

A. Example 1

Figure 12B:
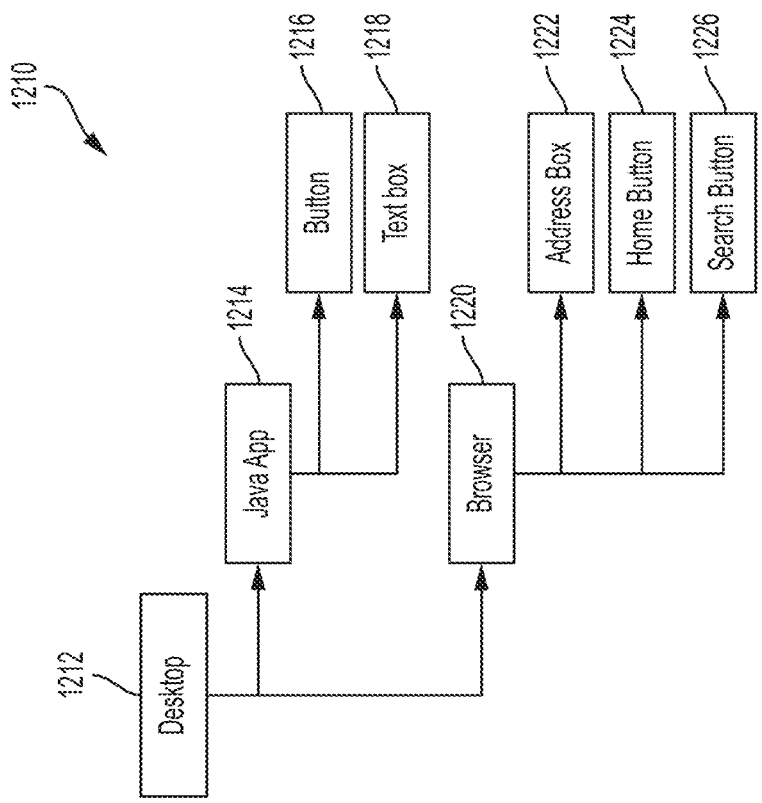
FIG. 12B is a diagram of an illustrative object hierarchy that may be used by the software robot of FIG. 12A, in accordance with some embodiments of the technology described herein.
Figure 12A:
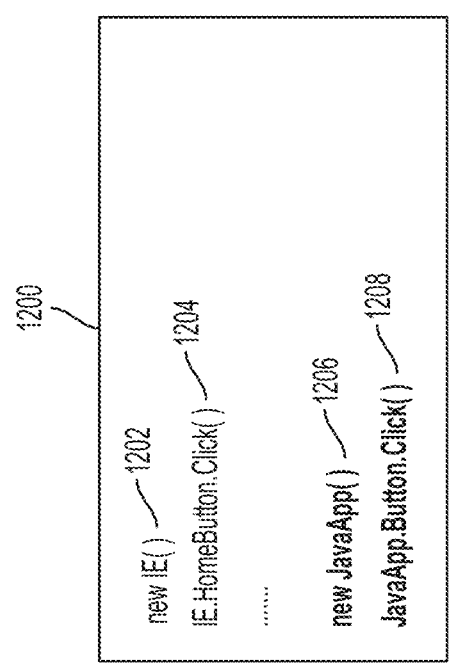
FIG. 12A is a diagram of an illustrative software robot for controlling application programs implemented using different GUI application libraries to perform a task, in accordance with some embodiments of the technology described herein.

One illustrative example of a software robot computer program is software robot 1200 shown in FIG. 12A. Software robot 1200 is a computer program containing instructions that, when executed, launches an Internet browser (e.g., as a result of executing instruction 1202), causes the Internet browser to navigate to a homepage (e.g., as a result of executing instruction 1204), launch a JAVA application (e.g., as a result of executing instruction 1206), and click a button in the graphical user interface of the JAVA application (e.g., as a result of executing instruction 1208).

Software robot 1200 performs the above-described actions by using an object hierarchy 1210 shown in FIG. 12B. As shown in FIG. 12B, the root of object hierarchy 1210 is "desktop" object 1212 that corresponds to the desktop interface of the WINDOWS operating system. JAVA app object 1214 is a child of the root desktop object 1212 and corresponds to an active GUI element of the JAVA application program launched by software robot 1200. Button object 1216 and Text box object 1218 are children of object 1214 and correspond to active GUI elements of the JAVA application representing a button and a textbox respectively. Browser object 1220 is also a child of the root desktop object 1212 and corresponds to an active GUI element of the Internet browser launched by the software robot 1200. Objects 1222, 1224, and 1226 are children of object 1220 and correspond to GUI elements of the Internet browser that represent an address box, a home button, and a search button, respectively.

As one example of how the software robot 1200 uses object hierarchy 1210 to perform the above-described actions, the software robot 1200 may perform the action of causing the Internet browser to navigate to a homepage by using the object 1224 to click on the "Home" button of the Internet browser. As another example, the software robot 1200 may perform the action of clicking a button of the JAVA application program by using object 1216 which corresponds to an active GUI element representing a button in the JAVA application program.

It should be appreciated that the object hierarchy 1210, shown in FIG. 12B, is a non-limiting example of a unified object hierarchy because it includes objects corresponding to active GUI elements of application programs implemented using different GUI application libraries. In particular, object hierarchy 1210 includes objects corresponding to elements of an Internet browser implemented using the WINDOWS GUI application library (i.e., objects 1220, 1222, 1224, and 1226) and objects corresponding to elements of a JAVA application implemented using the JAVA GUI application library. Each of these objects conform to the same unified interface. Accordingly, the functions in the unified interface, examples of which are described herein, may be invoked for each of these objects.

B. Example 2

Figure 13A:
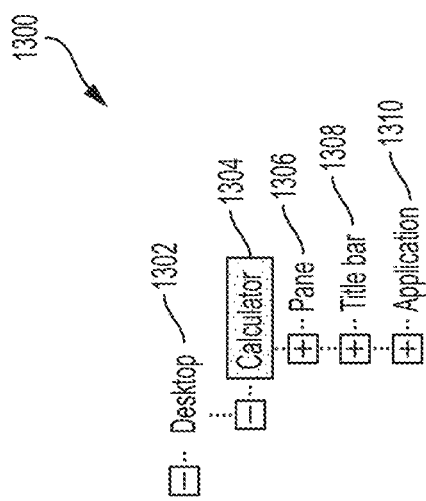
Figure 13E:
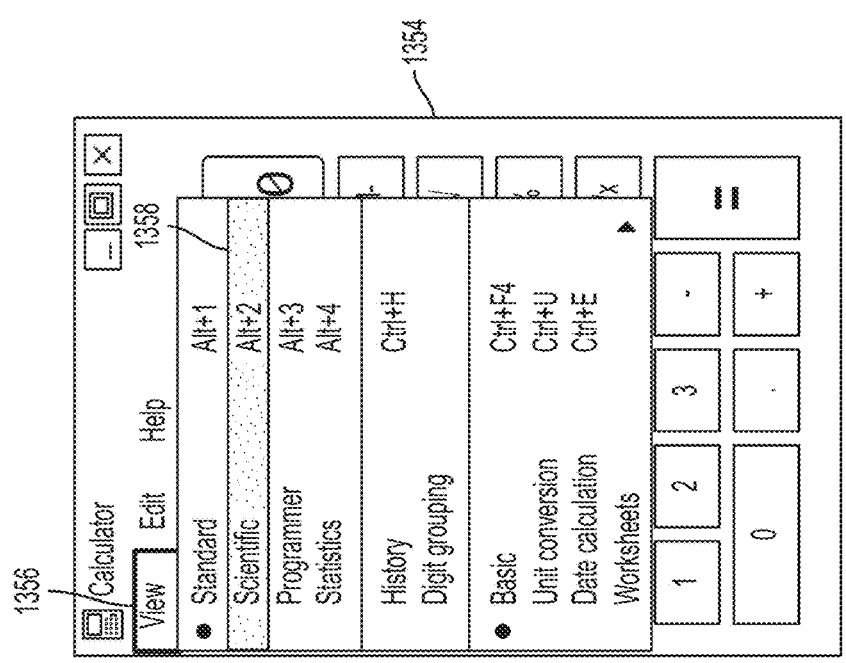
Figure 13D:
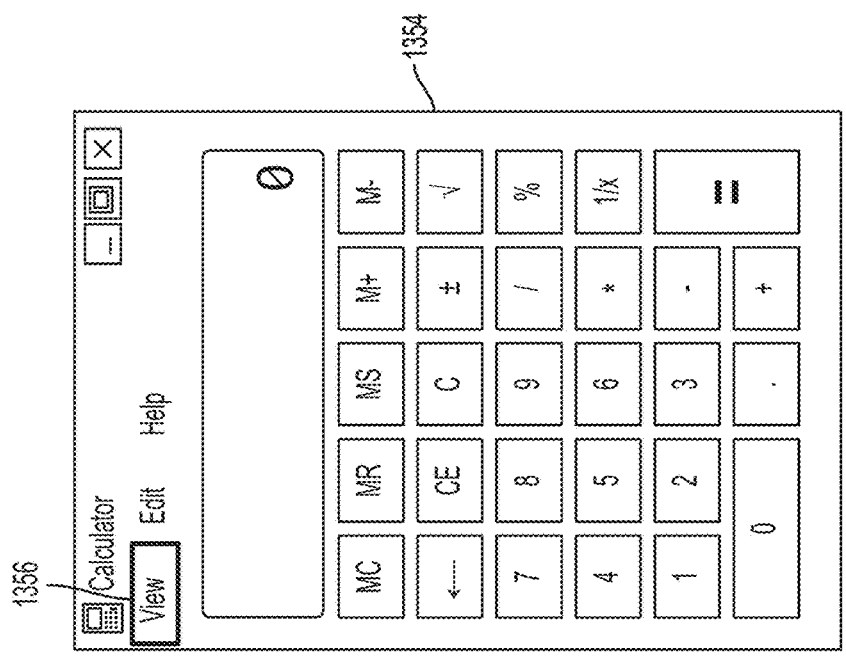
Figure 13C:
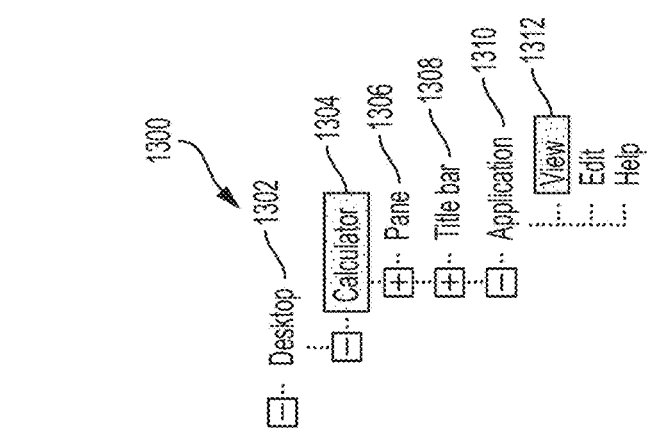
Figure 13K:
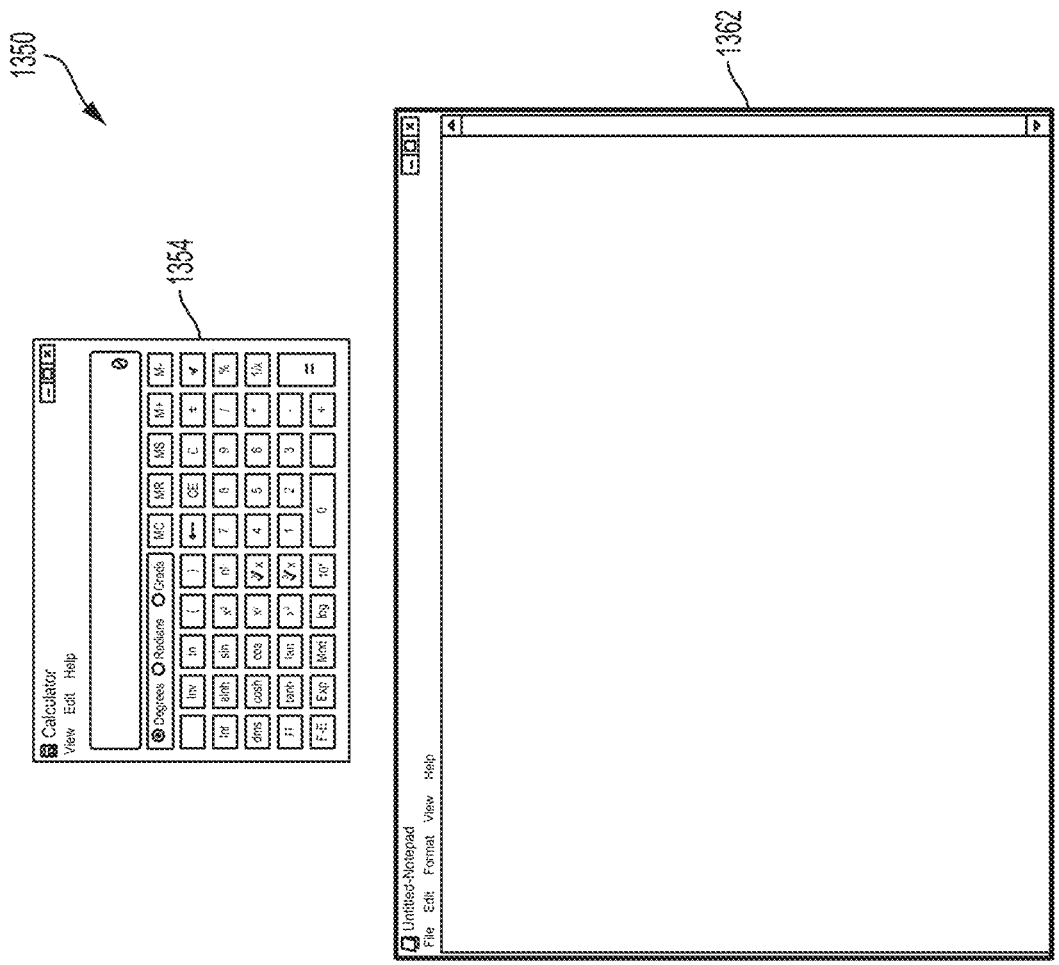
Figure 13J:
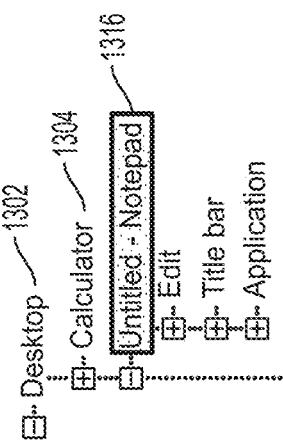
Figure 13L:
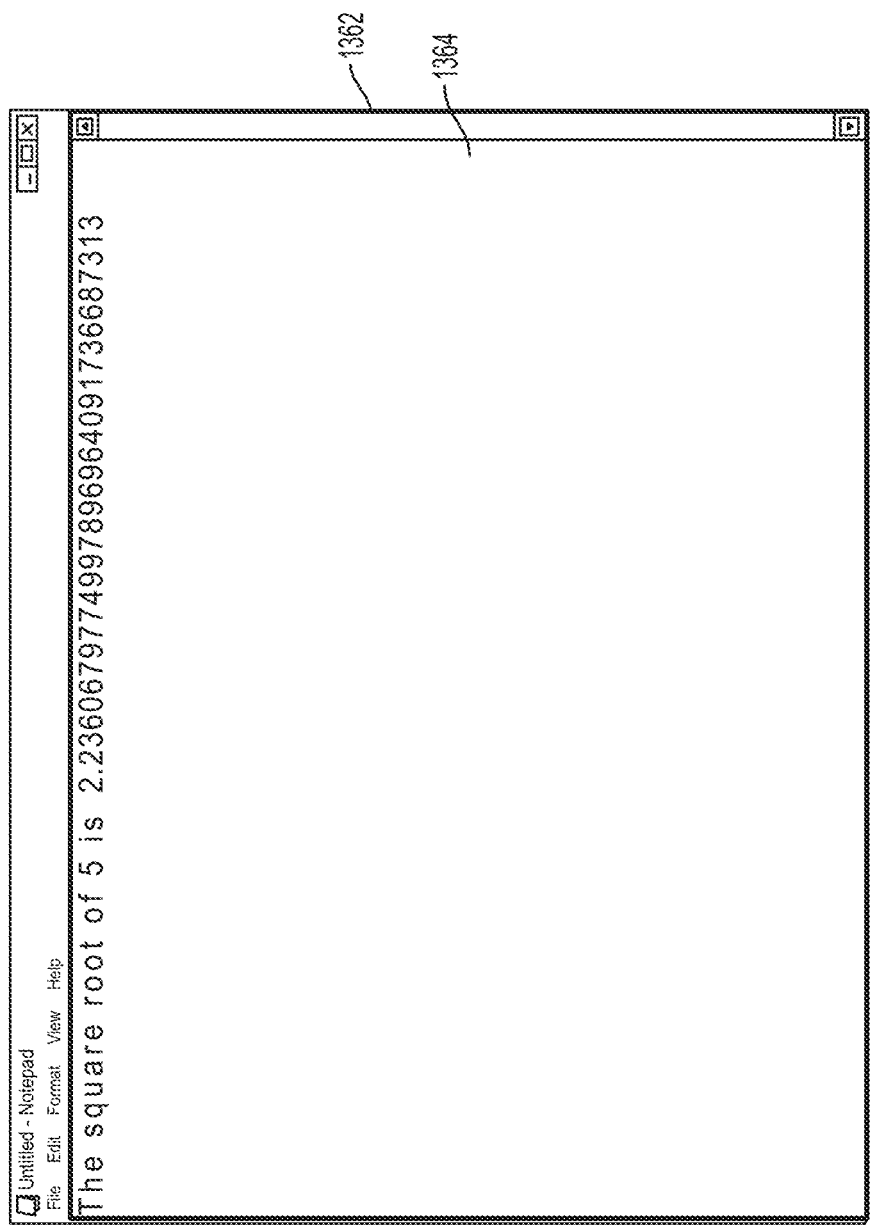
Figure 13O:
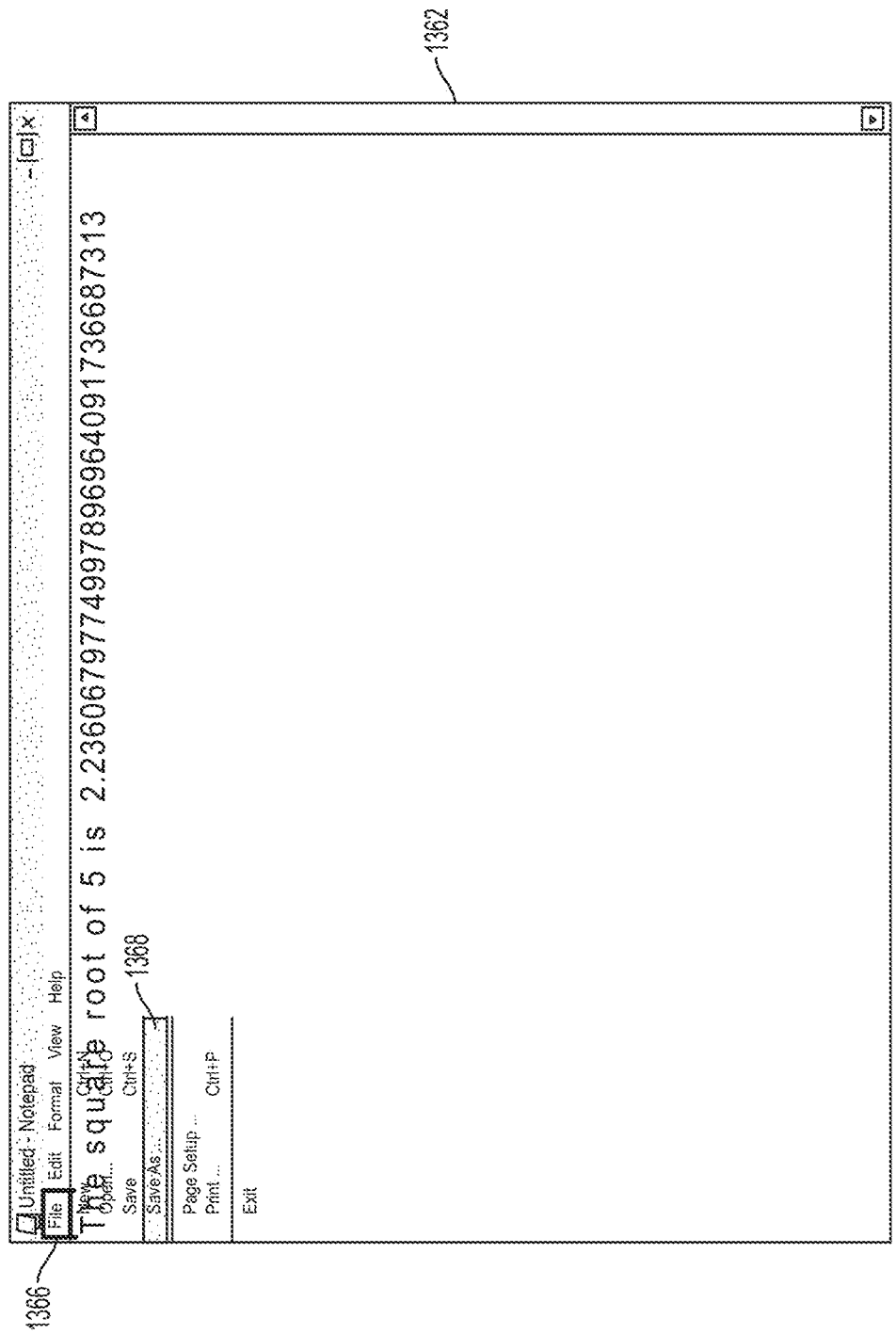

Another illustrative example of a software robot is shown in Table 2B. As discussed above, this software robot is configured to perform the task of calculating the square root of five using the calculator application program and saving the result of the calculation in a text file using the Notepad application program. FIGS. 13A-13R illustrate how the object hierarchy and the user interface of the computing device executing the software robot program are updated during performance of the task.

As shown in Table 2B, the software robot includes instructions for launching the calculator program, placing the calculator program into scientific mode, calculating the square root of five using the calculator program, launching the Notepad program, placing the results of the calculation in the Notepad canvas, and saving the contents of the Notepad canvas into a text file. Illustrative implementations for these instructions are shown in Tables 5-10 above. In this example, the object hierarchy has been generated prior to the execution of the first instruction shown in Table 2B.

FIGS. 13A and 13B illustrate the object hierarchy 1300 and the user interface of the computing device executing the software robot after launching the calculator program. An illustrative implementation of a function to perform this action is shown in Table 5. As shown in FIG. 13A, the root of object hierarchy 1300 is "desktop" object 1302 that corresponds to the desktop interface 1350 of the WINDOWS operating system. Calculator object 1304 is a child of the root desktop object 1302 and corresponds to GUI element 1354 of the calculator program contained within the desktop interface 1350. This correspondence is indicated by a simultaneous emphasis of object 1304 (with a box) and GUI element 1354 (with a boldface border). The children of the calculator object 1304 include "pane" object 1306, "title bar" object 1308, and "application" object 1310. Pane object 3106 corresponds to a pane of the calculator user interface that encapsulates all the calculator buttons below the results window; a similar pane is shown as GUI element 360 in FIG. 3B. Title bar object 1308 corresponds to a GUI element representing the title bar of the calculator program. Application object 1310 corresponds to a GUI element representing the menu toolbar of the calculator program, which toolbar contains the "View", "Edit" and "Help" menu items.

After the calculator program is launched, the software robot shown in Table 2B performs the action of placing the calculator program in Scientific mode. An illustrative implementation of a function to place the calculator in Scientific mode is shown in Table 6. As shown in FIGS. 13C and 13D, to place the calculator in scientific mode the object 1312, which corresponds to active GUI element 1356 representing the "View" menu item, is accessed in hierarchy 1300 and used to expand the View menu. The object hierarchy is refreshed to include objects corresponding to active GUI elements representing items in the expanded View menu shown in FIG. 13E. The refreshed hierarchy includes an object that corresponds to the GUI element 1358 representing the menu item that, when clicked, places the calculator program in "Scientific" mode. After the accessed object is used to place the calculator program in Scientific mode, the user interface of the calculator program is updated as shown in FIG. 13G, and the object hierarchy is refreshed to include objects corresponding to any new active GUI elements appearing in the user interface of the calculator as shown in FIG. 13F (see e.g., objects in the corresponding to the GUI elements representing the square root, percentage, and reciprocal operations).

After the calculator program is placed in Scientific mode, the object hierarchy is used to control the calculator to calculate the square root of five. To this end, object 1314 (shown in FIG. 13H) and corresponding to the active GUI element 1360 (shown in FIG. 13I) representing the number five is accessed in the refreshed hierarchy and used to "click" on the number five. Subsequently, object 1315 (shown in FIG. 13H) corresponding to the active GUI element 1361 (shown in FIG. 13I) representing the square root operation is accessed in the refreshed hierarchy and used to "click" on the square root, which causes the calculator program to compute the square root of five. The result of the calculation is accessed from the results pane. An illustrative implementation of a function to perform the above steps is shown in Tables 7 and 8.

Next, the software robot performs the action of opening the notepad application program. After, the notepad program is opened, the object hierarchy 1300 is refreshed and the user interface 1350 is updated as shown in FIGS. 13J and 13K. As shown in FIG. 13K, the user interface 1350 contains active GUI elements from both the calculator and notepad application programs and, as shown in FIG. 13J, the object hierarchy 1300 contains objects corresponding the active GUI elements of both the calculator and notepad programs. Object hierarchy 1300 includes object 1316 that corresponds to the active GUI element 1362 representing the outer container of the notepad. This correspondence is indicated by a simultaneous emphasis of object 1316 (with a box) and GUI element 1362 (with a boldface border).

Next, to place the result of the calculation into the notepad canvas, a handle to the object corresponding to the active GUI element 1364 (shown in FIG. 13L) is accessed in the object hierarchy. This object is then used to set the value of the active GUI element so that the notepad canvas shows the result of the previously performed calculation (i.e., the square root of five).

Next, as shown in FIGS. 13M-13R, the object hierarchy 1300 is used to control the notepad program to save the result of the calculation in file named "answer.txt." As shown in FIGS. 13M-N, to access the "Save As" menu item, object 1322, which corresponds to active GUI element 1366 representing the "File" menu item, is accessed in object hierarchy 1300 and used to expand the File menu. The object hierarchy is refreshed to include objects corresponding to active GUI elements representing items in the expanded File menu shown in FIG. 13O. The refreshed hierarchy includes an object that corresponds to the active GUI element 1368 representing the "Save As" menu item.

Figure 13P:
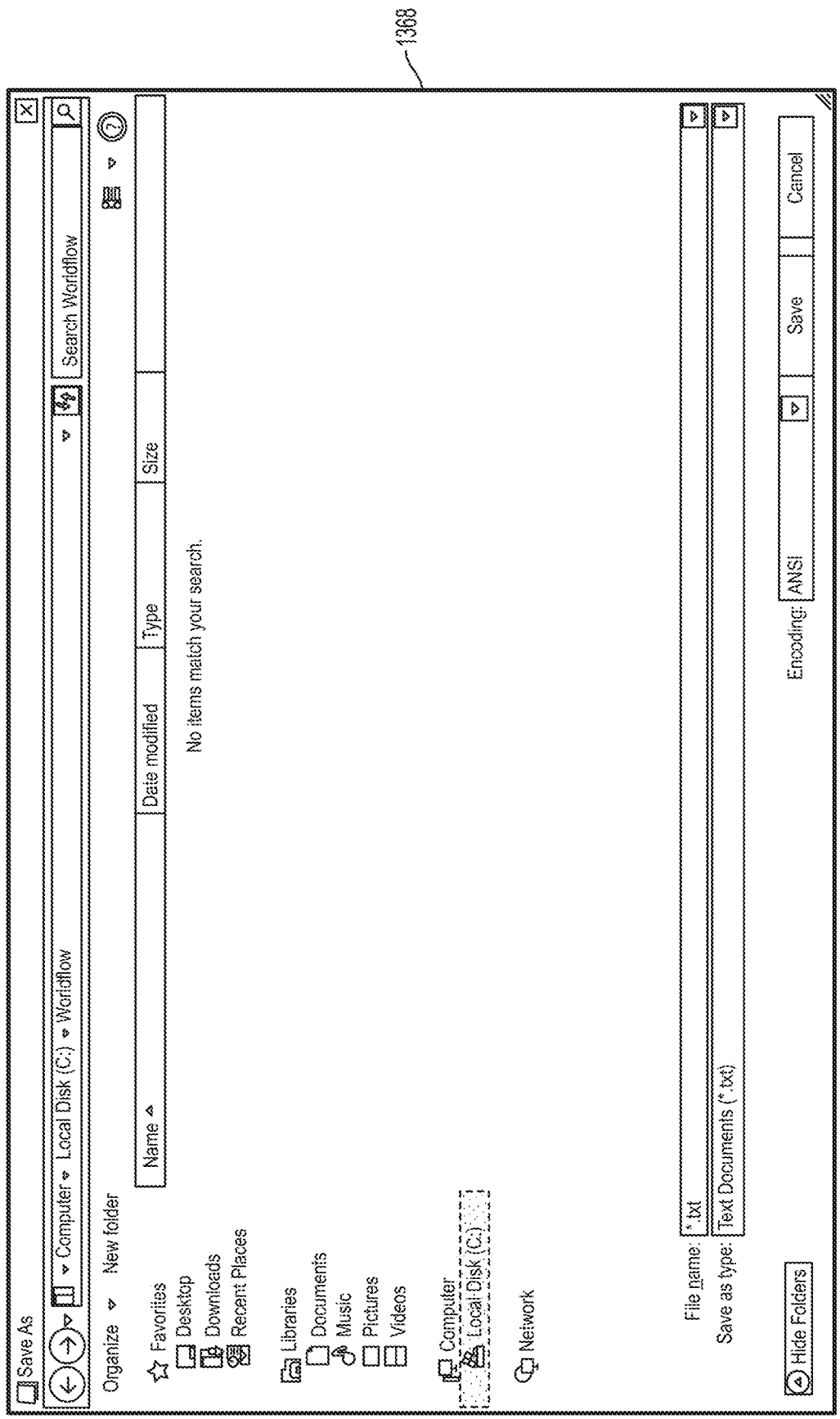
Figure 13Q:
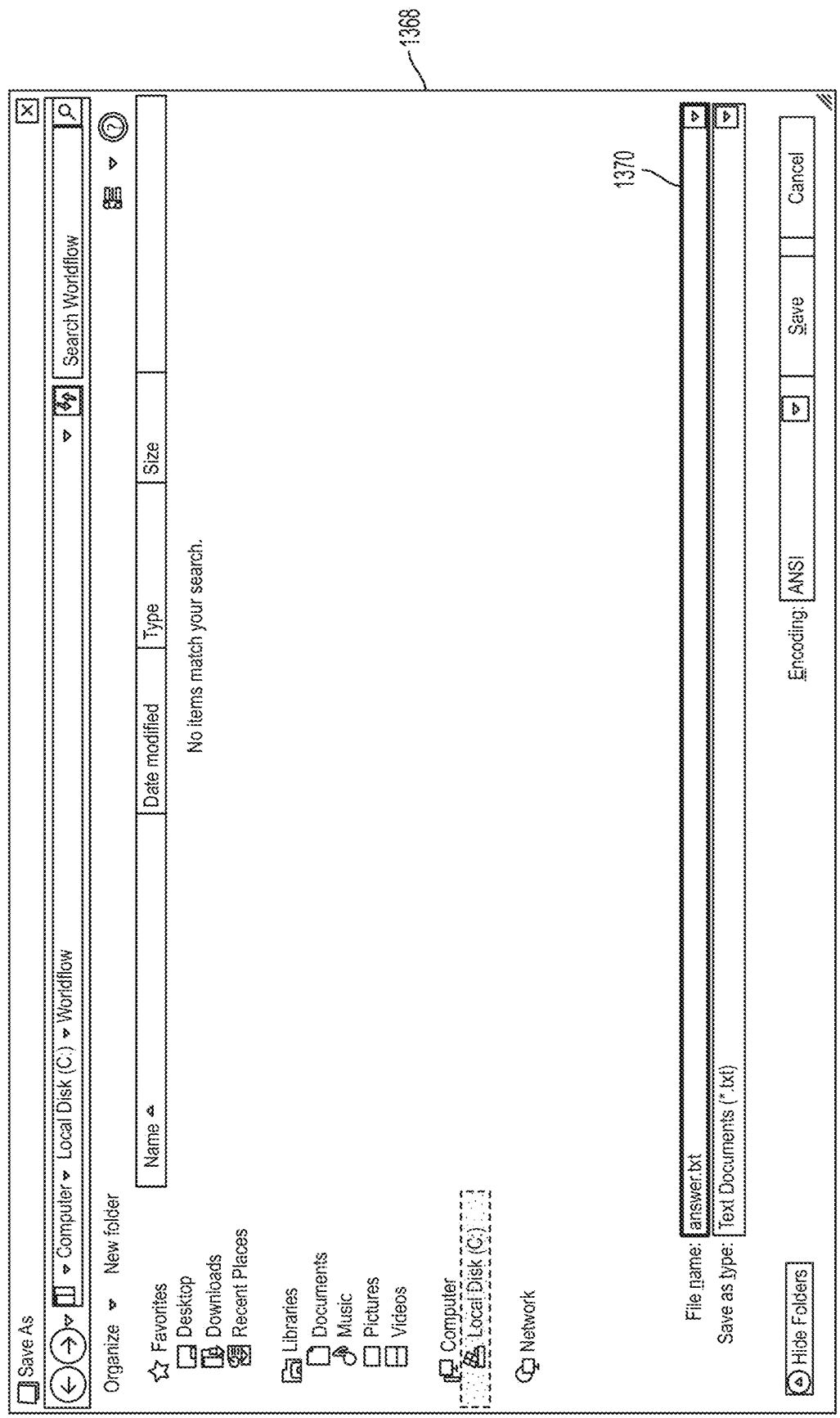
Figure 13R:
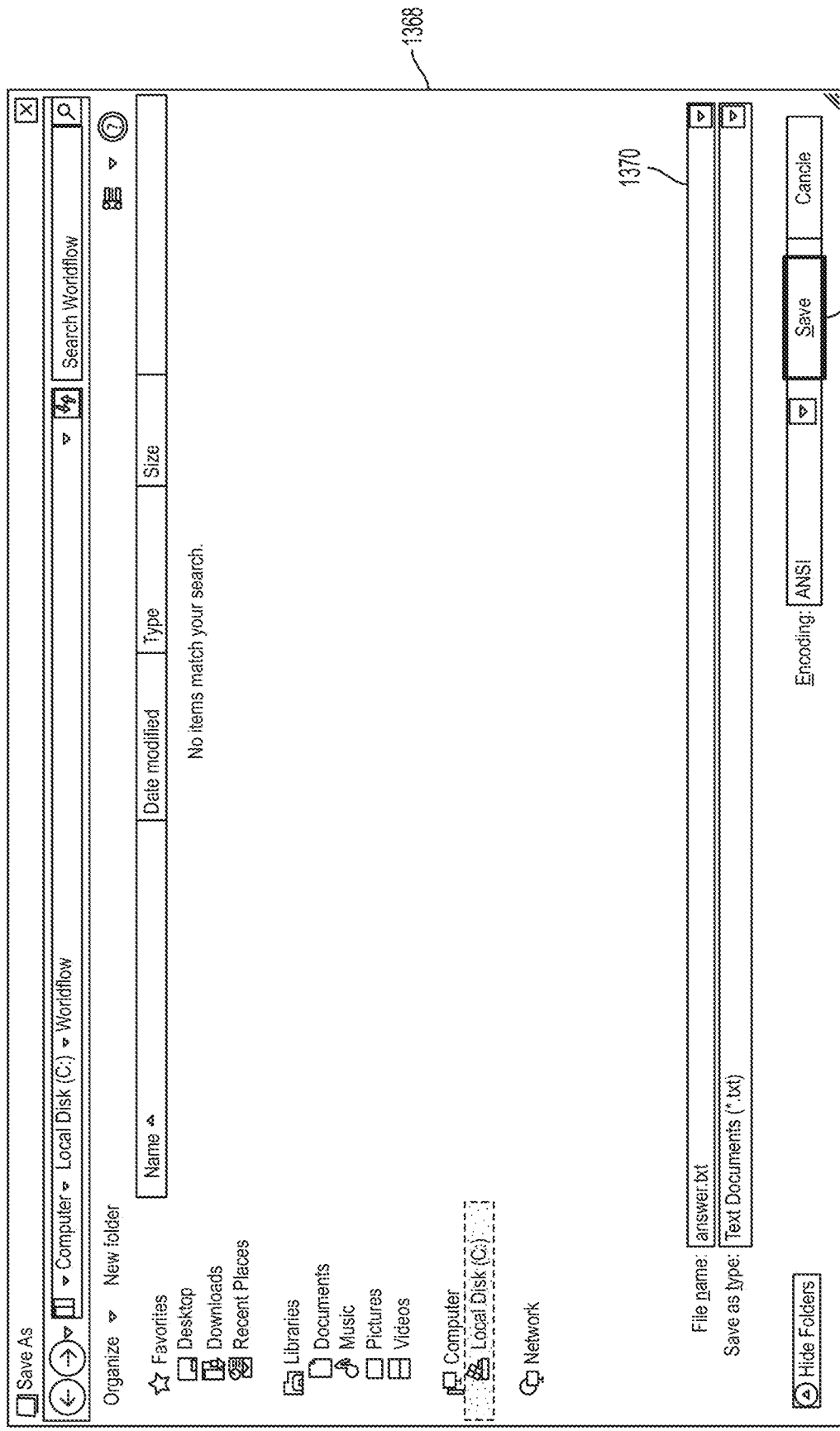

After the object corresponding to active GUI element 1368 is used to "click" the "Save As" item, the notepad program displays the "Save As" dialog box 1368, which is shown in FIG. 13P. The object hierarchy is refreshed to include objects corresponding to active GUI elements in the "Save As" dialog box including an object that corresponds to the active GUI element 1370, shown in FIG. 13Q, representing the "File Name" textbox into which the name of the file may be entered. This object is accessed and used to set the value of the active GUI element 1370 to "answer.txt." Afterward, the object in the hierarchy corresponding to the active GUI element 1372 (shown in FIG. 13R) representing the "Save" button is accessed and used to save the contents of the notepad canvas into a file named "answer.txt".

C. Example 3

Another illustrative example of a software robot is shown in Table 11. This software robot program is configured to perform the task of accessing products in a list and comparing the prices of each of the products as advertised by two e-commerce websites. Such a workflow may be used by an e-commerce company to understand how its pricing schemes compare to those of the competition. FIGS. 14A-14G illustrate how the object hierarchy and the user interface of the computing device executing the software robot program of Table 11 are updated during performance of the task.

TABLE 11

Illustrative software robot program for obtaining product prices

```
EXCEL e = new EXCEL( );
e.OpenWorkbook("sample_spreadsheet.xls");
amzn = new Amazon( );
flipkart = new Flipkart( );
ecomm1_link = e.GetCellValue(row, 3);
ecomm2_1ink = e.GetCellValue(row, 6);
ecomm1_price = amazon.GetPrice(ecomm1_link);
ecomm2_price = flipkart.GetPrice(ecomm2_link);
e.SetCell(row, 4, ecomm1_price);
e.SetCell(row, 7, ecomm2_price);
```

As shown in Table 11, the software robot program includes instructions for opening the EXCEL program, opening an EXCEL workbook that contains a list of products, opening an instance of an Internet browser to use for accessing pages of the Amazon e-commerce website, opening another instance of an Internet browser to use for accessing pages of the Flipkart e-commerce website, accessing an Amazon link to the price of a product in the spreadsheet, accessing a Flipkart link to the price of the same product in the spreadsheet, using the accessed links to open the Amazon and Flipkart webpages, obtaining the prices of the product from the opened webpages, and placing the prices into the spreadsheet. In this example, the object hierarchy has been generated prior to the execution of the first instruction shown in Table 11.

Figure 14B:
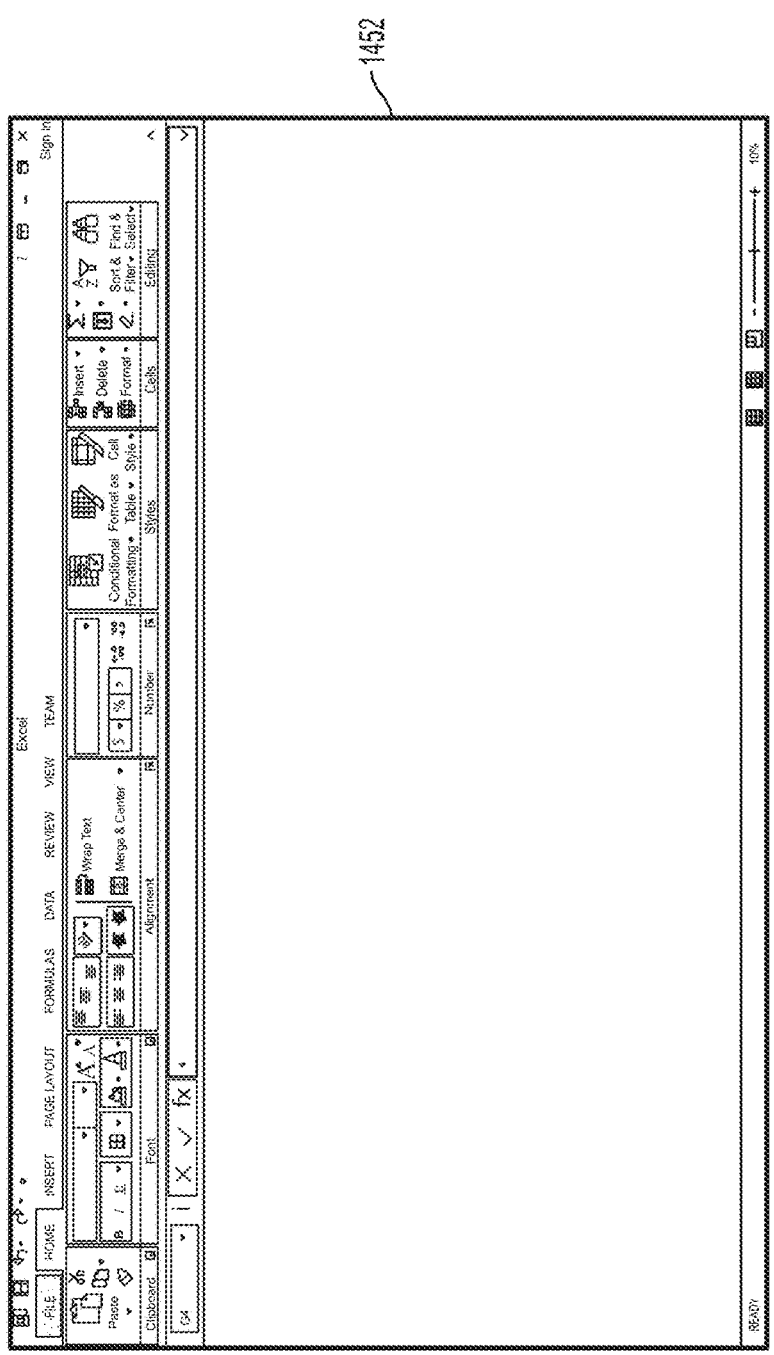
Figure 14A:
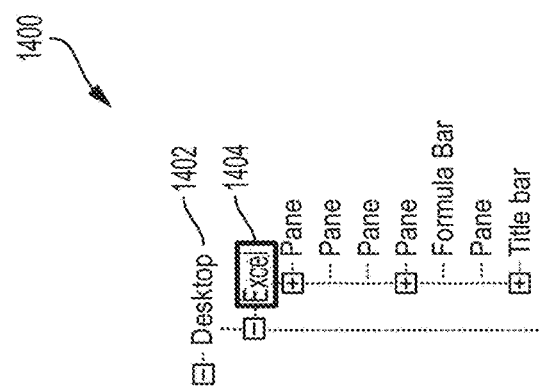

FIGS. 14A and 14B illustrate the object hierarchy 1400 and the user interface of the computing device executing the software robot after launching the EXCEL program (e.g., as a result of performing the instruction shown on the first line of Table 11). The root of object hierarchy 1400 is "desktop" object 1402 that corresponds to the desktop interface 1450 of the WINDOWS operating system. EXCEL object 1404 is a child of the root desktop object 1402 and corresponds to active GUI element 1452 of the EXCEL program contained within the desktop interface 1450. This correspondence is indicated by a simultaneous emphasis of object 1404 (with a box) and active GUI element 1452 (with a boldface border). EXCEL object 1404 contains multiple children corresponding to various active GUI elements contained in GUI element 1452 of the EXCEL program.

Figure 14C:
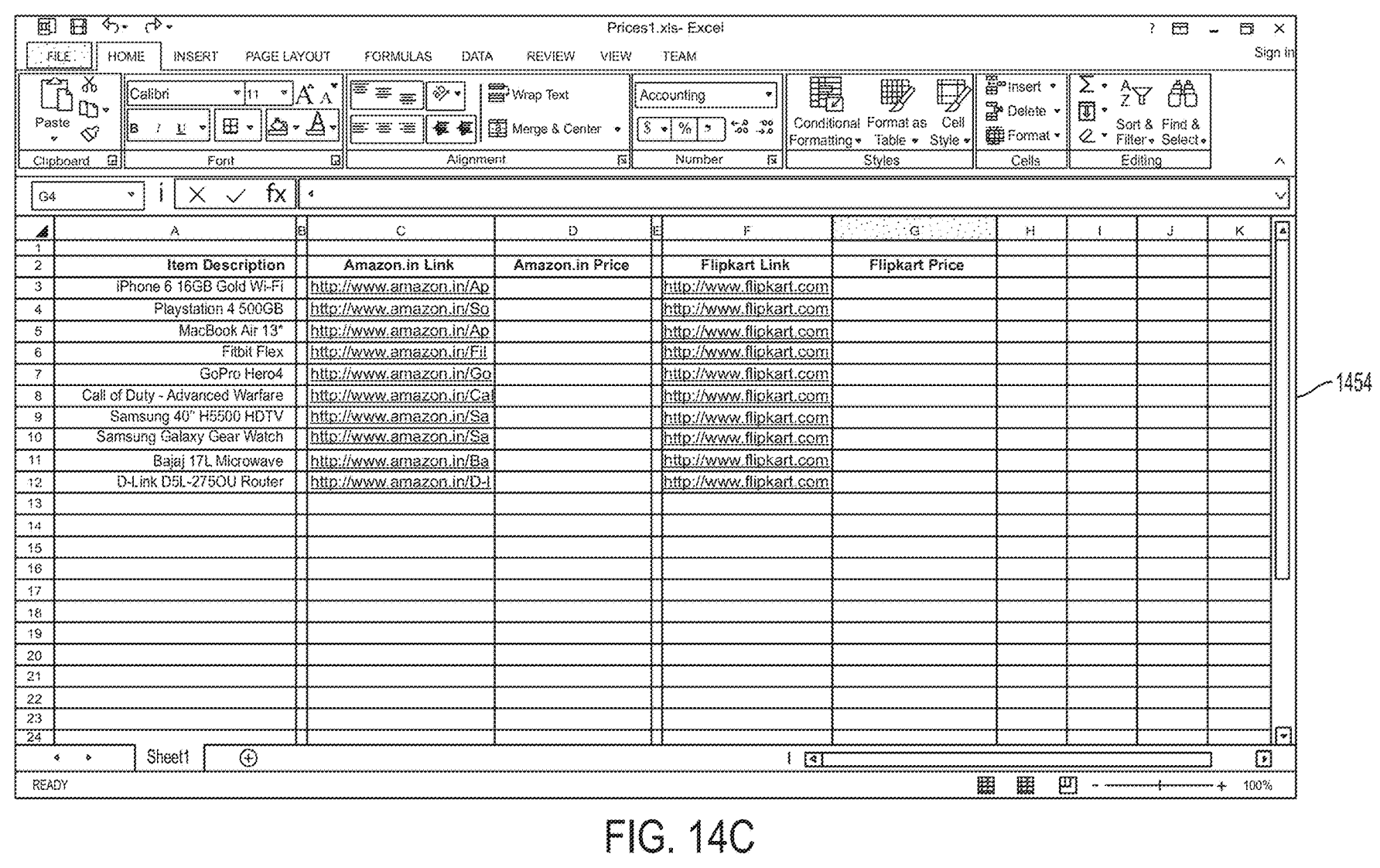

Next, objects in the object hierarchy corresponding to active GUI elements of the EXCEL application program are used to open the worksheet containing a list of products (e.g., as a result of performing the instruction shown on the second line of Table 11). After the worksheet is opened, the user interface of the EXCEL program is updated as shown in FIG. 14C. The contents of the loaded worksheet are shown in the active GUI element 1454 of FIG. 14C. The spreadsheet contains, for each product, the name of the product, a link to a webpage for the product on the Amazon website, and a link to a webpage for the product on the Flipkart website. As described below, the software robot will obtain prices for each product from the linked webpages associated with the product in the spreadsheet.

Figures 14D, 14E:
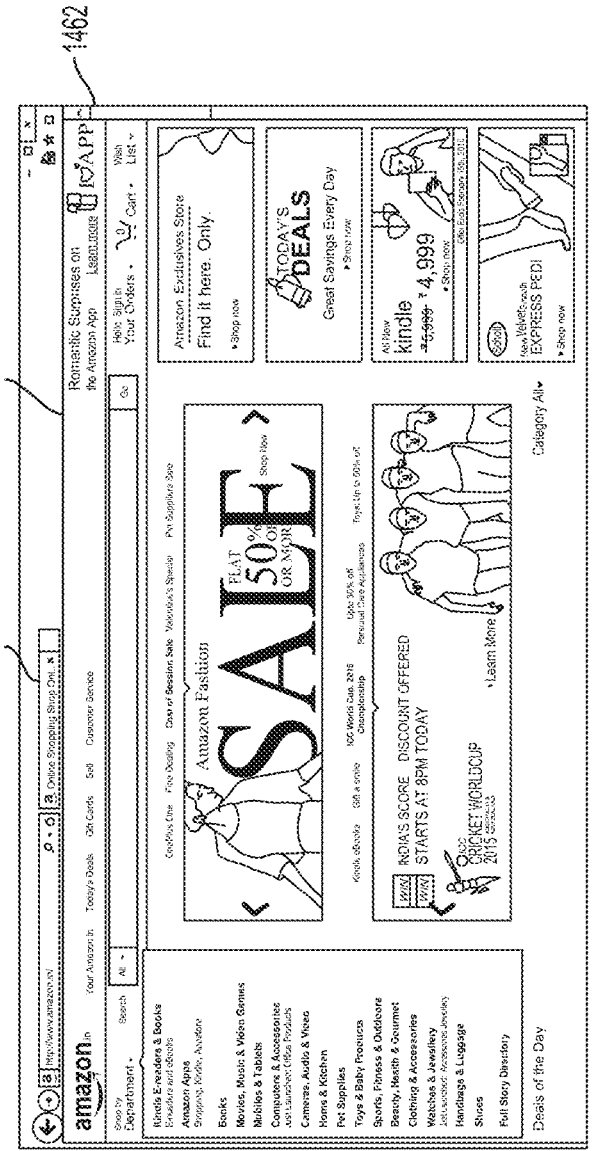

Next, the object hierarchy is used to launch an instance of an Internet browser to use for accessing pages of the Amazon e-commerce website and causes the launched Internet browser to access the Amazon homepage (e.g., as a result of performing the instruction shown on the third line of Table 11). After this action is performed, the object hierarchy 1400 and the user interface 1450 are updated as shown in FIGS. 14D and 14E, respectively. As shown, object hierarchy 1400 now includes object 1406 that corresponds to active GUI element 1462 that represents the outer container of the Internet browser. Object 1408, which is a descendant of object 1406, corresponds to active GUI element 1464 that represents the title of the Amazon homepage. Object 1410, which is a child of object 1408, is a root of a hierarchy of objects corresponding to active GUI elements in the webpage shown in pane 1466 of the Internet browser. The object hierarchy 1400 includes objects corresponding to active GUI elements implemented using different GUI application libraries (WINDOWS GUI application library and HTML in this example).

Next, the object hierarchy is used to launch another instance of an Internet browser to use for accessing pages Flipkart e-commerce website and causes the launched Internet browser to access the Flipkart homepage (e.g., as a result of performing the instruction shown on the fourth line of Table 11). After this action is performed, the hierarchy 1400 and the user interface 1450 are updated accordingly.

Next, the object hierarchy is used to access the links to Amazon and Flipkart webpages associated with one of the products in the spreadsheet shown in FIG. 14C (e.g., as a result of performing the instructions shown on the fifth and sixth lines of Table 11). The links are accessed by using the function GetCellValue(row, column) associated with the EXCEL component library. In some embodiments, this function may access the cells in the spreadsheet using objects in the object hierarchy 1400 that correspond to the active GUI elements representing the cells. In other embodiments, this function by using the component object model to access the cells in the spreadsheet. In this example, links to Amazon and Flipkart webpages having information about the "Playstation 4" product are accessed.

Next, the Internet browsers are used to navigate to the accessed links, and after the webpages indicated by the links are loaded, prices of the product are obtained from the webpages (e.g., as a result of performing the instructions shown on the seventh and eighth lines of Table 11). This functionality is accomplished via the "GetPrice" method, shown in Table 12 below, which takes as input a link of a particular webpage, uses an Internet browser to open the particular webpage, refreshes the object hierarchy to include objects corresponding to active GUI elements on the particular webpage, and uses objects in the hierarchy to extract the price of the product from the webpage.

Figure 14F:
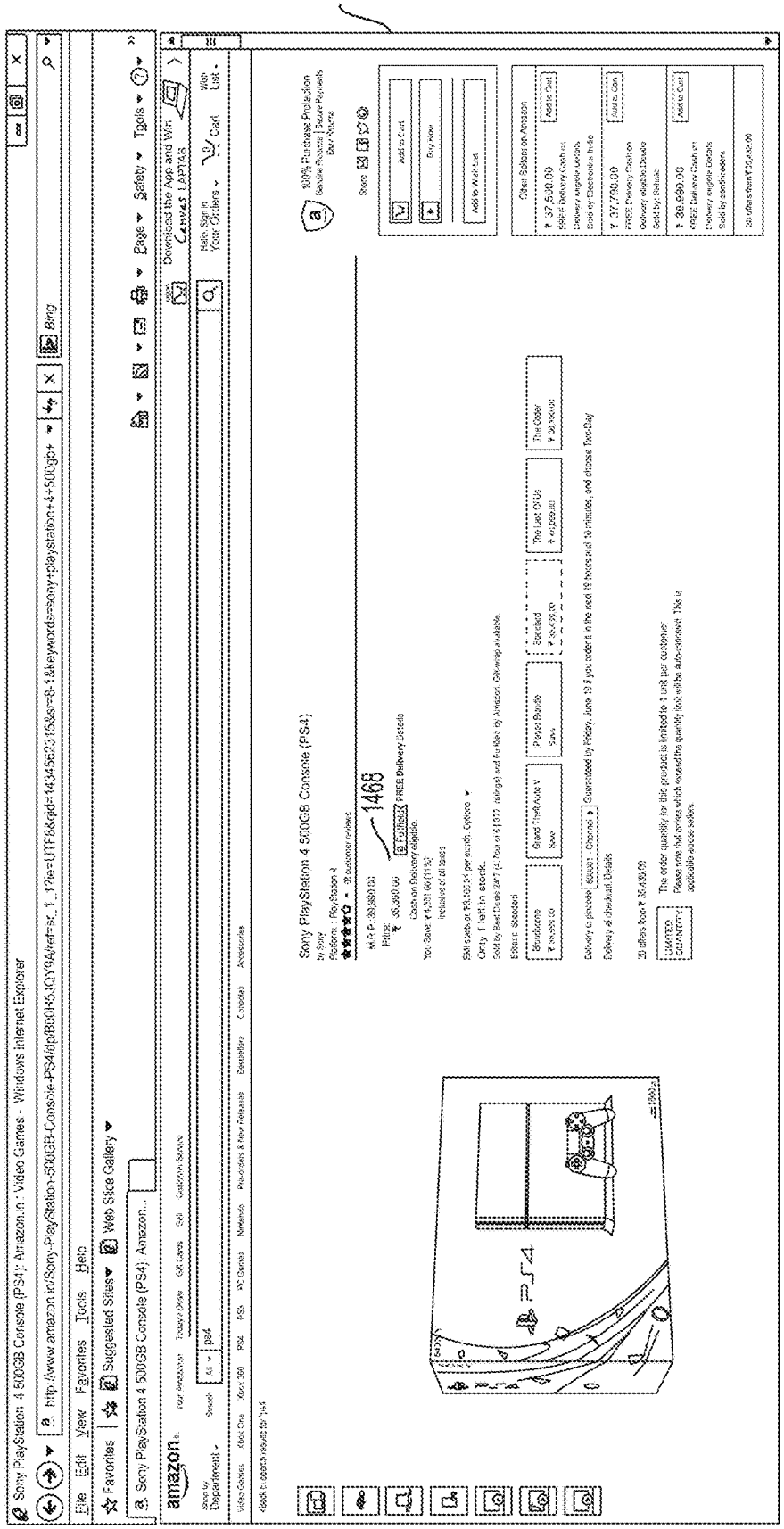
Figure 14G:
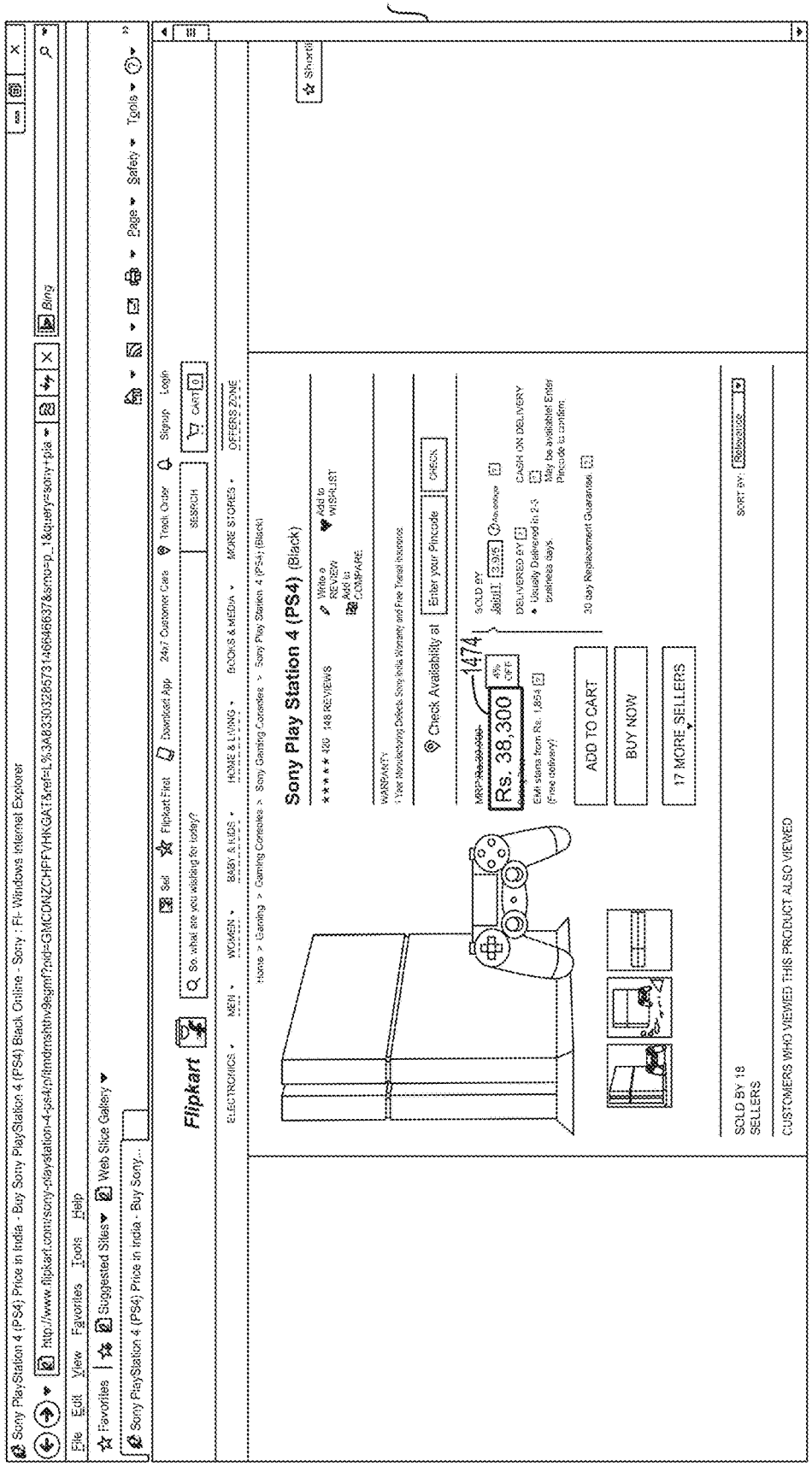

In particular, after the Amazon page indicated by the link is loaded, the object hierarchy 1400 is refreshed so that it includes objects corresponding to active GUI elements of the Amazon webpage, including an object corresponding to the active GUI element 1468 that displays the price of PlayStation 4 in the webpage, as shown in FIG. 14F. Similarly, after the Flipkart page indicated by the link is loaded, the object hierarchy 1400 is refreshed so that it includes objects corresponding to active GUI elements of the Flipkart webpage including element 1474 that displays the price of PlayStation 4 in the Flipkart webpage, which is shown in FIG. 14G within active GUI element 1472 that represents the outer container of the Internet browser used to access Flipkart webpages in this illustrative example. When the object hierarchy is refreshed, after the Internet browser loads a new webpage, only the portion of the hierarchy that is rooted at the object that corresponds to the Internet browser is refreshed so that the refresh is performed more efficiently than if the entire hierarchy were refreshed.

TABLE 12

Illustrative implementation of GetPrice function

```
GetPrice(string url) {
    if (_browser.Open(url)) {
        uohPrice = _html.Select("#'priceblock_saleprice'");
        raw_price = uohPrice.GetValue( );
}}
Open(string url) {
    browser.Navigate(url); // Navigate to the new page
    browser.Refresh(Depth.Infinite, StartAt.Parent); // Once page
    loads, refresh object hierarchy
    }
```

Finally, after the prices are obtained from the webpages, objects in the object hierarchy that correspond the active GUI elements of the EXCEL program and/or component object model (COM) objects may be used to place the prices into cells of the opened spreadsheet. Repeating some of the steps of the software robot shown in Table 11 may allow for Amazon and Flipkart prices to be obtained for each of the products listed in the opened spreadsheet.

D. Example 4

Another illustrative example of a software robot is the software robot for opening a database program and running a database query, which is shown in Table 14. The illustrated software robot launches the MICROSOFT SQL Server Management Studio application program (hereinafter, "management studio"), executes a search query against the "Persons" database table, and prints results of the search query to the console.

As illustrated in Table 14, the software robot first launches the management studio, which, as shown in Table 15, includes getting a handle to an object that corresponds to the active GUI element representing the main window of the management studio. In this example, that object handle is "_mstudio". Launching the management studio also includes logging into a SQL server. An illustrative implementation of a function (i.e., "_login( )") for logging into the SQL server is shown in Table 16. As illustrated in Table 16, logging into the SQL server involves refreshing the hierarchy of objects corresponding to the active GUI elements of the management studio, obtaining handles to objects corresponding to the active GUI elements representing the serverName field (i.e., "serverName"), the username field (i.e., "_userName"), the password field (i.e., "_password"), and the connect button, and using these object handles to connect to the SQL server. If the connection is successful, the portion of the object hierarchy corresponding to the management studio may be refreshed so that the object hierarchy reflects any changes to the GUI of the management studio, which result from the connection to the SQL server being established.

TABLE 14

Illustrative software robot program for submitting a database query

```
mstudio = new ManagementStudio( )
results = mstudio.NewQuery("SELECT * FROM Persons")
if (results != null) {
        foreach (key in results.Keys) {
                values = results[key]
                Print "(" + key + ") -> " + values}
}
```

TABLE 15

Illustrative implementation of function for launching MICROSOFT SQL Server

```
Method ManagementStudio( ) {
        root = UOHManager.GetRoot( );
        _mstudio = root.Select("@'MICROSOFT SQL Server
        Management
        Studio'::'ControlType.Window'");
        _login( );
}
```

TABLE 16

Illustrative implementation of function for logging into MICROSOFT SQL Server

```
Method _login( ) {
    _connectWindow = _mstudio.Select(">1 @'Connect to
```

TABLE 16-continued

Illustrative implementation of function for logging into MICROSOFT SQL Server

```
Server'::'ControlType.Window'")
    _serverName = _connectWindow.Select(" @'Server
    name:'::'ControlTypeEdit'")
    _userName = _connectWindow.Select(" @'User
    name:'::'ControlType.Edit'")
    _password = _connectWindow.Select(" @'Password:'::
    'ControlType.Edit'")
    _connect = _connectWindow.Select(" @Connect::
    'ControlType.Button'")
    if (_connect.Click(MouseButtons.Left)) {
            return (_mstudio.Select(">1 @'Connect to
            Server'::'ControlType.Window'") == null);
    } return false; }
```

After the management studio is launched and a connection to the SQL server is made, the software robot of Table 14 constructs new database query. In this example, the query is "Select * FROM Persons," which is a SQL query for selecting all records from the database table "Persons." An illustrative function "NewQuery" for constructing the new database query is shown in Table 17. As illustrated in Table 17, constructing a new database query involves refreshing the object hierarchy, obtaining handles to objects in the hierarchy that correspond to various active GUI elements of the management studio, and controlling the management studio to construct and execute the query. After the results of the search query are obtained, the software robot of Table 14 prints the results of the search query to a console.

TABLE 17

Illustrative implementation of function for running a search query

```
Method NewQuery(string query) {
        _mstudio.Refresh(Depth.Infinite)
        toolbarTop = _mstudio.Select(" @ToolBarDockTop::'ControlType.Pane'")
        newButton = toolbarTop.Select(" @'New Query'::'ControlType.Button'")
        if (newButton.Click(MouseButtons.Left)) {
            _login( )
            _tabRow = _mstudio.Select(" @'ControlType.Tab'::'ControlType.Tab'");
            _textEditor = _mstudio.Select(" @'Text Editor'::'ControlType.Edit'");
            _textEditor.SetValue(query);
            toolbarTop = _mstudio.Select(" @ToolBarDockTop::'ControlType.Pane'");
            execute = toolbarTop.Select(" @Execute::'ControlType.Button'")
            if (execute.Click(MouseButtons.Left)) {
                _mstudio.Refresh(Depth.Infinite)
                resultsPane = _tabRow.Select(" @Results::'ControlType.Pane'")
                if (resultsPane != null) {
                resultsGrid = resultsPane.Select(" @GridControl::'ControlType.Table'");
                children = resultsGrid.GetChildrenCopy( );
                if (children.Count > 0) {
                  queryResult = new Dictionary<string, List<string>>( );
                  for (int i = 1; i < children.Count; i++) {
                    child = children[i];
                    elements = child.GetChildrenCopy( );
                    if (elements.Count > 0) {
                    columnName = elements[0].GetValue( );
                    columnResults = new List<string>( );
                    for (int j = 1; j < elements.Count; j++)
                      columnResults.Add(elements[j].GetValue( ));
                      queryResult.Add(columnName, columnResults);
                }}
                return queryResult;
        }}}}
        return null;
}
```

E. Example 5

Software robot computer programs may be used to automate performance of various e-mail related tasks. A software robot may be used to send automated e-mails to customers of a business, to notify someone employed by the business that there is an issue which requires their attention, and/or to perform any other suitable task. An illustrative example of a software robot for performing an e-mail task is shown in Table 18. This software robot launches the MICROSOFT Outlook application program, obtains a list of unread e-mails, and responds to each e-mail with the message that the recipient is busy, but will respond to the e-mail as soon as possible. An illustrative implementation of a function to access all received e-mails in MICROSOFT Outlook is shown in Table 19. An illustrative implementation of a function to respond to each received e-mail is shown in Table 20.

TABLE 18

Illustrative Software Robot for Automatically Responding to E-mail

```
outlook = new Outlook2013( );
unread = outlook.GetEmails(true);
foreach (email in unread) {
    outlook.SendNewMail(email.GetFrom( ), null, "[Automated]
    Currently swamped, will respond ASAP", "I received your e-mail
    but I am swamped, I will respond to it ASAP.");
}
```

TABLE 19

Illustrative implementation of function for accessing information about received e-mails

```
Method GetEmails(var unread) {
UnreadButton = _outlook.Select(" @Unread::'ControlType.Button'");
if (UnreadButton.Click(MouseButtons.Left)) {
   TObj = _outlook.Select(" @T^::'ControlType.Table'");
   children = TObj.GetChildren( );
   emails = new List<Email>( );
   foreach (child in children){
         if (child.ControlType.Equals("ControlType.Group")) {
           messages = child.GetChildren( );
           foreach (message in messages) {
            if (message.SelectItem( )) {
              MessagePane = _outlook.Select(" @Message::'ControlType.Pane'")
              MssgObj = MessagePane.Select(" @Message::'ControlType.Document'")
              email = new Email(message, MssgObj.GetValue( ));
              FromContainer = _outlook.Select(" @From::'ControlType.Document'");
              FromButton =
                   _outlook.Select(" @'"+email.GetFrom( )+"'::'ControlType.Button'");
              if (FromButton.Click(MouseButtons.Left)) {
                emailAddress = _EmailFromContactCard(email.GetFrom( ));
                email.SetFromEmail(emailAddress);
              }
              ToContainer = _outlook.Select(" @To::'ControlType.Document'");
              foreach (ToChild in ToContainer.GetChildren( )){
                if (ToChild.Click(MouseButtons.Left)) {
                  emailAddress = _EmailFromContactCard(email.GetFrom( ));
                  email.AddToEmail(emailAddress);
                }
              }
              CcContainer = _outlook.Select(" @Cc::'ControlType.Document'");
              foreach (CcChild in CcContainer.GetChildren( )) {
              if (CcChild.Click(MouseButtons.Left)) {
                string emailAddress = _EmailFromContactCard(email.GetFrom( ));
                email.AddCcEmail(emailAddress);
              }
            }
          emails.Add(email);
   }}}} return emails;}
return null; }
```

TABLE 20

Illustrative Implementation of Function for Sending an E-mail

```
public bool SendNewMail(string ToMailAddress, string CCMailAddress, string Subject,
string Contents, List<string> attachments = null) {
        UOHObject NewMailButton = _outlook.Select(" @'New
Email'::'ControlType.Button'");
       Debug.Assert(NewMailButton != null);
       if (!NewMailButton.Click(MouseButtons.Left)) return false;
       UOHObject NewMailWindow = _desktop.Select(" @'Untitled
                          Message'::'ControlType.Window'");
       UOHObject ToText = NewMailWindow.Select(" @To::'ControlType.Document'");
       UOHObject CCText = NewMailWindow.Select(" @Cc::'ControlType.Document.'");
       UOHObject SubjectText = NewMailWindow.Select(" @Subject::'ControlType.Edit'");
```

TABLE 20-continued

Illustrative Implementation of Function for Sending an E-mail

```
        UOHObject ContentsText = NewMailWindow.Select(" @'Untitled
                    Message'::'ControlType.Document'");
        UOHObject SendButton = NewMailWindow.Select(" @Send::'ControlType.Button'");
        if (ToText.SetValue(ToMailAddress)) {
            if (CCMailAddress == null || CCText.SetValue(CCMailAddress)) {
                if (Subject == null || SubjectText.SetValue(Subject)) {
                    if (Contents == null || ContentsText.SetFocus( )) {
                        InputSimulator s = new InputSimulator( );
                        s.Keyboard.TextEntry(Contents);
                        Thread.Sleep(1000);
                        if (attachments != null) {
                            UOHObject AttachFile = NewMailWindow.Select("@'Attach
                                    File'::'ControlType.Button'");
                            foreach (string filename in attachments) {
                                if (AttachFile.Click(MouseButtons.Left)) {
                                    InsertDialog dialog = new InsertDialog(NewMailWindow);
                                    dialog.Insert(filename);
                        }}}
                        SendButton.Click(MouseButtons.Left);
                        return true;
}}
```

F. Example 6

Figure 15:
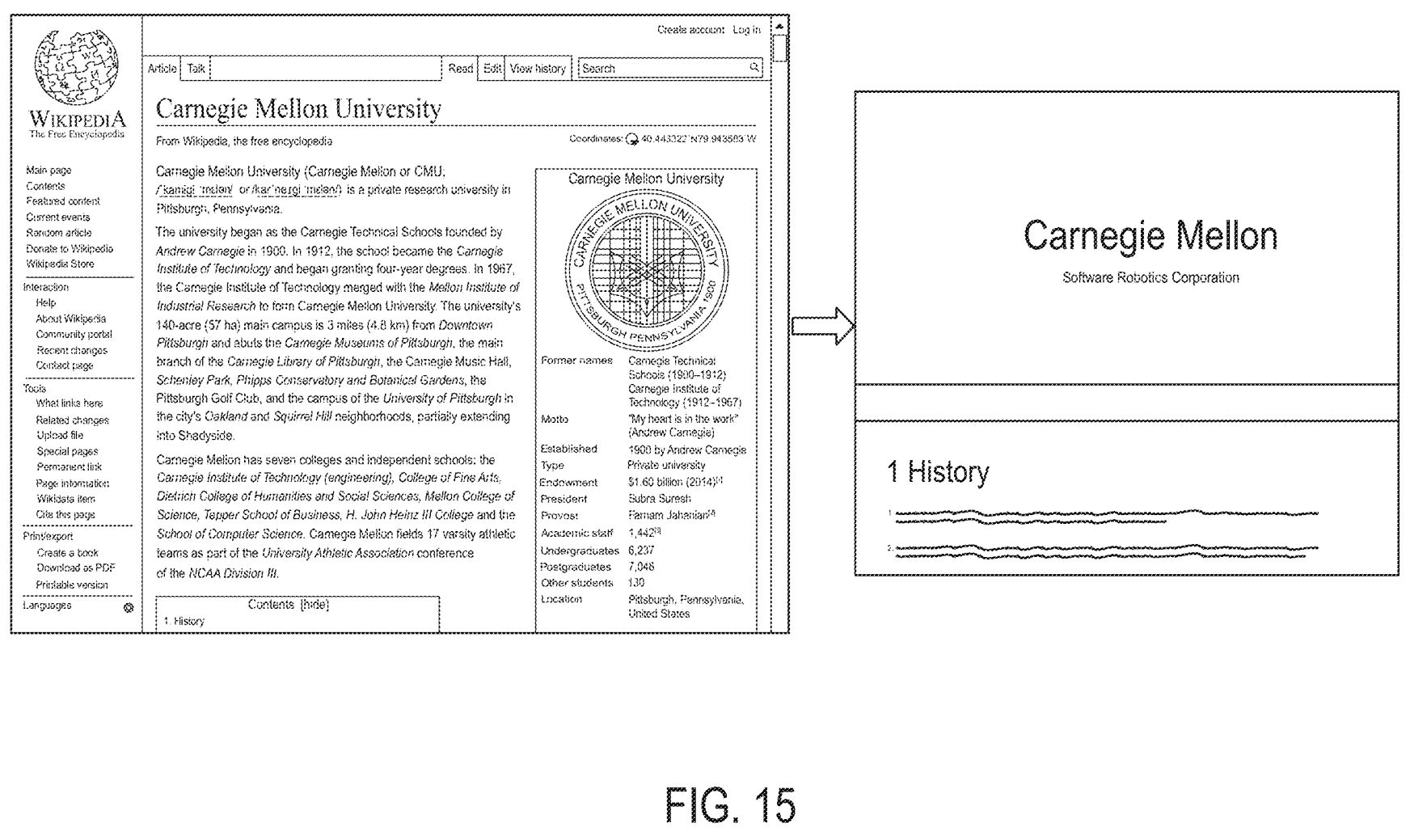

Another illustrative example of a software robot is shown in Table 21. This robot automatically creates a presentation out of content obtained from the Wikipedia website. For example, as shown in FIG. 15, the software robot may access Wikipedia content about Carnegie Mellon University and generate a POWERPOINT presentation based on this content. The software robot shown in Table 21 launches the MICROSOFT POWERPOINT application, creates a POWERPOINT presentation, performs a search on the Wikipedia website for content using a search term ("Baseball" in this example), extracts content from sections of each webpage obtained as a result of the search, places the extracted content into respective slides, and e-mails the generated presentation to three mail recipients. Rather than being placed into a slide verbatim, the extracted content is first processed using a technique for summarizing text to produce text summaries, and the summaries are then paced on the slides.

Tables 22-25 show illustrative implementations of various functions used by the software robot shown in Table 21. An illustrative implementation of a function for launching the POWERPOINT application is shown in Table 22. An illustrative implementation of a function for launching an instance of an Internet browser to navigate to the Wikipedia webpage is shown in Table 23. Table 24 shows an illustrative implementation of a function for controlling an Internet browser, via objects in the object hierarchy, to search for content on Wikipedia. Table 25 shows an illustrative function for creating a POWERPOINT slide from content provided as input to the function.

TABLE 21

Illustrative software robot program for automatically generating a POWERPOINT presentation

```
POWERPOINT powerpoint = new POWERPOINT( );
powerpoint.CreatePresentation( );
Wikipedia w = new Wikipedia( );
StringBuilder sb = new StringBuilder( );
powerpoint.PPTs[0].CreateSlide(PPTLayout.Title, 1, searchTerm, "Baseball");
int pageCount = 2;
foreach (WildContent parent in w.Search(searchTerm)) {
    if (parent.Content != null && parent.Content.Length == 0) {
        powerpoint.PPTs[0].CreateSlide(PPTLayout.Text1, pageCount++, parent.Title,
        string.Join("\r\n\r\n", parent.GetSectionTitles( ))); }
    else {
        string content = parent.GetAllContent( );
        powerpoint.PPTs[0].CreateSlide(PPTLayout.Text1, pageCount++, parent.Title,
            content); }
    _recurseWikiContentPresentation(parent, ref pageCount, powerpoint);
}
powerpoint.PPTs[0].SaveAs(@" c:\temp\test.ppt");
Outlook o = new Outlook("rohan@softwareroboticscorp.com");
string msg = "This mail has been generated automatically by the system. Do not be alarmed!
\n\r\r\n" + "This is a demonstration of a workflow that opens IE, navigates to Wikipedia,
searches for a specified (parameterized) term [" + searchTerm + "]" +", collates the results
into a hierarchical tree, opens POWERPOINT, create one page for each subsection of the
Wikipedia article, saves the POWERPOINT file" +", and then emails it to three people with
an attachment. Please see attached.\n\r\r\n An important feature here is that the text on each
slide is *summarized* using a " + "summarization library. Therefore you don't see the full
Wikipedia text."
```

TABLE 21-continued

Illustrative software robot program for automatically generating a POWERPOINT presentation o.SendMail("Automated Workflow: Content about " + searchTerm, msg, @" c:\temp\test.ppt", "person1@softwareroboticscorp.com", "person2@softwareroboticscorp.com", "person3@softwareroboticscorp.com");

TABLE 22

Illustrative Implementation of Functions for Generating New POWERPOINT presentation

```
class POWERPOINT {
Application _app;
List<PPT> _ppts;
        Initializer POWERPOINT( ) {
                _app = new Application( );
                _app.Activate( );
                _ppts = new List<PPT>( );
        }
        Method PPTs { get { return _ppts; } }
                Method CreatePresentation( ) {
```

TABLE 22-continued

Illustrative Implementation of Functions for Generating New POWERPOINT presentation

```
                _ppts.Add(new PPT(_app));
        }}
```

TABLE 23

Illustrative implementation of function for navigating to Wikipedia

```
private const string _url = "http://www.wikipedia.org/";
public Wikipedia(Browser browser) : base(browser, _url) { }
```

TABLE 24

Illustrative implementation of function for searching for content on Wikipedia

```
Method Search(string term) {
        // Ensure we are the main Wikipedia search page
        if (!_browser.CurrentURL.Equalst_url)) { _browser.Open(_url); }
        searchBox = _html.Select(_searchBoxStr);     // Get a handle to the search box
        // Type the search term into the search box
        if (searchBox != null && searchBox.SetValue(term)) {
          searchButton = _html.Select(_searchButtonStr); // Get a handle to the search button
          // Click on the search button
          if (searchButton != null && searchButton.Click(MouseButtons.Left)) {
             _browser.BusyWait( ); // If successful on clicking then wait till the page is loaded
             return getTOC( );     // Get the table of contents of this Wikipedia page
        }}
        return null;
}}
```

TABLE 25

Illustrative Implementation of function to create a POWERPOINT slide

```
Method CreateSlide(pptLayout, index, content) {
        slides = _ppt.Slides;
        CustomLayout slideLayout;
        if (layout == PPTLayout.Title){
          slideLayout = _ppt.SlideMaster.CustomLayouts[(PpSlideLayout.ppLayout-Title)];
        }
        else if (layout == PPTLayout.Text1){
          slideLayout = _ppt.SlideMaster.CustomLayouts[(PpSlideLayout.ppLayout-Text)];
        }
        else {throw new Exception("Unknown slide layout!");}
        _slides.Add(new PPTSlide(slides, slideLayout, index, content));
}
```

VII. Managing an Object Hierarchy

As described above, a software robot may use an object hierarchy to control active GUI elements of one or more other computer programs to cause the other computer program(s) to perform a task. This section describes some techniques used for managing the object hierarchy including techniques for refreshing the object hierarchy, searching for objects in it, and conditionally accessing the object hierarchy.

A. On-Demand Refreshing of Object Hierarchy

As described above, when a software robot uses an object hierarchy to control one or more computer programs to perform a task by using the object hierarchy to control the active GUI elements of the computer program(s), an object hierarchy may need to be refreshed, for example, to reflect any changes in the active GUI elements that may occur during performance of the task. The inventors have appreciated that refreshing the entire object hierarchy, which may contain a large number of objects corresponding to active GUI elements of multiple computer programs, may be computationally expensive and take too long to be practical. Even refreshing only an application-specific portion of the object hierarchy (i.e., the portion of the hierarchy consisting of all the objects corresponding to active GUI elements of a particular application program) may be impractical because that portion of the hierarchy may contain a large number of objects, and it may take too long to refresh all these objects. As such, the inventors have recognized that reducing the number of objects in a hierarchy that are refreshed will improve performance of software robots.

Accordingly, in some embodiments, objects in the object hierarchy are refreshed "on demand" such that when a software robot accesses an object corresponding to an active GUI element of a computer program, and determines that the object is to be refreshed, the object is refreshed along with a minimal number of other objects corresponding to the active GUI elements of the same computer program. Examples of circumstances in which an object in the object hierarchy is to be refreshed are described herein, including above with reference to FIGS. 10A-C.

The inventors have appreciated that when a particular object in the object hierarchy needs to be refreshed, it is frequently the case that its parent object also needs to be refreshed. The parent object's parent object may also need to be refreshed, and so on. Thus, when an object is to be refreshed, multiple objects on a path between the object and the root object of the object hierarchy may be refreshed.

Accordingly, in some embodiments, a reverse tree traversal technique is applied to refreshing a particular object such that not only is the particular object refreshed but so is any object that requires refreshing and lies along a path from the root of the hierarchy to the particular object. To refresh a particular object "O" in the object hierarchy, the reverse tree traversal technique begins by following the structure of the hierarchy in reverse, from the particular object "O" to the root of the hierarchy, until the first valid object "V" (i.e., an object that does not need refreshing) is found. A record of the path traversed is maintained (e.g., by storing information indicating which objects in the hierarchy were encountered on the path from object "O" to object "V").

Next, the technique involves refreshing descendant objects of object "V". However, not all descendant objects of object "V" are refreshed. Rather, each of the objects along the path from "V" to "O" is refreshed along with their immediate children. In this way, objects in the hierarchy that are not needed by the software robot are not refreshed and the unnecessary overhead of refreshing such "inactive" parts of the tree is avoided. To this end, all immediate children of object "V" are refreshed. Next, the child object "C1" of object "V" that lies in the path from "V" to "O" is selected and its immediate child objects are refreshed. Next, the child object "C2" of object "C1" that lies in the path from "C1" to "O" is selected and its immediate child objects are refreshed, and so on until all the objects in the path from object "V" to "O" are refreshed.

Figure 16A:
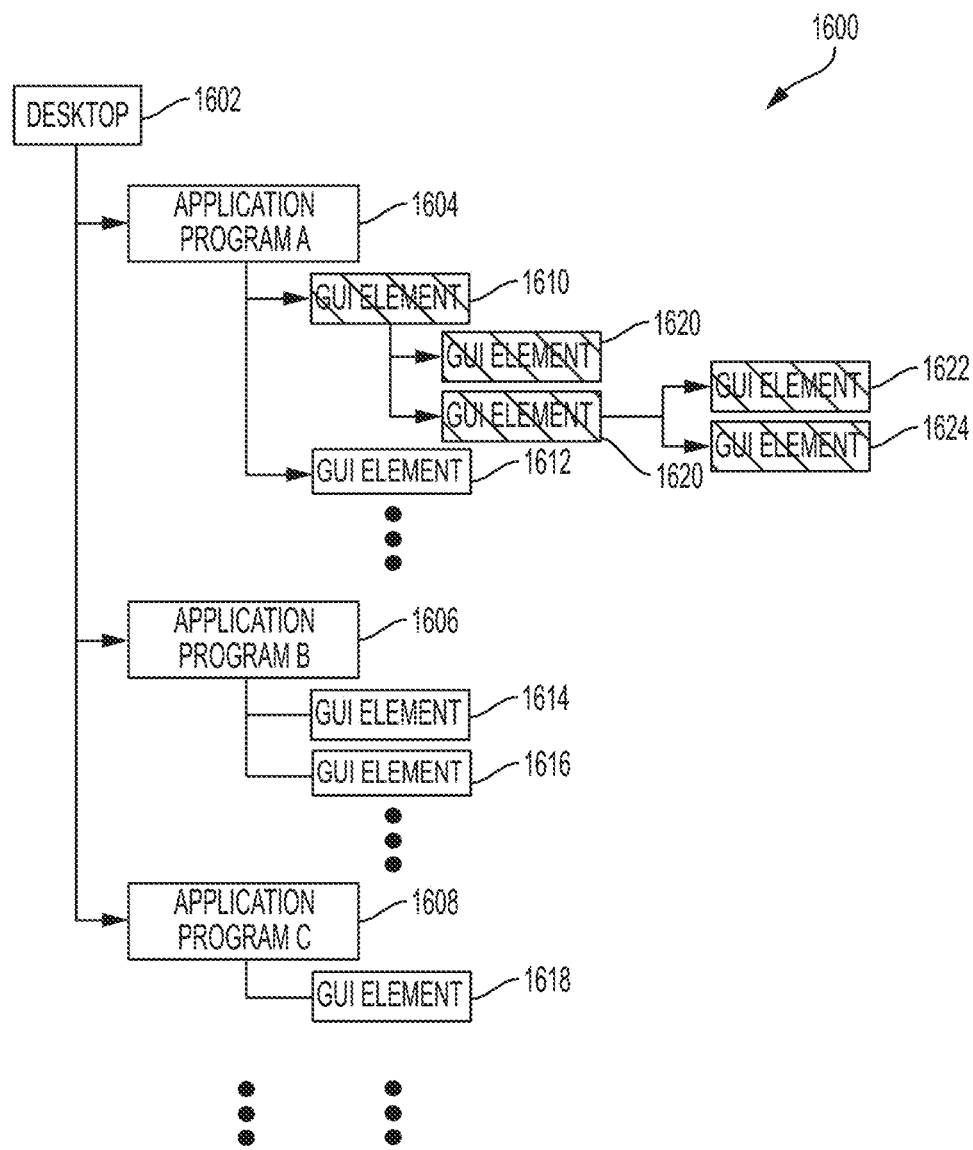
FIGS. 16A-16C illustrate using reverse tree traversal to refresh an object hierarchy, in accordance with some embodiments of the technology described herein.
Figure 16B:
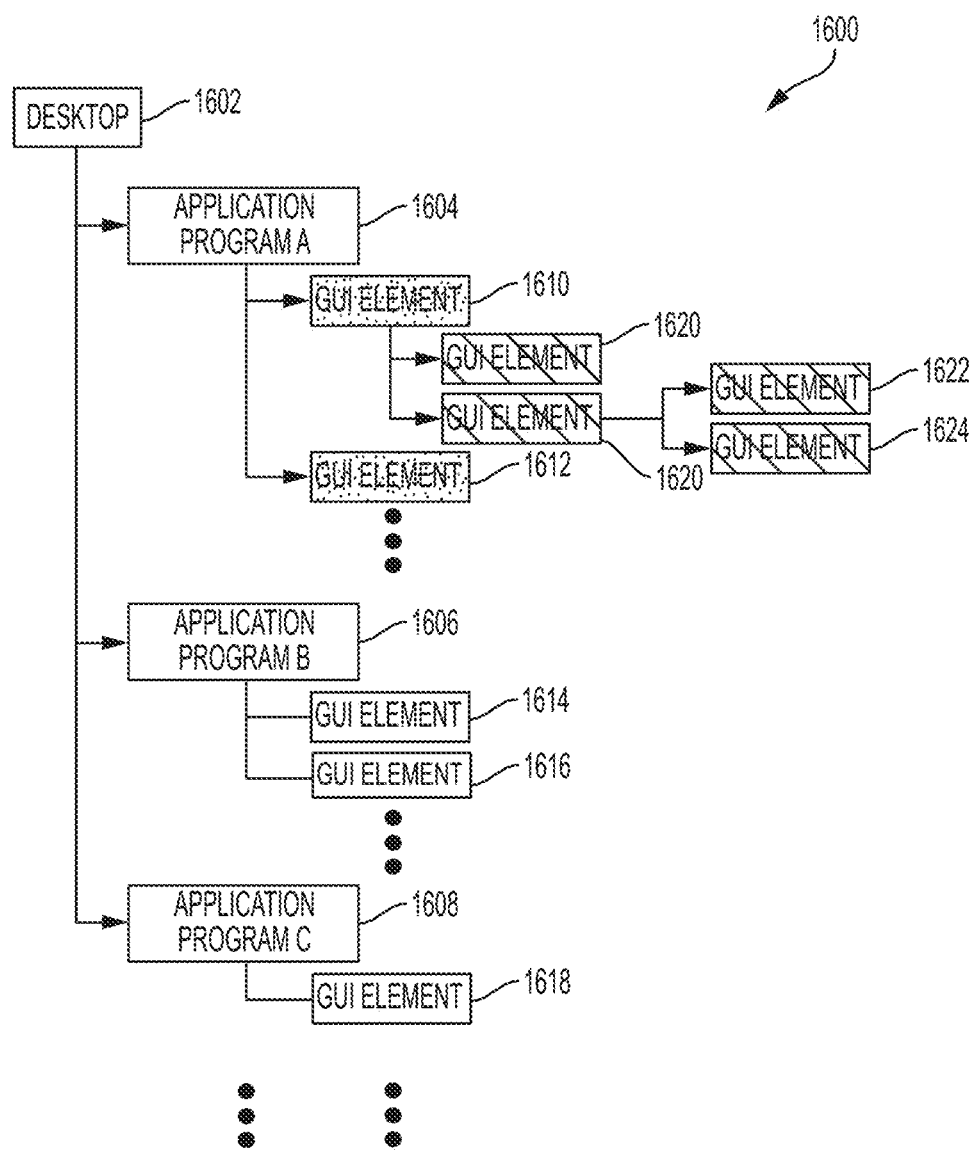
Figure 16C:
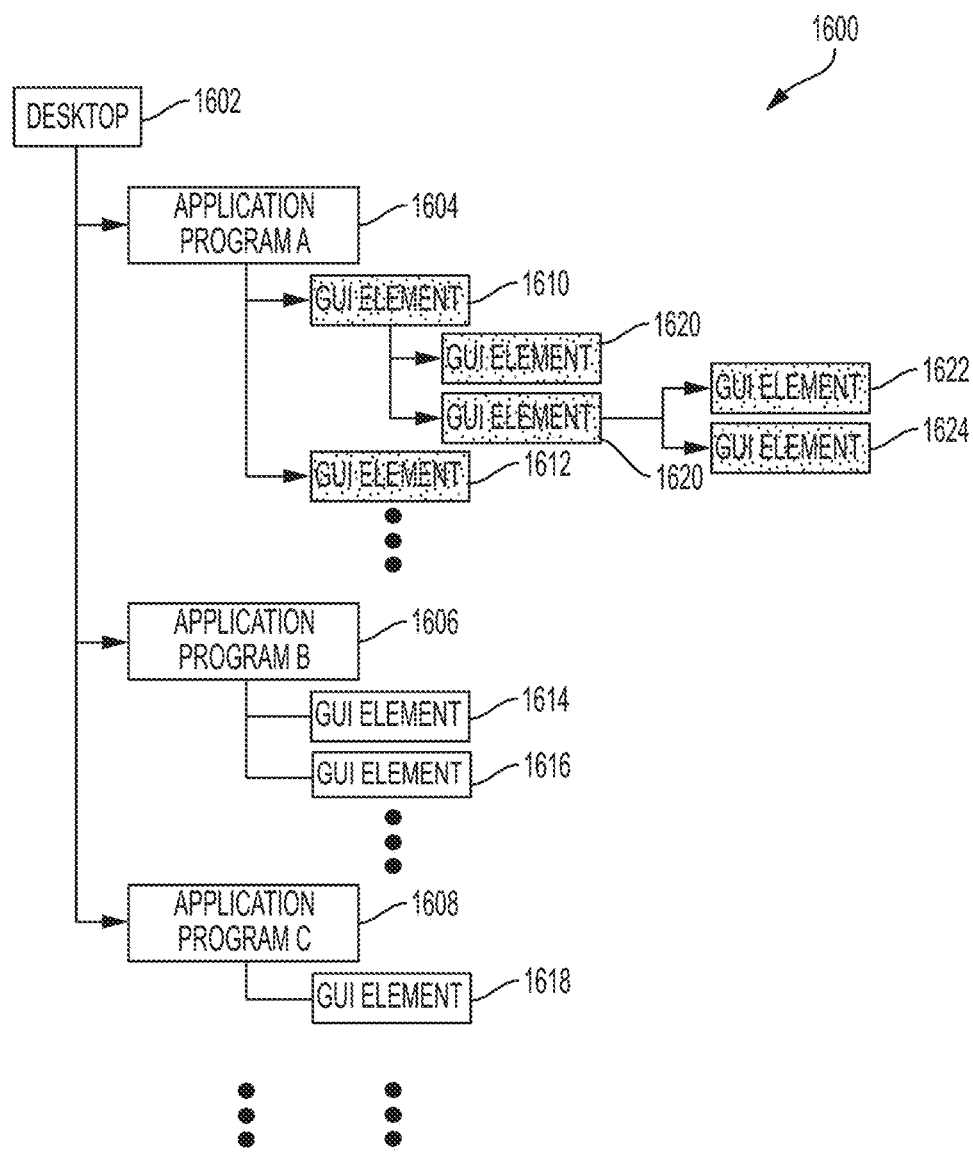

FIGS. 16A-16C show an example of refreshing an object hierarchy 1600 using the above-described reverse tree traversal technique. As shown in FIG. 16A, the root of object hierarchy 1600 is "desktop" object 1602 whose children include object 1604 corresponding to a GUI container of Application A, object 1606 corresponding to a GUI container of Application B, and object 1608 corresponding to a GUI container of Application C. The children of object 1604 include objects 1610 and 1612, the children of object 1610 include objects 1620 and 1621, and the children of object 1621 include objects 1622 and 1624. Each of objects 1610, 1612, 1620, 1621, 1622, and 1624 corresponds to an active GUI elements of Application A. The children of object 1606 include objects 1614 and 1616, each of which corresponds to active GUI elements of Application B. The children of object 1608 include object 1618, which corresponds to an active GUI element of Application C.

In this example, objects 1610, 1620, 1621, 1622, and 1624 need to be refreshed, which is indicated by the diagonal lines shown on these objects. On the other hand, objects 1606, 1608, 1612, 1614, 1616, and 1618 need not be refreshed. Suppose that during execution of a software robot, the software robot attempts to access object 1624 and it is determined that object 1624 is to be refreshed. In this example, applying the reverse tree traversal technique begins by following the structure of the object hierarchy 1600 from object 1624 toward the root object 1602, until the first object that does not need refreshing is found. In this example, that first object is object 1604. A record of the path traversed from object 1624 to object 1604 is maintained (e.g., by storing information indicating that objects 1621 and 1610 were encountered on the path from object 1624 to object 1604).

Next, the descendant objects of object 1604 are refreshed. However, not all descendant objects of object 1604 are refreshed. Rather, each of the objects along the path from 1604 to 1624 is refreshed along with its immediate children. In this way, objects in the hierarchy that are not needed by the software robot are not refreshed and the unnecessary overhead of refreshing such "inactive" parts of the tree is avoided. To this end, all immediate children of object 1604 are refreshed (i.e., objects 1610 and 1612 are refreshed as indicated by the dotting shown in FIG. 16B—dotted objects have been refreshed). Next, the child object 1610 of object 1604 is selected, because it lies on the path from object 1604 to object 1624, and its immediate child objects are refreshed (i.e., objects 1620 and 1621 are refreshed). Next, the child object 1621 of object 1610 is selected, because it lies on the path from object 1604 to object 1624, and its immediate child objects are refreshed including objects 1622 and 1624, at which point the refreshing is completed because, as shown by the shading in FIG. 16C, each of the objects along the path from 1604 to 1624 has refreshed along with their immediate children.

As this example illustrates, only a subset of the objects in the hierarchy 1600 were refreshed. For example, the objects corresponding to active GUI elements of application programs B and C were not refreshed. In addition, child objects of object 162 (not shown) were not refreshed. As such, not every object corresponding to an active GUI element of application program A was updated.

Figure 17A:
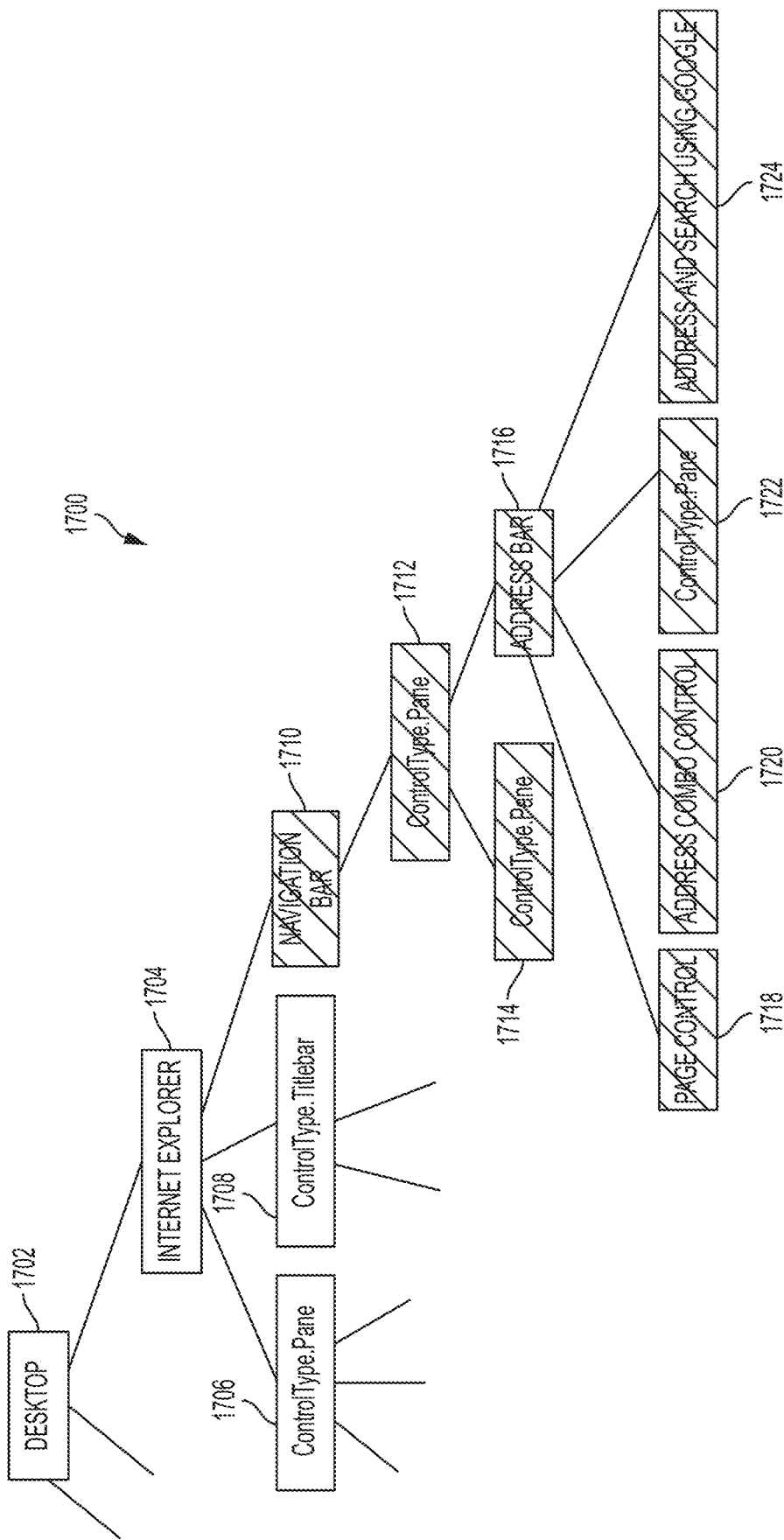
FIGS. 17A-17C provide another illustration of using a reverse tree traversal technique to refresh an object hierarchy, in accordance with some embodiments of the technology described herein.
Figure 17B:
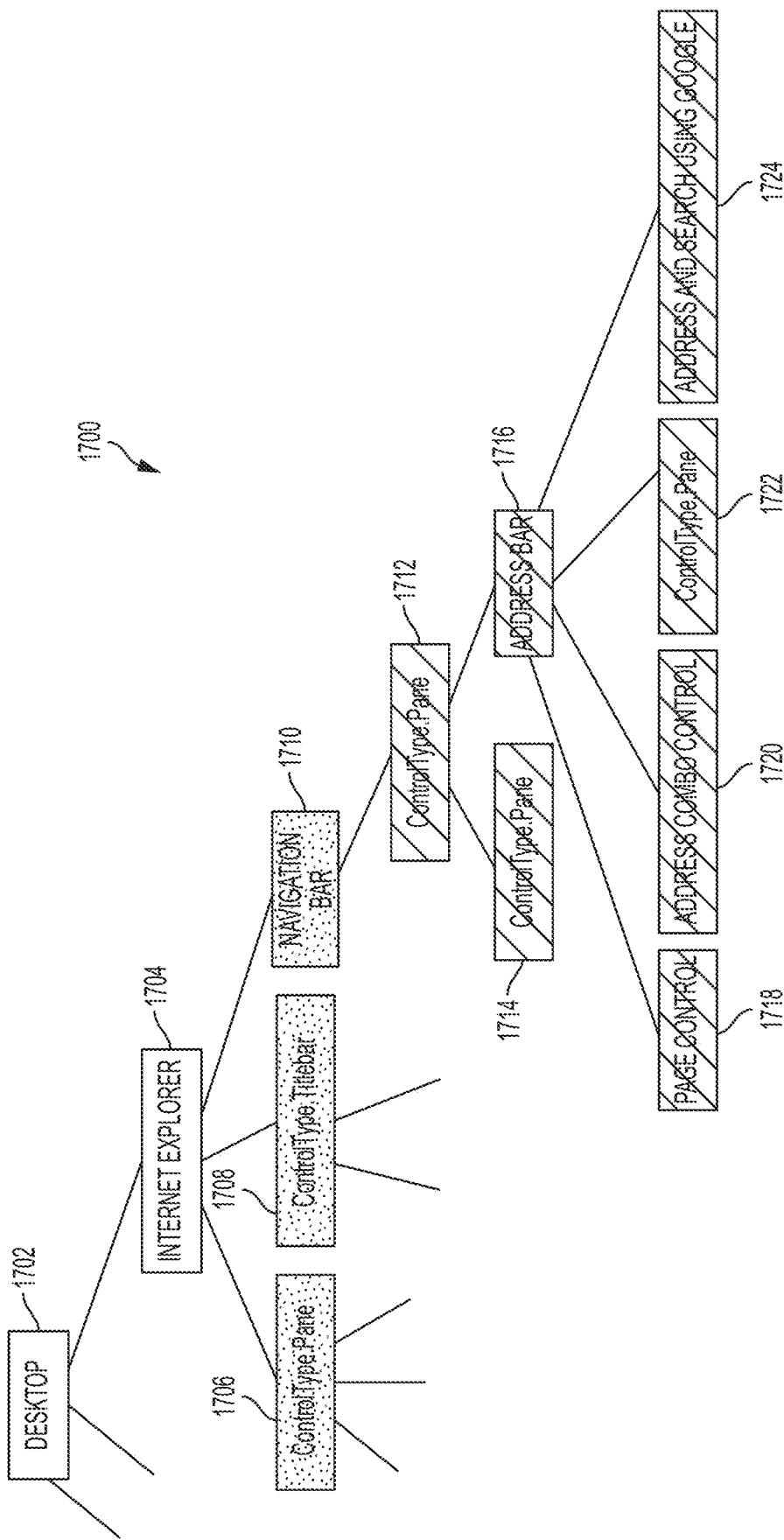
Figure 17C:
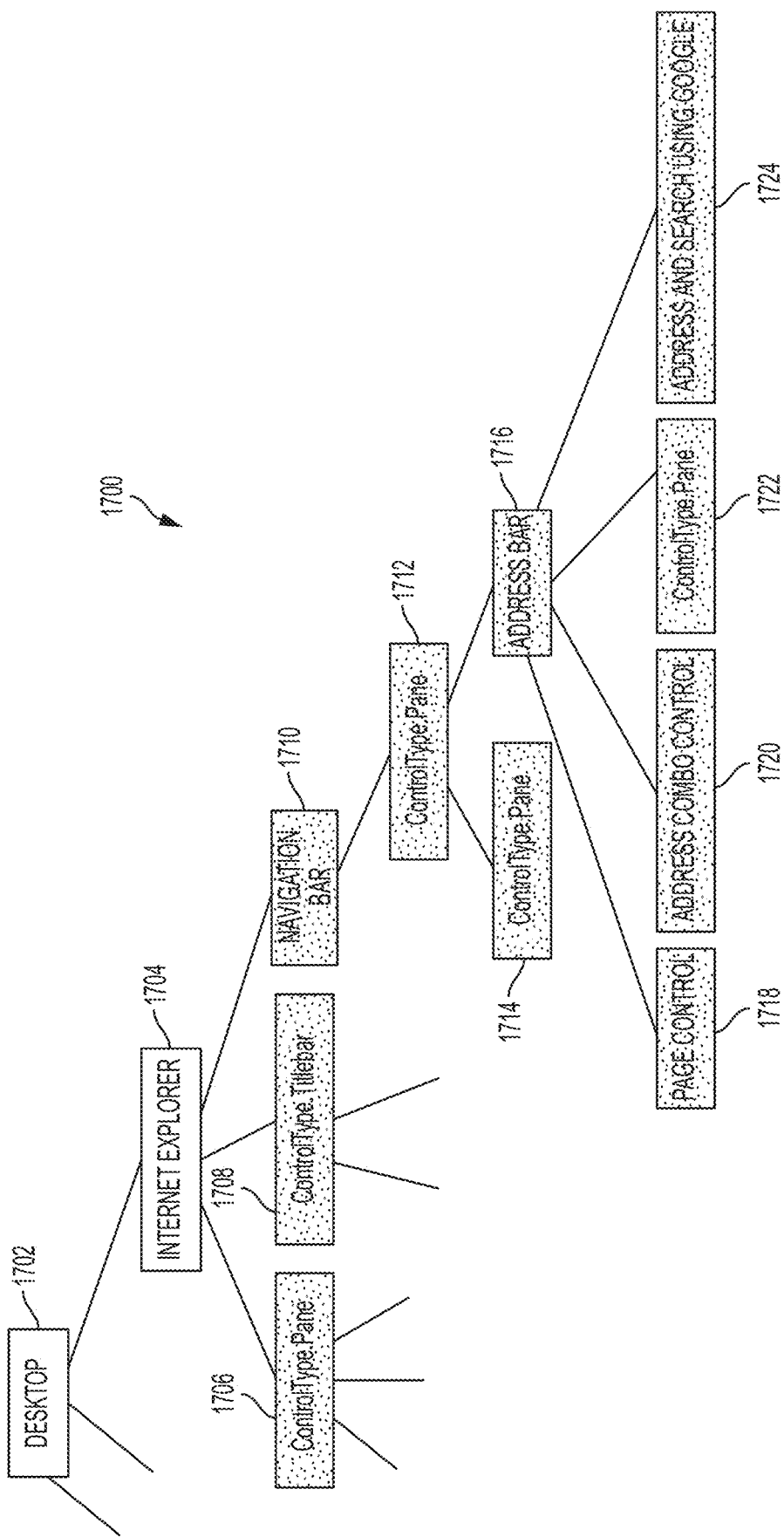

FIGS. 17A-17C provide another example of refreshing an object hierarchy, object hierarchy 1700 in this example, using the above-described reverse tree traversal algorithm. As shown in FIG. 17A, the root of object hierarchy 1700 is "desktop" object 1702 whose children include object 1704 corresponding to a GUI container of the Internet Explorer (IE) application program. The children of object 1704 include object 1706 corresponding to a pane GUI element, object 1708 corresponding to a toolbar GUI element, and object 1710 representing the IE navigation bar. Object 1712 is a child of object 1710 and corresponds to a pane GUI element. The children of object 1712 include object 1714 corresponding to a pane GUI element and object 1716 that corresponds to an address bar GUI element. The children of object 1716 include object 1718 corresponding to a page control GUI element, object 1720 corresponding to an address combo control GUI element, object 1722 corresponding to a pane GUI element, and object 1724 that corresponds to a GUI element representing a search control that causes the text in the address bar to be searched using an Internet search engine.

In this example, objects 1710-1724 in the hierarchy need to be refreshed, which is indicated by the diagonal lines shown on these objects, whereas objects 1702-1708 need not be refreshed. Suppose that during execution of a software robot, the software robot attempts to access object 1724, which needs to be refreshed. Applying the reverse tree traversal technique to refresh object 1724 begins by following the structure of the hierarchy 1700 from object 1724 toward the root object 1702, until the first object that does not need refreshing is found, which in this example is object 1704. A record of the path traversed from object 1724 to object 1704 is maintained (e.g., by storing information indicating that objects 1710, 1712, and 1716 were encountered on the path from object 1724 to object 1704).

Next, the descendant objects of object 1704 are refreshed. Specifically, each of the objects along the path from 1704 to 1724 is refreshed along with its immediate children. In this way, objects in the hierarchy 1700 that are not needed by the software robot are not refreshed and the unnecessary overhead of refreshing such "inactive" parts of the tree is avoided. First, all immediate children of object 1704 are refreshed (i.e., objects 1706, 1708, and 1710 are refreshed as indicated by the dotting shown in FIG. 17B—the dotted objects have been refreshed). Next, the child object 1710 of object 1704 is selected, because it lies on the recorded path from object 1704 to object 1724, and its immediate child object 1712 is refreshed. Next, the child object 1716 of object 1712 is selected, because it lies on the path from object 1704 to object 1724, and its immediate child objects are refreshed including objects 1720, 1722, and 1724, at which point the refreshing is completed because, as shown by the dotting in FIG. 17C, each of the objects along the path from 1704 to 1724 has been refreshed along with its immediate children. As illustrated in this example, only a subset of the objects in the hierarchy 1700 were refreshed. For example, the child objects of objects 1706 and 1708 were not refreshed, and neither were any objects corresponding to GUI elements of other application programs.

B. Refreshing Object Hierarchy Using Visual Cues

Another technique developed by the inventors for improving the efficiency with which an object hierarchy is refreshed is described in this subsection. As discussed above, refreshing fewer objects in an object hierarchy may speed up execution of software robots that control computer programs via the object hierarchy. The inventors have recognized that, in some embodiments, it may be advantageous to refresh only those objects in the object hierarchy that correspond to active GUI elements that have changed since the last time the object hierarchy was refreshed. In this way, computational resources are not wasted on refreshing objects that, upon being refreshed, would contain and/or be associated with exactly the same information as prior to being refreshed. As an analogy, using an Internet browser to refresh a webpage would waste computational and network resources if the content of the webpage has not changed.

Accordingly, the inventors developed a technique for refreshing an object hierarchy that includes identifying which objects in the hierarchy need to be refreshed, and refreshing at least the identified objects (e.g., only the identified objects, the identified objects and their descendants, etc.). Although it is possible to identify which objects in the hierarchy need to be refreshed by iteratively accessing objects in the hierarchy and determining whether each of the accessed objects is to be refreshed (e.g., by checking via calls to one or more APIs and/or operating systems whether each accessed object is to be updated), such iterative traversal of the hierarchy may be as computationally expensive as refreshing the entire hierarchy, and is therefore inefficient.

In some embodiments, visual cues may be used to identify which objects in the object hierarchy are to be refreshed. The visual cues may include features obtained at least in part by identifying visually discernible changes in visible active GUI elements of one or more computer programs. Since an object hierarchy includes objects that correspond to visible active GUI elements, identifying visually discernible changes in the visible active GUI elements may be used to identify which objects in the object hierarchy are to be refreshed. Accordingly, in some embodiments, refreshing an object hierarchy may comprise: (1) identifying one or more visible active GUI elements that have undergone visually discernible changes over a time period; (2) identifying objects in the object hierarchy corresponding to the identified visible active GUI element(s); and (3) refreshing the identified objects and, in some embodiments, their descendants.

Figure 18C:
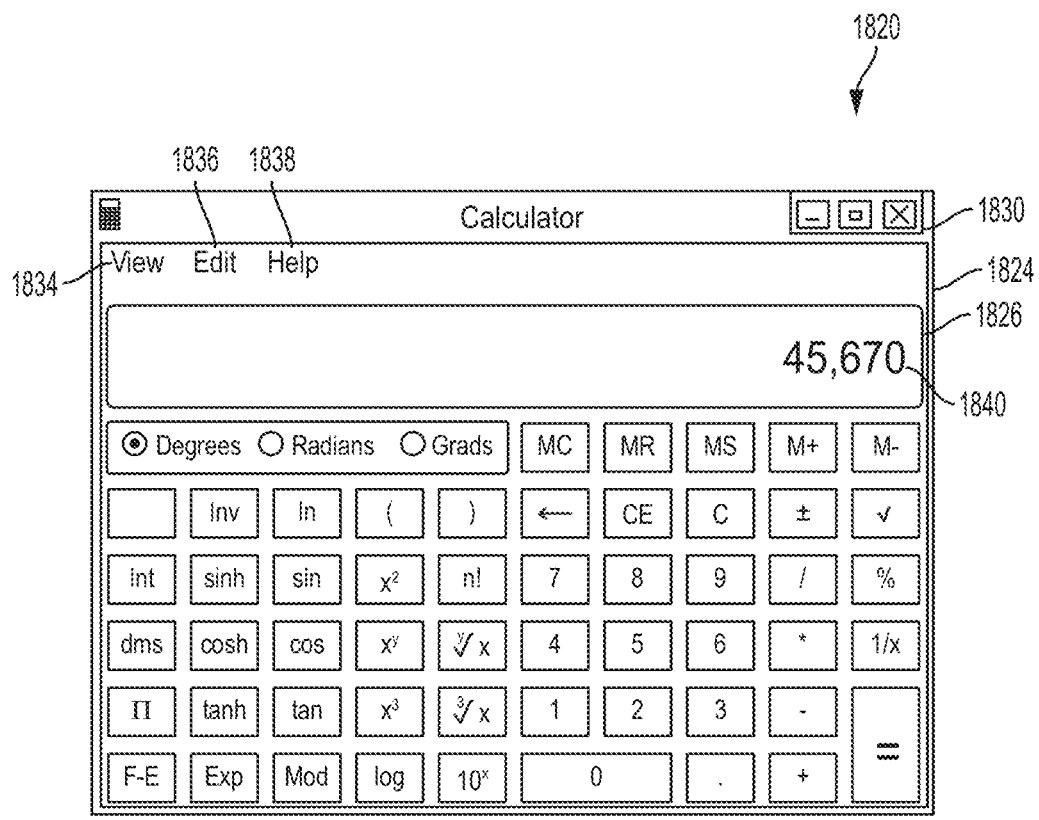

An example of this technique is illustrated with respect to FIGS. 18A-C. FIG. 18A shows a portion of an object hierarchy 1800 containing objects corresponding to active GUI elements of the calculator program shown in the illustrative display screen 1820 of FIG. 18B. The root of hierarchy 1800 is "Desktop" object 1802 that corresponds to the desktop interface of the WINDOWS operating system (not shown). Children of root object 1800 include calculator object 1804 corresponding to GUI element 1824 of the calculator program. Descendants of calculator object 1804 include pane object 1806 corresponding to results pane 1826 representing the GUI element displaying results of calculations, title bar object 1810 corresponding to GUI element 1830 representing the title bar, and application object 1812. Child objects of application object 1812 include objects 1814, 1816, and 1818 corresponding to active GUI elements 1834, 1836, and 1838, respectively. Pane object 1806 has child object 1808 corresponding to the result value 1828 shown in the results pane 1826, which result value in this example is zero.

Assuming that, at time A, objects in hierarchy 1800 reflect the most current state of active GUI elements of the calculator program, the challenge is to efficiently determine, at a later time B, which objects in hierarchy 1800 are to be refreshed without iteratively traversing each of the objects in hierarchy 1800. Suppose that, after time A and before time B, the calculator program was automatically controlled by a software robot to perform various calculations such that, at time B, the GUI calculator program is as shown in FIG. 18C. The only visually discernible difference between FIGS. 18B and 18C is that the value 1840 (i.e., 45,670) shown in FIG. 18C is different from value 1828 (i.e., 0) shown in FIG. 18B. Based on the determination that the only change among the visible active GUI elements is in the result value, it may be determined that object 1808, which corresponds to the result value, has changed in a visually discernible way and should be refreshed such that the result value stored by the object 1808 is 45,670 and not zero. Conversely, it may be determined that no other objects in hierarchy 1800 that correspond to active GUI elements of the calculator program should be refreshed since no other active GUI elements have changed in a visually discernible way. Accordingly, in this example, only one object in the hierarchy 1800 is refreshed, and no computational resources are wasted in traversing the entire subtree of objects corresponding to all active GUI elements of the calculator program.

Any of numerous techniques may be used to identify active GUI elements that have undergone visually discernible changes over a period of time. In some embodiments, a first set of features obtained from each of one or more active GUI elements at a particular time may be compared with a second set of features obtained later from each of the one or more active GUI elements. The results of comparing the first set of features with the second set of features may be used to identify the active GUI elements that have changed in a visually perceptible way by identifying the active GUI elements whose corresponding first and second features do not match.

The features may be of any suitable type and, for example, may be obtained by applying an image processing technique to the active GUI elements. In some embodiments, the features may be obtained by applying a hash function to each of one or more of the active GUI elements. For example, a visual hash may be computed for a bounding box of each of one or more active GUI elements visible at time A to obtain a first set of visual hashes. Next, a visual hash may be computed for a bounding box of each of one or more active GUI element visible at a later time B to obtain a second set of visual hashes. The first and second sets of visual hashes may be compared to identify active GUI elements that have changed, from time A to time B, by identifying those active GUI elements whose corresponding visual hashes in the first and second sets do not match one another. A visual hash for an active GUI element may be computed using any suitable hash function. In some embodiments, images of the GUI elements obtained at different times may be compared with one another (e.g., by comparing pixels of the images) to identify any active GUI elements that have undergone visually discernible features over a period of time.

In some embodiments, the above-described technique may be implemented recursively by relying on the containment relationships among the active GUI elements. For example, when a visual hash for a bounding box of a visible active GUI element does not change over a period of time, it may be determined (depending on the visual hash function used) not only that the active GUI element did not change in a visually discernible way, but also that none of the active GUI elements contained within that bounding box changed in a visually discernible way. Thus, when a visual hash for a bounding box of a visible active GUI element does not change over time, it may be determined that it is unnecessary to refresh either the particular object in the hierarchy corresponding to the visible active GUI element or any of the objects in the subtree rooted at the particular object. As such, when the visual hash for a bounding box of a particular visible active GUI element does not change over a period of time, it is unnecessary to compute the visual hash for any active GUI elements contained within the particular visible active GUI element. In this way, the technique may be implemented more efficiently because a visual hash need not be computed for all active GUI elements.

On the other hand, when a visual hash for a bounding box of a visible active GUI element does change over a period of time, the technique recursively examines children of the object corresponding to the visible active GUI element to determine whether the visual hashes of the GUI elements to which they correspond (which would be contained within the visible active GUI element) have changed over the period of time. In this way, active GUI elements that have changed in a visually discernible way may be identified along with the objects in the hierarchy that correspond to these objects and which need to be refreshed.

C. Searching for Objects in the Object Hierarchy

A software robot needs to access objects in the object hierarchy so that it may be use the accessed objects to control one or more other computer programs to perform actions. To this end, a software robot may need to search for the object in the object hierarchy and, once the object is found, obtain a handle to the found object. Accordingly, in some embodiments, a software robot may include one or more instructions to search for one or more objects that, when executed, search for the object(s) in the object hierarchy. Each such instruction may include a search string that specifies the object(s) that are to be searched for in the object hierarchy.

One non-limiting example of an instruction to search for an object in the object hierarchy is the instruction "_calc.Select("@Clear::'ControlType.Button'")", which was shown above in Table 5. This instruction, when executed, searches the object hierarchy for an object named "Clear" of control type "Button." Accordingly, the instruction, when executed, searches the object hierarchy for an object that corresponds to the active GUI element of the calculator application program that represents the "Clear" button. Another non-limiting example of an instruction to search for an object in the object hierarchy is the instruction "_outlook.Select("@'New Email'::'ControlType.Button'")," which was shown above in Table 20. This instruction, when executed, searches the object hierarchy for an object named "New Email" of type "ControlType.Button." Accordingly, the instruction, when executed, searches the object hierarchy for an object that corresponds to the active GUI element of the Outlook e-mail application program that represents the "New E-mail" button. Various other examples of search instructions are described herein.

In some embodiments, instructions to search for objects in an object hierarchy may include search strings formatted in accordance with a search grammar Search strings that conform to the search grammar do not include any content (e.g., syntax, labels, names, identifiers, etc.) that is specific to any one particular GUI technology and, as such, may be used to search for objects in the object hierarchy in a manner that is agnostic to and independent of the particular GUI application libraries that are used to implement the GUI elements to which the objects being searched for correspond. For example, an object hierarchy may contain an object corresponding to an active GUI element representing a button in a JAVA application and another object corresponding to an active GUI element representing a button in a WINDOWS application implemented using the WINDOWS GUI application library. Because these buttons are implemented using different GUI technologies, the buttons may have different properties, methods, and naming conventions. However, when the buttons are represented by unified objects as part of a unified hierarchy, search strings formatted in accordance with the search grammar do not include any content that is specific to the underlying GUI technologies (i.e., JAVA GUI application library and WINDOWS GUI application library) used to implement these buttons and, in this way, the search strings are independent of these underlying GUI application libraries or technologies. Thus, in some embodiments, search strings may be independent of any GUI technology. In other embodiments, however, the search strings may be technology specific.

Accordingly, in some embodiments, a common search language consisting of search strings formatted in accordance with a search grammar may be used to search for objects that correspond to active GUI elements implemented using different GUI application libraries. Without such a common search language implemented in the context of a unified hierarchy, as described herein, a programmer would have to utilize (and software robots would include) search strings having content specific to each GUI application library, which would result in cumbersome code that is not only difficult to maintain, but also is likely to contain errors.

In some embodiments, the search grammar includes multiple types of elements including tokens, relationship operators, and action operators. A token in the search grammar is any element that refers to a property of an object in the object hierarchy. Examples of tokens include, but are not limited to, the token "@" which refers to the name of an object (e.g., "Clear"), "#" which refers to the ID of an object, "::" which refers to the type of the object (e.g., "Button", "Window", "Pane," etc.), "." which refers to the class of the object, "::[ ]" which refers to a list of object types, and ":::" which refers to a property of the object. As one example, the search string "@A::Type1" may be used to find an object named "A" having type of "Type1." As another non-limiting example, the search string "@'New Email'::'ControlType.Button'" may be used to find an object named "New Email" having type "Button." As yet another example the search string "@a:::href('http://www.google.com')" may be used to find an object named "a" (e.g., an anchor an HTML webpage) having the property that it is associated with a hyperlink to the GOOGLE website.

A relationship operator is any element in the search grammar that expresses a relationship between two objects. For example, the relationship operator ">" indicates that the object following the operator is a descendant of the object preceding the operator. Thus, the string "A>B" indicates that object B is a descendant of object A. As another example, the relationship operator ">n" indicates that the object following the operator is a descendant of the object preceding the operator and that there are at most (n-1) objects separating these two objects. Thus, the string "A>1 B" indicates that object B is an immediate descendant of object A in the object hierarchy (i.e., there are no other objects separating them), and the string "A>2 B" indicates that object B is at depth at most two away from object A in the object hierarchy (i.e., there is at most one object on separating objects A and B).

As one example of a search string containing a relationship operator, the search string "@A:Type1>@B:Type2," shown in the second row of Table 26 below, is a search string that may be used to find an object named "B" having type of "Type2" that is a descendant of an object named "A" and having type of "Type1." This illustrative search string further indicates that the search is to begin at the portion of the object hierarchy rooted at the object named "A." As another example, the search string "@A:Type1>2 @B:Type2," shown in the third row of Table 26 below, is a search string that may be used to find an object named "B" having type of "Type2" that is a descendant of an object named "A" and having type of "Type1," and is no more than two away from object "A." This search string also indicates that the search is to begin at the portion of the object hierarchy rooted at the object named "A."

An action operator is any element in the search grammar that represents an action to be performed on an object in the object hierarchy after the object is found. For example, action operator "+", when following a particular object, indicates that the particular object is to be "clicked" and the results of the click are to be returned. As one example of a search string containing the action operator "+", the search string "(@A:Type1)+" may be used to: (1) find an object named "A" and having type of "Type 1"; (2) click on the object once it is found; and (3) return the object after it has been clicked. As another example of a search string containing the action operator "+", the search string "(@A:Type1>@B:Type2>@C:Type3)+" may be used to: (1) search for an object named "C" of type "Type3," which is a descendant of object "B" of type "Type2", which is a descendant of object "A" of type "Type1"; (2) click on the object once it is found; and (3) return the object after it has been clicked. As discussed in more detail below, the action operators allow for the object hierarchy to be modified as a particular object of interest is being accessed.

It should be appreciated that the above-illustrated examples of elements of the search grammar are illustrative and non-limiting and that a search grammar may include one or more other elements in addition to or instead of the above-described elements. For example, in some embodiments, the search grammar may include the elements shown below in Table 26, which illustrates the elements along with mandatory and optional parameters for these elements and examples of how these elements are used in search strings. Table 27 shows additional examples of search strings that include the above-described search grammar elements and provides descriptions of how searching with these illustrative search strings is performed.

TABLE 26

Illustrative elements of a search grammar. For each element in the search grammar any mandatory and optional parameters are shown along with an illustrative search string.

| Element | Parameter | Mandatory Element | Optional Element | Example Use |
|---------|-----------|-------------------|------------------|-------------|
| @ | Name | Name of the element | | @View |
| # | ID | Id of the element | | @View#MyView |

TABLE 26-continued

Illustrative elements of a search grammar. For each element in the search grammar any mandatory and optional parameters are shown along with an illustrative search string.

| Element | Parameter | Mandatory Element | Optional Element | Example Use |
|---|---|---|---|---|
| :: | Type | Type of the element | | ::ControlType |
| . | Class | Class of the element | | ::ControlType.MenuItem |
| ::[ ] | Multiple Types | At least one element type | | ::[ControlType.MenuItem \| ControlType.Button] |
| > | Child of | | Bounded search depth | @View >3 @Submit::ControlType.Button |
| ! | Reset Search | | | |
| + | Expand/Click | | Delay before expand/click | +200 |
| ^ | Case Sensitive | | | @View^ |
| * | Get Children of | | | @View^* |
| ::: | Property of | | | @a:::href('http://www.google.com') |
| ~ | Fuzzy match | | | @Vi~ (will match on @View) |
| :nth-child(x) | Nth child (0-based index) | | | @View:nth-child(0)-Find the "View" element that is the very first child of its parent. |
| :nth-child(x) | Nth child (0-based index) | | | @View >1 :nth-child(0)-Find the "View" element, and find its very first child. |
| :nth-child(x) | Nth child (0-based index) | | | @View > :nth-child(0)-Find the "View" element, and find all of its descendants that are the very first child of their parent. |

TABLE 27

Illustrative search strings formatted in accordance with the search grammar specified in Table 26, along with brief explanations of what occurs when the search string is executed.

| Search String | Explanation |
|---|---|
| self._appRoot.Select("@Application > @View::ControlType.MenuItem+ !> @Scientific::ControlType.MenuItem") | Find an element whose name is Application with a child named View that has a type ControlType.MenuItem. Expand/click on that item. Reset the search pointer to the same place the search originally started from, and then search for @Scientific::ControlType.MenuItem. |
| self._html.Select("@button:::name('Print box labels')") | Find an element with the name button, who has a property called name with a value of "Print box labels". This would match on this html element: <button name="Print box labels"> |
| self._html.Select("@input:::name (numOfPackages)") | Find an element with the name input who has a property called name with a value of numOfPackages. This would match on this html element: <input name="numOfPackages"> |
| self._html.Select("@input#username") | Find an element with the name input who has an ID with a value of username. This would match on this html element:<br><input name="anything" id="username"> |
| self._html.Select("@span.'button_label'") | Find an element with the name span who has a class of button_label. This would match on this html element: <span id="anything" name="anything" class="button_label"> |
| self._html.Select("@td:nth-child(1):::inner_text('Long Pants')~") | Find an element with the name td and get its 2nd child (zero indexed), where that 2nd child has inner text with a value of "Long Pants". |
| self._html.Select("@a:::href('http://www.google.com')") | Find an element with the name a that has a property href whose value is "http://www.google.com". This would match on the HTML element <a href="http://www.google.com"> |
| self._html.Select("@a:::inner_text('Hello')") | Find an element with the name a that has the inner text "Hello". This would match on the HTML element<a href="anything">Hello</a> |

It should be appreciated that a search for an object in the object hierarchy need not be performed by searching through the entire hierarchy and may be performed in a specified portion of the hierarchy. To this end, a search string may indicate that the search is to be performed in a portion of the hierarchy rooted at a particular object. For example, the search string "@A>@B" indicates that the search for object named B is to be performed in the portion of the object hierarchy rooted at the object "A." In other words, the search is initiated at object "A," and the search algorithm iterates through the descendants of the object "A" (e.g., recursively, via breadth-first search, depth-first search, etc.) to identify any descendant objects that match the search criteria (that are named "B" in this illustrative example). In this way, objects in the hierarchy, which are not descendants of object "A," are not examined, speeding up the search.

The inventors have appreciated that, in some embodiments, a programmer creating a software robot may need to write a series of multiple instructions in order for the software robot to perform a relatively simple task of accessing a desired object in the object hierarchy. For example, a software robot may wish to access the object representing the menu item "Scientific," in the "View" menu of the calculator program, that, when clicked, places the calculator program in scientific mode. This may be accomplished by: (1) searching for the object representing the "View" menu of the calculator program; (2) clicking on this object thereby causing the View menu to expand; (3) refreshing the object hierarchy to add objects corresponding to the now active GUI elements representing menu items in the expanded view menu; and (4) searching for the object corresponding to the active GUI element representing the "Scientific Menu" item. Implementing this series of acts using multiple instructions (e.g., four instructions for the four acts), would place the burden would be on the programmer creating the software robot to write all these instructions resulting in a substantial amount of code to perform a relatively straightforward task. When the object being accessed corresponds to a GUI element buried even deeper in the menus of an application, the developer would have to write even more instructions to access a single object, further exacerbating the problem.

To address this issue, in some embodiments, the search grammar includes one or more action operators. The action operators may be used to modify the object hierarchy as it is being searched for an object. The hierarchy may be modified to ensure that the modified hierarchy includes the object being searched for even if that object was not part of the hierarchy when the search began.

In the above example, the object corresponding to the "Scientific" menu item is not part of the object hierarchy when the search for the object representing the "View" menu of the calculator program is performed. As a result, multiple instructions have to be written by the programmer to access the object corresponding to the "Scientific" menu item. However, using action operators of the search grammar (e.g., the elements "+" and "!"), the "Scientific" menu item may be accessed via the single instruction shown in the first line of Table 27. As shown, this instruction, when executed, first finds an object named "View" that has a type "ControlType.MenuItem" and is a descendant of the object named "Application" (this is reflected in the "@Application>@View::ControlType.MenuItem" portion of the search string), then clicks on the object thereby expanding the menu (this is reflected by the "+" appearing after the @View::ControlType.MenuItem" portion of search string), causing the object hierarchy to be refreshed, and finally causes the search to continue for the object representing the "Scientific Menu Item" (this is reflected by the "!>@Scientific::ControlType.MenuItem" portion of the search string). In this way, a single search instruction, instead of four, may be used to access the object corresponding to the "Scientific" menu item.

As another example, the search string ""@File::'ControlType.MenuItem'+!>@'SaveAs'::'ControlType.MenuItem'"" may be used to search for an object in the object hierarchy corresponding to the "Save As" button in the File menu of the MICROSOFT WORD program. When a search is performed based on this search string, the system obtains a handle to the object corresponding to the "File" menu item, clicks on that menu item via the object, modifies the object hierarchy to include objects corresponding to the now active GUI elements representing menu items in the expanded "File" menu, and searches for the object corresponding to the "Save As" button in the modified object hierarchy. Once again, in this way, a single search instruction may be used to access the object corresponding to the "Scientific" menu item.

As may be appreciated from the foregoing examples, in some instances, instead of writing multiple search instructions to search for an object in the object hierarchy, a developer of a software robot may write a single search instruction that includes one or more action operators to search for the object. This greatly simplifies the task of creating a software robot by reducing the number of search and other instructions that a developer has to write for the software robot to access objects that it will use to control various application programs to perform a task. Reducing the number of search instructions required also reduces the number of programming errors introduced and makes the development of software robots more time-efficient and cost-effective. In addition, using a single search instruction reduces processing overhead associated with parsing multiple search instructions, repeatedly making the same function calls, and traversing the object hierarchy multiple times. This reduces delay associated with accessing objects in the object hierarchy leading to improved overall performance of the software robot. As a result, using a single search string with action operators not only reduces the complexity of the code that a developer of a software robot has to write, but also allows for software robots to be execute more efficiently.

In some embodiments, an instruction to search for an object in the object hierarchy may include, in addition to a search string conforming to the search grammar, one or more other parameters for controlling the manner in which the search is performed. For example, the instruction may include a refresh parameter indicating whether or not the object hierarchy is to be refreshed as the search is performed. For example, when the programmer inserting the instruction into a software robot knows that, at the time that the instruction is to be executed, the object hierarchy will contain the object being searched for and the object need not be refreshed, the programmer may set the value of the parameter to indicate that the hierarchy need not be refreshed during the search. As another example, the instruction may include a parameter indicating that the search to wait a threshold amount of time before completing the search for an object. The threshold amount of time to wait may also be specified. This parameter may be helpful, for example, when searching for objects corresponding to GUI elements on a webpage being loaded such that the search does not return without finding an object because the webpage containing a GUI element corresponding to the object has not finished loading.

It should also be appreciated that an instruction to perform a search may specify that the first object found matching the search criteria is to be returned or that all the objects found matching the search criteria are to be returned.

D. Search Optimization

Searching for objects in an object hierarchy may be a time-consuming operation because the hierarchy may include a large number of objects. For example, a search for a single object in the hierarchy, using depth- or breadth-first search, may take hundreds of milliseconds to perform. Since a software robot may search for and access hundreds—even thousands—of objects in the object hierarchy, as it is executing, the aggregate delay incurred across all the searches performed by the software robot may lead to a noticeable delay in execution of the software robot. As such, the inventors have appreciated that improving the speed of searching for objects in the object hierarchy will result in more efficient execution of software robots and completion of the tasks that the software robots were designed to automate.

Accordingly, in some embodiments, a search for an object in the object hierarchy may be implemented more efficiently by using additional information to guide the search to a particular portion of the object hierarchy. For example, such additional information may indicate a "starting point" object in the object hierarchy such that the search for a particular object is performed only among the descendants of this "starting point" object. As one non-limiting example, the additional information may indicate a "starting point" object rooting the portion of the hierarchy that contains objects corresponding to active GUI elements of a particular application program. Accordingly, when a programmer is creating a software robot that searches for a particular object corresponding to an active GUI element of a particular application during execution, the programmer may specify that the search for the particular object may be performed only in the portion of the object hierarchy consisting of objects corresponding to active GUI elements of the particular application. The programmer may do so in any suitable way and, for example, by providing information (e.g., as a parameter) to the search function indicating a "starting point" object in the object hierarchy at which to begin the search for a particular object. As another example, additional information that may be used to guide the search for a particular object may indicate that the particular object must be a descendant of an ancestor (e.g., parent) object having a particular name and/or type. Such additional information may also be provided by the programmer creating the software robot that searches for the particular object.

Another technique developed by the inventors for speeding up searching for objects in the object hierarchy is search caching. Since software robots may be used to automate tasks that are performed repeatedly, each software robot is likely to be executed multiple times. The inventors have appreciated that a software robot likely searches for the same objects (e.g., using the same search strings) each time the software robot executes, and that each such time the objects being searched for are located in the same place in the object hierarchy. In addition, in some circumstances, a software robot may search for the same object(s) multiple times, even if the software robot is executing once, and that in these circumstances, these object(s) are located in the same place in the object hierarchy. Accordingly, in some embodiments, information generated when searching for a particular object in the object hierarchy may be used to speed up a subsequent search for the same particular object. The generated information may be cached in association with information identifying the particular object, accessed at a later time when another search for the same particular object is performed, and used to speed up the search.

In some embodiments, when a software robot searches for and finds a particular object in the object hierarchy, information specifying the location of the particular object in the object hierarchy may be cached. When another search for the same particular object in the object hierarchy is initiated in the future, the cache may be checked to determine whether a search for the particular object has been performed previously and whether the cache contains information specifying the location of the particular object in the hierarchy. If it is determined that the cache contains information specifying the location of the particular object in the hierarchy, the software robot attempts to access the particular object at the specified location. If that attempt is successful, then the object is accessed. If the particular object is not found at the location or if it is determined that the cache does not contain information specifying the location of the particular object in the hierarchy, then a search (e.g., a depth- or a breadth-first search) for the particular object in the object hierarchy is performed.

In some embodiments, information specifying the location of a particular object may include a path to the particular object in the hierarchy. The path may be a path from an object serving as the root of the search (e.g., the root of the object hierarchy or any other object rooting the portion of the hierarchy in which the search was performed) to the particular. The path may be specified in any suitable way and stored in any suitable format. For example, the path may include information identifying each object (e.g., a hash of a unique identifier of each object) in the path from the root of the search to the particular object. Accordingly, in some embodiments, information specifying the location of a particular object may include: (1) an identifier for the object in the hierarchy that the search was started from; (2) the search string that was used to perform the search; and (3) a list of identifiers for the objects along the path. In some embodiments, when a search returns multiple objects (e.g., when multiple objects in the hierarchy satisfy a search string), the cache may include information specifying the location for each of the multiple objects in the object hierarchy.

This search caching technique speeds up the search process for several reasons. First, when information specifying the location of a particular object is available in the search cache and the particular object is accessed at the location in the hierarchy that is specified by the information in the search cache, no search is performed at all. Rather, the particular object is accessed by traversing the minimal portion of the hierarchy needed to access the particular object (e.g., by traversing only the path from the object at which the search was rooted to the particular object). Second, when searching for objects generally, objects in the object hierarchy may need to be refreshed. Replacing a search for the particular object across the entire object hierarchy with a traversal of the path from the root object to the particular object, the number of objects that need to be refreshed prior to accessing the particular object may be reduced.

E. Constructing an Object Hierarchy by Predicting Objects to be Used by a Software Robot The inventors have also appreciated that a software robot programmed to control one or more computer programs to perform a task will not make use of each active GUI element of the computer program(s) to control the computer program(s) to perform the task. For example, only a small subset of active GUI elements of the calculator program was used in the above-described examples of software robots controlling the calculator program. As another example, only a small subset of active GUI elements of the POWERPOINT program was used by the above-described software robot for automatically creating a presentation. As yet another example, a webpage may include hundreds or even thousands of active GUI elements, but in many instances, only a small number of them may be used by a software robot to perform a task. For example, the above-described software robot for comparing product prices across websites may access only a single value on a webpage for a product—the price of the product.

Since a software robot may not make use of many active GUI elements of the computer program(s) that it controls to perform a task, constructing an object hierarchy to include an object for each active GUI element of each computer program used by a software robot to perform the task would involve a large amount of wasted effort. Computational resources would be wasted further when refreshing the objects corresponding to active GUI elements never used by a software robot in performing the task. For example, refreshing the object hierarchy to reflect changes in webpage content may require refreshing hundreds of objects corresponding to GUI elements associated with the changed content, which is computationally expensive and potentially unnecessary because the software robot may not use any of the changed GUI elements in performing the task.

The inventors have recognized that the performance of a software robot would be improved if the number of objects in the object hierarchy that are not used by the software robot were reduced to a minimum. First, the automated workflow performed by a software robot would be performed faster because fewer objects in the object hierarchy would be generated and refreshed. One reason for this is that, as described above, generating and refreshing a particular object in the hierarchy may involve making calls to external APIs (e.g., provided by an application program or the operating system), which is computationally expensive and time consuming Additionally, having fewer objects in a hierarchy would reduce the time needed to search for an object in the hierarchy. Second, the software robot would become more robust because it would take less time to generate and/or refresh the object hierarchy. Since constructing an object hierarchy containing a large number of objects takes time, one or more GUIs may change during its construction so that the resulting object hierarchy does not faithfully represent these graphical user interfaces. Similarly, if refreshing an object hierarchy takes a long time, one or more GUIs may change during the refreshing so that the refreshed hierarchy does not faithfully represent the GUIs. This divergence between the object hierarchy and the current state of the GUIs that the hierarchy is used to control may lead to errors when there is an attempt to use a portion of the object hierarchy that does not accurately correspond to active GUI elements. The likelihood of such errors occurring increases with increases in the amount of time used to construct and/or refresh an object hierarchy.

Accordingly, in some embodiments, an object hierarchy is constructed to consist of substantially only those objects that correspond to the active GUI elements the software robot is predicted to use for performing a task, and the ancestors of these objects. Objects that correspond to active GUI elements that a software robot is predicted to use may be called "objects-of-interest." In an object hierarchy that consists of substantially only the objects-of-interest, at least a threshold percentage (e.g., at least 75%, at least 80%, at least 85%, at least 90%, at least 95%, at least 99%, all) of the objects in the hierarchy are objects-of-interest and their ancestors. More accurate predictions of active GUI elements to be used by a software robot in performing the task leads to the introduction of fewer extraneous objects (i.e., a higher threshold percentage of objects in the hierarchy are objects-of-interest) into the object hierarchy.

An object hierarchy consisting substantially of objects-of-interest may be considered a pruned version of the "complete" object hierarchy that contains an object for each and every active GUI element. The leaf objects in this pruned object hierarchy correspond to objects that the software robot is predicted to use for controlling one or more computer programs in furtherance of task. Thus, when predictions of the objects to be used by a software robot are completely accurate, the pruned object hierarchy consists of only the objects-of-interest and their ancestors. In this way, the computational effort for initially constructing and subsequently refreshing a large number of inconsequential objects in the hierarchy may be avoided.

In some embodiments, generating an object hierarchy for use by a software robot for controlling one or more computer programs to perform a task comprises: (1) predicting which GUI elements of the computer program(s) will be used by the software robot to control the computer program(s); and (2) generating an object hierarchy based, at least in part, on which GUI elements were predicted to be used by the software robot. The leaf objects in the generated object hierarchy may correspond to the active GUI elements predicted to be used by the software robot. In instances where the prediction for which GUI elements of the computer program(s) will be used are found to be inaccurate, the object hierarchy may be generated/updated without relying on the predictions. For example, upon unsuccessfully attempting to access an object in the hierarchy corresponding to an active GUI element, the entire object hierarchy may be refreshed and/or generated from scratch according to techniques described herein.

In some embodiments, predictions of which GUI elements will be used by a software robot may be made based on information gathered during one or more prior executions of the software robot. For example, when a software robot executes (e.g., for the first time) information indicating the objects in the object hierarchy accessed by the software robot to control one or more computer programs may be gathered and stored for subsequent use. This information may include information identifying the object, information identifying the location of the object within the object hierarchy (e.g., a "path" to the object in the hierarchy as described above in Section VII.D), information about the active GUI element to which the object corresponds, and/or any other suitable information. When the software robot executes at a later time to perform the same task, the stored information may be accessed and used to predict which objects in the hierarchy are likely to be accessed by the software robot, and guide construction of the object hierarchy based on this prediction. In this way, the performance of a software robot may be improved over time because the object hierarchy constructed for the software robot may be adapted based on the behavior of the software robot during one or more prior iterations.

A prediction of which objects in the object hierarchy are likely to be used by a software robot may be used to guide construction of the object hierarchy in any suitable way. In embodiments where information stored from one or more prior executions of the software robot includes paths to the objects in the hierarchy predicted to be used by the software robot, these paths may be used to guide generation of the object hierarchy. For example, in some embodiments, when generating the object hierarchy only the objects identified in one or more of the stored paths would need to be generated. These objects would correspond either to an object-of-interest or to an ancestor of an object of interest.

Figure 19A:
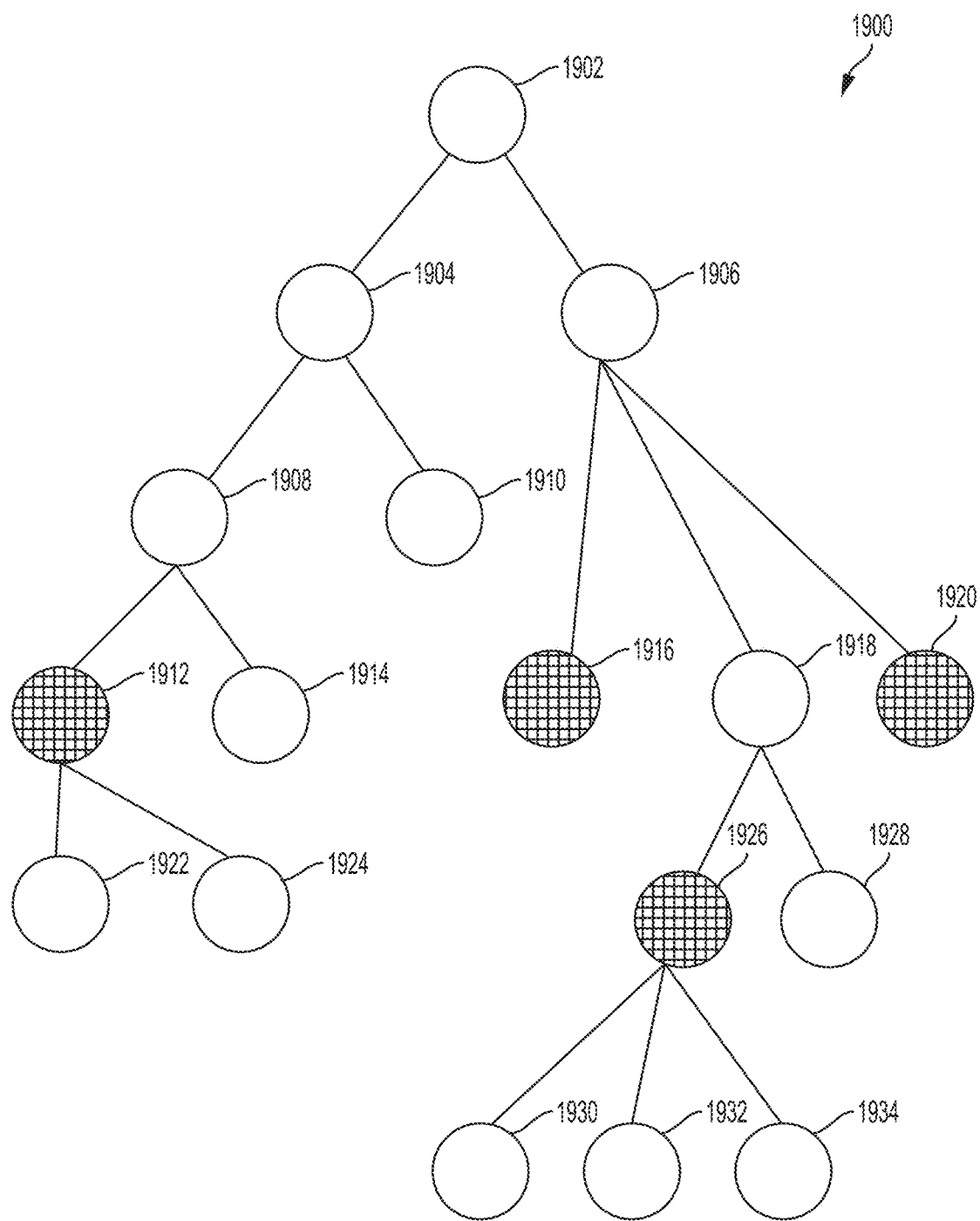
FIGS. 19A and 19B illustrate an example of constructing an object hierarchy guided by information gathered during an earlier execution of a software robot, in accordance with some embodiments of the technology described herein.
Figure 19B:
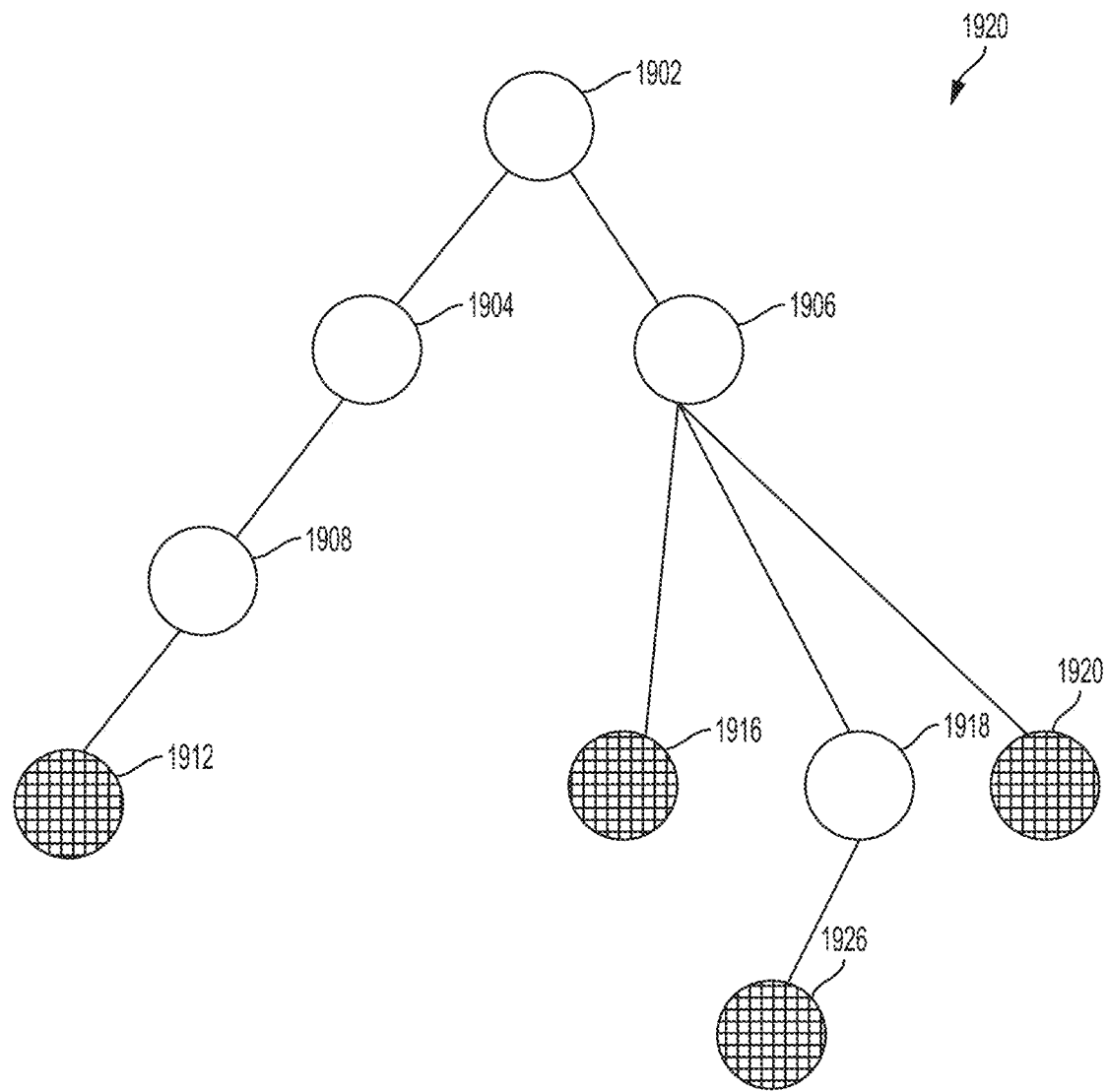

FIGS. 19A and 19B illustrate an example of constructing an object hierarchy guided by information gathered during an earlier execution of a software robot. FIG. 19A illustrates an example of an object hierarchy 1900 rooted at object 1902 and including objects 1904-1934. During its prior execution, the software robot accessed only the objects 1912, 1916, 1920, and 1926, which is indicated by shading by the nodes representing these objects. Although the software robot did not access the objects 1910, 1914, 1922, 1924, 1928, 1930, 1932, and 1934, the object hierarchy 1900 was generated with these objects and these objects may have been refreshed one or multiple times during the prior execution of the software robot, wasting computational resources.

In this illustrative example, information stored during the prior execution of the software robot may include information identifying the objects that were accessed and the paths to these objects. Specifically, the paths from the root 1902 to objects 1912, 1916, 1920, and 1926 may be stored. In turn, these paths may be used to generate the object hierarchy 1920 shown in FIG. 19B, which only includes those objects that occur in one of the paths from the root to objects 1912, 1916, 1920, and 1926. As may be appreciated, the resulting object hierarchy 1920 consists of substantially only the objects of interest and their ancestors.

In some embodiments, predicting which GUI elements of the computer program(s) will be used by the software robot to control the computer program(s) may include generating confidence values associated with the predictions. A confidence value may be generated for each of one or more of the GUI elements predicted to be used by a software robot. Such confidence values may be generated in any suitable way. For example, a confidence value associated with a prediction that a particular GUI element is to be used by the software robot may be generated based on statistics of how often this same prediction was accurate in the past. As a specific non-limiting example, after being set to an initial value, the confidence value may be increased (e.g., by a threshold amount) every time the prediction that the particular GUI element will be used is correct in that the particular GUI element is used by the software robot. Conversely, the confidence value may be decreased (e.g., by a threshold amount) every time the prediction that the particular GUI element will be used is incorrect in that the particular GUI element is not used by the software robot. A low confidence score associated with a prediction may indicate that a GUI has changed. For example, a low confidence score associated with predictions that particular active GUI elements in a webpage will be used by a software robot may indicate that the content of the webpage has changed.

In some embodiments, the generated confidence values may be used to influence the construction of an object hierarchy. For example, when the prediction that a particular GUI element will be used by a software robot is associated with a confidence value below a threshold, the prediction may be ignored and the constructed hierarchy does not include an object corresponding to the particular GUI element. On the other hand, when the prediction that a particular GUI element is to be used by the software robot is associated with a confidence above the threshold, the hierarchy is constructed to include an object corresponding to the particular GUI element.

F. Conditional Access to Object Hierarchy

The inventors have also appreciated that, in some circumstances, a software robot may wish to access an object in the hierarchy corresponding to an active GUI element of an application, but this object may not exist in the hierarchy. For example, a software robot may be programmed to control an Internet browser to load a webpage and then to access an object in a hierarchy corresponding to a GUI element in a webpage. However, the software robot may not be able to access the object corresponding to the GUI element in the webpage (e.g., a radio button in an HTML form) until the webpage (or at least the portion of the webpage containing the HTML form) is loaded. Thus, if the software robot attempts to access the object corresponding to the GUI element of the webpage prematurely, before the webpage is loaded, an error will occur. As another example, a software robot may be programmed to control an application through a particular object, but may not be able to access the object until it is loaded (e.g., becomes visible) in the application's GUI. As another example, a software robot may be programmed to control an application through a particular object, but should only do so after properties of this particular object change or are updated. As another example, a software robot may need to wait until a GUI of an application completes undergoing a transformation (e.g., an animation where the GUI slowly changes size).

The inventors have appreciated that it would be advantageous for a software robot to be able to wait until a condition to be satisfied (e.g., for one or more particular events to occur) prior to accessing one or more objects in the object hierarchy. Accordingly, in some embodiments, a software robot computer program may include one or more "WaitFor" instructions that, when executed, would cause the software robot to wait for one or more conditions to be satisfied prior to accessing one or more objects in the object hierarchy. Including such an instruction relieves the programmer that creates a software robot to write code that has to constantly check whether a particular object exists in the object hierarchy and, if not, cause the software robot to wait until the object appears while continuously refreshing the object hierarchy. Not only does doing so require the programmer to do additional work, but also may result in an inefficient implementation causing the object hierarchy to be needlessly refreshed (which is time consuming and may slow down the execution of the software robot).

One non-limiting example of a WaitFor instruction is the following instruction: WaitFor("@obj_name>Button::text ('View Processing Report')"). This illustrative instruction, when executed, would cause the software robot to wait and pause execution until an object of type "Button" (i.e., an object that corresponds to a button GUI element), having the name (e.g., identifier of the button) "obj_name," and text value (e.g., the text shown on the face of the button in the GUI) "View Processing Report" is found in the object hierarchy. After such an object is added to the object hierarchy, the WaitFor instruction releases the software robot from the waiting state. Thus, the effect of the WaitFor instruction shown above is that the software robot waits until the application program it is controlling changes its state so that the button for view processing reports is enabled and an object corresponding to this button is added to the object hierarchy. The system executing the software robot automatically detects when this object is added to the hierarchy and, in response to detecting that the object has been added to the hierarchy, allows the software robot to proceed with execution.

In some embodiments, the WaitFor instruction for causing a software robot to wait before accessing a particular object in the object hierarchy may be implemented by: (1) refreshing the object hierarchy; (2) searching for the object in the refreshed hierarchy; and (3) repeating these two steps until the object until it is found. In other embodiments, each of the WaitFor instructions in a software robot may be added to a list (or any other suitable data structure). When an object in the object hierarchy is being refreshed, the list may be checked to see if the object being refreshed matches any object in the list. If a match is found, the corresponding WaitFor instruction may be notified that the object it is waiting for is found and the software robot containing the WaitFor instruction may resume execution and access the object.

G. Determining Equality of Native Elements

As described herein, a software robot may control a computer program via objects in an object hierarchy that correspond to active GUI elements of the computer program, and, in some embodiments, an object in the hierarchy may control a corresponding active GUI element via an operating system (e.g., IOS, WINDOWS, etc.) or another application (e.g., JVM) managing execution of the computer program. In such embodiments, an object may control the corresponding active GUI element via a native element, managed by the OS or other application, that corresponds to the active GUI element. For example, as described above, the WINDOWS Automation API maintains a logical tree of elements through which active GUI elements of application programs implemented using the WINDOWS GUI application library may be controlled. As should be appreciated, that the objects in an object hierarchy are different from the native elements which, in some embodiments, may be used by the objects to control active GUI elements to which the objects correspond.

The inventors have recognized that the native elements, managed by an OS or other application, corresponding to active GUI elements of a computer program may change over time. For example, a native element corresponding to a GUI element (e.g., a button) managed by an OS or other application may die and be re-instantiated back as a new native element, all while the GUI element has not changed. As a result, it is important to be able to determine whether two such native elements are equal. Yet, the underlying systems (e.g., WINDOWS Automation API, JVM, etc.) neither provide unique identifiers for such native elements nor any other way of checking their equality.

Accordingly, some embodiments provide for ways of checking equality among native elements, which correspond to active GUI elements and are maintained by an OS or other application program. In some embodiments, equality of two native elements may be determined by comparing properties of the two native elements. The properties used for the comparison may be different depending on the technology used to implement the active GUI element(s) to which the two native objects correspond. For example, one set of properties may be used for comparing native elements corresponding to active GUI elements of an webpage (e.g., a URL associated with GUI element, a name of the GUI element, an ID of the GUI element, and/or any other suitable property), another set of properties may be used for comparing native elements corresponding to active GUI elements of a JAVA application (e.g., a memory address of a JVM object holding JAVA-specific information, a name of the GUI element, a control type of the GUI element, and/or any other suitable property), and yet another set of properties may be used for comparing native elements corresponding to active GUI elements of a WINDOWS application (e.g., a location of the GUI element, a width and/or a height of the GUI element, the control type of the GUI element, the class name of the GUI element, and/or any other suitable property).

In some embodiments, a first set of properties for a first native element and a second set of properties for a second native element may be compared by hashing the first set of properties using a hash function to obtain a first hash, hashing the second set of properties to obtain a second hash using the same hash function, and comparing the first hash with the second hash. The native elements are determined to be equal when their hashes match. Any suitable hash function may be used. In some embodiments, the hash function may be applied to a string constructed from the properties associated with a particular native element.

VIII. Resolving an Error in Automated Execution of a Task

When an error occurs during execution of a software robot, a user such as an administrator may need to intervene in order to resolve the error. The user may resolve the error so that the software robot may complete executing, restart the software robot, manually complete the task being performed by the software robot, and/or take any other suitable action(s). When alerted to the occurrence of an error, a user may access the computing device on which the software robot is executing to determine the nature of the error and identify actions that he/she should take to resolve it.

The inventors have appreciated that, when an error occurs during execution of a software robot that is performing a task, it may be difficult for the user to diagnose the nature of the error. For example, the software robot may perform the task by controlling one or multiple application programs to perform a sequence of actions in furtherance of the task and the user may not know which of the actions in the sequence were performed before the error occurred and which actions remain to be completed. Without this knowledge, it may be difficult for the user to determine the type of error that occurred and/or how to address the error.

As one example, the task may include performing actions using a first application, closing the first application, opening a second application, and performing additional actions using the second application. If the error occurs after the first application was closed and during attempted launch of the second application, a user logging into the computing device on which the software robot is executing would see neither the user interface of the first application (because it was closed) nor the user interface of the second application (because it was not launched successfully). As a result, the user would not know whether an error occurred during execution of the first application causing that program to close or during the execution of the second application. In fact, the error may be resolved simply by manually starting the second application so that the software robot may continue performing the actions for the task, but the user wouldn't know that this is the action that he should take to address the error.

Figure 20A:
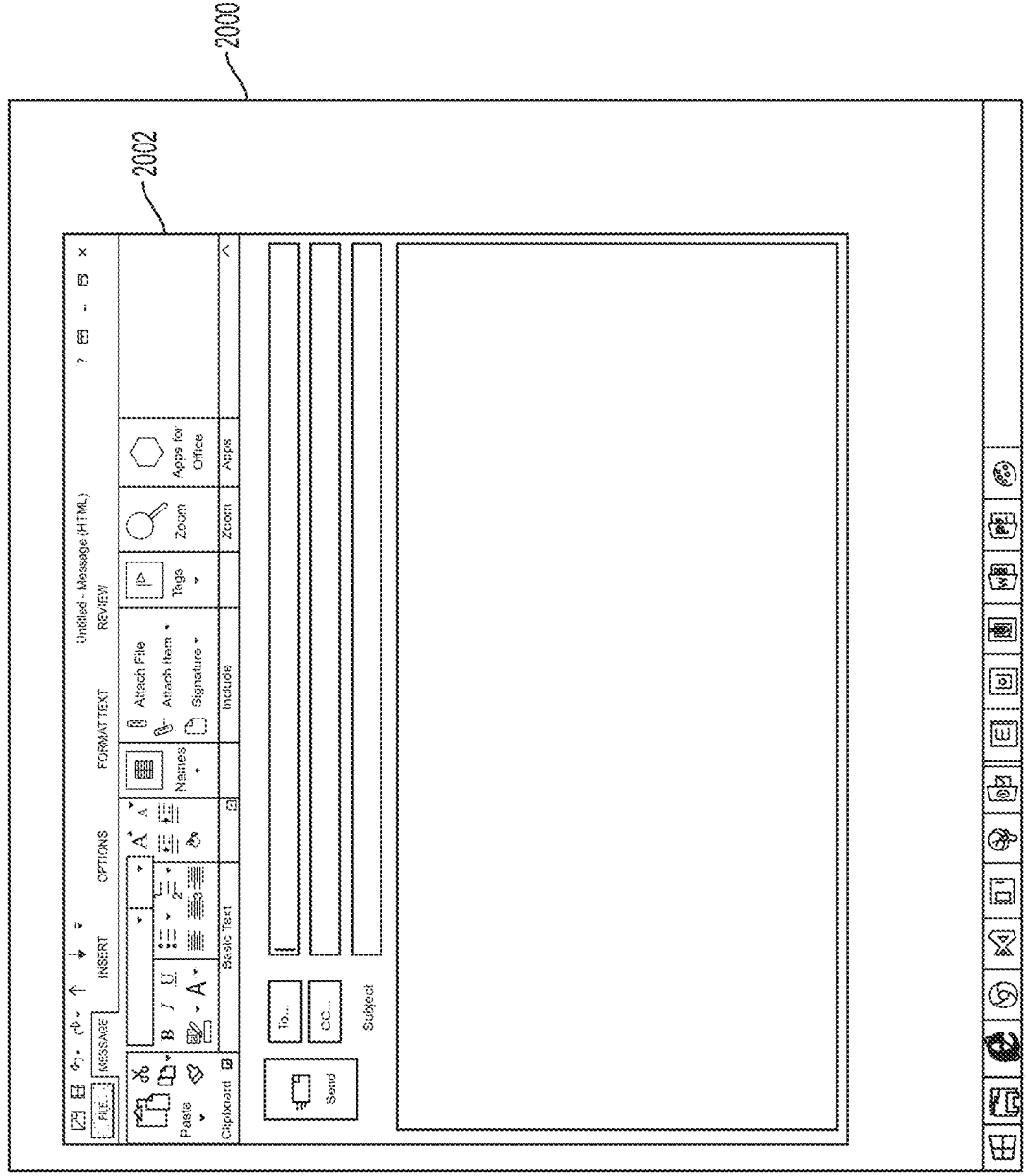
FIG. 20A is a diagram of an illustrative interface that may be presented to a user when an error occurs during performance of an automated task.

As another example, after receiving notification that an error occurred during execution of a software robot, the user may login to the computing device on which the software robot is executing and see a blank e-mail GUI 2002 on desktop 2000, as shown in FIG. 20A. The user would not be able to use this screen alone to determine what error had occurred and what action the user should take to resolve it.

A user attempting to diagnose an error in the execution of a software robot may access and review a log generated by the software robot. However, the information in the automatically generated log may not contain all the information needed to identify the error, and the information that the log does contain may be structured or formatted in a way that makes it difficult for a human to interpret quickly.

The inventors have recognized that it would be easier for a user to diagnose an error occurring during execution of a software robot if the user were provided with contextual information associated with actions performed by the software robot prior to occurrence of the error in addition to any information contained in a log automatically generated by the software robot. Such contextual information not only may relieve the user of the burden of making sense of information stored in machine-generated logs, but also may remove the need for software robot developers to expend time and effort ensuring that the information written to the software robot's log, for debugging the software robot at a later time, is easy to understand and includes any potentially useful detail. In addition, such contextual information has value beyond identifying errors and, for example, may be used by a user, who stopped automatic performance of a task, to complete the task manually.

Accordingly, in some embodiments, a software robot may be configured to control one or more computer programs, via an object hierarchy, to perform a sequence of actions in furtherance of a task. During performance of the sequence of actions, two types of information may be generated automatically without human intervention: (1) a log of already-performed actions in the sequence of actions; and (2) contextual information associated with the already-performed actions, which includes at least some information not in the log. The log and the contextual information may be presented to a user. In turn, the user may use the contextual information and, optionally information in the log, to manually perform one or more acts including, but not limited to, identifying an error that occurred during execution of the software robot, resolving an error that occurred during execution of the software robot, stopping execution of the software robot, restarting execution of the software robot from the beginning, restarting execution of the software robot to complete performance of uncompleted actions in the sequence of actions, and/or manually completing actions in the sequence of actions.

In some embodiments, automatically generating the contextual information comprises generating a visual record that indicates which actions in the sequence of actions were already performed. The visual record may comprise a visualization of how GUI elements of one or more application programs appeared on a display when the already-performed actions in the sequence of actions were being performed. For example, the visual record may include a video generated by recording how the display appeared during performance of the already-performed action. The user may be provided with an interface that allows the user to view the visual record. When the visual record includes the video, the user may use the interface to playback, rewind, fast forward the visual record, and/or perform any other suitable actions. The interface may allow the user to play the visual record of the automation process at different speeds including real-time speed, faster than real-time speed, and slower than real-time speed.

In some embodiments, automatically generating the contextual information comprises automatically generating a textual record that includes a natural language description of actions in the sequence of actions that were already performed. However, contextual information may be of any other suitable type, as aspects of the technology described herein are not limited in this respect.

Figure 20B:
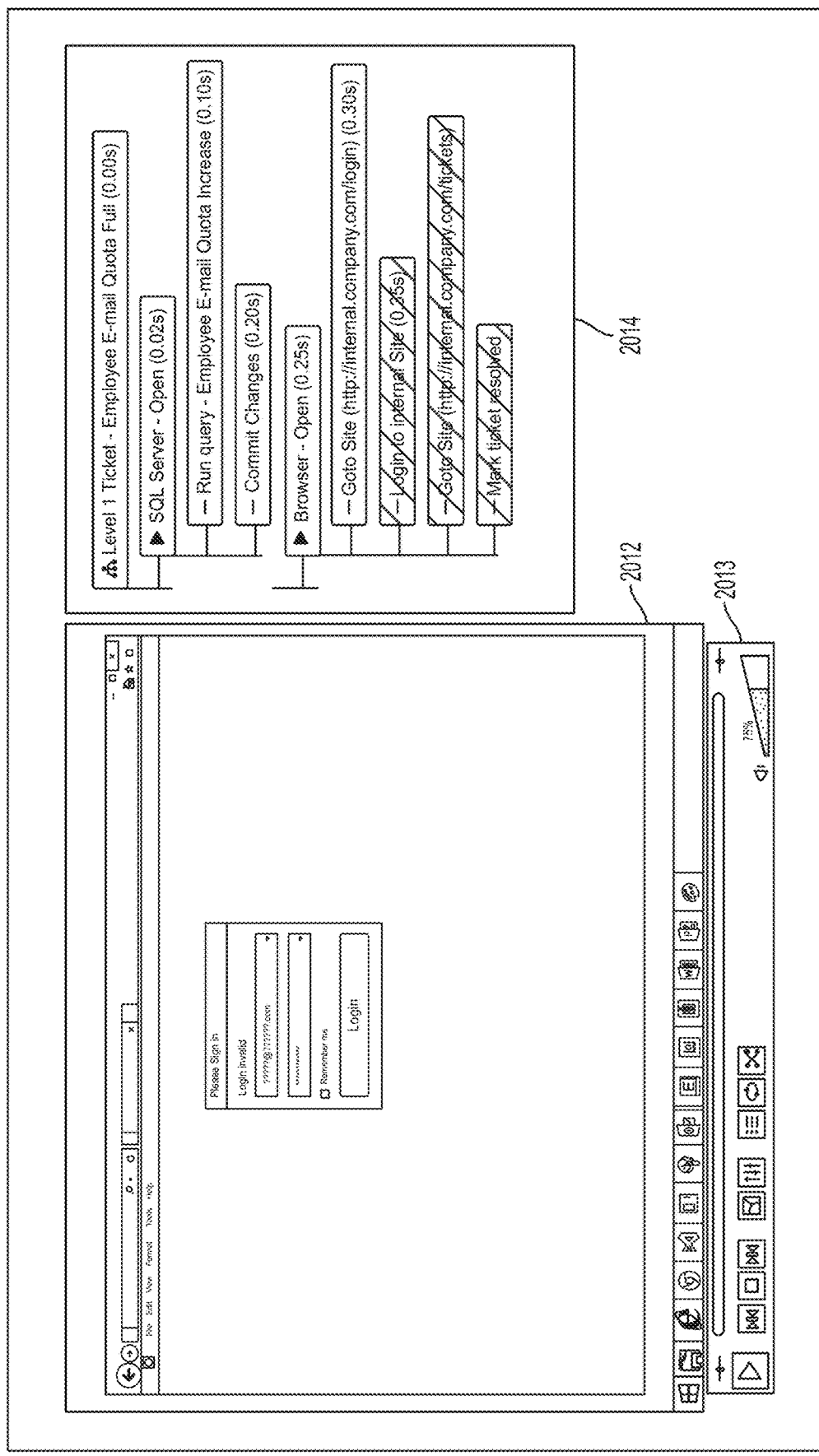
FIG. 20B is a diagram of an illustrative interface for presenting contextual information, in accordance with some embodiments of the technology described herein.

FIG. 20B is a diagram of an illustrative interface 2010 that may be used for presenting contextual information to a user, in embodiments where the contextual information generated during performance of a sequence of actions includes a visual record of information shown on a display during performance of at least some of the actions in the sequence. The user may utilize interface 2010 to diagnose the nature of an error that may have occurred in the execution of a software robot, resolve the error, and/or for any other purpose examples of which are described herein. Interface 2010 includes visual record playback area 2012, which shows a series of images generated (e.g., a video) when the already-performed actions in the sequence were being performed. Interface 2010 also includes control portion 2013 that may be used to control the way in which the visual record is played back in playback area 2012 (e.g., starting and stopping playback, controlling speed of playback, rewinding, fast forwarding, etc.). Interface 2010 also includes portion 2014, which displays information indicating the sequence of actions that constitute the workflow implemented by the software robot. Portion 2014 indicates which actions were completed (as indicated by unshaded boxes), times at which they were completed (as shown in parentheses following a textual description of each action), and which actions remained to be completed (as indicated by shaded boxes). The time at which a particular action in the sequence was completed may be used the user to identify a corresponding portion of the visual record capturing what the display of the computing device executing the workflow showed during execution of the particular action. In this way, the user can identify portions in the visual record corresponding to respective actions in the sequence. It should be appreciated that interface 2010 is illustrative and may be modified to show different contextual information to the user and/or display at least some of the same contextual information in a different manner. For example, interface 2010 may be modified to include a natural language description of the already-performed actions in addition to (or instead of at least some of) the information shown via interface 2010.

Figure 21:
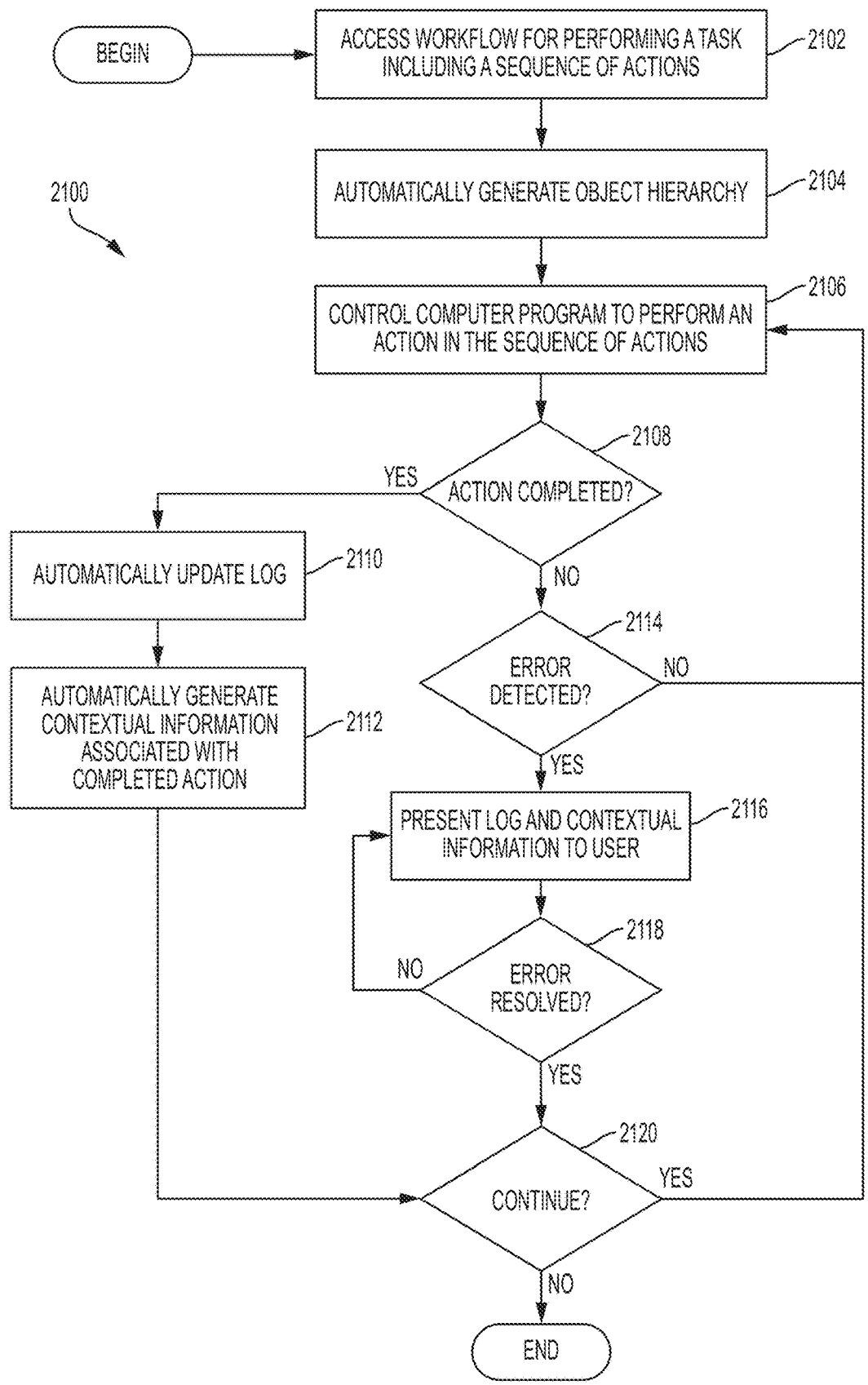
FIG. 21 is a flowchart of an illustrative process for human-assisted resolution of one or more errors occurring during performance of an automated task, in accordance with some embodiments of the technology described herein.

Aspects of how contextual information may be used to aid in resolution of errors that occurred during execution of a software robot may be understood further with reference to FIG. 21, which is a flowchart of illustrative process 2100 for human-assisted resolution of one or more errors occurring during execution of a software robot performing a task. Process 2100 may be performed by any suitable computing device(s) and, for example, may be performed by device 2210 described with reference to FIG. 22.

Process 2100 begins at act 2102, where a software robot for performing a task is accessed. The task may include a sequence of actions performed by one or more computer programs. The software robot program may include instructions that, when executed by the computing device(s) performing process 2100, cause the computing device(s) to control one or more computer programs to perform the task using a hierarchy of objects corresponding to active GUI elements of the computer program(s). Act 2102 may be performed in any suitable way including any of the ways described with respect to act 1002 of process 1000.

After a software robot computer program is accessed at act 2102, process 2100 proceeds to act 2104, where an object hierarchy is automatically generated by the computing device(s) executing process 2100. The generated object hierarchy includes objects corresponding to at least some of the active GUI elements of the operating system and/or application programs used by the software robot to perform the task. The object hierarchy may be generated in any suitable way including in any of the ways described with reference to act 1004 of process 1000.

Next, process 2100 proceeds to act 2106, where the generated object hierarchy is used to control a computer program (e.g., an application program or an operating system) to perform an action in the sequence of actions constituting the task. This may be done in any of the ways described herein including any of the ways described with reference to FIGS. 10A-C.

Next, process 2100 proceeds to decision block 2108, where it is determined whether the action of act 2106 has been completed successfully. This determination may be made in any suitable way. For example, it may be determined that the action has been completed when all the program instructions in the software robot associated with the action have been executed successfully. When it is determined that the action has been completed, process 2100 proceeds via the YES branch to acts 2110 and 2112, where information associated with execution of the action is recorded. On the other hand, when it is determined that the action has not been completed, process 2100 proceeds via the NO branch to decision block 2114, as described in more detail below. Below, the YES branch is described first and the NO branch is described second.

At act 2110, any information automatically generated by the software robot during execution of the action is recorded to a log. This information may be of any suitable type and may be stored in any suitable format. For example, the information stored in the log may include information generated by logging, debugging, and/or print statements occurring within the instructions executed by the software robot during performance of the action.

At act 2112, contextual information associated with the completed action may be generated. For example, a visual record of information shown by a display of the computing device executing process 2100 during execution of the action may be generated. This may be done in any suitable way. For example, the content of the display may be recorded during performance of the action, and upon completion of the action, the recorded video may be saved and, optionally, updated with metadata indicating when the action was performed (e.g., when the action began and when the action completed). This metadata may be used subsequently to allow a user to access quickly the portion of the video corresponding to the completed action. As another example, a natural language description of the completed action may be generated and stored at act 2112.

It should be appreciated that although acts 2110 and 2112 are shown as taking place after acts 2106 and 2108 have executed, this is by way of illustration only, as portions of acts 2110 and 2112 may occur during performance of acts 2106 and 2108. For example, a visual record of information shown by the display (of the computing device executing process 2100) during execution of the action may be generated during act 2106, as the software robot is controlling a computer program to perform the action.

After acts 2110 and 2112 are performed, process 2100 proceeds to decision block 2120, where it is determined whether to continue processing in furtherance of performing the task. When it is determined, at block 2120, that the last action in the sequence of actions constituting the task has been performed, process 2100 ends. On the other hand, when it is determined that another action in the sequence remains to be performed, process 2100 returns via the YES branch to act 2106, where the software robot controls a computer program to perform the other action.

The "NO" branch of decision block 2108 is described next. When it is determined, at decision block 2108, that the action has not completed, process 2100 proceeds to decision block 2114, where it is determined whether an error has been detected. This determination may be made in any suitable way. For example, the software platform executing the software robot may detect that an error has occurred (e.g., by catching an exception, determining that an application program unexpectedly closed, receiving an indication from an operating system, aspect oriented programming, etc.). When no error has been detected, process 2100 returns to act 2106 so that the action may complete.

On the other hand, when an error has been detected, process 2100 proceeds to act 2116, where the log and contextual information generated during process 2100 are presented to a user so that the user may take corrective action to address the error. The contextual information may be presented to the user in any suitable way. For example, the user may be presented with a visual record of information shown on the display during execution of the previously completed actions and/or a portion of the action being performed that was completed prior to the occurrence of the error. This may be done using the illustrative interface of FIG. 20B or in any other suitable way. As another example, the user may be presented with a natural language description of the already-completed actions. As yet another example, a user may be shown contextual information from a prior successful execution of the software robot during which the error did not occur. For example, the user may be shown a visual record (e.g., video) of the robot's prior error-free execution. This may help the user to understand the next steps that the software robot is to perform, which in turn may help to resolve the error.

In some embodiments, the contextual information generated during process 2100 may not be presented to the user immediately after occurrence of an error is detected. For example, the user may be notified that an error has occurred and the information may be presented to the user only after the user logs in to the computing device executing process 2100 and requests that the contextual information be shown. In such embodiments, the log and contextual information generated during execution of the software robot are saved for subsequent examination by the user.

Next, process 2100 proceeds to decision block 2118, where it is determined whether the error has been resolved. This determination may be made in any suitable way. For example, a user may provide an indication to the software platform executing the software robot that the error has been resolved. As another example, the user may simply cause the software robot to continue execution. When it is determined that the error has been resolved, process 2100 proceeds to decision block 2120, where the execution of the software robot may be resumed. For example, the action during which the error occurred may be completed. Additionally, it may be determined at block 2120, whether there are any other additional actions to be performed, as described above. On the other hand, when it is determined that the error has not been resolved, process 2100 returns to block 2116 and waits until the error is resolved.

In addition to generating information used for identifying and resolving errors in execution of software robots, in some embodiments, performance information used for analyzing and evaluating the performance of software robots may be collected. The performance information may be gathered at each computing device executing one or more software robots. The performance information may be stored at the computing device at which it as gathered, analyzed at the computing device at which it was gathered, and/or sent (e.g., in real-time) to another device (e.g., a server configured to receive performance data from multiple other devices) to be stored and/or analyzed. The results of analyzing the collected performance information can be used for improving the performance of a software robot. The results can also be used to detect and/or predict issues (e.g., outages) in external systems. For example, analysis of the performance data which indicates that the amount of time to perform an action involving an external system (e.g., a database, a website, etc.) increases relative to how long it has taken previously, may indicate an issue with the external system.

In some embodiments, the performance information may include timing information indicating how long each of the actions part of a task took to perform. As described above, a task may include one or more actions, and performing each action may include causing a computer program to execute one or multiple instructions. The timing information may include, for each of one or more actions part of a task, timing information indicating how long each of the instructions constitution the action took to perform. Additionally or alternatively, performance information may include memory information indicating how much memory (e.g., RAM) was used by the software robot and/or the computer program(s) controlled by it. The memory information gathered may indicate the amount of memory used to perform actions in a task and/or for particular instructions in an action. Additionally or alternatively, performance information may include networking information indicating how much network resources (e.g., bandwidth) were used by the software robot and/or the computer program(s) controlled by it. The networking information may indicate the amount of network resources used to perform actions in a task and/or for particular instructions in an action.

The inventors have appreciated that, while conventional profilers may provide basic information about the time taken for executing various functions used within a computer program, they fail to provide any contextual information that could give insight into why there was an unexpected delay (if any) in the execution of a software robot. For example, a conventional profiler does not indicate whether a delay was due to the amount of processing required, network latency, waiting for a remote server to perform an action, or some other reason(s).

Accordingly, the inventors have developed context-aware profiling techniques that may provide insight into why any delays in execution of a software robot may have occurred. To this end, in some embodiments, in addition to including timing, memory, and/or networking information for actions in a task performed by a software robot, the performance information may include classifications for the actions.

An action may be classified into one of multiple predefined categories. For example, an action may be classified based on the type of application program (e.g., a database, a web-based application, a WINDOWS application, etc.) performing the action. As another example, an action may be classified based on the type of GUI library used by the software robot to implement the action (e.g., JAVA GUI interface library, WINDOWS GUI interface library, etc.). As yet another example, the action may be classified based on which components in the components library are invoked during performance of the action. As yet another example, the action may be classified based on whether a delay was internal (e.g., due to a large amount of computation to be performed) or external (e.g., due to network latency, due to waiting for a remote device to perform one or more actions). These classifications may help not only to organize the performance data into groups (e.g., corresponding to the classes) used for analyzing the performance data and presenting results of that analysis, but also to identify the cause of the delay, which may facilitate taking steps toward eliminating the delay going forward.

In some embodiments, the performance data may be collected using Aspect-Oriented Programming (AOP) techniques. AOP techniques allow the software platform on which a software robot is executing to detect (e.g., catch) any functions (sometimes called "methods") invoked by the software robot and record information about each of the invocations. For each function call, the recorded information may include information identifying the function (e.g., its name), parameters provided to the function, output obtained from the function, values of environment variables at the time of the call, the amount of time that the function took to execute, the API containing the application, the application program that was involved, and/or any other suitable information. In some embodiments, techniques other than AOP (e g, manually augmenting all of the code for timing information and recording it) may be used to obtain performance information.

FIG. 20C is a diagram of an illustrative interface that may be used to present information about the performance of a software robot, in accordance with some embodiments of the technology described herein. The illustrative interface includes portion 2050 which shows how many times an action was performed by the software robot, the average time it took to perform the action, information identifying the action, and information identifying the application used to perform the action. The illustrative interface also includes portion 2052, which shows the time taken to perform each action in the order that the actions were performed, and portion 2054, which shows the amount of time taken by the software robot and the applications invoked by it. Also, as shown in FIG. 20C, the performance of the software robot may be examined at a higher level of granularity. For instance, the time taken by the software robot, as shown in portion 2054, may be further broken down into time taken by the software robot to manage its object hierarchy as shown in portion 2060*a*, execution time of functions in the component libraries accessed by the software robot as shown in portion 2060*b*, and time taken by any logging performed by the software robot as shown in portion 2060*c*.

IX. Environments for Deploying Software Robots

A software robot computer program may be used to control one or more application programs executing on a single computing device, on a single virtual machine, on multiple computing devices, and/or on multiple virtual machines, which may be executing on a same computing device or different computing devices. Accordingly, software robots may be deployed in various types of computing environments, as discussed below with reference to FIG. 22 and FIGS. 23A-23C.

Figure 22:
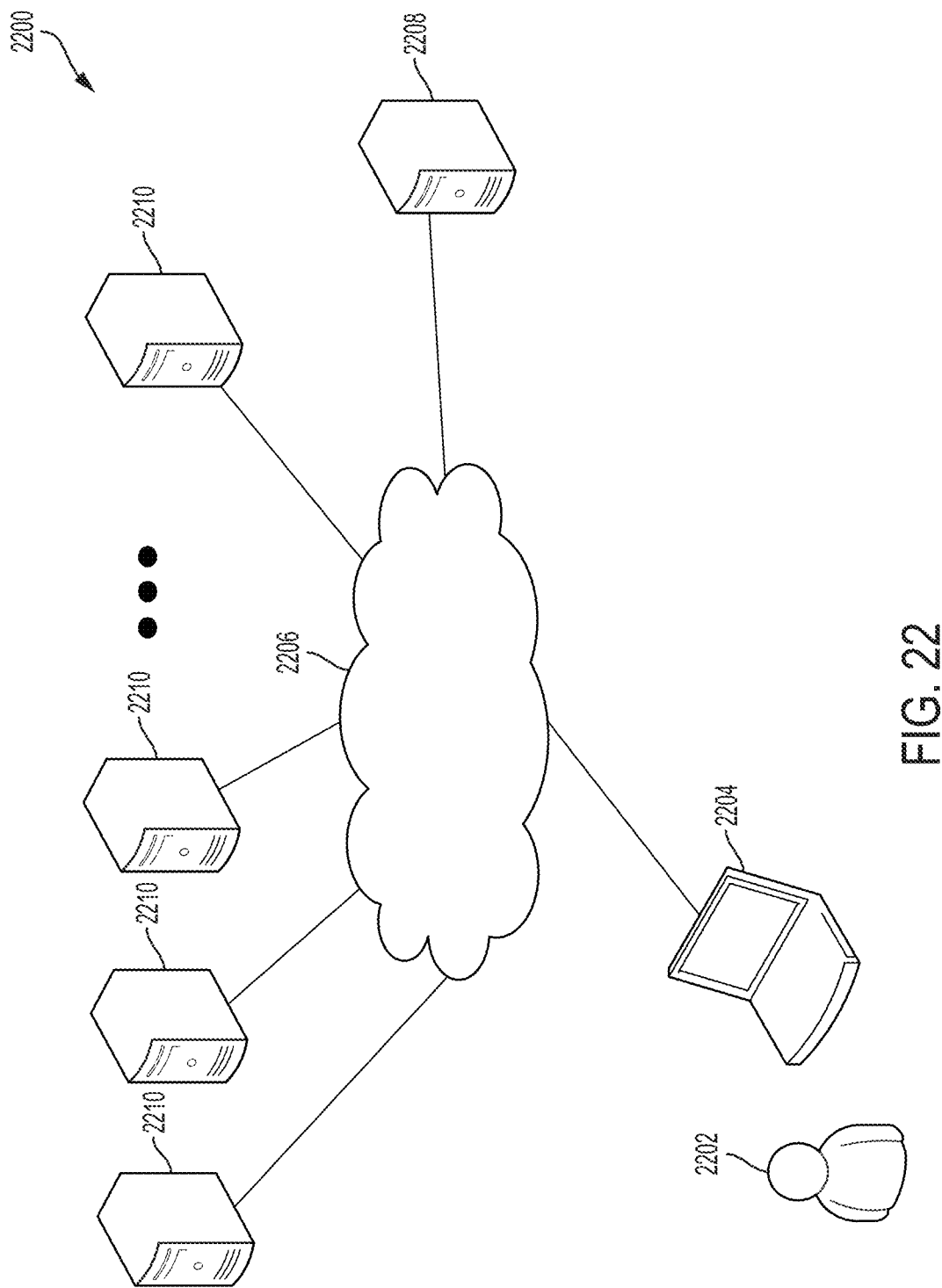
FIG. 22 is a diagram of an illustrative system in which some embodiments of the technology described herein may operate.

FIG. 22 is a diagram of an illustrative system 2200 in which some embodiments of the technology described herein may operate. System 2200 includes a client device 2204, controller device 2208, and multiple computing devices 2210. Though only four computing devices 2210 are shown in this non-limiting example, system 2210 may have fewer (e.g., one, two or three) or more (e.g., at least five, at least ten, at least 100, etc.) computing devices 2210. Devices 2204, 2208, and 2210 are communicatively coupled via network 2206, to which they may be connected via a wired connection (as shown in FIG. 22), a wireless connection, or a combination thereof. Network 2206 may be a local area network, a wide area network, a corporate Intranet, the Internet, and/or any other suitable type of network.

Each of devices 2204, 2208, and 2210 may be a portable computing device (e.g., a laptop, a smart phone, a personal digital assistant (PDA), a tablet device, a smart watch, etc.), a fixed computing device (e.g., a desktop, a server, a rack-mounted computing device, a mainframe), and/or any other suitable computing device that may be configured to execute one or more application programs and/or software robots. Some of devices 2204, 2208, and 2210 may be a same type of device or different types of devices. In some embodiments, all of devices 2210 may be of a same type, whereas, in other embodiments, some of devices 2210 may be of different types.

In some embodiments, user 2202 may configure any one or more of the devices 2204, 2208, and 2210 to execute one or more software robots. For example, user 2202 may configure controller 2208 and/or devices 2210 to execute a software robot. To this end, the user 2202 may remotely initiate, via client device 2204, execution of a software robot or robots on one or more of the devices 2208 and 2210. It should be appreciated that execution of a software robot may be initiated in any other suitable way (e.g., automatically rather than manually).

In some embodiments, a software robot executing on a computing device may be configured to control one or more computer programs (e.g., an operating system and/or one or more applications) executing on the same computing device to perform a task. For example, a software robot executing on controller 2208 may be configured to control one or more applications executing on controller 2208 to perform a task. As another example, a software robot executing on a device 2210 may be configured to control one or more applications executing on that device to perform a task. The software robot may control the program(s) by using an object hierarchy having objects corresponding to active GUI elements of the program(s), as described herein.

In some embodiments, a software robot executing on a computing device may be configured to control one or more computer programs executing on one or more other computing devices to perform a task. The control may be achieved using an object hierarchy comprising objects corresponding to active GUI elements of the computer program(s), as described herein. For example, a software robot executing on controller 2208 may be configured to control one or more applications executing on one or multiple computing devices 2210. For example, a software robot executing on controller 2208 may be configured to control a first application executing on a first computing device 2210 to perform a first sub-task of a task and to control a second application executing on a second computing device 2210 to perform a second sub-task of the task. The software robot may control the first application using an object hierarchy including objects corresponding to active GUI elements of the first application. Similarly, the robot may control the second application using an object hierarchy including objects corresponding to active GUI elements of the second application.

When the software robot and the computer program(s) controlled by it are executing on the same device, the object hierarchy used by the robot to control the computer program(s) may be generated, accessed, and refreshed on that same device. However, in embodiments where the software robot and the computer program(s) it is controlling to perform a task are executing on different computing devices, the object hierarchy may be generated and managed in a centralized or in a distributed manner In some embodiments, a software robot may control one or more computer programs executing on different computing devices by using multiple distributed object hierarchies. The distributed hierarchies may be local to the computing devices executing the program(s) being controlled, remotely, by the software robot. For example, a software robot executing on the controller device 2208 may be configured to control a first application executing on a first computing device 2210 to perform one or more actions (e.g., a first sub-task) in furtherance of a task by using a first object hierarchy generated on first computing device 2210 and comprising objects corresponding to active GUI elements of the first application. The first object hierarchy may be refreshed, on first computing device 2210, to contain objects corresponding to currently active GUI elements of the first application. The software robot may be further configured to control a second application executing on a second computing device 2210 to perform one or more additional actions (e.g., a second sub-task) in furtherance of the task by using a second object hierarchy generated on second computing device 2210 and comprising objects corresponding to active GUI elements of the second application. The second hierarchy may be refreshed, on the second computing device 2210, to contain objects corresponding to currently active GUI elements of the second application.

Accordingly, in some embodiments, controller 2208 may be configured to access a software robot for controlling a first application program executing on a first computing device 2210 external to the controller 2208, use the software robot to identify a first action to perform in furtherance of a task, and provide an indication to the first computing device 2210 to control the first application program to at least partially perform the first action. The indication may be in any suitable form and, for example, may be an indication to perform an action by using a particular active GUI element of the first application (e.g., an indication to click on a button in the GUI of the first application). As another example, the indication may include a command indicating that a local object should be accessed in the local object hierarchy maintained by the first computing device 2210 and/or that the local object should be used to perform an action on the corresponding active GUI element after being accessed. The command may include a search string (e.g., formatted in accordance with a search grammar) that may be used to search for the local object in the local object hierarchy maintained by the first computing device 2210.

The first computing device 2210 may be configured to generate a first object hierarchy including objects corresponding to active GUI elements of the first application executing on device 2210 and, in response to receiving the above-described indication from controller 2208, using the first object hierarchy to cause the first application to at least partially perform the first action. This may be done in any of the ways described herein and, for example, may include accessing, in the first object hierarchy, a first object corresponding to a first active GUI element of the first application and using the first object to cause the first application to at least partially perform the first action. Accessing the first object may include refreshing the first object hierarchy and/or searching for the first object in it (e.g., based on information, such as a search string, provided in the indication from controller 2208), which may be performed in any of the ways described herein.

The controller 2208 may be further configured to use the software robot to identify a second action to perform in furtherance of the task, and provide an indication to a second computing device 2210 (different from the first computing device) to control a second application program (different from the first application program) executing on the second computing device to at least partially perform the second action. The second computing device 2210 may be configured to generate a second object hierarchy including objects corresponding to active GUI elements of the second application and, in response to receiving the above-described indication from controller 2208, use the second object hierarchy to cause the second application to at least partially perform the second action. This may be done in any of the ways described herein and, for example, may include accessing, in the second object hierarchy, a second object corresponding to a second active GUI element of the second application and using the second object to cause the second application to at least partially perform the second action. Accessing the second object may include refreshing the second object hierarchy and/or searching for the second object in it, which may be performed in any of the ways described herein.

In some embodiments, a software robot may control one or more computer programs executing on different computing devices by using a single global object hierarchy generated and managed on the same computing device on which the software robot is executing. The global object hierarchy may be generated from information provided by the different computing devices executing the computer program(s) controlled by the software robot.

In some embodiments, for example, a software robot executing on controller 2208 may be configured to control first and second applications executing, respectively, on first and second computing devices 2210. The controller 2208 may be configured to: (1) obtain, from the first computing device 2210, first information about active GUI elements of the first application; (2) obtain, from the second computing device 2210, second information about active GUI elements of the second application; and (3) use the first and second information to generate a global object hierarchy having objects corresponding to active GUI elements of the first and second applications.

Information about active GUI elements of the first application program may be obtained from the operating system executing on the first computing device (e.g., via the WINDOWS Automation API), the first application program itself (e.g., when the first application program is an Internet browser), another application program (e.g., a JVM), and/or in any other suitable way. The information may include information identifying the active GUI elements, their relationship to one another, and/or any other suitable information (examples of which are provided herein) that may be used to generate an object hierarchy having objects corresponding to active GUI elements of the first application. Information about active GUI elements of the second application program may be obtained from analogous sources on the second computing device and may contain any suitable information that may be used to generate an object hierarchy containing objects corresponding to active GUI elements of the second application.

The controller 2208 may use the global object hierarchy to control the first and second application programs. This may be done in any suitable way. For example, in some embodiments, the controller 2208 may access, in the global object hierarchy, a first object corresponding to a first active GUI element of the first application program and use the first object to cause the first application program to at least partially perform the first action. For example, the first object may be used to make a call to the operating system (e.g., via the WINDOWS Automation API), the first application program (e.g., an Internet browser), or another application program (e.g., JVM) executing on the first computing device 2210 to execute an action via the active GUI element to which the first object corresponds. Accessing the first object may include refreshing the global object hierarchy and/or searching for the first object in it, which may be performed in any of the ways described herein.

In some embodiments, a software robot executing on a computing device may be configured to control one or more computer programs executing on one or more virtual machines to perform a task. In embodiments where a software robot controls multiple computer programs executing on multiple respective virtual machines, at least some (e.g., all) of the virtual machines may be executing on a same computing device. In some instances, all the virtual machines may be executing on different devices.

A software robot may control computer programs executing on multiple virtual machines in ways that are analogous to how a software robot may control computer programs executing on multiple computing devices. In some embodiments, a software robot may control the computer programs using multiple distributed object hierarchies generated and managed on respective virtual machines. In other embodiments, a software robot may control the computer programs using a global object hierarchy constructed from information provided by the virtual machines.

In some embodiments, a software robot may control one or more computer programs executing on different virtual machines by using multiple distributed object hierarchies. The distributed object hierarchies may be local to the virtual machines executing the program(s) being controlled. For example, in some embodiments, controller 2208 may be configured to access a software robot for controlling a first application program executing on a first virtual machine executing on a first computing device 2210, use the software robot to identify a first action to perform in furtherance of a task, and provide an indication to the first computing device 2210 to control the first application program to at least partially perform the first action. The indication may of any suitable type including any of the types described above. The first computing device 2210 may be configured to generate, using the first virtual machine, a first object hierarchy including objects corresponding to active GUI elements of the first application executing on device 2210 and, in response to receiving the above-described indication from controller 2208, using the first object hierarchy to cause the first application to at least partially perform the first action. This may be done in any way described herein.

The controller 2208 may be further configured to use the software robot to identify a second action to perform in furtherance of the task, and provide an indication to the first computing device 2210 (or another device 2210) to control a second application program executing on a second virtual machine (different from the first virtual machine) executing on the first (or another) computing device 2210 to at least partially perform the second action. The first computing device 2210 may be configured to generate, using the second virtual machine, a second object hierarchy including objects corresponding to active GUI elements of the second application and, in response to receiving the above-described indication from controller 2208, use the second object hierarchy to cause the second application to at least partially perform the second action. This may be done in any of the ways described herein.

In some embodiments, a software robot may control one or more computer programs executing on different virtual machines devices by using a single global object hierarchy. The global object hierarchy may be generated from information provided by the different virtual machines executing the computer program(s) controlled by the software robot.

In some embodiments, for example, a software robot executing on controller 2208 may be configured to control first and second application programs executing, respectively, on first and second virtual machines. The controller 2208 may be configured to: (1) obtain, from the first virtual machine, first information about active GUI elements of the first application (examples of such information are described herein); (2) obtain, from the second virtual machine, second information about active GUI elements of the second application (examples of such information are described herein); and (3) use the first and second information to generate a global object hierarchy containing objects corresponding to active GUI elements of the first and second applications. In turn, the controller 2208 may use the global object hierarchy to control the first and second application programs executing on the first and second virtual machines. This may be done in any of the ways described herein, including in any of the ways described above with respect to controlling multiple application programs executing on different computing devices using a global object hierarchy.

System 2200 may be used to support distributed and/or parallel execution of multiple software robots. For example, in some embodiments, controller device 2208 may be configured to manage execution of multiple software robots on computing devices 2210. The controller 2208 may be configured to initiate and monitor execution of the software robots on devices 2210. The controller 2208 may be configured to gather information from each of the devices 2210 including, but not limited to, information indicating whether one or more robots have completed their respective tasks, information indicating whether one or more robots have encountered any errors, logs and/or any contextual information generated by the robots, performance information indicating an amount of processing power and/or computing resources taken by the software robots and/or computer programs executing on computing devices 2210.

Figure 23B:
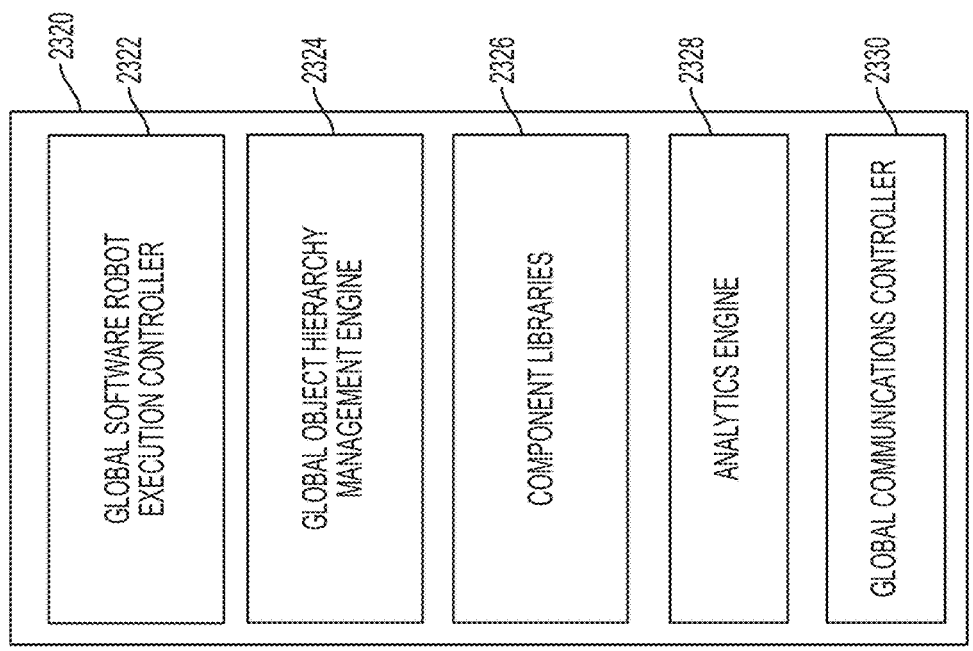
FIG. 23B is a diagram of illustrative software modules executing on a controller part of the illustrative system of FIG. 22.
Figure 23A:
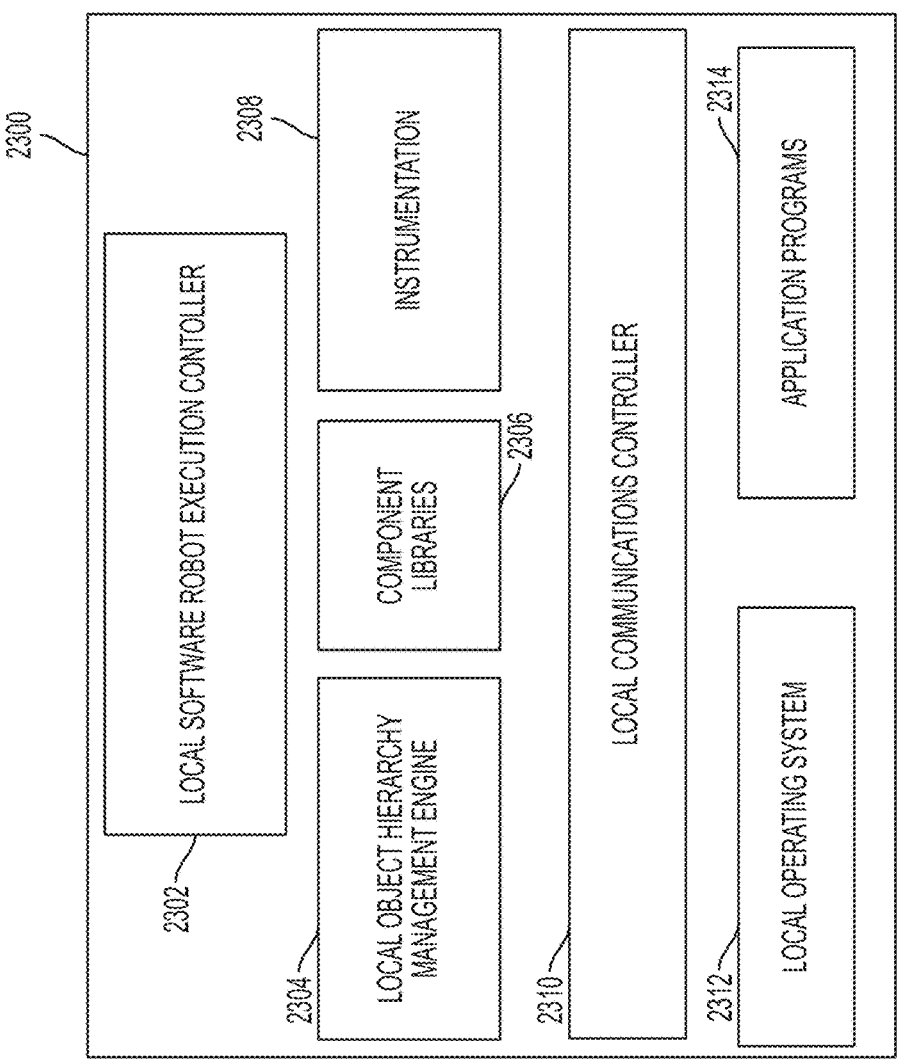
FIG. 23A is a diagram of illustrative software modules used by a computing device to execute one or more software robots, in accordance with some embodiments of the technology described herein.

FIG. 23A is a diagram of illustrative software modules used by computing device 2300 in executing one or more software robots. At least some (e.g., all) of these software modules may be installed on any computing device to configure it to execute one or more software robots in accordance with embodiments described herein.

In the illustrative embodiment of FIG. 23A, the software modules installed on computing device 2300 include local software robot execution controller 2302, local object hierarchy management engine 2304, component libraries 2306, instrumentation module 2308, and local communications controller 2310. Computing device 2300 is configured to execute operating system 2312 and one or more application programs 2314 executing on operating system 2312. Software modules 2302, 2304, 2306, 2308, and 2310 are configured to execute on operating system 2312 and may be used to facilitate execution of one or more software robots to control one or more computer programs, for example, to control operating system 2312 and/or one or more application programs 2314. A computing device may be configured to execute a software robot by using one or more other software modules in addition to or instead of the illustrated modules. Computing device 2300 may be of any suitable type of device including a portable or a fixed device, examples of which are provided herein.

Local software robot execution controller 2302 may be configured to initiate and manage execution of a software robot executing on computing device 2300. Controller 2302 may access and launch a software robot. Controller 2302 may be configured to initialize any variables and/or data structures, which may be used by a software robot during its execution. For example, controller 2302 may provide an indication (e.g., a command) to local object hierarchy management engine 2304 to generate an object hierarchy including objects corresponding to active GUI elements of operating system 2312 and/or one or more application programs 2314. The generated object hierarchy may be used by a software robot to control one or more computer program(s) executing on device 2300. Controller 2302 may pause or terminate execution of a software robot. Controller 2302 may be configured to perform any other suitable function(s) to facilitate execution of a software robot on computing device 2300.

Local object hierarchy management engine 2304 may be configured to generate and manage object hierarchies used by software robots executing on computing device 2300. Engine 2304 may be configured to generate an object hierarchy in any of the ways described herein (including by accessing information from operating system 2312 and/or application programs 2314 to do so), refresh an object hierarchy in any of the ways described herein, facilitate searching the object hierarchy for one or more objects in any of the ways described herein, provide for access to objects in the hierarchy (e.g., by providing handles), and/or perform any other functionality associated with generating and managing an object hierarchy.

Component libraries 2306 may include one or more functions used for controlling one or more computer programs (e.g., operating system 2312 and/or application programs 2314). As described above, a function in component libraries 2306 may be configured to control a particular computer program to perform a particular action through one or more objects in an object hierarchy corresponding to active GUI elements of the computer programs. Functions in component libraries 2306 may be organized in groups corresponding to respective computer programs. In this way, the component libraries 2306 may provide APIs for computer programs executing on computing device 2300.

Instrumentation module 2308 may be configured to generate information associated with execution of a software robot on device 2300. For example, instrumentation module 2308 may be configured to generate information that may be used to resolve any errors arising during execution of a software robot. Examples of such information are described herein. As another example, instrumentation module 2308 may be configured to collect performance information used for analyzing and evaluating the performance of software robots may be collected. Examples of such performance information are described herein.

When device 2300 is part of a system in which one or more software robots are deployed (e.g., system 2200 of FIG. 22), local communications controller 2310 may be used to communicate with other components of the system. Controller 2310 may receive, from an external device, an indication to launch a software robot, an indication to control a computer program executing on device 2300 to perform an action, and/or any other suitable information. Controller 2310 may provide, to an external device, an indication that a software robot encountered an error or completed performance, information about the active GUI elements of computer programs executing on device 2300, performance information, and/or any other suitable information.

In some embodiments, device 2300 may be part of a system in which one or more software robots may be deployed and, for example, may be a computing device 2210 of system 2200. In such embodiments, computing device 2300 may perform any of the functions performed by any one of computing devices 2210 as described above. For example, in embodiments where controller 2208 executes a software robot that remotely controls a particular one of application programs 2314 via a local object hierarchy generated and maintained on device 2300, device 2300 may be configured to: (1) use engine 2304 to generate the local object hierarchy comprising objects corresponding to active GUI elements of the particular application; and (2) in response to receiving an indication from the controller 2208 to perform an action using the particular application program, using the local object hierarchy to cause the particular application program to at least partially perform the action. As another example, in embodiments where controller 2208 maintains a global object hierarchy to control execution of an application program on device 2300, device 2300 may be configured to provide to controller 2208 information about active GUI elements of the application program so that controller 2208 may use this information to generate and/or maintain the global object hierarchy.

FIG. 23B is a diagram of illustrative software modules executing on a controller device 2320, which may be part of a system in which one or more software robots may be deployed and, for example, may be controller 2208 of system 2200. These software modules include global software robot execution controller 2322, global object hierarchy management engine 2324, component libraries 2326, analytics engine 2328, and global communications controller 2330. Device 2320 may include one or more other software modules in addition to or instead of the illustrated software modules. Controller device 2320 may be of any suitable type of device including a portable or a fixed device.

Global software robot execution controller 2322 may be configured to initiate and manage execution of a software robot for controlling a computer program or programs executing on one or more devices external to device 2320 (e.g., devices 2210) and, in some instances, on one or more virtual machines. Controller 2322 may access and launch a software robot, and may be configured to initialize any variables and/or data structures, which may be used by the software robot during its execution. For example, controller 2322 may provide an indication (e.g., a command) to global object hierarchy management engine 2324 to generate a global object hierarchy including objects corresponding to active GUI elements of the computer program(s) executing on the device(s) external to device 2320. The generated global object hierarchy may be used by the software robot to control the computer program(s) executing on the external device(s). Controller 2322 may pause or terminate execution of a software robot, and perform any other suitable function(s) to facilitate execution of the software robot.

Global object hierarchy management engine 2324 may be configured to generate and manage a global object hierarchy used by a software robot executing on device 2320. Engine 2324 may be configured to generate the global object hierarchy based on information received from the device(s) external to device 2320 that are executing any computer program(s) being controlled by the software robot. Engine 2324 may be configured to refresh the global object hierarchy, provide for the ability to search for objects in the global hierarchy, and provide for access to objects in the hierarchy in any of the ways described herein.

Component libraries 2326 may include one or more functions used for controlling one or more computer programs executing on device(s) external to device 2320 and may include some (e.g., all) of the component libraries 2306, described above.

Analytics engine 2328 may be configured to obtain performance information provided by one or more external devices, analyze the received information, and present results of the analysis to a user. In this way, a user may be able to assess the performance of the software robot as a function of computing resources and time taken by the computer program(s) being controlled by the software robot to perform a task.

When controller device 2320 is executing a software robot controlling computer program(s) on device(s) external to device 2320, global communications controller 2330 may be used to communicate with the external device(s).

In embodiments where device 2320 executes a software robot that controls one or more application programs executing on one or more external device(s) (e.g., devices 2210 of FIG. 22), device 2320 may be configured to: (1) use engine 2324 to generate the global object hierarchy comprising objects corresponding to active GUI elements of the application program(s); and (2) control the application program(s) to perform a task by using the global object hierarchy.

Figure 23C:
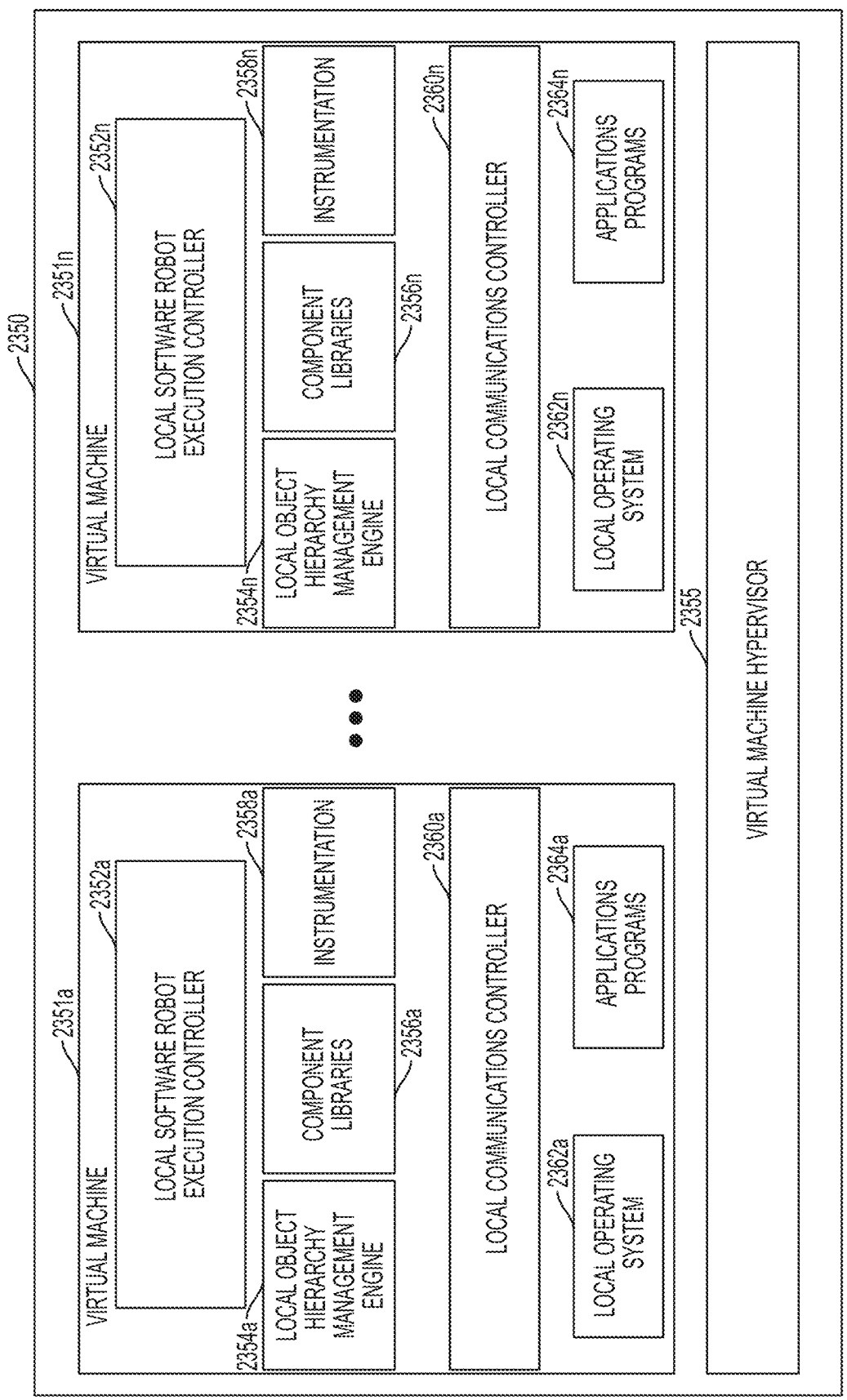
FIG. 23C is a diagram of illustrative software modules used by a computing device to execute software robots on virtual machines, in accordance with some embodiments of the technology described herein.

FIG. 23C is a diagram of illustrative software modules used by a computing device 2350 in executing multiple software robots on multiple virtual machines. As illustrated, device 2350 is configured to execute virtual machine hypervisor 2350 for managing multiple virtual machines executing on device 2350, including virtual machine 2351*a* and 2351*n*. Though only two virtual machines are illustrated, device 2350 and may be configured to execute any suitable number of virtual machines. Each of the virtual machines executing on device 2350 includes software modules for executing a software robot on the virtual machine. For example, virtual machines 2350*a* and 2350*n*, respectively, include local software robot execution controllers 2352*a* and 2352*n*, local object hierarchy management engines 2354*a* and 2354*n*, component libraries 2356*a* and 2356*n*, instrumentation modules 2358*a* and 2358*n*, local communication controllers 2360*a* and 2360*n*, and local operating systems 2362*a* and 2362*n*. Operations of these software modules is described herein with respect to corresponding modules shown in FIG. 23A.

Figure 24:
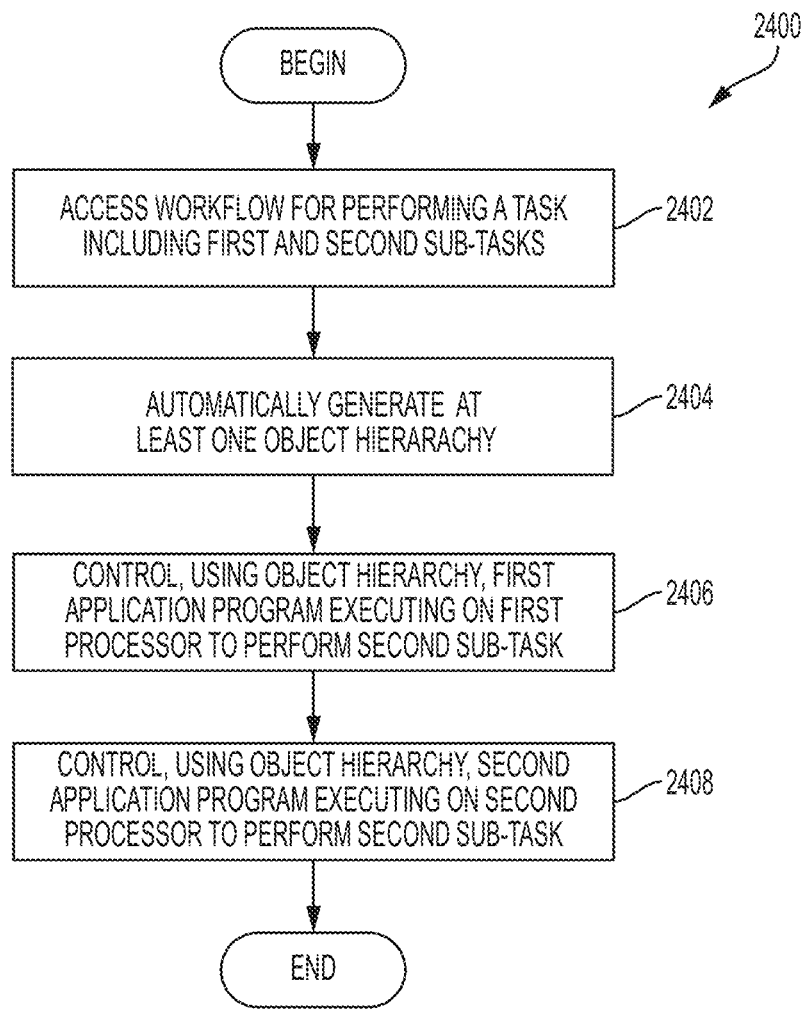
FIG. 24 is a flowchart of an illustrative process for using a software robot to control multiple application programs, executing on different physical devices and/or different virtual machines, to perform a task, in accordance with some embodiments of the technology described herein.

FIG. 24 is a flowchart of an illustrative process 2400 for performing a task by using an object hierarchy to control application programs executing on different physical computing devices and/or different virtual machines. Process 2400 may be executed using system 2200 described with reference to FIG. 22.

Process 2400 begins at act 2402 that involves accessing a software robot used to control multiple application programs to perform a task including a first sub-task to be performed by a first application program and a second sub-task to be performed by a second application program. The first and second application programs may be executing on different physical computing devices and/or different virtual machines Next, process 2400 proceeds to act 2404, where at least one object hierarchy is generated for controlling the first and second applications. In some embodiments, a single global object hierarchy is generated from information provided by the physical computing devices or virtual machines executing the first and second applications. In other embodiments, multiple object hierarchies may be generated. For example, first and second object hierarchies, containing objects corresponding to active GUI elements of the first and second applications, may be generated, respectively, by the physical devices or virtual machines, executing the first and second applications. An object hierarchy may be generated in any of the ways described herein.

Next, process 2400 proceeds to acts 2406 and 2408, where the at least one object hierarchy is used to control the first and second application programs to perform the first and second sub-tasks respectively. In embodiments where a single global object hierarchy is generated at act 2404, the single global object hierarchy is used to control both the first and second application programs, as described above with reference to FIG. 22. In embodiments where multiple object hierarchies at act 2404, the object hierarchies are used to control respective application programs. For example, a first object hierarchy generated on a first computing device or virtual machine executing the first application may be used to control the first application. Similarly, a second object hierarchy generated on a second computing device or virtual machines executing the second application may be used to control the second application.

X. Additional Implementation Detail

Figure 25:
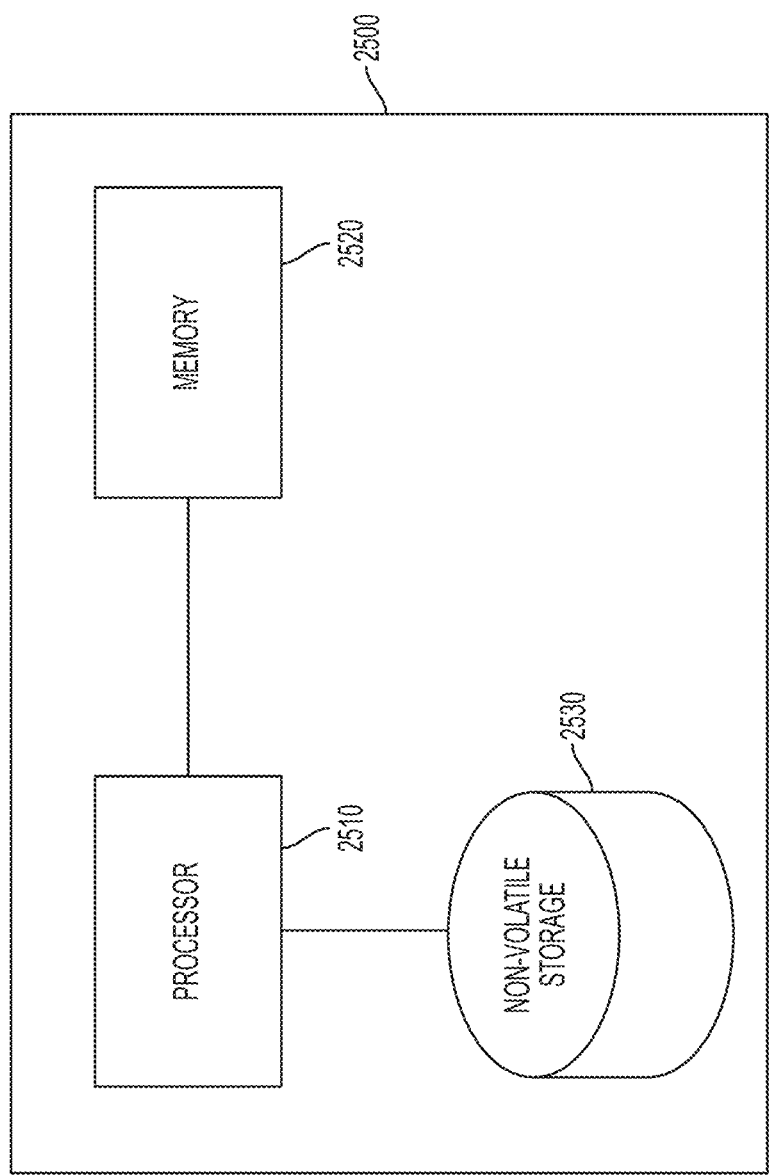
FIG. 25 is a block diagram of an illustrative computer system that may be used in implementing some embodiments.

An illustrative implementation of a computer system 2500 that may be used in connection with any of the embodiments of the disclosure provided herein is shown in FIG. 25. The computer system 2500 may include one or more computer hardware processors 2510 and one or more articles of manufacture that comprise non-transitory computer-readable storage media (e.g., memory 2520 and one or more non-volatile storage devices 2530). The processor 2510(*s*) may control writing data to and reading data from the memory 2520 and the non-volatile storage device(s) 2530 in any suitable manner. To perform any of the functionality described herein, the processor(s) 2510 may execute one or more processor-executable instructions stored in one or more non-transitory computer-readable storage media (e.g., the memory 2520), which may serve as non-transitory computer-readable storage media storing processor-executable instructions for execution by the processor(s) 2510.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for controlling at least one application program for performing a task comprising a sequence of actions, the at least one application program including a first application program and a second application program, the first and second application programs implemented using different graphical user interface (GUI) technologies and configured to execute at least in part by using different GUI application libraries, the system comprising:
   at least one computer hardware processor; and
   at least one non-transitory computer-readable storage medium storing processor-executable instructions that, when executed by the at least one computer hardware processor, cause the at least one computer hardware processor to perform:
      controlling the first application program and the second application program using an object hierarchy comprising a first portion of the object hierarchy for the first application program and a second portion of the object hierarchy for the second application program, wherein controlling the first application program and the second application program using an object hierarchy comprises:
         controlling the first application program to perform a first action in the sequence of actions using the first portion of the object hierarchy, the first portion of the object hierarchy comprising a first plurality of objects corresponding to a first plurality of active GUI elements of the first application program, wherein controlling the first application program comprises:
            using a first object of the first plurality of objects to cause, via a first active GUI element of the first plurality of active GUI elements, the first application program to at least partially perform the first action, the first action programmatically emulating a user's interaction with the first active GUI element; and
            after the first application program performs the first action, refreshing the object hierarchy to obtain a first refreshed object hierarchy comprising a second plurality of objects corresponding to a second plurality of active GUI elements reflecting changes in a user interface of the first application program; and
         controlling the second application program to perform a second action in the sequence of actions using the second portion of the object hierarchy, the second portion of the object hierarchy comprising a third plurality of objects corresponding to a third plurality of active GUI elements of the second application program, wherein controlling the second application program comprises:
            using a third object of the third plurality of objects to cause, via a third active GUI element of the third plurality of active GUI elements, the second application program to at least partially perform the second action, the second action programmatically emulating a user's interaction with the third active GUI element; and
            after the second application program performs the second action, refreshing the object hierarchy to obtain a second refreshed object hierarchy comprising a fourth plurality of objects corresponding to a fourth plurality of active GUI elements reflecting changes in a user interface of the second application program.

2. The system of claim 1, wherein refreshing the object hierarchy comprises:
   refreshing at least one object in the object hierarchy, adding at least one object to the object hierarchy, and/or removing at least one object from the object hierarchy.

3. The system of claim 1, wherein refreshing the object hierarchy comprises:
   refreshing only a subset of objects in the object hierarchy.

4. The system of claim 1, wherein controlling the first application program to perform the first action in the sequence of actions comprises:
   accessing the first object in the object hierarchy corresponding to the first active GUI element of the first application program.

5. The system of claim 1, wherein refreshing the object hierarchy comprises:
   refreshing only one or more parent objects of the first object in the object hierarchy, one or more descendant objects of the first object in the object hierarchy, and/or the first object.

6. The system of claim 1, wherein refreshing the object hierarchy comprises:
   adding a new object to the object hierarchy, wherein the new object is associated with an active GUI element of the first application program.

7. The system of claim 1, wherein the first active GUI element of the first application program is a visible GUI element of the first application program.

8. The system of claim 1, further comprising a display, wherein the processor-executable instructions further cause the at least one computer hardware processor to perform:
   displaying the user interface of the first application program on the display during the performance of at least some of the sequence of actions.

9. The system of claim 1, further comprising:
   generating the object hierarchy comprising a plurality of objects corresponding to active GUI elements of the at least one application program, the generating comprising:
      identifying the first plurality of active GUI elements of the first application program and the third plurality of active GUI elements of the second application program; and
      generating the first portion of the object hierarchy comprising the first plurality of objects and the second portion of the object hierarchy comprising the third plurality of objects.

10. The system of claim 9, wherein generating the object hierarchy comprises:
    obtaining a first hierarchical representation of the first plurality of active GUI elements of the first application program from an operating system; and
    identifying the first plurality of active GUI elements of the first application program using the first hierarchical representation.

11. The system of claim 10, wherein obtaining the first hierarchical representation is performed by using the WINDOWS Automation API.

12. The system of claim 1, wherein the processor-executable instructions, when executed by the at least one computer hardware processor, further cause the at least one computer hardware processor to perform:
controlling the first application program to perform a third action in the sequence of actions using the first refreshed object hierarchy at least in part by:
using a second object of the second plurality of objects to cause, via a second active GUI element of the second plurality of active GUI elements, the first application program to at least partially perform the third action, the third action programmatically emulating a user's interaction with the second active GUI element.

13. The system of claim 12, wherein the processor-executable instructions, when executed by the at least one computer hardware processor, further cause the at least one computer hardware processor to perform:
controlling the second application program to perform a fourth action in the sequence of actions using the second refreshed object hierarchy at least in part by:
using a fourth object of the fourth plurality of objects to cause, via a fourth active GUI element of the fourth plurality of active GUI elements, the second application program to at least partially perform the fourth action, the fourth action programmatically emulating a user's interaction with the fourth active GUI element.

14. A method for controlling at least one application program for performing a task comprising a sequence of actions, the at least one application program including a first application program and a second application program, the first and second application programs implemented using different graphical user interface (GUI) technologies and configured to execute at least in part by using different GUI application libraries, the method comprising:
using at least one computer hardware processor to perform:
controlling the first application program and the second application program using an object hierarchy comprising a first portion of the object hierarchy for the first application program and a second portion of the object hierarchy for the second application program, wherein controlling the first application program and the second application program using an object hierarchy comprises:
controlling the first application program to perform a first action in the sequence of actions using the first portion of the object hierarchy, the first portion of the object hierarchy comprising a first plurality of objects corresponding to a first plurality of active GUI elements of the first application program, wherein controlling the first application program comprises:
using a first object of the first plurality of objects to cause, via a first active GUI element of the first plurality of active GUI elements, the first application program to at least partially perform the first action, the first action programmatically emulating a user's interaction with the first active GUI element; and
after the first application program performs the first action, refreshing the object hierarchy to obtain a first refreshed object hierarchy comprising a second plurality of objects corresponding to a second plurality of active GUI elements reflecting changes in a user interface of the first application program; and
controlling the second application program to perform a second action in the sequence of actions using the second portion of the object hierarchy, the second portion of the object hierarchy comprising a third plurality of objects corresponding to a third plurality of active GUI elements of the second application program, wherein controlling the second application program comprises:
using a third object of the third plurality of objects to cause, via a third active GUI element of the third plurality of active GUI elements, the second application program to at least partially perform the second action, the second action programmatically emulating a user's interaction with the third active GUI element; and
after the second application program performs the second action, refreshing the object hierarchy to obtain a second refreshed object hierarchy comprising a fourth plurality of objects corresponding to a fourth plurality of active GUI elements reflecting changes in a user interface of the second application program.

15. The method of claim 14, wherein refreshing the object hierarchy comprises:
refreshing at least one object in the object hierarchy, adding at least one object to the object hierarchy, and/or removing at least one object from the object hierarchy.

16. The method of claim 14, wherein refreshing the object hierarchy comprises:
refreshing only a subset of objects in the object hierarchy.

17. The method of claim 14, wherein controlling the first application program to perform the first action in the sequence of actions comprises:
accessing the first object in the object hierarchy corresponding to the first active GUI element of the first application program.

18. The method of claim 14, wherein refreshing the object hierarchy comprises:
refreshing only one or more parent objects of the first object in the object hierarchy, one or more descendant objects of the first object in the object hierarchy, and/or the first object.

19. The method of claim 14, further comprising:
generating the object hierarchy comprising a plurality of objects corresponding to active GUI elements of the at least one application program, the generating comprising:
identifying the first plurality of active GUI elements of the first application program and the third plurality of active GUI elements of the second application program; and
generating the first portion of the object hierarchy comprising the first plurality of objects and the second portion of the object hierarchy comprising the third plurality of objects.

20. At least one non-transitory computer-readable storage medium storing processor-executable instructions that, when executed by at least one computer hardware processor, causes the at least one computer hardware processor to perform a method for controlling at least one application program for performing a task comprising a sequence of actions, the at least one application program including a first application program and a second application program, the first and second application programs implemented using different graphical user interface (GUI) technologies and configured to execute at least in part by using different GUI application libraries, the method comprising:

controlling the first application program and the second application program using an object hierarchy comprising a first portion of the object hierarchy for the first application program and a second portion of the object hierarchy for the second application program, wherein controlling the first application program and the second application program using an object hierarchy comprises:

controlling the first application program to perform a first action in the sequence of actions using the first portion of the object hierarchy, the first portion of the object hierarchy comprising a first plurality of objects corresponding to a first plurality of active GUI elements of the first application program, wherein controlling the first application program comprises:

using a first object of the first plurality of objects to cause, via a first active GUI element of the first plurality of active GUI elements, the first application program to at least partially perform the first action, the first action programmatically emulating a user's interaction with the first active GUI element; and after the first application program performs the first action, refreshing the object hierarchy to obtain a first refreshed object hierarchy comprising a second plurality of objects corresponding to a second plurality of active GUI elements reflecting changes in a user interface of the first application program;

controlling the second application program to perform a second action in the sequence of actions using the second portion of the object hierarchy, the second portion of the object hierarchy comprising a third plurality of objects corresponding to a third plurality of active GUI elements of the second application program, wherein controlling the second application program comprises:

using a third object of the third plurality of objects to cause, via a third active GUI element of the third plurality of active GUI elements, the second application program to at least partially perform the second action, the second action programmatically emulating a user's interaction with the third active GUI element; and after the second application program performs the second action, refreshing the object hierarchy to obtain a second refreshed object hierarchy comprising a fourth plurality of objects corresponding to a fourth plurality of active GUI elements reflecting changes in a user interface of the second application program.

\* \* \* \* \*